(12) United States Patent
Bensel et al.

(10) Patent No.: US 12,446,894 B1
(45) Date of Patent: Oct. 21, 2025

(54) SAW BLADE FOR USE IN PERFORMING A MEDICAL PROCEDURE

(71) Applicant: Stryker European Operations Limited, Carrigtwohill (IE)

(72) Inventors: Peter Hans Bensel, Kalamazoo, MI (US); Matteo Nicolasi, County Cork (IE); Stephen Isham, Mattawan, MI (US); Samuel David Dayton, Kalamazoo, MI (US)

(73) Assignee: Stryker European Operations Limited, Carrigtwohill (IE)

( * ) Notice: Subject to any disclaimer, the term of this patent is extended or adjusted under 35 U.S.C. 154(b) by 0 days.

(21) Appl. No.: 19/186,213

(22) Filed: Apr. 22, 2025

(51) Int. Cl.
*A61B 17/14* (2006.01)
*B23D 49/00* (2006.01)

(52) U.S. Cl.
CPC .......... *A61B 17/142* (2016.11); *B23D 49/002* (2013.01)

(58) Field of Classification Search
CPC ..... A61B 17/14; A61B 17/142; A61B 17/144; B23D 49/002
See application file for complete search history.

(56) References Cited

U.S. PATENT DOCUMENTS

| | | | |
|---|---|---|---|
| 4,106,181 A | 8/1978 | Mattchen | |
| 5,306,285 A * | 4/1994 | Miller | B23D 61/123 606/177 |
| 6,113,618 A | 9/2000 | Nic | |
| 7,001,403 B2 | 2/2006 | Hausmann et al. | |
| 7,704,253 B2 | 4/2010 | Bastian et al. | |
| 8,216,262 B2 * | 7/2012 | O'Donoghue | A61B 17/142 606/86 R |

(Continued)

FOREIGN PATENT DOCUMENTS

| | | | | |
|---|---|---|---|---|
| DE | 202006009423 U1 | 8/2006 | | |
| JP | 2016508806 A * | 3/2016 | ........... | A61B 17/142 |

(Continued)

OTHER PUBLICATIONS

Partial International Search Report for Application No. PCT/IB2025/054203 dated Jul. 9, 2025, 3 pages.

(Continued)

*Primary Examiner* — Eric S Gibson
(74) *Attorney, Agent, or Firm* — Howard & Howard Attorneys PLLC

(57) ABSTRACT

A surgical saw blade configured for oscillatory resection of bone, the saw blade including a body defining a longitudinal axis (L). The body including a mounting portion and a distal portion, the distal portion and the mounting portion formed integrally with one another such that oscillation of the mounting portion results in oscillation of the distal portion. The distal portion having teeth formed on a blade head. The mounting portion defining a series of apertures including a first aperture shaped for receiving a biasing actuator, and a second aperture including a second proximal end and a second distal end. The mounting portion includes a peninsula portion extending away from the first aperture and configured for retaining the saw blade in a saw mount, the peninsula portion is partially surrounded by the second aperture, and the peninsula portion defines an area less than an area defined by the rear second aperture.

28 Claims, 66 Drawing Sheets

(56) References Cited

U.S. PATENT DOCUMENTS

| | | | |
|---|---|---|---|
| 8,734,450 B2 * | 5/2014 | Landon | A61B 17/142 30/337 |
| 9,119,631 B1 | 9/2015 | Murphy | |
| 9,192,290 B2 | 11/2015 | Spinnler et al. | |
| 9,192,390 B2 | 11/2015 | delRio et al. | |
| 9,402,635 B2 | 8/2016 | Boykin et al. | |
| 9,414,845 B2 | 8/2016 | Boykin | |
| 9,522,007 B2 * | 12/2016 | Servidio | A61B 17/142 |
| 9,603,603 B2 * | 3/2017 | Wang | A61B 17/14 |
| 10,022,129 B2 | 7/2018 | Reng | |
| 10,239,135 B2 | 3/2019 | Desoutter et al. | |
| D853,816 S | 7/2019 | Schaz et al. | |
| 10,363,617 B2 | 7/2019 | Desoutter et al. | |
| 10,456,142 B2 * | 10/2019 | Shiels | A61B 17/142 |
| 10,568,637 B2 * | 2/2020 | Koljaka | A61B 17/142 |
| 10,667,826 B2 | 6/2020 | Hassler, Jr. et al. | |
| 10,687,824 B2 * | 6/2020 | Shiels | A61B 17/142 |
| 10,736,686 B2 | 8/2020 | Rontal et al. | |
| 10,856,885 B2 * | 12/2020 | Boykin | A61B 90/92 |
| 11,000,297 B2 | 5/2021 | Robertson et al. | |
| 11,109,871 B2 * | 9/2021 | Mootien | B27B 19/008 |
| 11,219,465 B2 | 1/2022 | Guzman et al. | |
| 11,324,530 B2 | 5/2022 | Bornhoft et al. | |
| 11,389,179 B2 | 7/2022 | Bono et al. | |
| 11,490,898 B2 | 11/2022 | Gisler | |
| 11,766,266 B2 | 9/2023 | Bono et al. | |
| 11,812,973 B2 * | 11/2023 | Sieh | A61B 17/142 |
| 11,844,530 B2 * | 12/2023 | Schmuckli | B27B 19/006 |
| 11,883,056 B2 | 1/2024 | Behzadi | |
| 2002/0133186 A1 * | 9/2002 | Kullmer | B23D 61/025 606/178 |
| 2004/0098000 A1 * | 5/2004 | Kleinwaechter | B23D 61/123 D24/146 |
| 2004/0138668 A1 * | 7/2004 | Fisher | B23D 51/10 606/82 |
| 2007/0016238 A1 | 1/2007 | Marietta | |
| 2007/0123893 A1 * | 5/2007 | O'Donoghue | A61B 17/142 606/82 |
| 2009/0138017 A1 | 5/2009 | Carusillo et al. | |
| 2012/0041443 A1 * | 2/2012 | Landon | A61B 17/142 606/82 |
| 2013/0204256 A1 * | 8/2013 | Wang | B23D 61/006 606/82 |
| 2016/0016239 A1 * | 1/2016 | DeSoutter | A61B 17/142 403/373 |
| 2017/0209152 A1 | 7/2017 | Babaev | |
| 2017/0348007 A1 * | 12/2017 | Shiels | A61B 17/142 |
| 2018/0064447 A1 * | 3/2018 | Koljaka | A61B 17/142 |
| 2018/0317936 A1 * | 11/2018 | Mootien | B27B 19/008 |
| 2019/0021745 A1 * | 1/2019 | Shiels | A61B 17/142 |
| 2019/0290289 A1 * | 9/2019 | Schmuckli | B27B 19/006 |
| 2020/0375609 A1 * | 12/2020 | Miyatani | A61B 17/142 |
| 2021/0369286 A1 | 12/2021 | Mootien et al. | |
| 2022/0297339 A1 * | 9/2022 | Gisler | B27B 19/008 |

FOREIGN PATENT DOCUMENTS

| | | | | |
|---|---|---|---|---|
| WO | WO-2009151959 A1 * | 12/2009 | | A61B 17/142 |
| WO | WO-2012151122 A1 * | 11/2012 | | A61B 17/32002 |
| WO | 2017106093 A1 | 6/2017 | | |
| WO | WO-2017214737 A1 * | 12/2017 | | A61B 17/142 |
| WO | 2022133340 A2 | 6/2022 | | |
| WO | 2023133447 A1 | 7/2023 | | |

OTHER PUBLICATIONS

English language abstract and machine-assisted English translation for DE 20 2006 009 423 U1 extracted from espacenet.com database on Apr. 23, 2025, 7 pages.

* cited by examiner

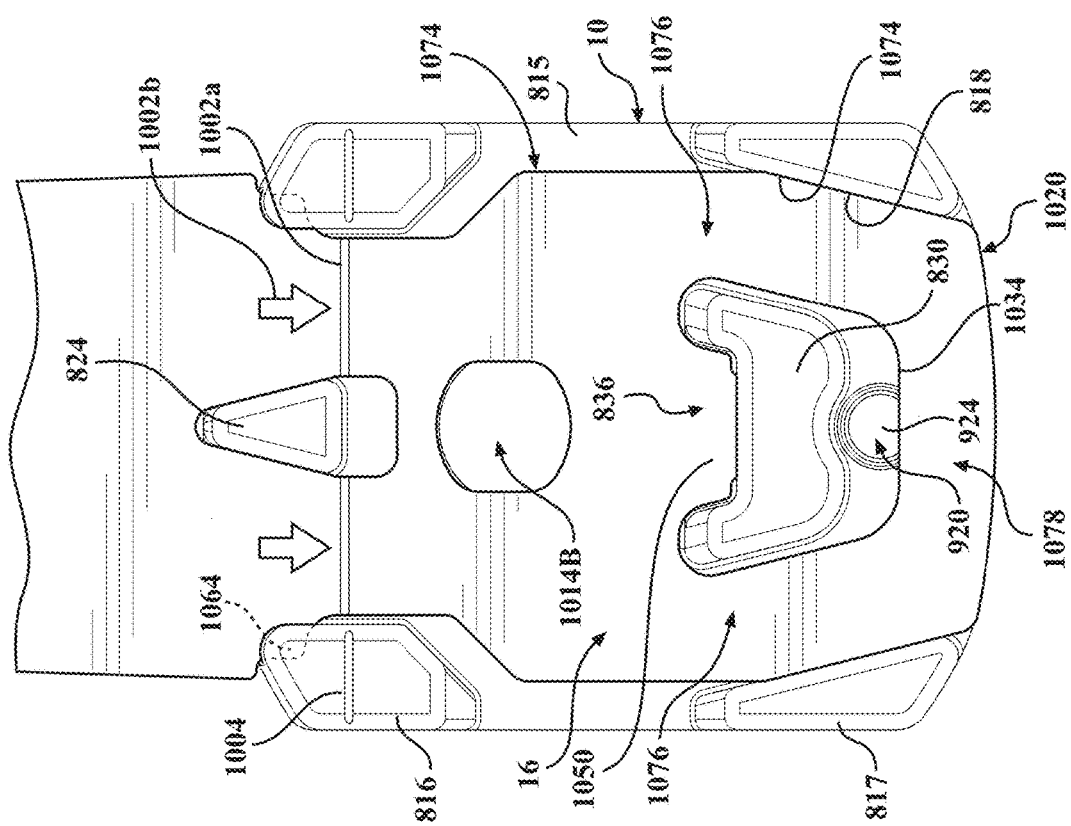
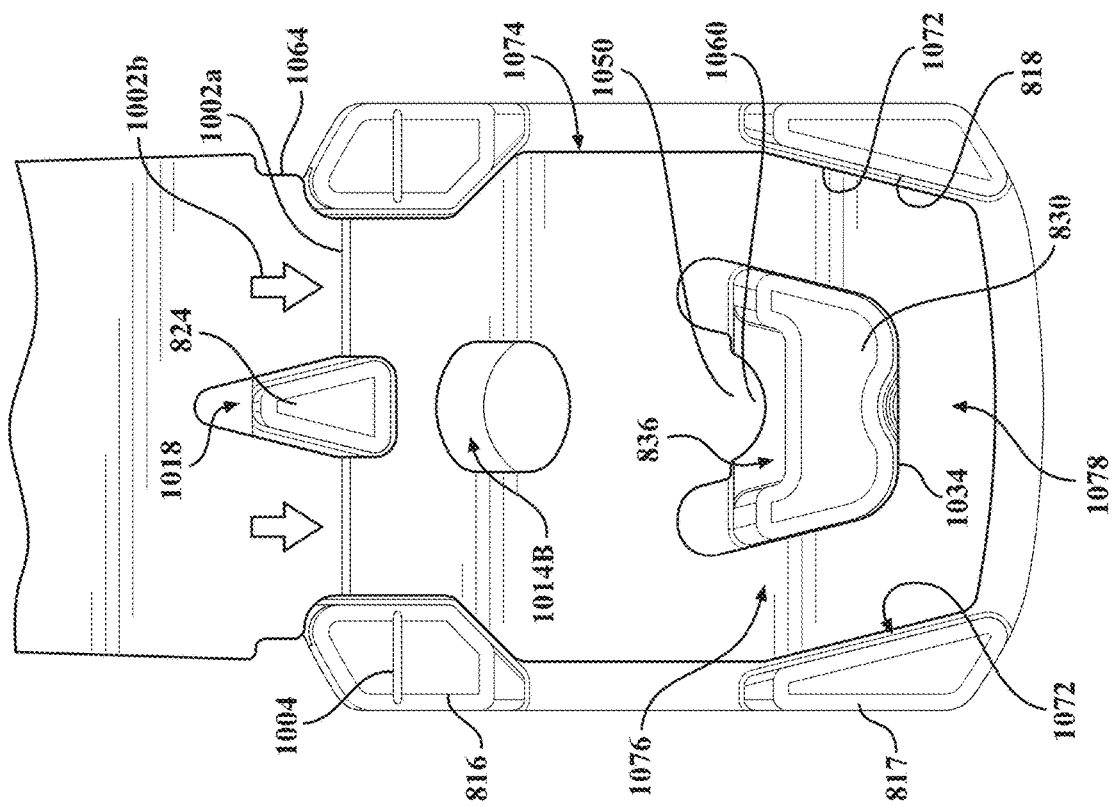
FIG. 58A
FIG. 58B

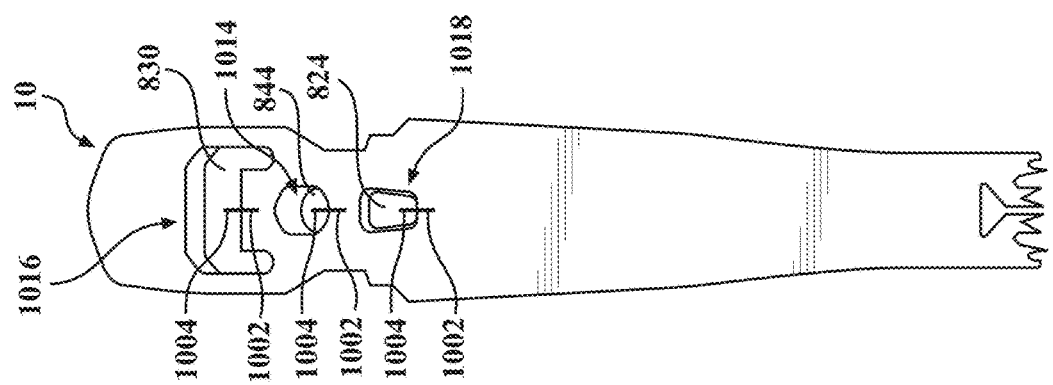

SAW BLADE FOR USE IN PERFORMING A MEDICAL PROCEDURE

SUMMARY OF THE INVENTION

This Summary introduces a selection of concepts in a simplified form that are further described below in the Detailed Description below. This Summary is not intended to limit the scope of the claimed subject matter nor identify key features or essential features of the claimed subject matter.

A surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The sagittal also includes where the proximal portion defines a geometric feature configured for mounting the planar blade body to the surgical saw; a blade head extending from a distal end of the distal portion of the planar blade body, the blade head may include a plurality of teeth arranged adjacent to one another across at least a portion of a width of the blade head, each of the plurality of teeth having a top surface and an opposed bottom surface; where each of the plurality of teeth may include a bevel to one of the top surface or the bottom surface; where the bevel is alternatingly applied to the opposite of the top or the bottom surface of the adjacent teeth of each of the plurality of teeth.

A second general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The sagittal also includes a geometric feature defined by the proximal portion of the planar blade body, the geometric feature configured for mounting the planar blade body to the surgical saw. The sagittal also includes a blade head extending from a distal end of the distal portion of the planar blade body. The sagittal also includes a plurality of teeth arranged adjacent to one another across a width of the distal end of the blade head. The sagittal also includes where the distal portion of the planar blade body may include opposed side surfaces, each of the opposed side surfaces may include a concave profile between the intermediate portion of the planar blade body and the blade head, the concave profile configured to define a void along the side surfaces of the distal portion of the planar blade body as the planar blade body is oscillated from side-to-side by the surgical saw. The sagittal also includes where at least a portion of each of the opposed side surfaces of the distal portion may include a bevel.

A third general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The sagittal also includes a geometric feature defined by the proximal portion of the planar blade body, the geometric feature configured for mounting the planar blade body to the surgical saw. The sagittal also includes a blade head extending from a distal end of the distal portion of the planar blade body. The sagittal also includes a plurality of teeth arranged adjacent to one another across a width of the distal end of the blade head. The sagittal also includes where the distal portion of the planar blade body may include opposed side surfaces, each of the opposed side surfaces may include a concave profile between the intermediate portion of the planar blade body and the blade head, the concave profile configured to define a void along the side surfaces of the distal portion of the planar blade body as the planar blade body is oscillated from side-to-side by the surgical saw. The sagittal also includes where at least a portion of each of the opposed side surfaces of the distal portion may include a chamfer.

A fourth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The sagittal also includes a geometric feature defined by the proximal portion of the planar blade body, the geometric feature configured for mounting the planar blade body to the surgical saw. The sagittal also includes a blade head extending from a distal end of the distal portion of the planar blade body. The sagittal also includes a plurality of teeth arranged adjacent to one another across a width of the distal end of the blade head. The sagittal also includes a recess defined in at least one of a top surface or a bottom surface of the blade head, the recess proximal to the plurality of teeth. The sagittal also includes where the distal portion of the planar blade body may include opposed side surfaces, each of the opposed side surfaces may include a taper between the intermediate portion of the planar blade body and the blade head, the taper configured to reduce a width of the distal portion of the planar blade body moving distally from the intermediate portion toward the blade head to define a void along the side surfaces of the distal portion of the planar blade body as the planar blade body is oscillated from side-to-side by the surgical saw. The sagittal also includes where the recess is configured to direct debris removed by the plurality of teeth to the void along the side surfaces of the distal portion of the planar blade body as the planar blade body is oscillated from side-to-side by the surgical saw.

A fifth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The sagittal also includes a longitudinal axis extending between the proximal and distal portions of the planar blade body. The sagittal also includes a geometric feature defined by the proximal portion of the planar blade body, the geometric feature configured for mounting the planar blade body to the surgical saw. The sagittal also includes a blade head extending from a distal end of the distal portion of the planar blade body. The sagittal also includes a plurality of teeth arranged adjacent to one another across a width of the distal end of the blade head. The sagittal also includes a recess defined in at least one of a top surface or a bottom surface of the blade head. The sagittal also includes where the distal portion of the planar blade body may include opposed side surfaces, each of the opposed side surfaces is tapered inward toward the longitudinal axis of the planar blade body moving from the intermediate portion of the planar blade body to a distal edge of the recess of the blade head, the taper configured to define a void along the side surfaces of the distal portion of the planar blade body as the planar blade body is oscillated from side-to-side by the surgical saw.

A sixth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The sagittal also includes a longitudinal axis extending between the proximal and distal portions of the planar blade body. The sagittal also includes a geometric feature defined by the proximal portion of the planar blade body, the geometric feature configured for mounting the planar blade body to the surgical saw. The sagittal also includes a blade head extending from a distal end of the distal portion of the planar blade body. The sagittal also includes a plurality of teeth arranged adjacent to one another across a width of the distal end of the blade head. The sagittal also includes where the intermediate portion of the planar blade body may include opposed side surfaces, each of the opposed side surfaces of the intermediate portion is tapered inward toward the longitudinal axis of the planar blade body moving from the proximal portion of the planar blade body to the distal portion of the planar blade body. The sagittal also includes where the distal portion of the planar blade body may include opposed side surfaces, each of the opposed side surfaces of the distal portion may include a concave profile. The sagittal also includes where the combination of the concave shape of the opposed side surfaces of the distal portion and the taper of the opposed side surfaces of the intermediate portion are configured to reduce the lateral profile of the planar blade body when it is oscillated from side-to-side by the surgical saw.

A seventh general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The sagittal also includes a longitudinal axis extending between the proximal and distal portions of the planar blade body. The sagittal also includes a geometric feature defined by the proximal portion of the planar blade body, the geometric feature configured for mounting the planar blade body to the surgical saw. The sagittal also includes a blade head extending from a distal end of the distal portion of the planar blade body. The sagittal also includes a plurality of teeth arranged adjacent to one another across a width of the distal end of the blade head. The sagittal also includes where the intermediate portion of the planar blade body may include opposed side surfaces, each of the opposed side surfaces is tapered inward toward the longitudinal axis of the planar blade body moving from the proximal portion of the planar blade body to the distal portion of the planar blade body, the taper configured such that the side surfaces of the intermediate portion of the planar blade body never extend beyond a kerf width defined by the blade head when the planar blade body is oscillated from side-to-side by the surgical saw. The sagittal also includes where at least a portion of each of the opposed side surfaces of the intermediate portion may include a chamfer.

An eighth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The sagittal also includes a longitudinal axis extending between the proximal and distal portions of the planar blade body. The sagittal also includes a geometric feature defined by the proximal portion of the planar blade body, the geometric feature configured for mounting the planar blade body to the surgical saw. The sagittal also includes a blade head extending from a distal end of the distal portion of the planar blade body. The sagittal also includes a plurality of teeth arranged adjacent to one another across a width of the distal end of the blade head. The sagittal also includes where the intermediate portion of the planar blade body may include opposed side surfaces, each of the opposed side surfaces is tapered inward toward the longitudinal axis of the planar blade body moving from the proximal portion of the planar blade body to the distal portion of the planar blade body, the taper configured such that the side surfaces of the intermediate portion of the planar blade body never extend beyond a kerf width defined by the blade head when the planar blade body is oscillated from side-to-side by the surgical saw. The sagittal also includes where at least a portion of each of the opposed side surfaces of the intermediate portion may include a radius extending between a top surface and a bottom surface of the planar blade body.

A ninth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The sagittal also includes a geometric feature defined by the proximal portion that is configured for mounting the planar blade body to the surgical saw. The sagittal also includes a blade head extending from a distal end of the distal portion of the planar blade body, the blade head may include a plurality of teeth arranged adjacent to one another, each of the plurality of teeth having a top surface and an opposed bottom surface. The sagittal also includes a recess defined in at least one of a top surface or a bottom surface of the blade head. The sagittal also includes where each of the plurality of teeth may include a bevel to one of the top surface or the bottom surface. The sagittal also includes where a proximal end of the bevel on the top surface or bottom surface of each of the plurality of teeth is configured to extend into the recess on the respective top surface or bottom surface of the blade head such that biological material removed by the plurality of teeth may move proximally along the bevel and into the recess defined in the respective top surface or the bottom surface of the blade head.

A tenth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The sagittal also includes a geometric feature defined by the proximal portion that is configured for mounting the planar blade body to the surgical saw. The sagittal also includes a blade head extending from a distal end of the distal portion of the planar blade body, the blade head may include a plurality of teeth arranged adjacent to one another, each of the plurality of teeth having a top surface and an opposed bottom surface. The sagittal also includes where two adjacent teeth may include a bevel alternatingly applied to the top surface and the bottom surface of adjacent teeth. The sagittal also includes where the bevel of one of the top or bottom surface of one of the two adjacent teeth defines a cutting edge with an unbeveled top or bottom surface of the adjacent tooth, the cutting edge extending distally from a distal end of the adjacent tooth with the unbeveled top or bottom surface.

An eleventh general aspect includes a method of manufacturing a saw blade for use with a sagittal surgical saw. The method also includes applying a bevel to one of a top surface or a bottom surface of each of the plurality of teeth such that the bevel is alternatingly applied to the top and the bottom surfaces of the adjacent teeth of each of the plurality of teeth to define a V-shaped side profile across a width of a distal end of the blade head.

A twelfth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The blade also includes a longitudinal axis extending between the proximal and distal portions of the planar blade body, the longitudinal axis bisecting the planar blade body. The blade also includes a geometric feature defined by the proximal portion of the planar blade body, the geometric feature configured for mounting the planar blade body to the surgical saw. The blade also includes a blade head extending from a distal end of the distal portion of the planar blade body. The blade also includes a plurality of inner teeth that extend distally a first distance from the blade head and are positioned proximate the longitudinal axis. The blade also includes one or more outer teeth that extend distally a second distance from the blade head on either side of the inner teeth. The blade also includes where the second distance is greater than the first distance such that the outer teeth move along a first arc and the inner teeth move along a second arc when the planar blade body is oscillated from side-to-side by the surgical saw. The blade also includes where the combination of the first and second arc define a recess in the cut profile of the blade head when the planar blade body is oscillated from side-to-side by the surgical saw.

A thirteenth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The blade also includes a longitudinal axis extending between the proximal and distal portions of the planar blade body, the longitudinal axis bisecting the planar blade body. The blade also includes a geometric feature defined by the proximal portion of the planar blade body, the geometric feature configured for mounting the planar blade body to the surgical saw. The blade also includes a blade head extending from a distal end of the distal portion of the planar blade body. The blade also includes a plurality of teeth arranged adjacent one other across a width of the blade head. The blade also includes where a distance that each of the plurality of teeth extend distally from the blade head increase respective to the distance a tooth of the plurality of teeth is located from the longitudinal axis.

A fourteenth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The blade also includes where the proximal portion defines a geometric feature configured for mounting the planar blade body to the surgical saw, the geometric feature including at least one aperture. The blade also includes a blade head extending from a distal end of the distal portion of the planar blade body, the blade head may include a plurality of teeth arranged adjacent to one another. The blade also includes where the distal portion of the planar blade body may include a top surface, a bottom surface, and a pair of opposed side surfaces extending between the top and bottom surfaces. The blade also includes where the pair of opposed side surfaces taper inward toward a longitudinal axis that bisects the planar blade body. The blade also includes where at least a portion of each of the side surfaces of the distal portion may include a chamfer where the side surfaces intersects with either the top or bottom surfaces.

A fifteenth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The blade also includes a blade head extending from a distal end of the distal portion of the planar blade body, the blade head may include a plurality of teeth arranged adjacent to one another. The blade also includes where the proximal portion defines a geometric feature configured for mounting the planar blade body to the surgical saw. The blade also includes where the planar blade body may include a top surface, bottom surface, and a pair of opposed side surfaces extending between the top surface and the bottom surface. The blade also includes where at least one of the pair of opposed side surfaces of the distal portion of the planar blade body defines a chamfer where the at least one of the pair of opposed side surfaces meets one of the top surface or the bottom surface.

A sixteenth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The blade also includes a blade head extending from a distal end of the distal portion of the planar blade body, the blade head may include a plurality of teeth arranged adjacent to one another. The blade also includes where the proximal portion defines a geometric feature configured for mounting the planar blade body to the surgical saw. The blade also includes where the planar blade body may include a top surface, bottom surface, and a pair of opposed side surfaces extending between the top surface and the bottom surface. The blade also includes where at least one of the pair of opposed side surfaces of the distal portion of the planar blade body defines a radius between the top and bottom surfaces.

A seventeenth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The blade also includes a blade head extending from a distal end of the distal portion of the planar blade body, the blade head may include a plurality of teeth arranged adjacent to one another. The blade also includes where the proximal portion defines a geometric feature configured for mounting the planar blade body to the surgical saw. The blade also includes where the planar blade body may include a top surface, bottom surface, and a pair of opposed side surfaces extending between the top and bottom surfaces. The blade also includes where each of the pair of opposed side surfaces of the intermediate portion and the distal portion of the planar blade body defines a chamfer where each of the pair of opposed side surfaces meets one of the top or bottom surfaces.

An eighteenth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The blade also includes where the proximal portion defines a geometric feature configured for mounting the planar blade body to the surgical saw, the geometric feature including at least one aperture. The blade also includes a blade head extending from a distal end of the distal portion of the planar blade body, the blade head may include at least three teeth extending distally from the blade head on each side of a longitudinal axis of the planar blade body, the at least three teeth arranged adjacent to one another. The blade also includes where the distal portion of the planar blade body may include a top surface, a bottom surface, and a pair of opposed side surfaces extending between the top and bottom surfaces. The blade also includes where the pair of opposed side surfaces taper inward toward a longitudinal axis that bisects the planar blade body such that that the top and the bottom surfaces of the distal portion of the planar blade body may include a biconcave profile. The blade also includes where one of the at least three teeth that is most distal to the longitudinal axis of the planar blade body extends a first distance from the distal end of the distal portion of the planar blade body, one of the at least three teeth that is most proximal to the longitudinal axis of the planar blade body extends a second distance from the distal end of the distal portion of the planar blade body, and one of the at least three teeth that is between the most proximal to the longitudinal axis and the most distal to the longitudinal axis extends a third distance from the distal end of the distal portion of the planar blade body. The blade is further configured such that the third distance is greater than the second distance but less than the first distance.

A nineteenth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The blade also includes where the proximal portion defines a geometric feature configured for mounting the planar blade body to the surgical saw, the geometric feature including at least one aperture. The blade also includes a blade head extending from a distal end of the distal portion of the planar blade body, the blade head may include opposed outer edges with at a first outer tooth positioned proximate each of the opposed outer edges of the blade head and a second outer tooth positioned adjacent to the first outer tooth and more proximate to a longitudinal axis of the planar blade body. The blade also includes where each of the first and second outer teeth may include a pair of distal tips separated by a V-shaped groove, the distal tip terminating at a point. The blade also includes where the first outer tooth extends a first distance from the distal end of the distal portion of the planar blade body and the second outer tooth extends a second distance from the distal end of the distal portion of the planar blade body. The blade also includes where the first distance is greater than the second distance such that the first outer tooth and the second outer tooth travel along the same arc as the planar blade body is oscillated.

A twentieth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The blade also includes where the proximal portion defines a geometric feature configured for mounting the planar blade body to the surgical saw, the geometric feature including at least one aperture. The blade also includes a blade head extending from a distal end of the distal portion of the planar blade body, the blade head defining at least two tines separated by an opening. The blade also includes the at least two tines may include at least two teeth extending from each of the at least two tines. The blade also includes where the blade head further defines an elongated aperture having a major axis that is generally parallel to a longitudinal axis of the planar blade body, the opening disposed at a distal end of the elongate aperture. The blade also includes where one of the at least two teeth that is distal to the opening extends a first distance from the distal end of the distal portion of the planar blade body and one of the at least two teeth that is proximal to the opening extends a second distance from the distal end of the distal portion of the planar blade body such that the first distance is greater than the second distance.

A twenty-first general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The blade also includes a blade head extending from a distal end of the distal portion of the planar blade body, the blade head defining at least two tines separated by and opening. The blade also includes at least three teeth extending distally from each of the at least two tines. The blade also includes where one of the at least three teeth that is most distal to the opening extends a first distance from the distal end of the distal portion of the planar blade body, one of the at least three teeth that is most proximal to the opening extends a second distance from the distal end of the distal portion of the planar blade body, and one of the at least three teeth that is between the most proximal to the opening and the most distal to the opening extends a third distance from the distal end of the distal portion of the planar blade body. The blade is further configured such that the third distance is greater than the second distance and less than the first distance.

A twenty-second general aspect includes a method of manufacturing a saw blade for use with a sagittal surgical saw. The method also includes laser cutting a planar blade body having opposed proximal and distal ends, the distal end defining a blade head with a plurality of teeth arranged adjacent to one another across a width the blade head. The method also includes grinding a distal end of at least one of the plurality of the teeth with a grinding device that is oriented at an angle relative to a top surface or a bottom surface of the planar blade body, the angle corresponding to a rake angle of the at least one of the plurality of the teeth.

A twenty-third general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The blade also includes where the proximal portion defines a geometric feature configured for mounting the planar blade body to the surgical saw, the geometric feature including at least one aperture. The blade also includes a blade head extending from a distal end of the distal portion of the planar blade body, the blade head defining at least two tines separated by and opening that opens to an elongated aperture, the elongate aperture having a major axis generally parallel to a longitudinal axis of the planar blade body. The blade also includes the at least two tines may include at least two teeth extending from each of the at least two tines, each of the at least two teeth extending from each of the at least two tines may include a bevel to one of a top surface or a bottom surface of the planar blade body. The blade also includes where the bevel is alternatingly applied to the opposite of the top or the bottom surface of the adjacent teeth of each of the at least two teeth extending from each of the at least two tines. The blade also includes where one of the at least two teeth that is distal to the opening extends a first distance from the distal end of the distal portion of the planar blade body and one of the at least two teeth that is proximal to the opening extends a second distance from the distal end of the distal portion of the planar blade body such that the first distance is greater than the second distance.

A twenty-fourth general aspect includes a surgical sagittal saw blade for use with a surgical saw including a blade mount. The surgical sagittal saw blade also includes a planar blade body including a proximal portion, an intermediate portion, and a distal portion, the proximal and distal portions extending from opposed ends of the intermediate portion. The blade also includes a blade head extending from a distal end of the distal portion of the planar blade body, the blade head may include a plurality of teeth arranged adjacent to one another. The blade also includes an indicia disposed on a point on the distal portion and/or the intermediate portion of the planar blade body relative to the blade head such that the indicia is configured to indicate a distance to the point on the planar blade body relative to the blade head. The blade also includes where the indicia is shaped to allow for visibility of the indicia by the user while the planar blade body is oscillated.

A twenty-fifth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The blade also includes where the proximal portion defines a geometric feature configured for mounting the planar blade body to the surgical saw, the geometric feature including at least one aperture. The blade also includes a blade head extending from a distal end of the distal portion of the planar blade body, the blade head may include at least three outer teeth, the three outer teeth including a first outer tooth positioned proximate an outer edge of the blade head, a second outer tooth positioned adjacent to the first outer tooth, and a third outer tooth position adjacent to the second outer tooth and more proximate to a longitudinal axis of the planar blade body. The blade also includes where each of the first, second, and third outer teeth may include a pair of distal tips separated by a V-shaped groove, the distal tip terminating at a point. The blade also includes where the first outer tooth extends a first distance from the distal end of the distal portion of the planar blade body, the second outer tooth extends a second distance from the distal end of the distal portion of the planar blade body, and the third outer tooth extends a third distance from the distal end of the distal portion of the planar blade body. The blade also includes where the second distance is greater than the third distance, and the first distance is greater than both of the second and the third distances.

A twenty-sixth general aspect includes a surgical sagittal saw blade for use with a surgical saw. The surgical sagittal saw blade also includes a planar blade body including a proximal portion, an intermediate portion, and a distal portion, the proximal and distal portions extending from opposed ends of the intermediate portion. The blade also includes a blade head extending from a distal end of the distal portion of the planar blade body, the blade head defining at least two tines separated by and opening. The blade also includes a plurality of teeth extending distally from the blade head, with at least three of the plurality of teeth extending distally from each of the at least two tines. The blade also includes a recess defined in at least one of a top surface or a bottom surface of the blade head, the recess proximal to the plurality of teeth. The blade also includes an aperture defined in at least one of the two tines of the blade head, the aperture proximal to the plurality of teeth. The blade also includes where the recess is configured to direct debris removed by the plurality of teeth toward a side surface of the distal portion of the planar blade body or toward the aperture as the planar blade body is oscillated from side-to-side by the surgical saw.

In some implementations, the surgical sagittal saw blade may optionally include where the cutting edge of the adjacent tooth with the unbeveled top or bottom surface may include a first cutting edge and a second cutting edge, the first and second cutting edges on opposed sided of the unbeveled top or bottom surface. The cutting edge is configured to act as a rasp when the planar blade body is oscillated from side-to-side by the surgical saw. The cutting edge is configured to remove biological material in the direction perpendicular to a top surface or a bottom surface of the planar blade body when the planar blade body is oscillated from side-to-side by the surgical saw.

In some implementations, the surgical sagittal saw blade may optionally include where a distal tip of each of the teeth of the plurality of teeth define a concave profile of a distal end of the blade head.

Some of the implementations described above may optionally include one or more of the following features. The surgical sagittal saw blade where the bevel that alternates between the top and the bottom surfaces of the adjacent teeth of each of the plurality of teeth defines a V-shaped side profile across a width of a distal end of the blade head. The surgical sagittal saw blade where in the V-shaped side profile of the plurality of teeth defines a thickness of the blade head that is equal to or greater than a thickness of the planar blade body to allow the insertion of the planar blade body into a kerf cut by the blade head. The blade head may include a top surface and a bottom surface; where at least one of the top surface or the bottom surface defines a recess, the recess located proximal to the plurality of teeth of the blade head and configured to assist with evacuation of biological material removed by the plurality of teeth when the planar blade body is oscillated from side-to-side by the surgical saw. The planar blade body may include a longitudinal axis extending from the proximal portion to the distal portion of the planar blade body; and where the recess may include a lateral axis extending along the width of the recess, the recess is oriented such that the lateral axis of the recess is generally perpendicular to the longitudinal axis of the planar blade body. A proximal end of the bevel on the top surface or bottom surface of each of the plurality of teeth is configured to open into the recess on the respective top surface or bottom surface of the blade head such that biological material removed by the plurality of teeth may move proximally along the bevel and into the recess. The bevel to the top or the bottom surface of the each of the plurality of teeth may include a first bevel to a proximal portion of the top or the bottom surface of each of the plurality of teeth and a second bevel to a distal portion of the top or the bottom surface each of the plurality of teeth. The first bevel to the proximal portion of the top or the bottom surface of each of the plurality of teeth is at a first angle relative to the unbeveled surface of the adjacent tooth and the second bevel to a distal portion of the top or the bottom surface each of the plurality of teeth is at a second angle relative to the unbeveled surface of the adjacent tooth; and where the second angle is greater than the first angle, and the second angle is configured to define a V-shaped side profile at a distal end of the plurality of teeth of the blade head. The bevel that alternates between the top and the bottom surfaces of the adjacent teeth of each of the plurality of teeth increase in depth moving distally along each of the top or the bottom surfaces of each of the plurality of teeth. The bevel that alternates between the top and the bottom surfaces of the adjacent teeth of each of the plurality of teeth defines a V-shaped side profile at a distal end of the plurality of teeth of the blade head. The distal portion of the planar blade body defines a generally V-shaped void, the V-shaped void oriented such the v opens toward the intermediate and/or proximal portions of the planar blade body. The blade head defines at least two tines, at least two of the plurality of teeth extending each of the at least two tines; and where each of the at least two tines are separated by an opening, the opening configured to open into the V-shape void.

In some implementations, the surgical sagittal saw blade may optionally include where the taper along the opposed side surfaces of the intermediate portion of the planar blade body is such that the distal end of the intermediate portion of the planar blade body will not cross beyond a lateral boundary defined on either side of the planar blade body; where the lateral boundary on the either side of the planar blade body are generally parallel to the longitudinal axis of the planar blade body and the distance of the lateral boundary from the longitudinal axis is defined by an outermost point of the side surface of a proximal end of the intermediate portion of the planar blade body when the planar blade body is oscillated from side-to-side by the surgical saw.

A twenty-seventh general aspect includes a surgical saw blade (10) configured for oscillatory resection of bone. The surgical saw blade also includes a body (12) defining a longitudinal axis (1112), the body (12) having a mounting portion (16) and a distal portion (18) opposite the mounting portion (16), the distal portion (18) and the mounting portion (16) integral with one another such that oscillation of the mounting portion (16) results in oscillation of the distal portion (18), the distal portion (18) having teeth (28) formed on a blade head (26), the mounting portion (16) defines a series of apertures including a central aperture (1014) shaped for receiving a biasing actuator (844). The blade also includes a rear aperture (1016) including a proximal end (1034) and a distal end (1036) opposite the proximal end (1034), where the mounting portion (16) includes a peninsula portion (1060) extending away from the central aperture (1014) and configured for retaining the saw blade (10) in a saw blade (10) mount. The blade also includes the peninsula portion (1060) is partially surrounded by the rear aperture (1016). The blade also includes the peninsula portion (1060) defines an area less than an area defined by the rear aperture (1016).

A twenty-eighth general aspect includes a surgical saw blade (10) configured for oscillatory resection of bone. The surgical saw blade also includes a body (12) defining a longitudinal axis (1112), the body (12) having a mounting portion (16) and a distal portion (18) opposite the mounting portion (16), the distal portion (18) and the mounting portion (16) integral with one another such that oscillation of the mounting portion (16) results in oscillation of the distal portion (18), the distal portion (18) having teeth (28) formed on a distal region. The blade also includes the mounting portion (16) defines a series of apertures including a rear aperture (1016). The blade also includes a fore aperture distal to the rear aperture (1016), the fore aperture shaped to retain the saw blade (10) during actuation, where the rear and fore aperture each intersects the longitudinal axis (1112) of the body (12) of the saw blade (10). The mounting portion (16) includes a peninsula portion (1050) extending away from the fore aperture, the peninsula portion (1050) configured for retaining the saw blade (10) in a saw blade (10) mount, the peninsula portion (1050) being partially surrounded by the rear aperture (1016).

A twenty-ninth general aspect includes a surgical saw blade (10) configured for oscillatory resection of bone. The surgical saw blade also includes a body (12) defining a longitudinal axis (1112), the body (12) having a mounting portion (16) having a proximal edge (1020), a distal end (1022) opposite the proximal edge (1020), two sides (1062) extending between the distal end (1022) and the proximal edge (1020), and two stop protrusions (1064) extending outwardly from the two sides (1062). The blade also includes a distal portion (18) opposite the mounting portion (16), the distal portion (18) having teeth (28) formed on a distal region, the distal portion (18) and the mounting portion (16) integral with one another such that oscillation of the mounting portion (16) results in oscillation of the distal portion (18). The mounting portion (16) defines a series of apertures including a central aperture (1014) shaped to receiving a biasing actuator (844). The blade also includes a rear aperture (1016) proximal to the central aperture (1014). The mounting portion (16) includes a peninsula portion (1050) extending away from the central aperture (1014), the peninsula portion (1050) partially surrounded by the rear aperture (1016) and configured for retaining the saw blade (10) in a saw blade mount. The blade also includes the stop protrusions (1064) are distal to the central aperture (1014).

A thirtieth general aspect includes a surgical saw blade (10) configured for oscillatory resection of bone. The surgical saw blade also includes a body (12) having a mounting portion (16) and a distal portion (18) opposite the mounting portion (16); the distal portion (18) having teeth (28) formed on a distal region, the body (12) defining a longitudinal axis (1112), the distal portion (18) and the mounting portion (16) are integral with one another such that oscillation of the mounting portion (16) results in oscillation of the distal portion (18). The mounting portion (16) defines a central aperture (1014) shaped to receiving a biasing actuator (844). The blade also includes a rear aperture (1016) proximal to the central aperture (1014). The blade also includes a first driving portion, having at least one first drive wall proximal to the central aperture (1014), the first drive wall including a first end and a second end, where the first end has a first end distance to the longitudinal axis (1112) and the second end that is proximal to the first end has a second end distance to the longitudinal axis (1112), the first end distance is greater than the second end distance. The blade also includes a second driving portion defined by a fore aperture, the fore aperture being located distal to the central aperture (1014). The central, rear, and fore aperture each overlap the longitudinal axis (1112) of the body (12) of the saw blade (10).

A thirty-first general aspect includes a surgical saw blade (10) configured for oscillatory resection of bone. The surgical saw blade also includes a body (12) having a mounting portion (16) and a distal portion (18) opposite the mounting portion (16); the distal portion (18) having teeth (28) formed on a distal region, the body (12) defining a longitudinal axis (1112), the distal portion (18) and the mounting portion (16) are integral with one another such that oscillation of the mounting portion (16) results in oscillation of the distal portion (18). The mounting portion (16) defines a first aperture (1014) shaped to receiving a biasing actuator (844). The blade also includes a second aperture having a proximal end (1034) and a distal end (1036), with the proximal end (1034) being wider than the distal end (1036). The blade also includes two sides (1062) extending between the distal end (1036) and the proximal end (1034), and two stop protrusions (1064) extending outwardly from the two sides (1062). The blade also includes three driving protrusions (1076, 1050) extending from a proximal end of the mounting portion (16), the three driving protrusions (1076, 1050) being proximal the two stop protrusions (1064).

A thirty-second general aspect includes a surgical saw assembly having a blade mount (808) and a surgical saw blade (10) configured for oscillatory resection of bone. The surgical saw assembly also includes a body portion (814) defining a longitudinal axis (1112), the body portion having a top surface (815) extending between a proximal end (804) and a distal end (802). The assembly also includes an actuator (844) configured to be movable in a direction perpendicular to the top surface (815). The assembly also includes a biasing member (920) configured to be movable in a direction perpendicular to the top surface (815). The biasing member (920) engages the saw blade (10) in a mounted position to bias the surgical saw blade (10) towards the proximal end (804).

A thirty-third general aspect includes a surgical saw assembly having a blade mount (808) and a surgical saw blade (10) configured for oscillatory resection of bone. The surgical saw assembly also includes a body portion (814) defining a longitudinal axis (1112), the body portion having a top surface (815) extending between a proximal end (804) and a distal end (802). The assembly also includes a biasing member (920) configured to be movable in a direction perpendicular to the top surface (815). The assembly also includes an actuator (844) movable between a first position and a second position, the first position corresponding to a locked blade state, and the second position corresponding to an unlocked blade state. The saw blade (10) is movable between an unmounted state, a mounted state and the locked state. The assembly also includes the biasing member (920) engages with the saw blade (10) in the mounted state and the locked state but not the unmounted state. The assembly also includes the actuator (844) engages with the saw blade (10) in the locked state, but not the unmounted state or the mounted state. The assembly also includes the blade (10) is removable from the mount (808) when the actuator is in the second position but not in the first position.

A thirty-fourth general aspect includes a method for mounting a surgical saw blade (10) to a blade mount (808) of a surgical saw assembly. The method also includes directing the surgical saw blade (10) from an unmounted position to a mounted position with respect to a blade mount, where the biasing member automatically engages with the surgical saw blade (10) in the mounted position. The method also includes moving the actuator (844) from the first position to the second position, where the saw blade (10) is removable from the mount when the actuator is in the first position but not in the second position.

A thirty-fifth general aspect includes a blade assembly for attachment to a surgical saw. The blade assembly also includes a blade mount (808) having a plurality of protrusions (830, 824), the plurality of protrusions having an upper surface (831, 825), where the upper surface of at least one of the plurality of protrusions includes a mount indicia (1004). The assembly also includes a surgical saw blade (10) movable between an unmounted position and a mounted position with respect to the blade mount, the saw blade (10) having a body (12) including a mounting portion (16) and a distal portion (18) opposite the mounting portion (16), the body (12) defining a longitudinal axis (1112), the distal portion (18) having teeth (28) formed on a distal region, the mounting portion (16) defining a plurality of apertures (1014, 1016, 1018) configured to correspond to the plurality of protrusions (830, 824), and the mounting portion (16) having a blade indicia (1002). In the unmounted position the mount indicia (1004) and blade indicia (1002) are separate, and in the mounted position the mount indicia adjoins the blade indicia.

A thirty-sixth general aspect includes a method for mounting a surgical saw blade (10) to a mount apparatus. The method also includes directing the surgical saw blade (10) from an unmounted position to a mounted position with respect to a blade mount (808). The surgical saw blade (10) may include a body (12) defining a longitudinal axis (1112), the body (12) including a mounting portion (16) and a distal portion (18) opposite the mounting portion (16); the distal portion (18) having teeth (28) formed on a distal region, the mounting portion (16) defining a plurality of apertures, where the mounting portion (16) includes a blade indicia (1002). The method also includes the blade mount having a plurality of protrusions (824, 830) corresponding to the plurality of apertures (1016, 1018), the plurality of protrusions having an upper surface (825, 831), where the upper surface of at least one of the plurality of protrusions includes a mount indicia (1004). The method also includes aligning the blade indicia to the mount indicia. The method also includes locking the blade (10) in the mounted position.

A thirty-seventh general aspect includes a blade assembly for attachment to a surgical saw. The blade assembly also includes a blade mount (808) having a mount geometry for receiving a surgical saw blade (10), the blade mount having a mount indicia (1004). The assembly also includes a surgical saw blade (10) movable between an unmounted position and a mounted position with respect to the blade mount, the saw blade (10) having a body (12) including a mounting portion (16) and a distal portion (18) opposite the mounting portion (16), the mounting portion (16) defining a blade (10) geometry corresponding to the mount geometry, the mounting portion (16) including a blade indicia (1002). In the unmounted position the mount indicia and blade indicia are separate, and in the mounted position the mount indicia adjoins the blade indicia.

A thirty-eighth general aspect includes a method for mounting a surgical saw blade (10) to a blade mount (808). The method also includes directing the surgical saw blade from an unmounted position to a mounted position with respect to the blade mount. The method also includes the surgical saw blade (10) having a body (12) including a mounting portion (16) and a distal portion (18) opposite the mounting portion (16); the mounting portion (16) defining a blade (10) geometry, where the mounting portion (16) includes a blade indicia (1002). The method also includes the blade mount having a mount geometry configured for receiving the surgical saw blade, the blade mount including a mount indicia (1004). The method also includes aligning the blade indicia to the mount indicia. The method also includes locking the blade in the mounted position.

A thirty-ninth general aspect includes. The surgical tool assembly also includes a mount (808) having a mount geometry for receiving a saw blade (10), the mount having a mount indicia (1004). The assembly also includes a saw blade (10) movable between an unmounted position and a mounted position with respect to the mount, the saw blade (10) having a body (12) including a mounting portion (16)

and a distal portion (18) opposite the mounting portion (16), the mounting portion (16) defining a blade (10) geometry corresponding to the mount geometry, the mounting portion (16) including a blade indicia (1002). In the unmounted position the blade indicia and mount indicia are separate, and in the mounted position the blade indicia adjoins the mount indicia.

A fourteenth general aspect includes a surgical saw blade (10) configured for oscillatory resection of bone. The surgical saw blade also includes a body (12) defining a longitudinal axis (1112), the body having a mounting portion (16) having a proximal end and a distal end opposite the proximal end, two sides (1062) extending between the distal end and the proximal end, where the mounting portion further may include two stop protrusions (1064) extending outwardly from the two sides. The blade also includes a distal portion (18) opposite the mounting portion (16), the distal portion (18) having teeth (28) formed on a distal region, the distal portion (18) and the mounting portion (16) are integral with one another such that oscillation of the mounting portion (16) results in oscillation of the distal portion (18). The mounting portion (16) defines an aperture (1014, 1016, 1018). The blade also includes an indicia (1002) is positioned on the mounting portion (16), the indicia adjacent to an edge of the aperture.

A forty-first general aspect includes a surgical sagittal saw blade (10) for use with a surgical saw. The surgical sagittal saw blade also includes a planar blade body (12) including a proximal portion (16), an intermediate portion (14), and a distal portion (18), the proximal and distal portion extending from opposed ends of the intermediate portion. The blade also includes a blade head extending from a distal end of the distal portion (18) of the planar blade body, the blade head may include a plurality of teeth (28) arranged adjacent to one another. The blade also includes where the proximal portion defines a geometric feature configured for mounting the planar blade body to the surgical saw, the geometric feature including at least one aperture (1014, 1016, 1018). The blade also includes a blade indicia (1002) disposed on the proximal portion, the blade indicia may include a first partial image corresponding to a mount indicia (1004) may include a second partial indicia such that the combination of the blade indicia and the mount indicia define a complete image when the surgical sagittal saw blade is properly mounted to the blade mount.

A forty-second general aspect includes a surgical saw blade configured for oscillatory resection of bone. The surgical saw blade also includes a body defining a longitudinal axis, the body having a mounting portion and a distal portion opposite the mounting portion, the distal portion and the mounting portion integral with one another such that oscillation of the mounting portion results in oscillation of the distal portion, the distal portion having teeth formed on a blade head, the mounting portion defines a series of openings including a first aperture shaped for receiving a biasing actuator. The blade also includes a second aperture including a proximal end and a distal end opposite the proximal end. The mounting portion includes a peninsula portion extending away from the first aperture and configured for retaining the saw blade in a saw blade mount. The blade also includes the peninsula portion is partially surrounded by the second aperture. The blade also includes the peninsula portion defines an area less than an area defined by the second aperture.

A forty-third general aspect includes a surgical saw blade configured for oscillatory resection of bone. The surgical saw blade also includes a body defining a longitudinal axis, the body having a mounting portion and a distal portion opposite the mounting portion, the distal portion and the mounting portion integral with one another such that oscillation of the mounting portion results in oscillation of the distal portion, the distal portion having teeth formed on a distal region, the mounting portion including a first aperture defining a drive portion and a biasing portion, the biasing portion an arcuate shape configured for biasing the surgical saw blade in a proximal direction, the drive portion positioned distal to the biasing portion, the drive portion may include two side walls, the two side walls taper towards the longitudinal axis in a direction towards a proximal end of the mounting portion. The proximal end defines a retention portion, the retention portion being the narrowest region of the mounting portion and having a width at its narrowest dimension being less than the width of the first opening at a lateral axis.

A forty-fifth general aspect includes a surgical saw blade configured for oscillatory resection of bone. The surgical saw blade also includes a body defining a longitudinal axis, the body having a mounting portion and a distal portion opposite the mounting portion, the distal portion and the mounting portion integral with one another such that oscillation of the mounting portion results in oscillation of the distal portion, the distal portion having teeth formed on a distal region, the mounting portion including a first aperture defining a drive portion and a biasing portion, the biasing portion an arcuate shape configured for biasing the surgical saw blade in a proximal direction, the drive portion positioned distal to the biasing portion, the drive portion may include two side walls, the two side walls taper towards the longitudinal axis in a direction towards a proximal end of the mounting portion. The blade also includes three driving protrusions extending from a proximal end of the mounting portion, the three driving protrusions being proximal the two stop protrusions.

A forty-sixth general aspect includes a surgical saw blade configured for oscillatory resection of bone. The surgical saw blade also includes a body defining a longitudinal axis, the body having a mounting portion and a distal portion opposite the mounting portion, the distal portion and the mounting portion integral with one another such that oscillation of the mounting portion results in oscillation of the distal portion, the distal portion having teeth formed on a distal region, the mounting portion including a proximal edge. The blade also includes a distal axis opposite the proximal edge. The blade also includes two sides extending between the distal axis and the proximal edge. The blade also includes a first aperture defining a drive portion and a biasing portion, the biasing portion an arcuate shape configured for biasing the surgical saw blade in a proximal direction, the drive portion positioned distal to the biasing portion, the drive portion may include two side walls, the two side walls taper towards the longitudinal axis in a direction towards a proximal end of the mounting portion. The two sides define at least two drive surfaces positioned proximal to the first aperture, the two drive surfaces tapering towards the longitudinal axis in the proximal direction.

A forty-seventh general aspect includes a surgical saw blade configured for oscillatory resection of bone. The surgical saw blade also includes a body having a mounting portion and a distal portion opposite the mounting portion; two sides extending between the distal portion and a proximal end of the mounting portion, the distal portion having teeth formed on a distal region, the body defining a longitudinal axis, the distal portion and the mounting portion are integral with one another such that oscillation of the mounting portion results in oscillation of the distal portion, the mounting portion defining a first aperture. The blade also includes where the mounting portion further may include two stop protrusions extending outwardly from the two sides, positioned on a lateral axis, the lateral axis perpendicular to the longitudinal axis. The blade also includes the first aperture defining a first driving portion having at least one first drive wall aligned with the two stop protrusions. The blade also includes the proximal end defining a retention portion, the retention portion being the narrowest region of the mounting portion and having a width at its narrowest dimension being less than the width of the first aperture at the lateral axis. The blade also includes the first aperture and the retention portion each intersect the longitudinal axis.

A forty-eighth general aspect includes a surgical saw blade configured for oscillatory resection of bone. The surgical saw blade also includes a body having a mounting portion and a distal portion opposite the mounting portion, two sides extending between the distal portion and a proximal end of the mounting portion, the distal portion having teeth formed on a distal region, the body defining a longitudinal axis, the distal portion and the mounting portion are integral with one another such that oscillation of the mounting portion results in oscillation of the distal portion, the mounting portion defining a first aperture. The blade also includes where the mounting portion further may include two stop protrusions extending outwardly from the two sides. The blade also includes the first aperture defining a first driving portion having at least one first drive wall aligned with the two stop protrusions. The two sides further may include a first side portion and a second side portion positioned proximal to the first side portion, where the second side portion tapers towards the longitudinal axis from the first side portion to the proximal end.

A forty-ninth general aspect includes a surgical saw blade configured for oscillatory resection of bone. The surgical saw blade also includes a body defining a longitudinal axis, the body having a mounting portion and a distal portion opposite the mounting portion, the distal portion and the mounting portion integral with one another such that oscillation of the mounting portion results in oscillation of the distal portion, the distal portion having teeth formed on a distal region, the mounting portion defines a series of apertures including a first aperture shaped for receiving a biasing actuator, the first aperture defining a keyway corresponding to the biasing actuator. The blade also includes a second aperture defining a driving portion, the second aperture positioned distal to the first aperture. The first and second aperture each overlap the longitudinal axis of the body of the saw blade.

These and other configurations, features, and advantages of the present disclosure will be apparent to those skilled in the art. The present disclosure is not intended to be limited to or by these configurations, embodiments, features, and/or advantages.

BRIEF DESCRIPTION OF THE DRAWINGS

Referring now to the drawings, exemplary illustrations are shown in detail. Although the drawings represent schematic embodiments and/or exemplary configurations, the drawings are not necessarily to scale and certain features may be exaggerated to better illustrate and explain an innovative aspect of an exemplary configuration. Furthermore, the exemplary illustrations described herein are not intended to be exhaustive or otherwise limiting or restricting to the precise form and configuration shown in the drawings and disclosed in the following detailed description.

FIG. 58A is a perspective view of the surgical saw blade assembly with the surgical saw blade in an unmounted position, according to the teachings of the present disclosure.

FIG. 58B is a perspective view of the surgical saw blade assembly with the surgical saw blade in a mounted position, according to the teachings of the present disclosure.

FIG. 60A is a top view of the surgical saw blade having an indicium, according to the teachings of the present disclosure.

FIG. 60B is a top view of the surgical saw blade having an indicium, according to the teachings of the present disclosure.

FIG. 60C is a top view of the surgical saw blade having an indicium, according to the teachings of the present disclosure.

FIG. 60D is a top view of the surgical saw blade having an indicium, according to the teachings of the present disclosure.

Other advantages of the invention will be readily appreciated as the same becomes better understood by reference to the following detailed description when considered in connection with the accompanying drawings, wherein:

DETAILED DESCRIPTION OF THE INVENTION

Figure 1:
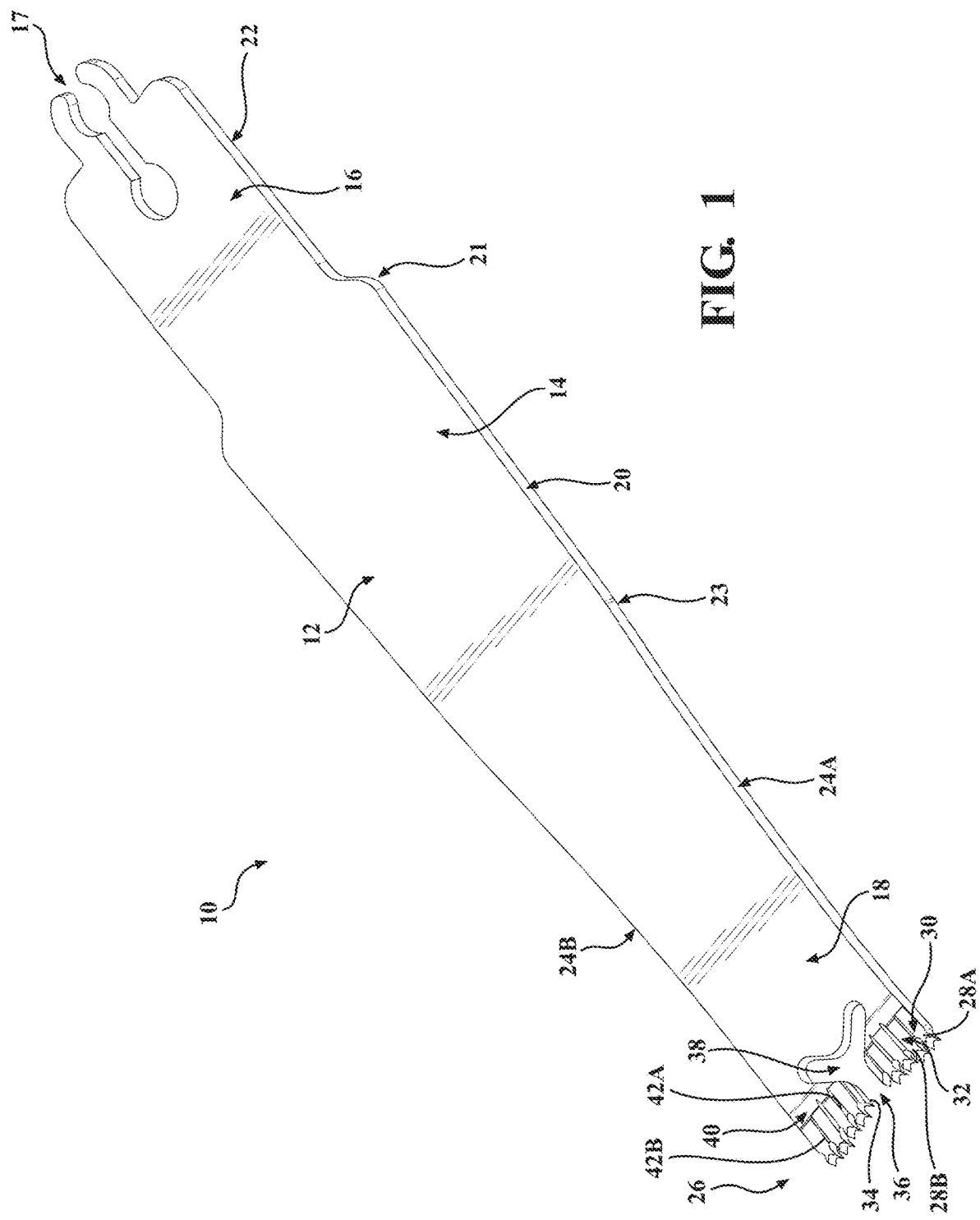
FIG. 1 is a perspective view of a first configuration of a saw blade for use with a surgical saw.
Figure 52:
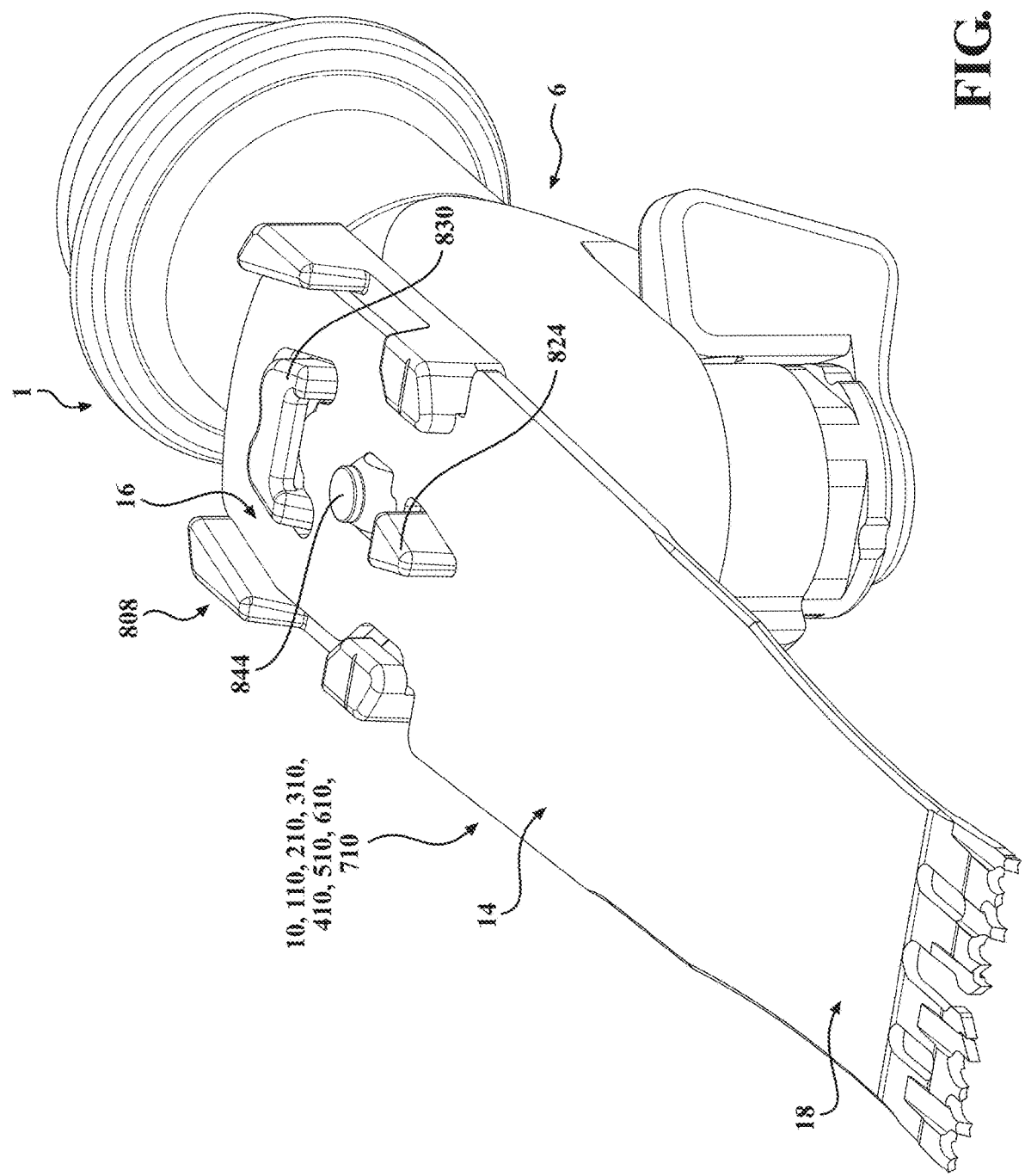
FIG. 52 is a perspective view of a surgical saw assembly including the surgical saw blade of FIG. 50 shown coupled to a blade mount of a surgical saw, according to the teachings of the present disclosure.
Figure 53:
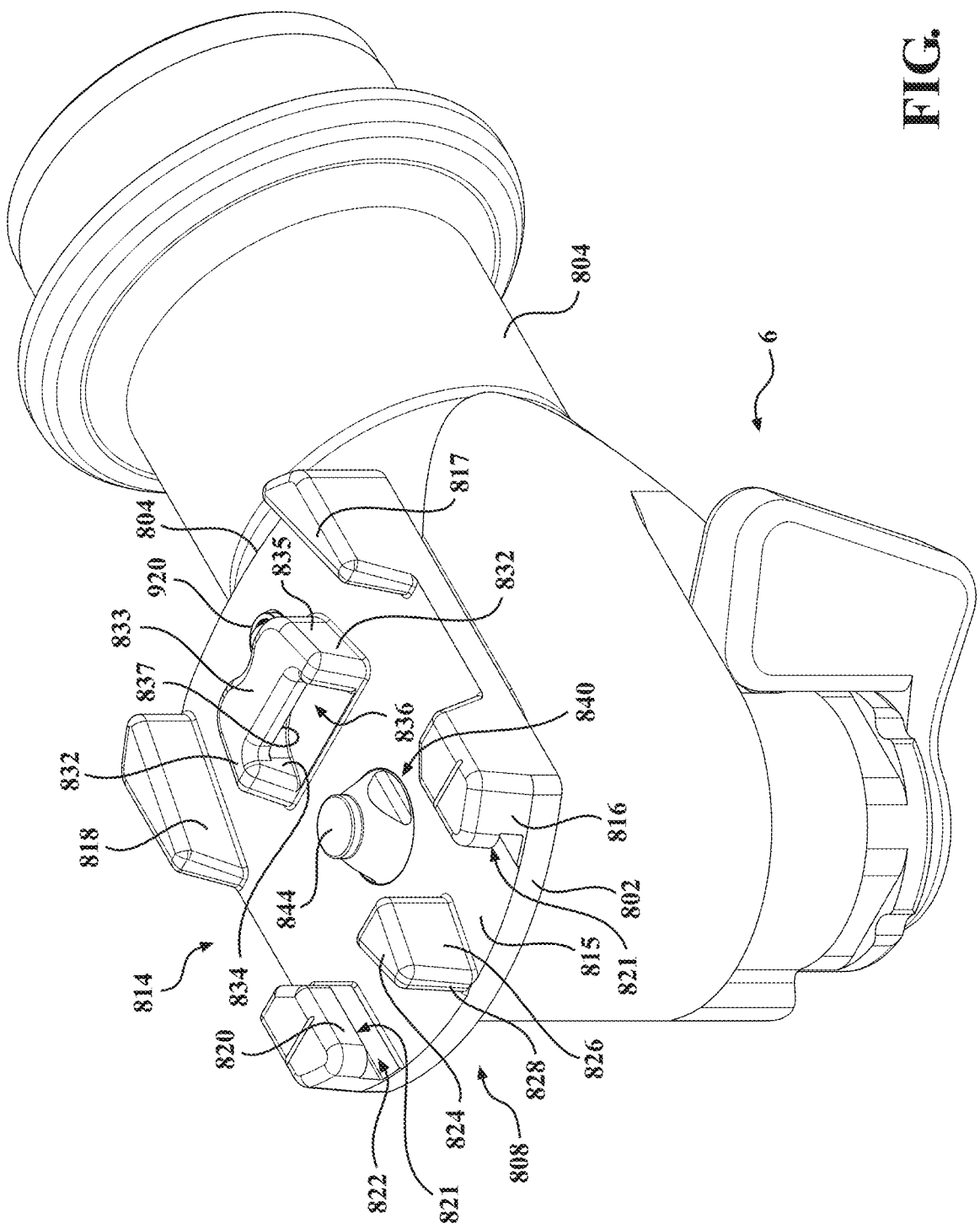
FIG. 53 is a perspective view of the blade mount of the surgical saw assembly of FIG. 52, according to the teachings of the present disclosure.

With reference to the drawings, where like numerals are used to designate like structure throughout the several views, a surgical saw blade for use in a surgical saw system is shown at FIG. 1 for use during surgical procedures. The surgical procedures may be orthopedic surgeries, brain surgeries, cardiovascular surgeries or any other surgeries requiring the use of a cutting instrument. As described further below, the surgical saw blade 10 is mounted within a blade mount of a surgical saw assembly 1 (see FIG. 52) for oscillation by a surgical saw. The blade may be of various shapes and sizes such as a crescentic blade or a straight blade.

Referring to FIGS. 1 to 9, a first configuration of a saw blade 10 for use with a surgical saw, such as a sagittal surgical saw configure to oscillate a saw blade, is illustrated. The saw blade 10 comprises a blade body 12. The blade body 12 may also be referred to as a planar blade body. The blade body 12 may comprise an intermediate portion 14, as well as a proximal portion 16 and distal portion 18 disposed on opposed sides of the intermediate portion. In describing the feature of the saw blade 10, "proximal" or "proximally" is understood to mean towards the surgical saw or the surgeon holding the saw, and away from the site to which the saw blade 10 is to be applied. By contrast, "distal" or "distally is understood to mean away from the surgical saw or the surgeon holding the saw and towards the site to which the saw blade 10 is applied. The proximal portion 16 may define a geometric feature 17 configured for attaching the saw blade 10 to the surgical saw (not shown). Example geometric features 17 or blade mount may be found and described in U.S. Pat. No. 8,216,262, which is hereby incorporated by reference.

Figure 2:
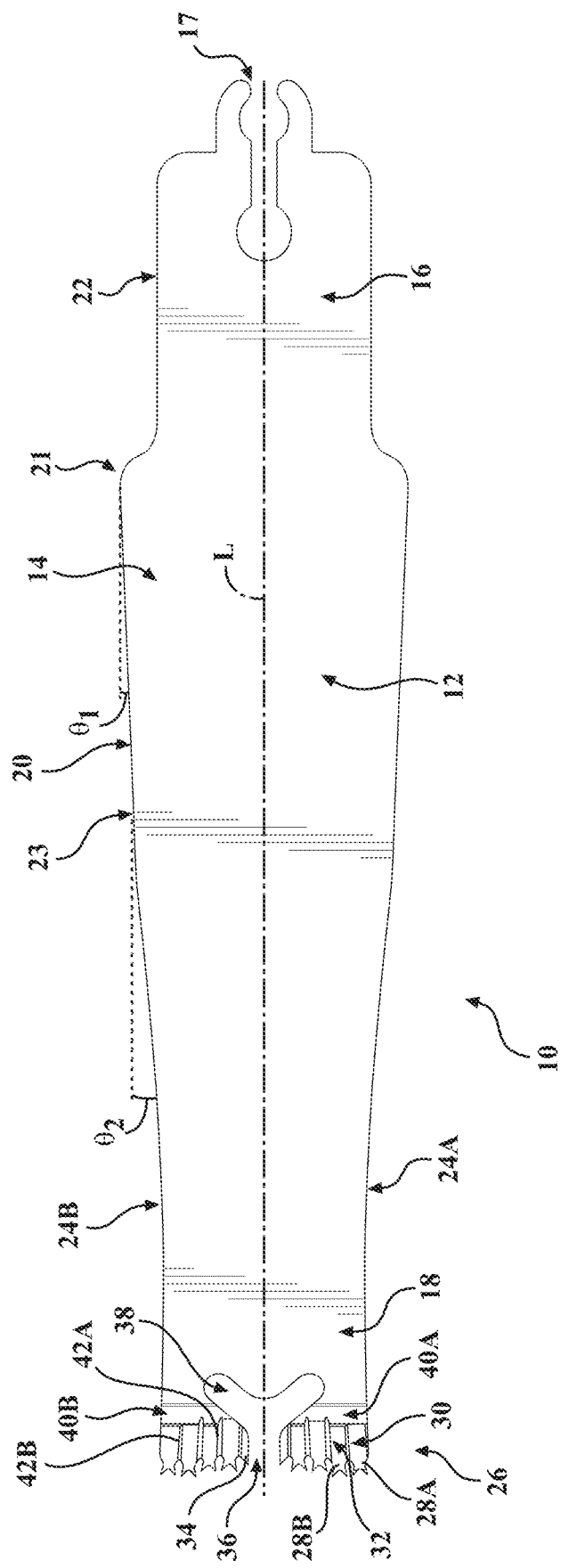
FIG. 2 is a top view of the saw blade of FIG. 1.

Each of the portions 14, 16, 18 of the blade body 12 may further comprise opposed side surfaces 20, 22, 24. For example, example the intermediate portion may have an intermediate side surface 20 or intermediate edge, the proximal portion 16 may similarly define a proximal side surface 22 or proximal edge, and the distal portion 18 may similarly define a distal side surface 24 or distal edge. Each of the portions 14, 16, 18 of the blade body 12 may have distinct width providing a distinct side surface 20, 22, 24 from the others. Alternatively, it is further contemplated that one or more of the portions 14, 16, 18 of the blade body 12 may have the same or similar widths. The blade body 12 may also comprise a longitudinal axis (L) extending between the proximal and distal portions 16, 18 of the blade body 12, as illustrated in FIG. 2. The longitudinal axis (L) may be configured to bisect the blade body 12 such that is generally event spaced between the opposing side surfaces 20, 22, 24 of the portions 14, 16, 18 of the blade body 12.

Figure 3B:
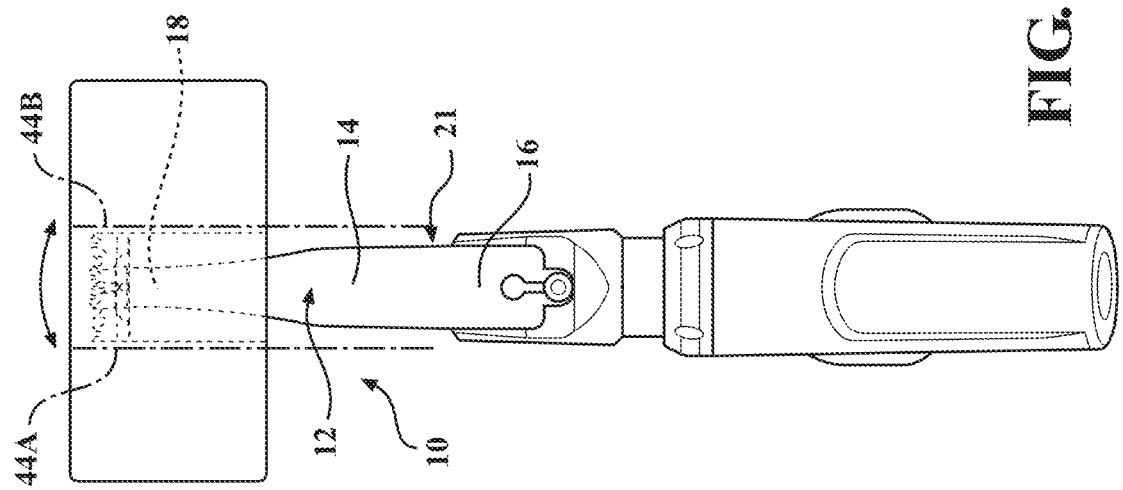
FIG. 3B is a top view of the saw blade of FIG. 1, illustrating the parallel boundary on the respective sides of the saw blade when oscillated by a surgical saw.
Figure 3A:
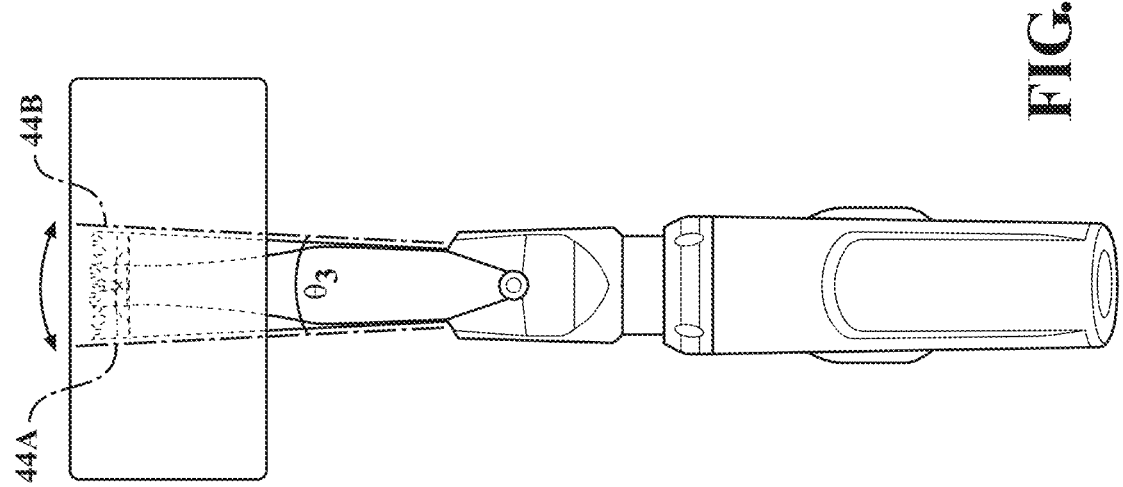
FIG. 3A is a top view of an example configuration of a saw blade from the prior illustrating a divergent boundary on the respective sides of the prior art saw blade when oscillated by a surgical saw.

Referring to FIG. 2, The side surface(s) 20 of the intermediate portion 14 of the blade body 12 may be tapered at an angle ($\Theta 1$). The taper of the side surface(s) 20 of the intermediate portion 14 may be such that the distance between the side surface 20 and the longitudinal axis (L) decrease as you move from a proximal end 21 of the intermediate portion 14 to a distal end 23 of the intermediate portion 14. For example, as illustrated in FIG. 2, the width of the intermediate portion 14 section decreases as you move from the proximal end 21 of the intermediate portion 14 toward the distal end 23. This taper ($\Theta 1$) of the side surface(s) 20 of the intermediate portion 14 allows for improved structural rigidity of the blade body 12 while also reducing the width and footprint of the blade body 12 as it is oscillated from side-to-side by the surgical saw. For example, referring to FIG. 3A, an example footprint of a prior saw blade is illustrated. The opposing sides of the boundary 44A, 44B of the footprint of the prior saw blade design are divergent from one another. Said another way, the boundary lines are arranged at an angle ($\Theta 3$) to one another, with the distance between the sides of the boundary 44A, 44B of the saw blade when oscillated increase as you move distally. By contrast, FIG. 3B illustrates an example of the boundary 44A, 44B of the footprint of the saw blade 12 design illustrated and described herein. Because of the tapered sides 20 of the intermediate portion 14 of the blade body 12, the opposed sides of the boundary of the footprint of the blade body 12 as it is oscillated from side-to-side are generally parallel to one another. In operation, for the blade to be able to clear its own body, the kerf produced by the cutting geometry of the saw blade 12 needs to be larger than the blade body 12 as it oscillates side to side within its intended excursions arc. In order to maximize the stiffness gains of the blade body 12, but still satisfy the conditions outline above, the intermediate portion 14 of the blade body 12 tapers were designed such that they never exceed more than half the excursion arc radius on either side (see FIGS. 2 and 3B). When the tapers are modelled at exactly half the excursion arc radius, the blade edges create parallel lines that connect its distal end to its proximal end, see FIG. 3B. These lines can be used as a reference to better locate the blade tip when it is impossible to visually do so directly (i.e., when the blade tip is embedded deep in the bone during resection). While the proposed design suggests the tapers are modelled at exactly half the excursion arc radius, a lesser percentage of the excursion arc radius is also contemplated. This is not possible with previous straight blades as these reference lines in that configuration would be diverging from the pivot point of the saw (see FIG. 3A).

Figure 4:
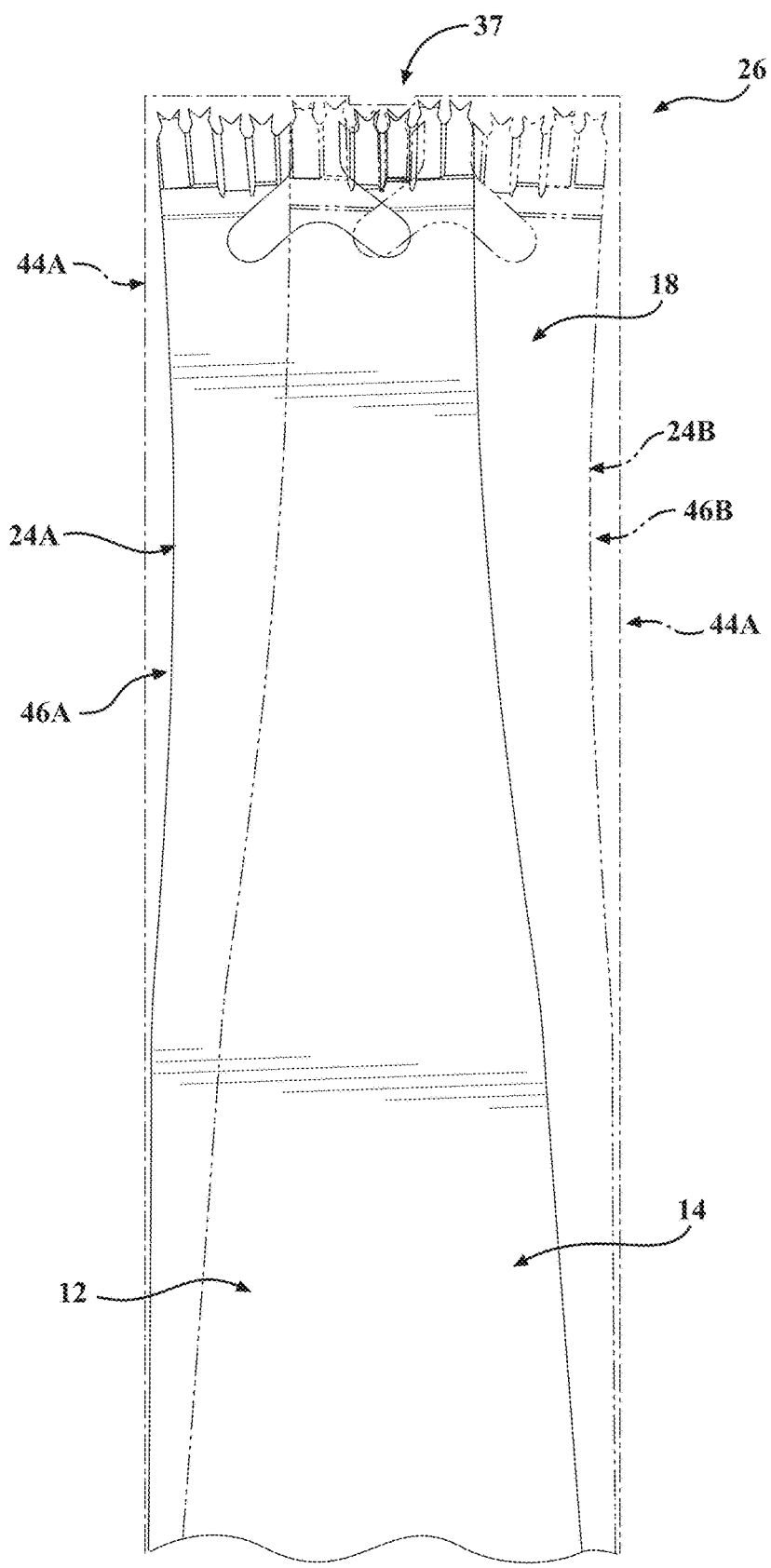
FIG. 4 is an enhanced top view of the saw blade of FIG. 3B, illustrating the boundary on the respective sides of the saw blade when oscillated by a surgical saw and that the boundary is correlated to the kerf width of a blade head of the saw blade.
Figure 5:
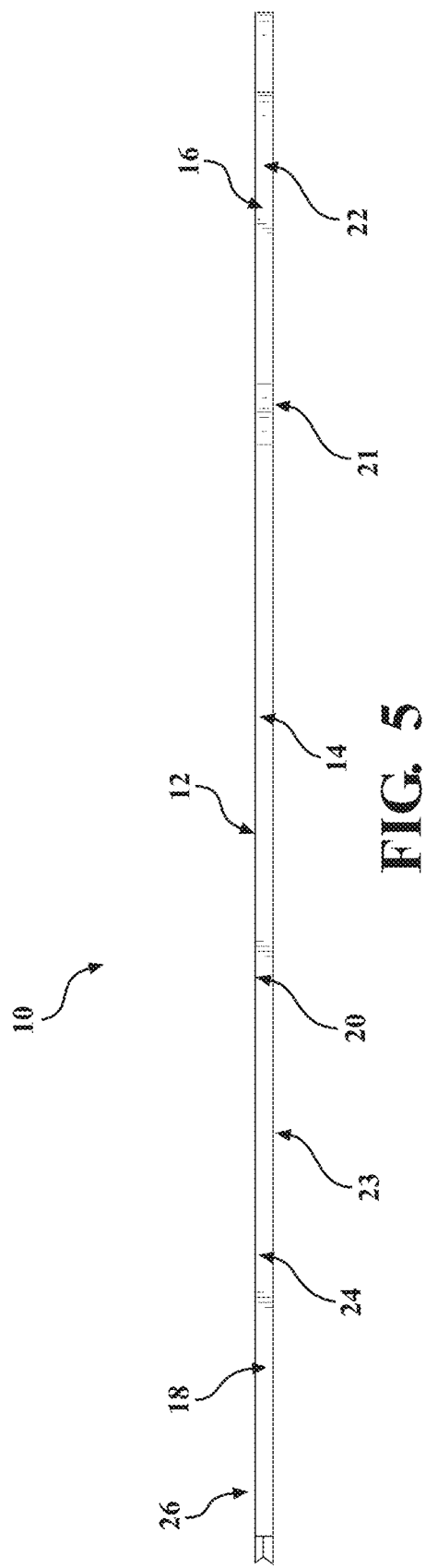
FIG. 5 is a side view of the saw blade of FIG. 1.

The distal side(s) 24 of the distal portion 18 of the blade body 12 may be similarly shaped to improve the performance of prior saw blade designs. Referring to FIGS. 2 and 4, the distal side(s) 24 of the distal portion 18 of the blade body 12 may configured to include a tapered, concave, convex, arcuate, or similar shaped. The shape of the distal side(s) 24 of the distal portion 18 of the blade body 12 may be configured to define a void 46A, 46B along the length of the side(s) 24 of the distal portion 18 when the blade body 12 is oscillated. For example, as is illustrated in FIGS. 2 and 4, the distal side(s) 24 of the distal portion 18 of the blade body 12 may comprise a concave or arcuate shape bending inward toward the longitudinal axis (L) of the blade body 12. Referring to FIG. 4, the void 46A, 46B along the length of the side(s) 24 of the distal portion 18 provided by the concave or arcuate shape of the distal side(s) 24 as the blade body 12 is oscillated is illustrated. The void 46A, 46B may be configured to assist with the evacuation or removal of biological tissue that has been removed from within the kerf of the cut produce by the saw blade 12. This may be particularly useful for narrow cuts that are limited to or close in width to the kerf width of the saw blade 12 when oscillated. The void 46A, 46B may also increase the distance between the sides/edges of the saw blade 12 and any soft tissues that might be present on either side of the intended cut path. These soft tissues are not intended to be resected during the surgical procedure and moving the edges of the blade further away from them decreases the risk of accidental damage.

A blade head 26 may extend distally from the distal portion 18 of the blade body 12. The blade head 26 may comprise a plurality of teeth 28, arranged on the blade head 26 and configured for cutting biological material such as bone, tissue, etc. The plurality of teeth 28 may be generally configured to extend distally from the blade head 26. This may include one or more of the plurality of teeth extending forward of the blade head 26 (away from the intermediate and proximal portions 14, 16 of the blade body 12, as well as extending above or below the top or bottom surfaces of the blade head 26.

The blade head 26 may further define an opening 36. This opening 36 may be open to a void 38 defined by the blade head 26 and/or the distal portion 18 of the blade body 12. The opening 36 may be defined on or along the longitudinal axis (L) of the blade body 12. The void defined by the blade head 26 and/or the distal portion 18 of the blade body 12 may be generally disposed proximal to or behind the plurality of teeth 28. The void 38 may be defined as a generally U-shaped or V-shaped void or aperture, with the opening 36 opening into the U-shape or V-shape void 38. The U-shape or V-shape void 38 may be oriented such that it extends from the opening 36 at the distal end of the blade head 26 toward the proximal portion 16 of the blade body 12. The opening 36 and/or the void 38 may function to assist with evacuation or removal of debris, such as biological material cut by the plurality of teeth 28, as the blade body 12 is oscillated by the surgical saw. For example, bone chips removed/severed by the plurality of teeth 28 may flow into the opening 36 and/or the void 38 to prevent the bone chips from collecting on or in front of the teeth and potentially inhibiting the cutting functionality of the plurality of teeth 28. The collection of or buildup of bone chips or other biological material on or in front of the plurality of teeth may also increase the likelihood of the blade body moving off plane or track as it continues to cut. This is commonly referred to as skiving, a condition that should be avoided when attempting to make precision or accurate cuts. The V-shape of the void 38 may assist in spreading the debris captured within the void out laterally toward the outside of the blade as is moves proximally through the opening 36 and/or void 38.

The blade head 26 and/or the distal portion 18 of the blade body 12 may also define a recess 40 configured to assist in the evacuation or removal of debris, such as biological material cut by the plurality of teeth 28, as the blade body 12 is oscillated by the surgical saw. The recess 40 may be defined by a reduced thickness in the blade head 26 and/or the distal portion 18 of the blade body 12. The recess may be formed on one or both of a top and bottom surface of the blade head 26 and/or the distal portion 18 of the blade body 12. The recess 40 may be generally defined by and/or disposed on the blade head 26 and/or the distal portion 18 of the blade body 12 proximal to or behind the plurality of teeth 28. The recess 40 may also serve to direct biological material from the blade head 26 and/or void 38 to the void 46 defined along the sides of the distal portion 18 of the blade body 12 as biological tissue is removed by the saw blade 12.

Figure 6:
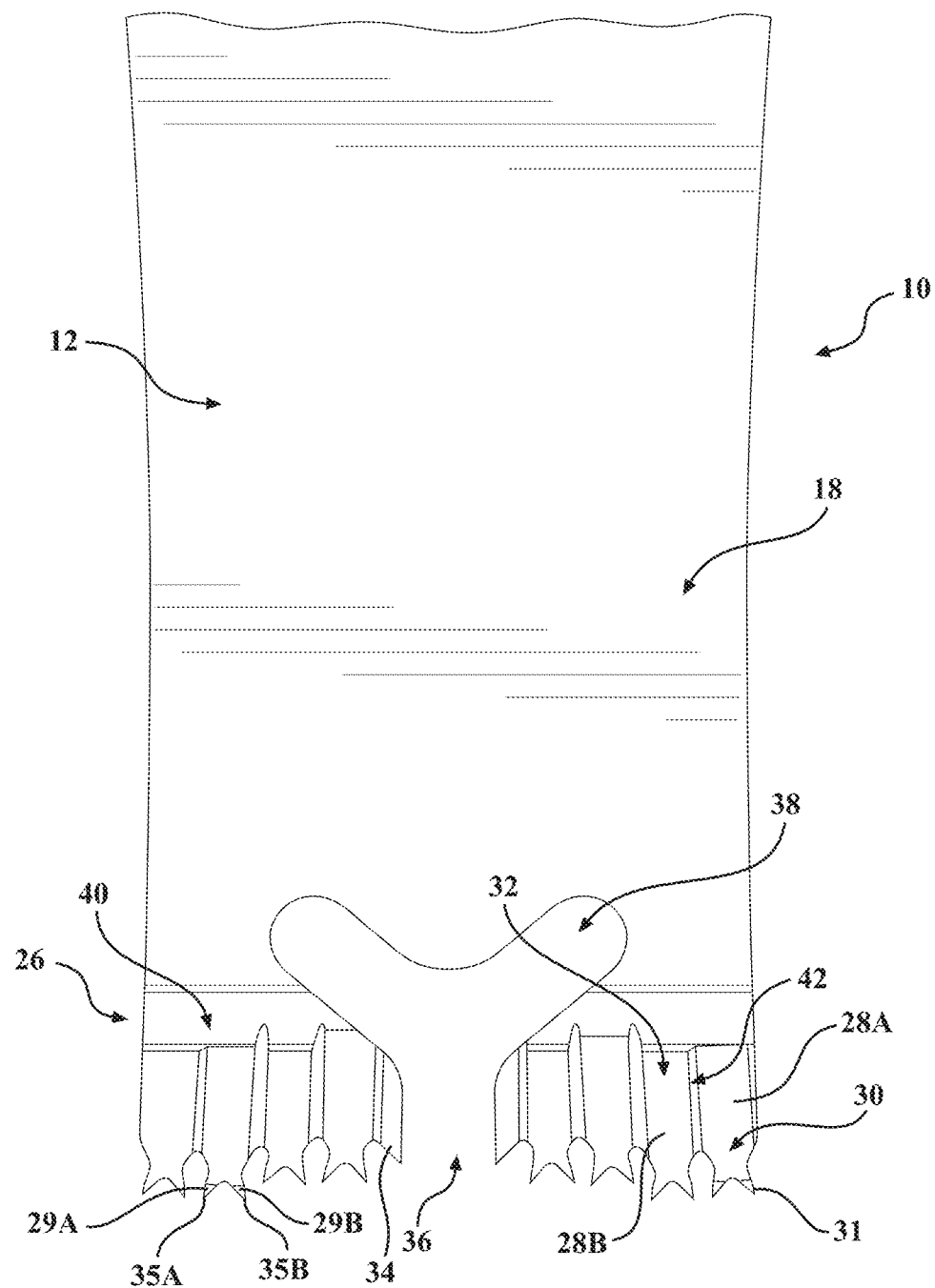
FIG. 6 is an enhanced top view of the saw blade of FIG. 1, illustrating the features of a distal portion and a blade head of the saw blade.
Figure 7:
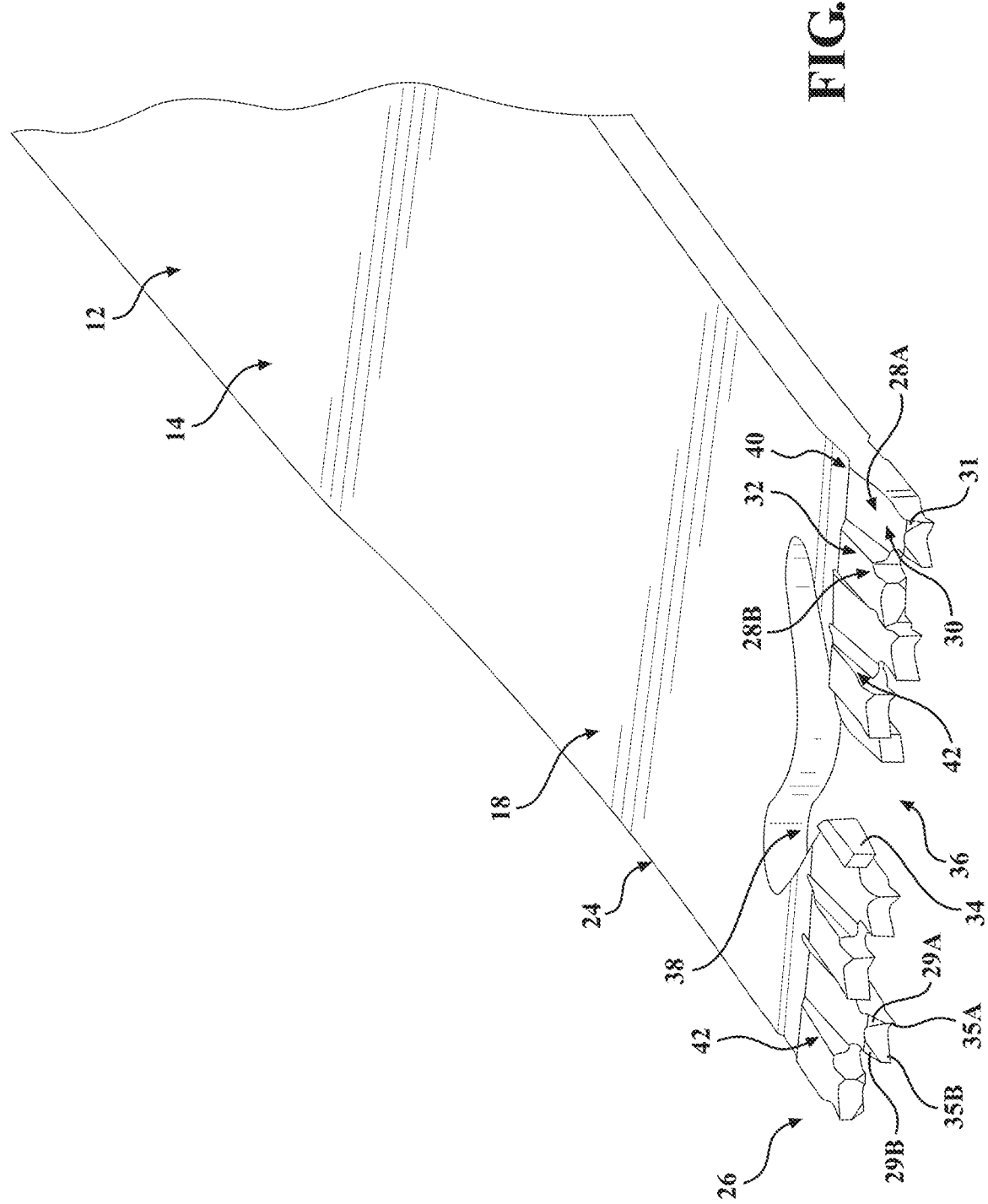
FIG. 7 is an enhanced perspective view of the saw blade of FIG. 1, illustrating the features of a distal portion and a blade head of the saw blade.
Figure 8:
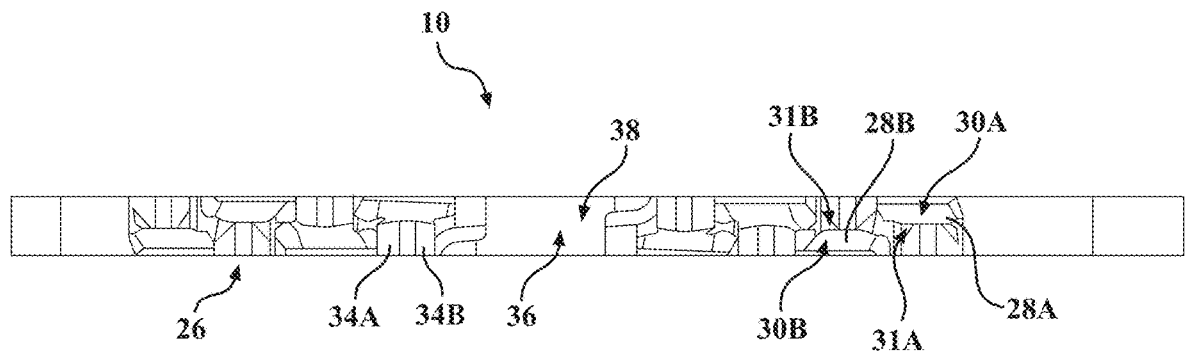
FIG. 8 is an enhanced front view of the saw blade of FIG. 1, illustrating the features of a blade head including a plurality of teeth.

Referring to FIGS. 6 to 8, the plurality of teeth 28 of the blade head 26 may comprise a beveled surface 30, 31 and a flat or unbeveled surface 32. The beveled surface 30, 31 may be sloped and configured to direct or funnel biological tissues that has been removed by the plurality of teeth distally toward the void 38 and/or the recess 40 in order to keep the plurality free from debris that may impact the effectiveness of the plurality of the in performing the cut. The blade head 26 may be configured such that the plurality of teeth 28A, 28B such that bevel 30, 31 is applied to one of a top surface and bottom surface of the each of the plurality of teeth 28. It is further contemplated that the bevel 30, 31 may be alternatingly applied to the top and bottom surfaces of adjacent teeth of the plurality of teeth 28, with the other of the top or bottom surface being flat 32. For example, referring to FIG. 8, a bevel 30A, 31A is applied to the top surface of a first tooth 28A of the plurality of teeth 28 and the bottom surface of the first tooth 28A is flat 32A. The adjacent tooth 28B includes a bevel 30B, 31B applied to the bottom surface of the adjacent tooth 28B of the plurality of teeth 28 and the top surface of the adjacent tooth 28B is flat 32B. The blade head 26 may be configured such that this alternating pattern of applying the bevel 30, 31 to the top surface than the bottom of the adjacent tooth 28 may continue across all of the plurality of teeth 28 across the blade head 26. The bevel 30, 31 may be configured such the depth of the bevel increase as you move distally along the tooth 28.

Figure 9:
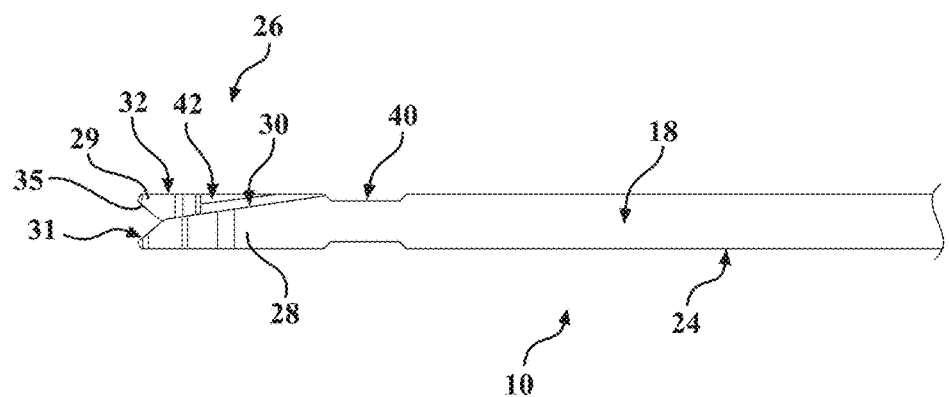
FIG. 9 is an enhanced side view of the saw blade of FIG. 1, illustrating the features of a blade head including a plurality of teeth defining a V-shaped profile.

Referring to FIGS. 7 to 9, it is further contemplated that one or more of the teeth 28 may comprise varying levels or angels of beveling 30, 31. For example, a first bevel 30 may comprise a first slope or angle as you move distally along the tooth 28. A second bevel 31 may be applied to the tooth 28 at a point distal to the first bevel 30, and the second bevel 31 may comprise a second slope or angle as you move distally along the tooth 28. The second slope of the second bevel 31 applied to the distal end of the tooth 28 may be steeper or greater than the first slope of the first bevel 30 applied to the blade head 26. The second bevel 31 may be applied to the distal end of the teeth 28 such that it defines a V-shaped recess in the distal end of the plurality of teeth 28 in between a pair of cutting edges 29 edges defined by each of the plurality of teeth 28. The second bevel 31 may terminate at a distal tip 35 of the cutting edges 29 and/or the plurality of teeth 28. As can be seen in FIG. 9, the second bevel 31 is applied to alternating surfaces of the teeth 28 of the blade head 26 and generally creates a V-shaped lateral profile of the plurality of teeth 28 across the distal end of the blade head 26. It can also be seen that the second bevel 31 is applied such that the distal tip 35 may comprise a flat. For example, the second bevel 31 is applied to produce an angled cutting surface 29 that includes a flat tip 35 at the distal end of the tooth 28.

The bevel 30, 31, and by extension the V-shaped profile of the plurality of teeth 28 at distal end of the blade head 26, is created by griding the teeth 28 with an alternating top bevel 30A,31A that creates a bevel sloping downward along the top surface and a bottom believe 30B, 31B that creates a bevel sloping upward along the bottom surface. The bevel 30, 31 sequence is created by alternating the grinding wheel pitched upward and downward relative to the top and bottom surfaces of the planar blade body. For example, in a first pass, the grinding wheel may be pitched downward relative to the top surface of the planar blade body 12 when applied to a top surface of the first tooth 28A to create the downward slope for the bevel 30A, 31A of the first tooth 28A. The grinding wheel may then be adjusted to be pitched upward relative to the bottom surface of the planar blade body 12 applied to the adjacent tooth 28B to create the upward slope for the bevel 30B, 31B of the adjacent tooth 28B. This sequence continues across the whole width of the blade head 26. As described above, this grinding pattern leaves a V-shape profile of the plurality of teeth 28 at the distal end of the blade head 26 across the whole width of the blade head 26 when viewing it in the sagittal plane (FIG. 9). It is contemplated that the grinding process may be completed in two passes using a customized grinding wheel or tooling where the grinding wheel or tooling is configured to contact each of the respective teeth 28A intended to have the first bevel 30A, 31A that is directed downward relative to the top surface of the in the first pass, and then the grinding wheel or tooling may be adjusted and configured to contact each of the respective teeth 28B intended to have the second bevel 30B, 31B that is directed upward relative to the bottom surface of the in the second pass. An advantage provided by this feature is to prevent blade skive by increasing the cut force on entry into a cut medium. This increase in force will cause the teeth 28 to imbed themselves into the cut medium sooner and prevent the blade head 26 from walking across the surface of the medium. The V-notch also creates a 'wedge' in the material as it cuts which will help the blade head 26 oppose reaction forces that otherwise may cause the blade head 26 to skive or dive during cutting.

Referring to FIGS. 6 and 7, the beveling 30, 31 applied to alternating surfaces of adjacent teeth 28 of the blade head 26 provides the formation of a cutting edge 42 at the opposed edges of the unbeveled surface 32 of the teeth 28. The cutting edge 42 may be defined along the length of the unbeveled surface 32 of the teeth 28. The cutting edge may be configured to allow for grinding, sanding, cutting, etc. of biological material in a direction perpendicular to the cutting direction of the teeth 28. For example, as is illustrated in FIG. 4, the typical cutting direction of the teeth 28 and/or blade head is in the distal to proximal direction along the x or y axis of a coordinate system. The cutting edge 42 defined along the length of the unbeveled surface 32 of the teeth 28 may be configured to cut or grind in the positive or negative z-axis, i.e. upward or downward. This cutting or grinding action created by the cutting edge 42 as the blade head 26 is oscillated may be considered similar to a rasp-like cutting action or operation. The cutting edge 42 generally comprises a 90 degree formed between the beveled surface 32 of the tooth 28 and beveling 30, 31 of the adjacent tooth 28. However, other rake angles are completed for the cutting edge. An advantage of the added direction cutting provided by the cutting edge 42 is that the cutting edge 42 may serve to help adjust or move the blade head 26 back to preferred plane/line to address skiving/drifting of the blade head 26 during the cutting procedure.

Figure 10:
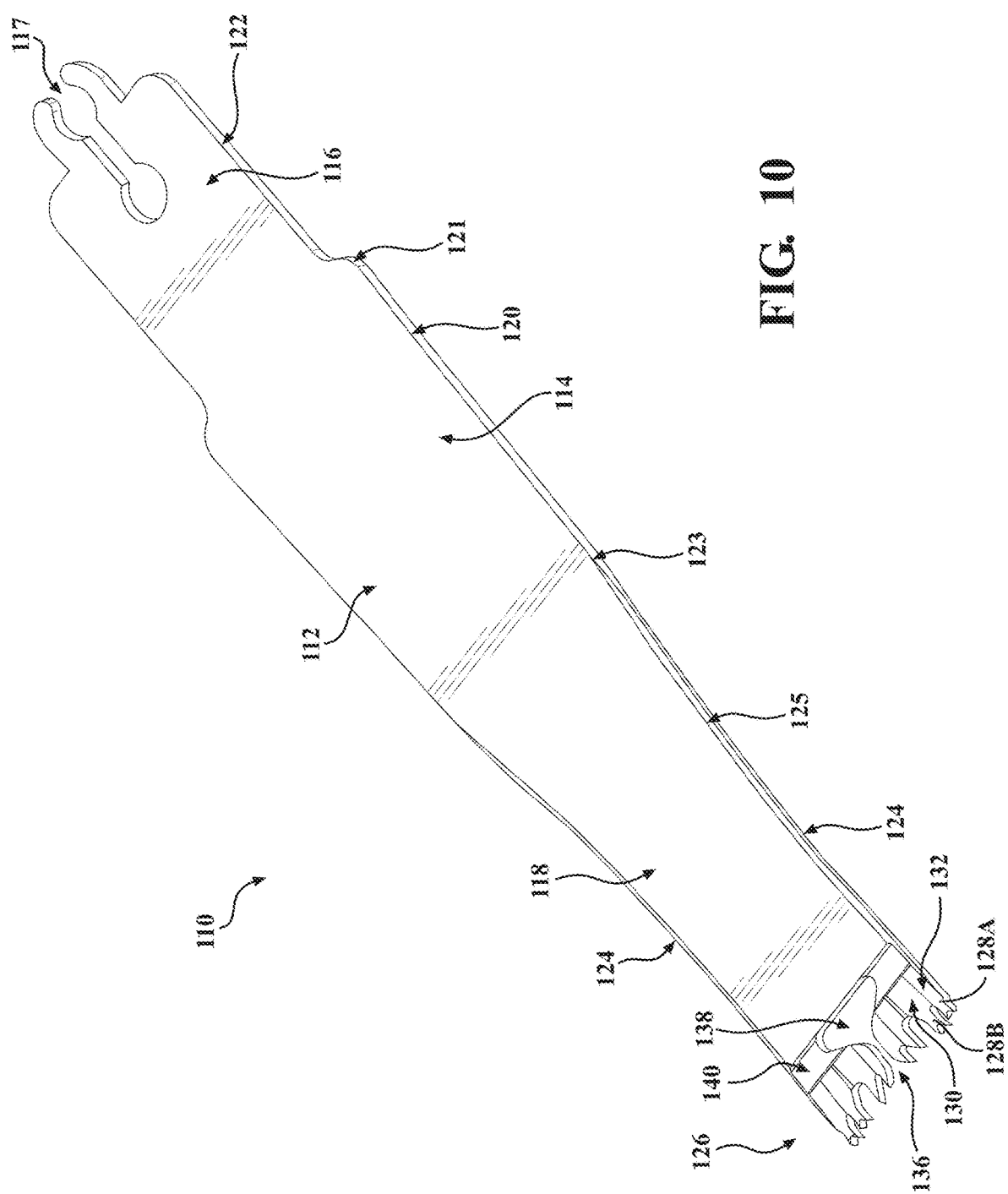
FIG. 10 is a perspective view of a second configuration of a saw blade for use with a surgical saw.

Referring to FIGS. 10 to 17, a second configuration of a saw blade 110 for use with a surgical saw, such as a sagittal surgical saw configure to oscillate a saw blade, is illustrated. It should be understood that any features of the saw blade 110 illustrated in FIGS. 10-17 that share a common base reference number may be configured, arranged, and/or designed to function in the same or similar matter as the configuration of the saw blade 10 described above. For example, FIG. 10 illustrates a saw blade 110 including a blade body 112. It should be understood that the blade body 112 of the saw blade in FIG. 10 may have the same characteristics and/or functionality as the blade body 12 of the saw blade 10 of FIGS. 1-9 described above.

Many of the features of the saw blade 110 illustrated in FIGS. 10 to 17 are the same or similar to those of the saw blade 10 described above. The saw blade 110 comprises an intermediate portion 114, as well as a proximal portion 116 and distal portion 118 disposed on opposed sides of the intermediate portion. The proximal portion 116 may define a geometric feature 117 configured for attaching the saw blade 110 to the surgical saw (not shown).

A blade head 126 may extend distally from the distal portion 118 of the blade body 112. The blade head 126 may comprise a plurality of teeth 128, 134 arranged on the blade head 126 and configured for cutting biological material such as bone, tissue, etc. The plurality of teeth 128, 134 may be generally configured to extend distally from the blade head 126. This may include one or more of the plurality of teeth 128, 134 extending forward of the blade head 126 (away from the intermediate and proximal portions 114, 116 of the blade body 112, as well as extending above or below the top or bottom surfaces of the blade head 226. The plurality of teeth 128, 134 arranged on the blade head may comprise teeth 128, 134 or different shapes and/or sizes. For example, the blade may comprise outer teeth 128 and inner teeth 134. The inner teeth 134 may also be referred to as central or center teeth, as they are generally located toward the center of the blade head 126, with the outer teeth 128 being located away from the center of the blade head 126.

Figure 15:
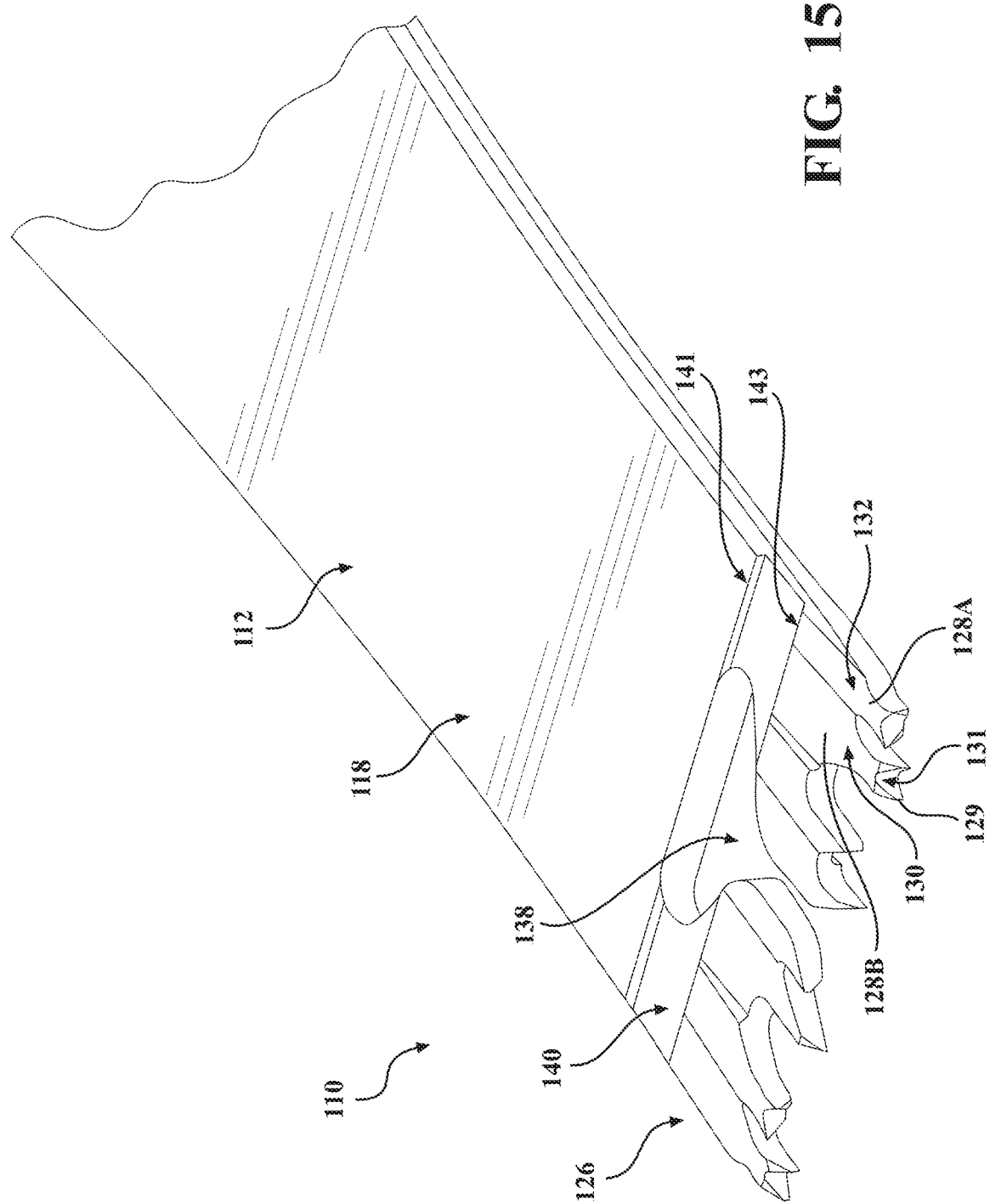
FIG. 15 is an enhanced perspective view of the saw blade of FIG. 10, illustrating the features of a distal portion and a blade head of the saw blade.
Figure 16:
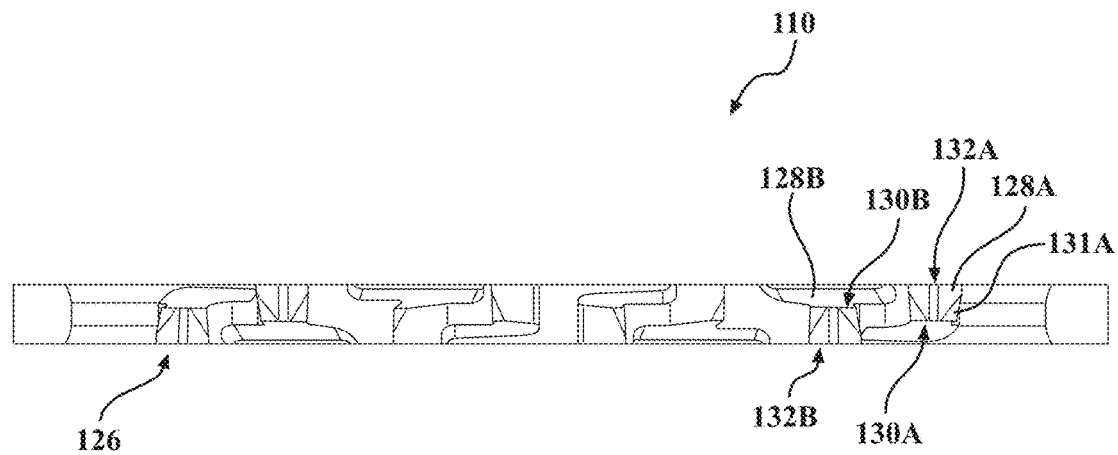
FIG. 16 is an enhanced front view of the saw blade of FIG. 10, illustrating the features of a blade head including a plurality of teeth.
Figure 17:
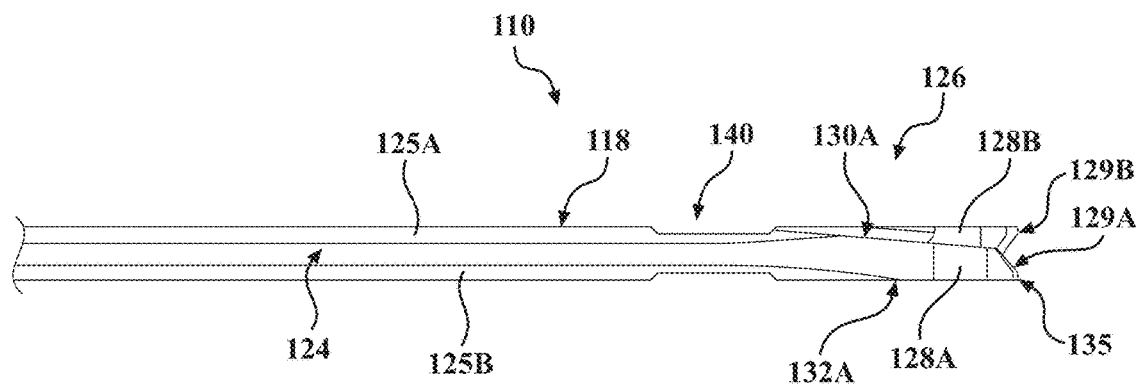
FIG. 17 is an enhanced side view of the saw blade of FIG. 10, illustrating the features of a blade head including a plurality of teeth defining a V-shaped profile and a recess.

Referring to FIGS. 15 to 17, it is further contemplated that one or more of the teeth 128 may comprise varying levels or angles of beveling 130, 131. For example, a first bevel 130 may comprise a first slope or angle as you move distally along the tooth 128. A second bevel 131 may be applied to the tooth 128 at a point distal to the first bevel 130, and the second bevel 31 may comprise a second slope or angle as you move distally along the tooth 128. The second slope of the second bevel 131 applied to the distal end of the tooth 28 may be steeper or greater than the first slope of the first bevel 130 applied to the blade head 126. The second bevel 131 may be applied to the distal end of the teeth 128 such that it defines a V-shaped recess in the distal end of the plurality of teeth 128 in between a pair of cutting edges 129 edges defined by each of the plurality of teeth 28. The second bevel 131 may terminate at a distal tip 135 of the cutting edges 129 and/or the plurality of teeth 128. As can be seen in FIG. 17, the second bevel 31 is applied to alternating surfaces of the teeth 128 of the blade head 126 and generally creates a V-shaped lateral profile of the plurality of teeth 128 across the distal end of the blade head 126. It can also be seen that the second bevel 131 is applied such that the distal tip 135 may comprise a flat. For example, the second bevel 131 is applied to produce an angled cutting surface 129 that includes a flat tip 135 at the distal end of the tooth 28.

The blade head 126 may also define an opening 136 that opens into a void 138 defined in the blade head 126 and/or distal portion 118 of the blade body 112. The void 138 may be generally oval or kidney-shaped.

A recess 140 may be defined in the blade head 126 and/or distal portion 118 of the blade body 112. The recess 140 may generally extend across the width of the blade head 126 and/or distal portion 118 of the blade body 112. The recess 140 may have a height dimension D1 defined between a proximal edge 141 and a distal edge 143 of the recess 140. The height dimension D1 of the recess 140 may comprise a distance of at least three millimeters (3-mm) between the proximal edge 141 and the distal edge 143 of the recess 140. It is further contemplated that the height dimension D1 of the recess 140 may comprise a distance of at least 12 millimeters (12-mm) between the proximal edge 141 and the distal edge 143 of the recess 140. It is further contemplated that the height dimension D1 of the recess 140 may comprise a distance of at least 15 millimeters (15-mm) between the proximal edge 141 and the distal edge 143 of the recess 140. The recess 140 may be further aligned and/or oriented relative to the oval shape of the void 138, such that the recess 140 on either side of the void 138 may extend from one of the apexes of the major axis of the oval-shaped void 138 to assist with evacuation or removal of biological material or debris from with the void 138 to outside the width of the blade body 112. In operation, debris and/or biological tissue may enter the void 138 through the opening 136. Alternatively, debris and/or biological tissue may travel along one of the beveled surfaces 130 on the top or bottom surface of the teeth 128, 134 and feed onto the surface of the recess 140, and from there travel along the surface of the recess 140 and into the void 138. The debris and/or biological tissue on the surface of the recess 140 may also travel toward one of the distal side edges 124 of the blade body 112 or blade head 126.

Figure 11:
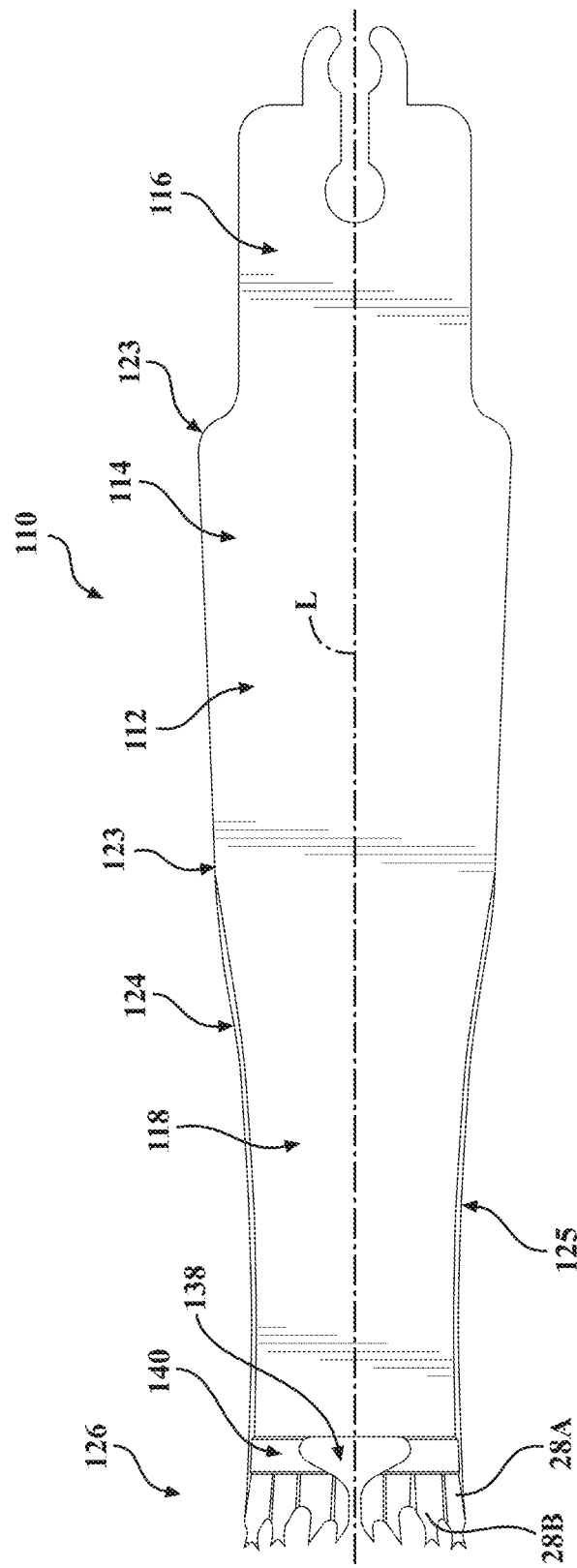
FIG. 11 is a top view of the saw blade of FIG. 10.
Figure 12:
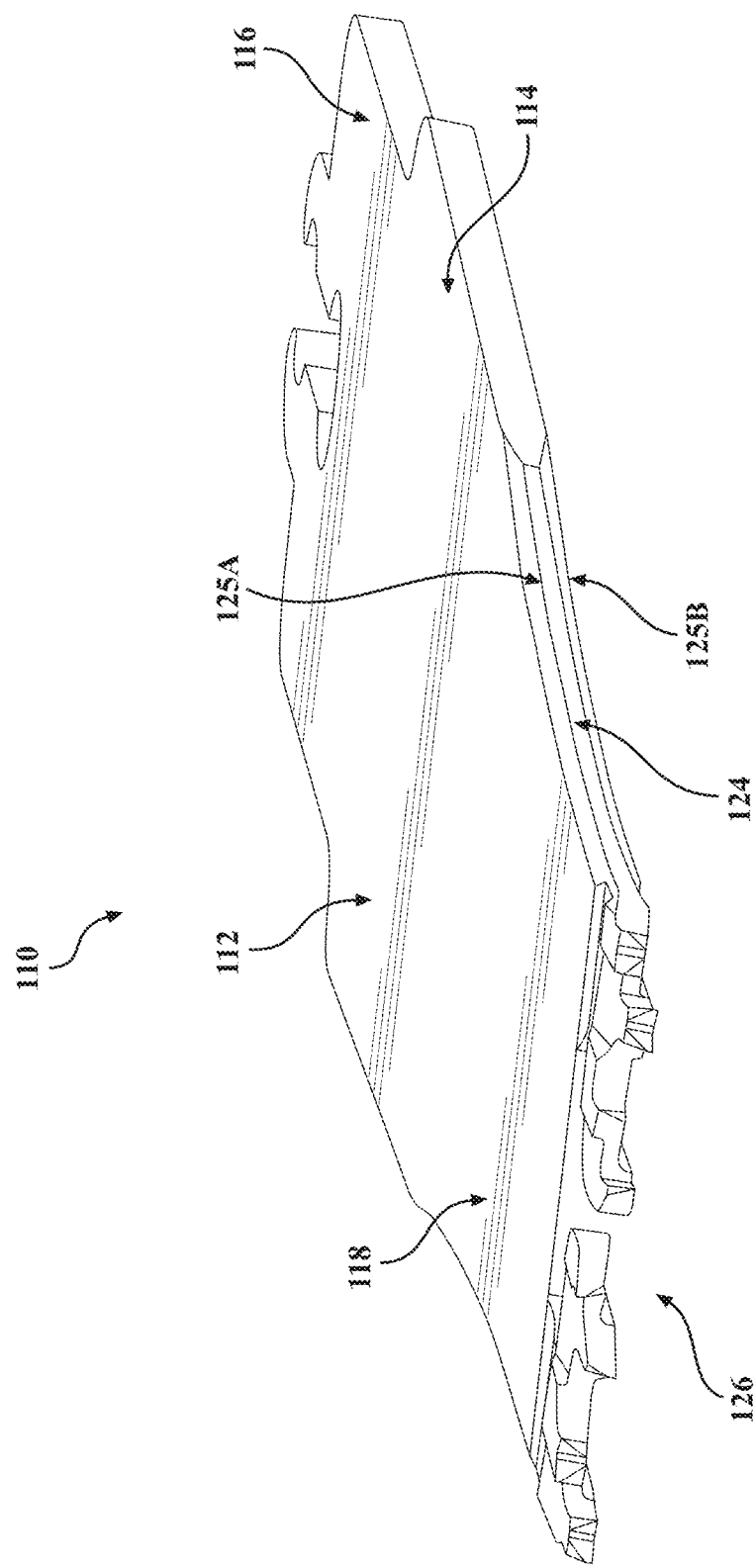
FIG. 12 is an alternate perspective view of the saw blade of FIG. 10, illustrating features of a side edge of a distal portion of the saw blade.
Figure 13:
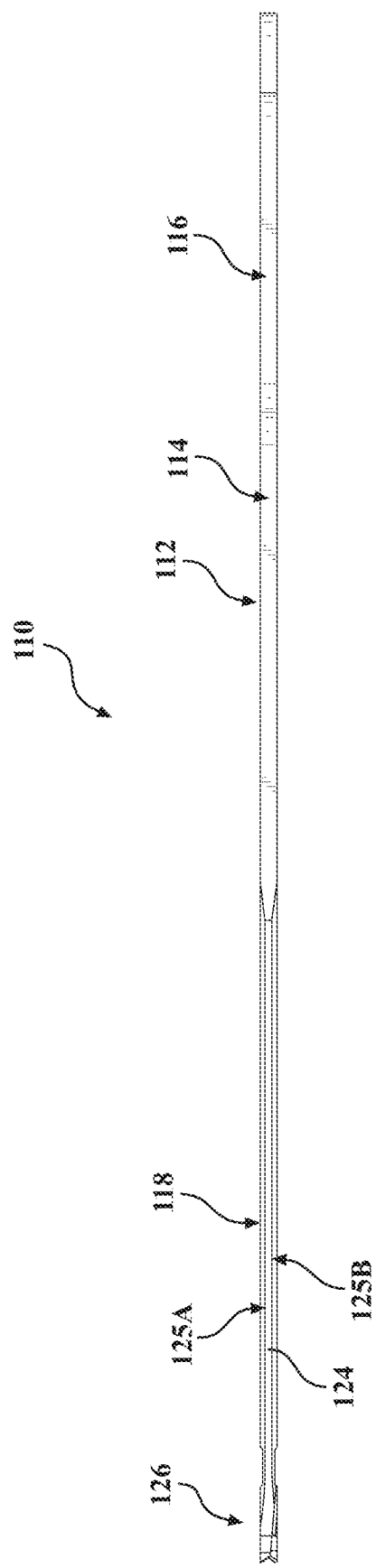
FIG. 13 is a side view of the saw blade of FIG. 10.
Figure 14:
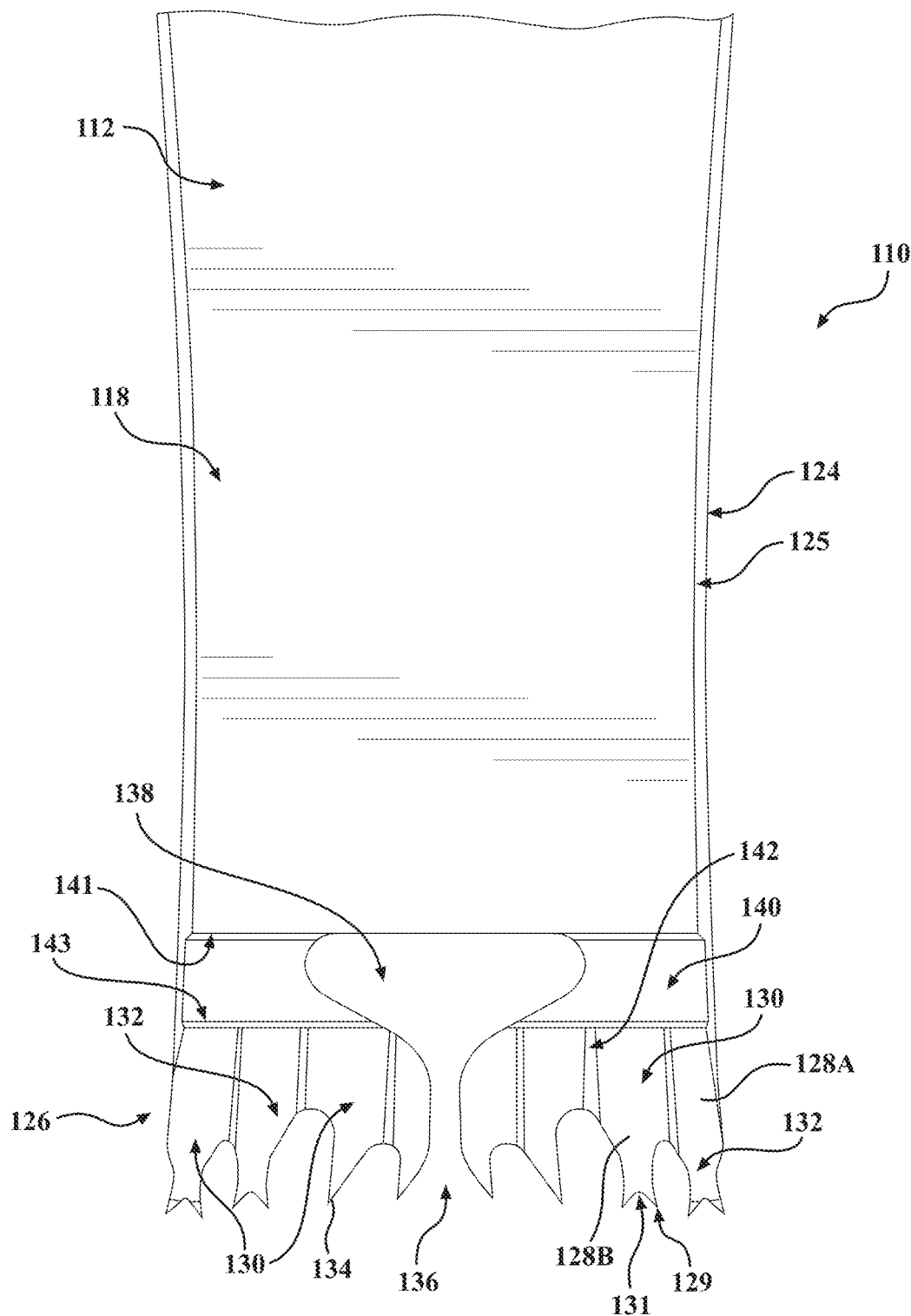
FIG. 14 is an enhanced top view of the saw blade of FIG. 10, illustrating the features of a distal portion and a blade head of the saw blade.

Similar to the blade body 12 described above, the configuration of the blade body 112 illustrated in FIGS. 10-17 may include a distal portion 118 of the blade body 112 having distal sides 124 shaped to define a void 146 along the length of the distal side(s) 124 of the distal portion 118 when the blade body 112 when oscillated. For example, as is illustrated in FIGS. 10 to 12, the distal side(s) 124 of the distal portion 118 of the blade body 112 may comprise a concave or arcuate shape bending inward toward the longitudinal axis (L) of the blade body 112. The void 146 may be configured to assist with the evacuation or removal of biological tissue that has been removed from within the kerf of the cut produce by the saw blade 110.

The distal sides 124 of the distal portion 118 of the blade body 112 may also optionally include a beveled edge 125A, 125B. While not illustrated, it is also contemplated that the distal sides 124 may be configured to have a fillet, rounded, or chamfered edge. The double beveled edge 125 of the distal sides 124 may reduce stress and/or improve the strength of the shaped distal side surface 124 of the distal portion 118 of the blade body 112. The double beveled edge 125 may also improve the flow/evacuation of biological material along the length of the distal side surface 124 of the distal portion 118 of the blade body 112. The blade body 112 may also be configured such that the bevel 125, 127 is present on a side edge 120 of the intermediate portion 114 of the blade body 112 and/or on the side edges of the blade head 126. For example, the bevel 125, 127 may extend along the entire length of one or both of the side edges 120, 124 of the intermediate and distal portions 114, 118 of the blade body 112 and along the edge of the blade head 126 up to a point on the side of the blade head 126 that is just proximal to the plurality of teeth 128. Alternatively, in another configuration it is contemplated that the bevel 125, 127 may only be present on one or both of the side edges 120, 124 of the intermediate and distal portions 114, 118 of the blade body 112. In yet another configuration, the bevel 125 may only be on the side edge 125 of the intermediate section and/or the side edge of the blade head 126.

Figure 18A:
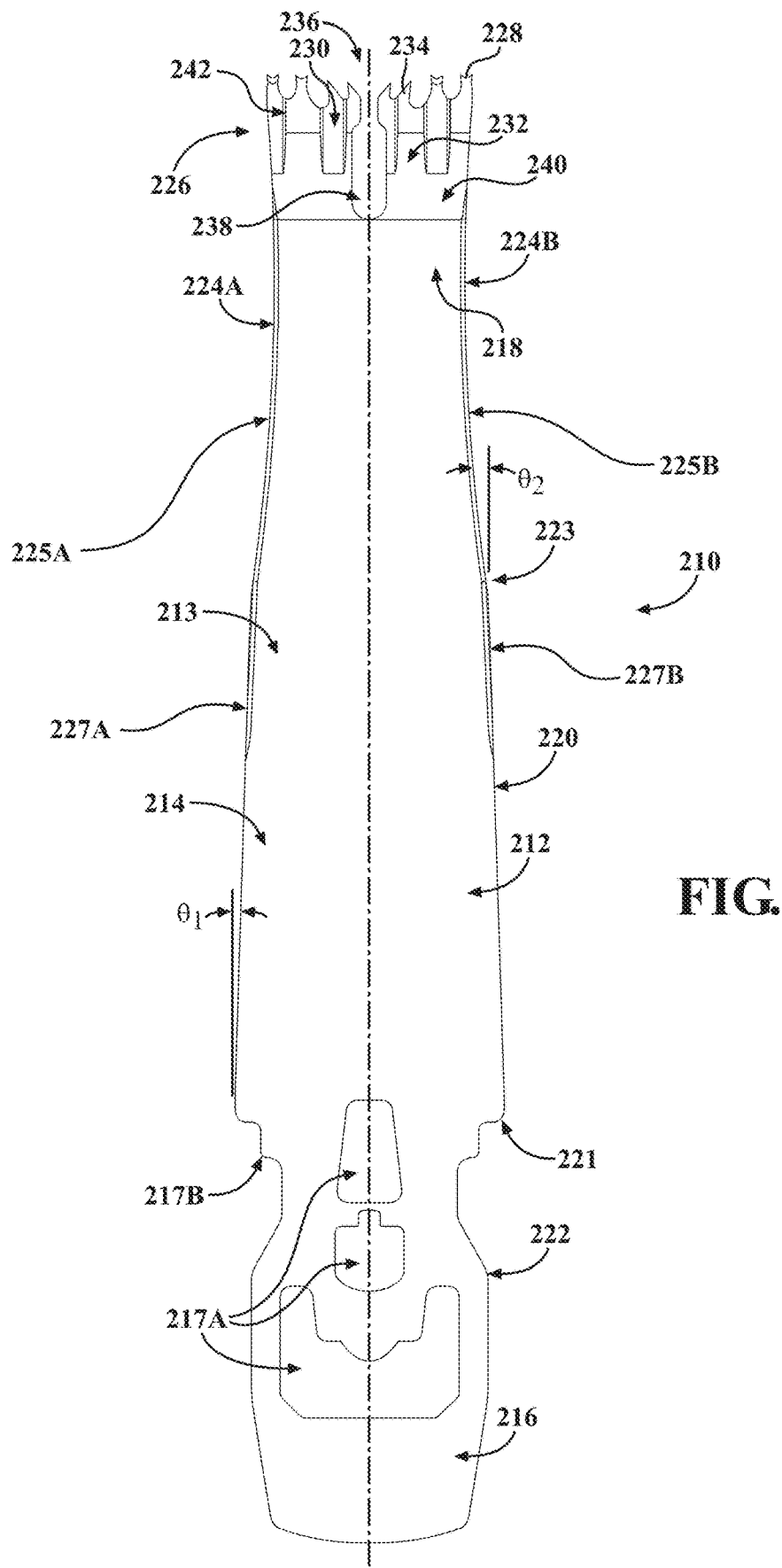
FIG. 18A is a top view of a third configuration of a saw blade for use with a surgical saw.

Referring to FIGS. 18A to 25, a third configuration of a saw blade 210 for use with a surgical saw, such as a sagittal surgical saw configure to oscillate a saw blade, is illustrated. It should be understood that any features of the saw blades 10, 110, illustrated in FIGS. 1-17 that share a common base reference number may be configured, arranged, and/or designed to function in the same or similar manner as the configuration of the saw blades 10, 110 described above. For example, FIG. 18A illustrates a saw blade 210 including a blade body 212. It should be understood that the blade body 212 of the saw blade 210 in FIG. 18A may have the same characteristics and/or functionality as any of the blade body's 12, 112 of the saw blades 10, 110 of FIGS. 1-17 described above.

Each of the portions 214, 216, 218 of the blade body 212 may further comprise opposed side surfaces 220, 222, 224. For example, the intermediate portion may have an intermediate side surface 220 or intermediate edge, the proximal portion 216 may similarly define a proximal side surface 222 or proximal edge, and the distal portion 218 may similarly define a distal side surface 224 or distal edge. Each of the portions 214, 216, 218 of the blade body 212 may have distinct width providing a distinct side surface 220, 222, 224 from the others. Alternatively, it is further contemplated that one or more of the portions 214, 216, 218 of the blade body 212 may have the same or similar widths. The blade body 212 may also comprise a longitudinal axis (L) extending between the proximal and distal portions 216, 218 of the blade body 212, as illustrated in FIG. 18A. The longitudinal axis (L) may be configured to bisect the blade body 212 such that is generally evenly spaced between the opposing side surfaces 220, 222, 224 of the portions 214, 216, 218 of the blade body 212.

Referring to FIG. 18A, the side surface(s) 220 of the intermediate portion 214 of the blade body 212 may be tapered at an angle ($\Theta 1$). The taper of the side surface(s) 220 of the intermediate portion 214 may be such that the distance between the side surface 220 and the longitudinal axis (L) decrease as you move from a proximal end 221 of the intermediate portion 214 to a distal end 223 of the intermediate portion 214. For example, as illustrated in FIG. 18A, the width of the intermediate portion 214 decreases as you move from the proximal end 221 of the intermediate portion 214 to the distal end 223. This taper ($\Theta 1$) of the side surface(s) 220 of the intermediate portion 214 allows for improved structural rigidity of the blade body 212 while also reducing the width and footprint of the blade body 212 as it is oscillated from side-to-side by the surgical saw.

The side surface(s) 224 of the distal portion 218 of the blade body 212 may similarly include taper. For example, the side surface(s) 222 of the distal portion 218 may be tapered at an angle ($\Theta 2$). The taper of the side surface(s) 224 of the distal portion 218 may provide for the side surface(s) 224 having a generally concave or inward arching shape. As illustrated in FIG. 18A, both side surfaces 224A, 224B have an inward arching shape toward the longitudinal axis (L) such that a top surface 213 and a bottom surface 215 of the blade body 212 have a generally biconcave shape. As described above, this allows for reduced footprint of the blade 210 as it is oscillated back and forth by a saw. See FIGS. 3A and 3B above illustrating and describing the reduce footprint of provide by the inward tapered and/or concave shape of the side surfaces of the saw blade 10, 110, 210.

As described above, the blade body 212 may comprise side surfaces 220, 222, 224. The side surfaces 220, 224 of the intermediate and distal portions 214, 218 of the blade body 212 may further comprise a beveled edge 225A, 225B. The beveled edge 225A, 225B may also be referred to as a chamfer. While not illustrated, it is also contemplated that the distal sides 224 may be configured to have a fillet, rounded, or tapered edge. The double beveled edge 225 of the side surfaces 224 of the distal portion 218 may reduce stress and/or improve the strength of the shaped side surface 224 of the distal portion 218 of the blade body 212. The double beveled edge 225 may also improve the flow/evacuation of biological material along the length of the distal side surface 224 of the distal portion 218 of the blade body 212. The beveled edge 225 of the side surfaces 224 of the distal portion 218 may also prevent inadvertent damage within the cut zone by removing the generally square edge where the side surface 224, 220 abuts the top and bottom surfaces 213, 215. The squared edge design in the prior designs may serve as an edge capable of cutting and/or chipping surrounding tissue and bone.

A blade head 226 may extend distally from the distal portion 218 of the blade body 212. The blade head 226 may comprise a plurality of teeth 228, 234 arranged on the blade head 226 and configured for cutting biological material such as bone, tissue, etc. The plurality of teeth 228, 234 may be generally configured to extend distally from the blade head 226. This may include one or more of the plurality of teeth 228, 234 extending forward of the blade head 226 (away from the intermediate and proximal portions 214, 216 of the blade body 212, as well as extending above or below the top or bottom surfaces of the blade head 226. The plurality of teeth 228, 234 arranged on the blade head may comprise teeth 228, 234 or different shapes and/or sizes. For example, the blade may comprise outer teeth 228 and inner teeth 234. The inner teeth 234 may also be referred to as central or center teeth, as they are generally located toward the center of the blade head 226, with the outer teeth 228 being located away from the center of the blade head 226.

Figure 18B:
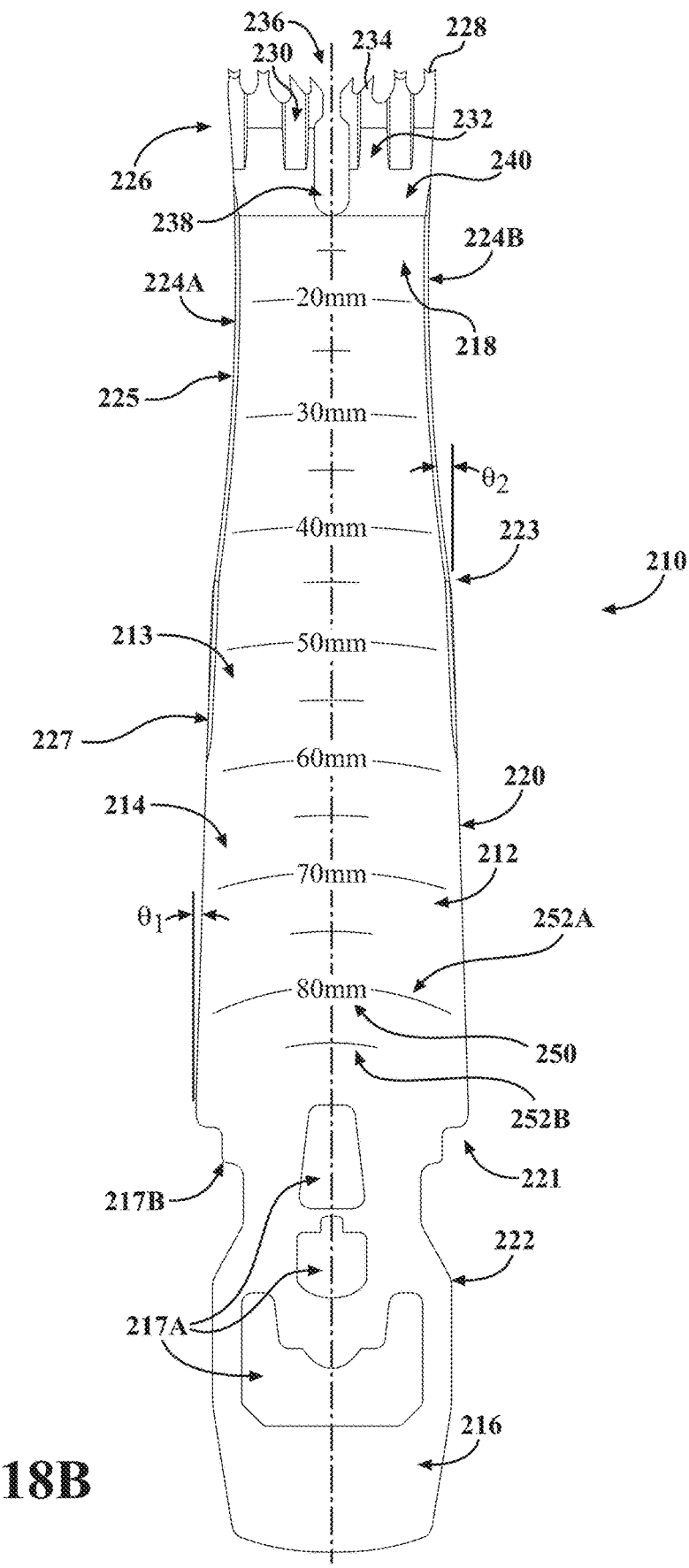
FIG. 18B is a top view of the saw blade of FIG. 18A for use with a surgical saw, the saw blade including a first configuration of a depth marking indicia corresponding to a distance from the distal end of the saw blade.
Figure 18C:
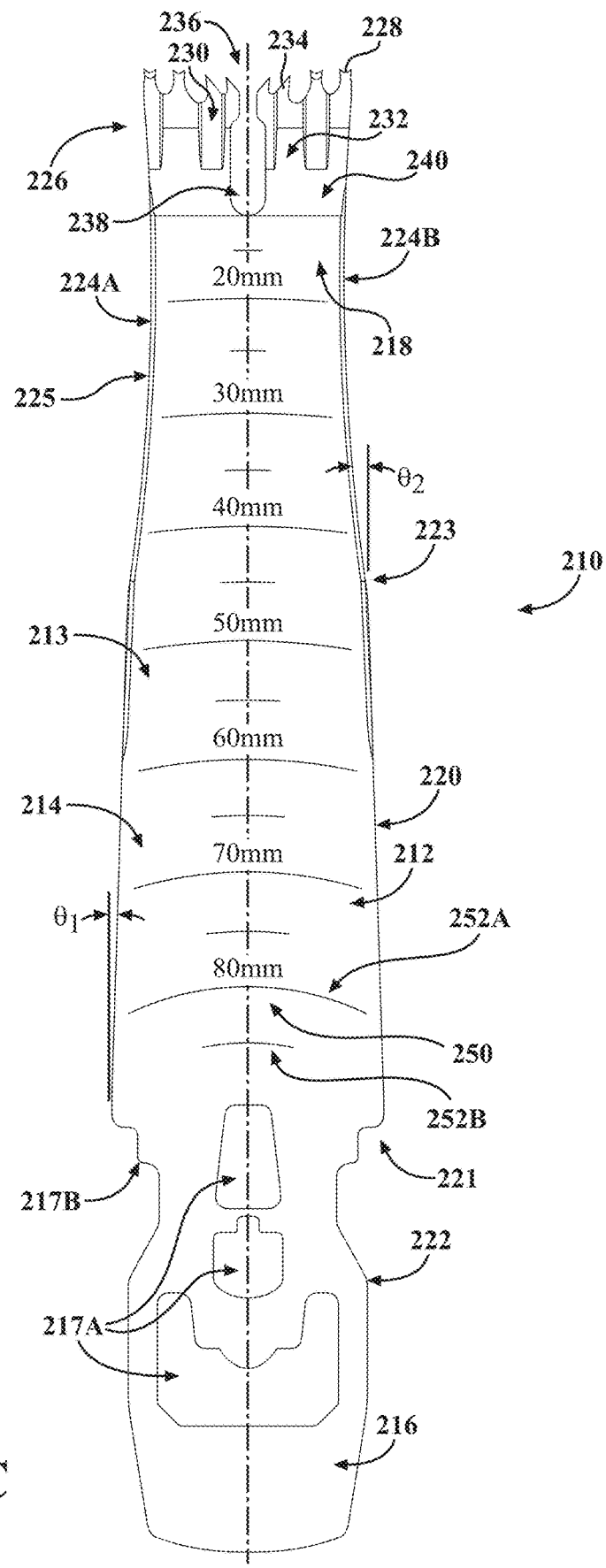
FIG. 18C is a top view of the saw blade of FIG. 18A for use with a surgical saw, the saw blade including a second configuration of a depth marking indicia corresponding to a distance from the distal end of the saw blade.
Figure 18D:
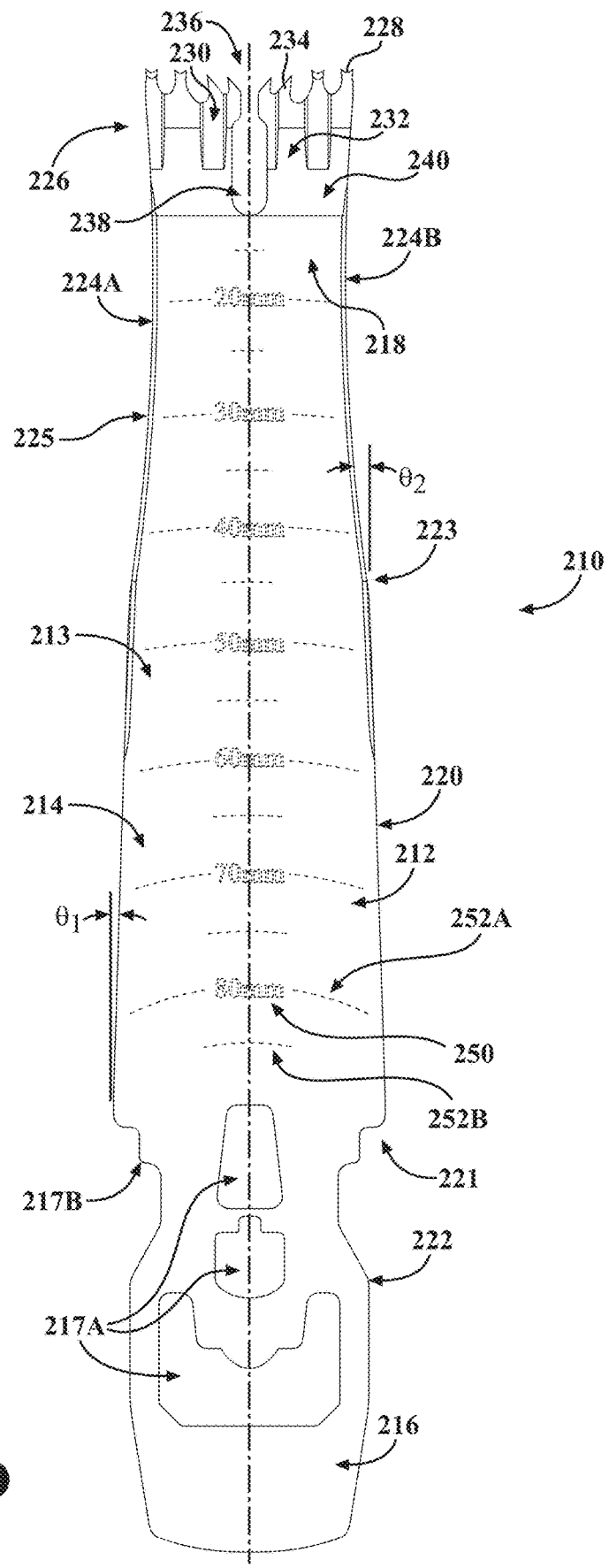
FIG. 18D is a top view of the saw blade of FIG. 18A for use with a surgical saw, the saw blade including a third configuration of a depth marking indicia corresponding to a distance from the distal end of the saw blade.
Figure 18E:
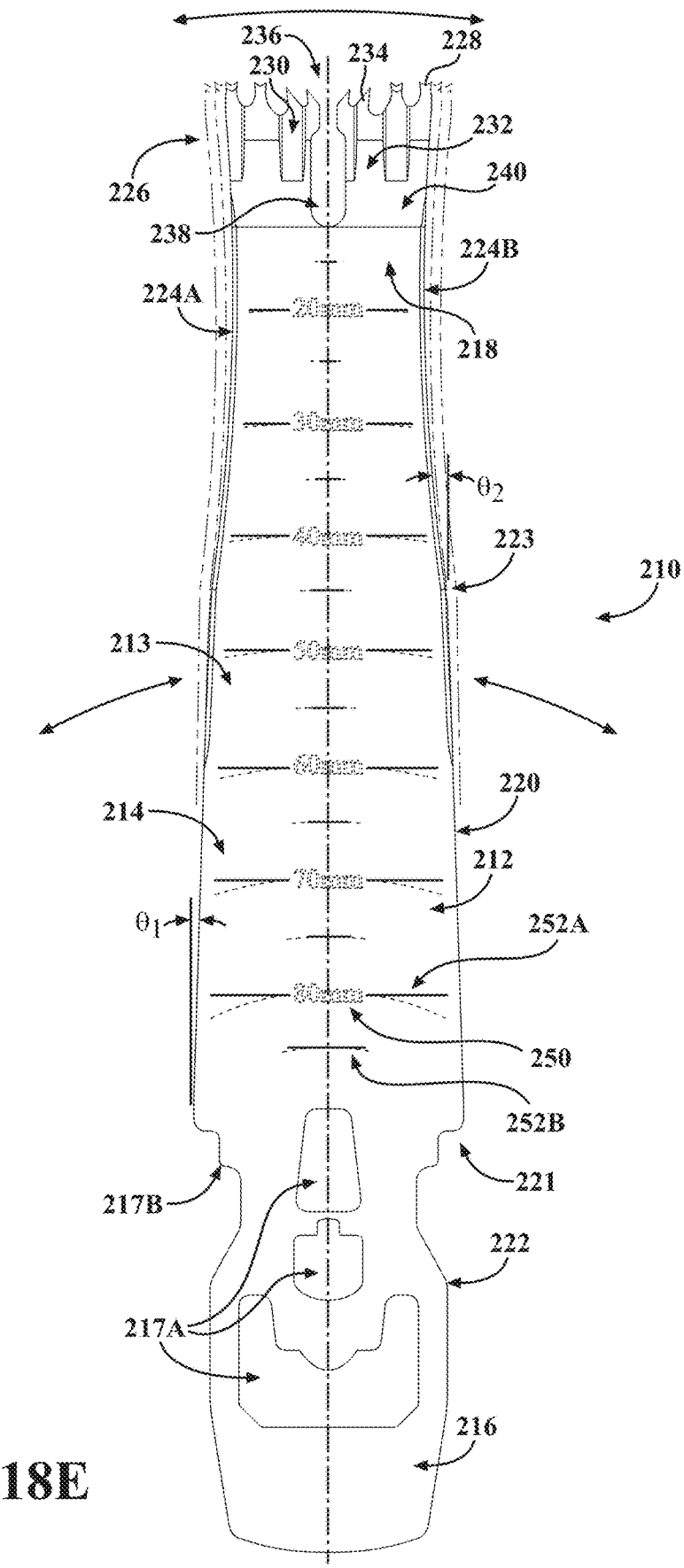
FIG. 18E is a top view of the saw blade of FIG. 18D for use with a surgical saw, illustrating how the depth marking indicia is perceived by the user when the saw blade is oscillated.
Figure 19:
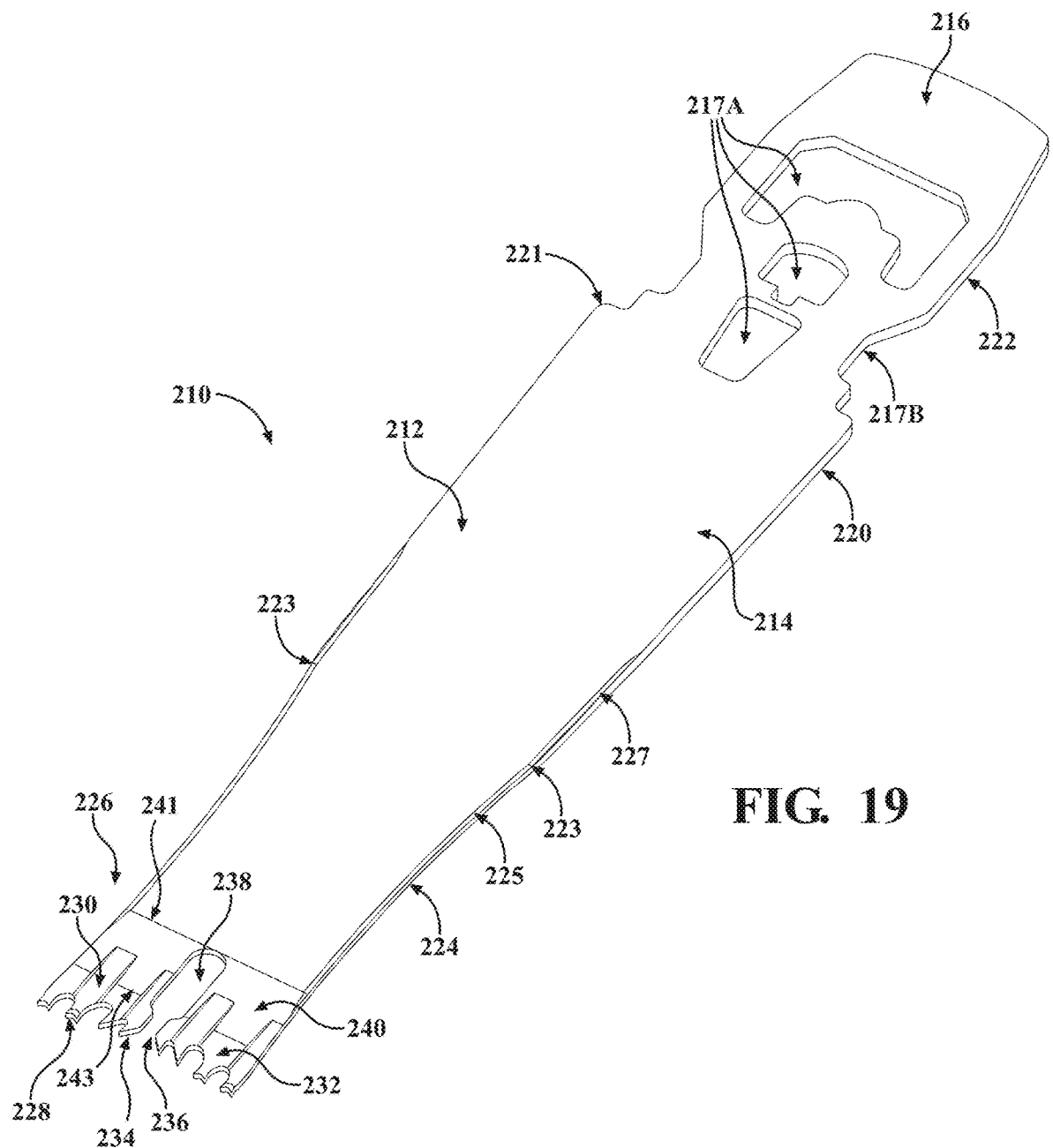
FIG. 19 is a perspective view of the saw blade of FIG. 18A.
Figure 20:
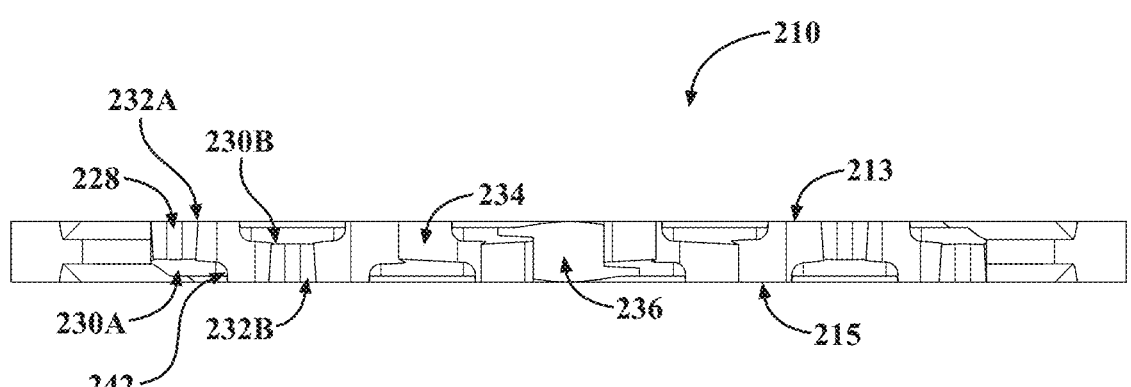
FIG. 20 is a front view of the saw blade of FIG. 18A.
Figure 21:
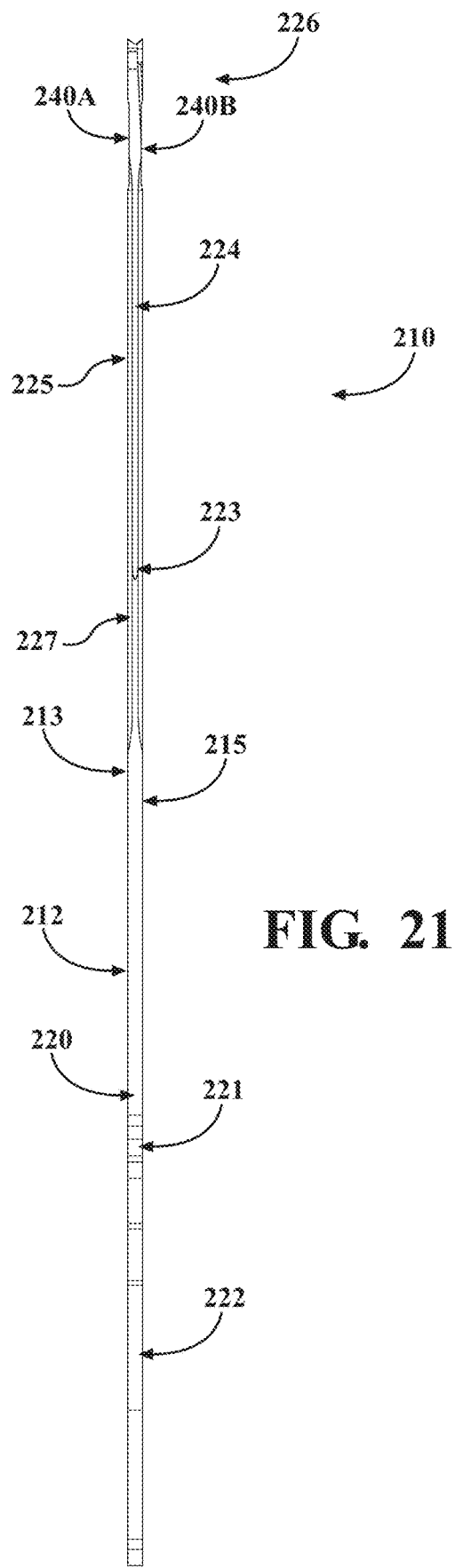
FIG. 21 is a side view of the saw blade of FIG. 18A.
Figure 22:
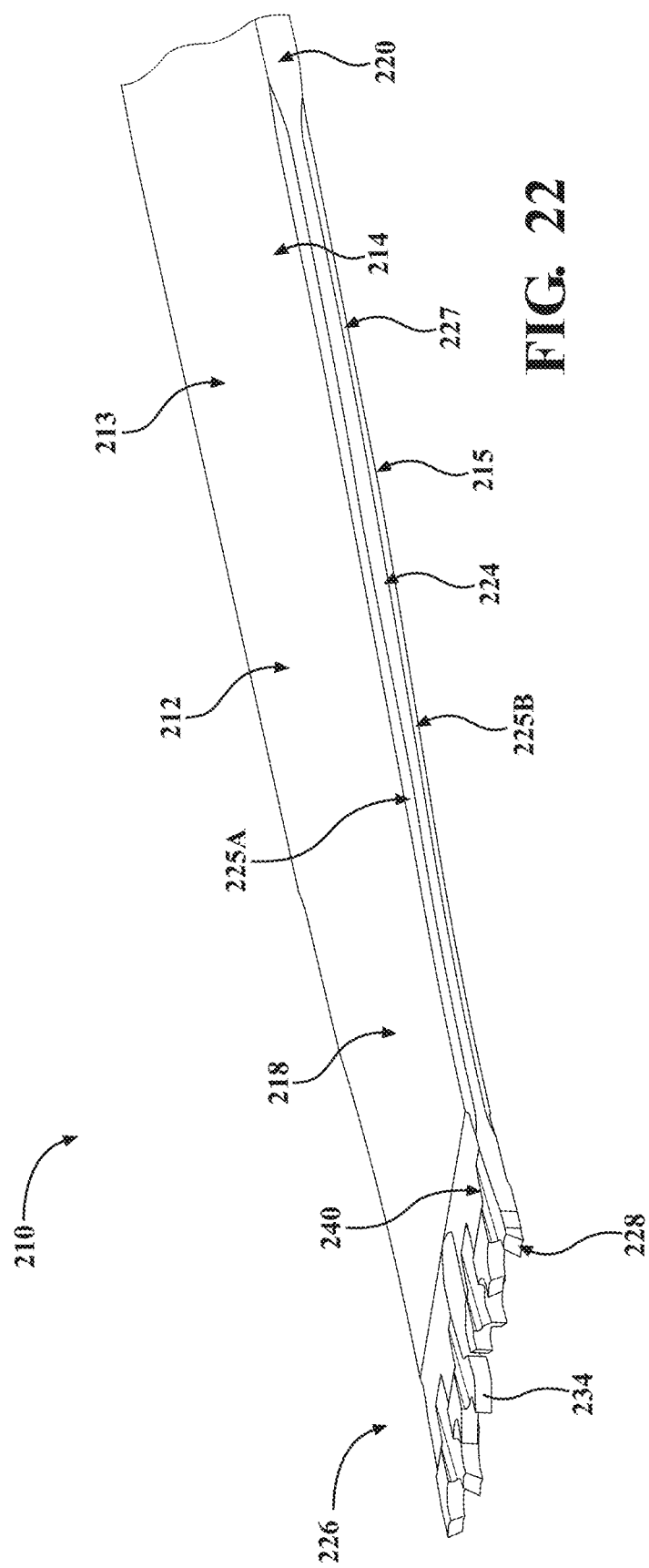
FIG. 22 is an enhanced perspective view of a distal portion and blade head of the saw blade of FIG. 18A.

Referring to FIGS. 18B to 18E, example configurations of a saw blade 210, including indicia 250, 252A, 252B disposed on the top or bottom surface 213, 215, of the blade body 212. The indicia 250, 252A, 252B may include markings corresponding to the distance from the distal end of the blade body 212 and/or the teeth 228, 334, the indicia 250, 252A, 252B intended to indicate the depth of the cut. The indicia 250, 252A, 252B may include numerical markings 250 indicating the depth. The indicia 252A, 252B may also include lines, shapes, or similar markings. As illustrated in FIG. 18B, the indicia 252A, 252B may comprise solid lines that are oriented in an arched shape that is concentric to the axis of rotation of blade body 212 when the blade body 212 is oscillated. This configuration of the indicia 252A, 252B can assist the user in more accurately identifying the depth the blade head 226 is inserted. FIG. 18C illustrates an alternate configuration of the indicia 250, 252A, 252B where the indicia 252A, 252B include dotted or dashed lines that are oriented in an arched shape that is concentric to the axis of rotation of the blade body 212 when the blade body 212 is oscillated. FIGS. 18B and 18C are only intended to be examples of lines and/or shapes that may ae arranged in the arched configuration that is concentric to the axis of rotation of the blade body 212 when the blade body 212 is oscillated. While not shown in the figures, other shapes such as dashes, squares, dots, or similar shapes may be arranged on the top or bottom surface 213, 215, of the blade body 212 in the arched configuration to provide a visual aide for the depth the blade to the user as the blade 210 is utilized in a surgical procedure. By having the indicia 252A, 252B concentric to the blade's axis of rotation, it allows the user to visibly see the indicia 252A, 252B as the blade is oscillating. For example, as is illustrated in FIG. 18D, the indicia 252A, 252B on the blade 210 being arranged and/or oriented to be concentric to the blade's axis of rotation results in the indicia 252A, 252B appearing as a straight line to the user when the blade 210 is oscillated back and forth.

Figure 23:
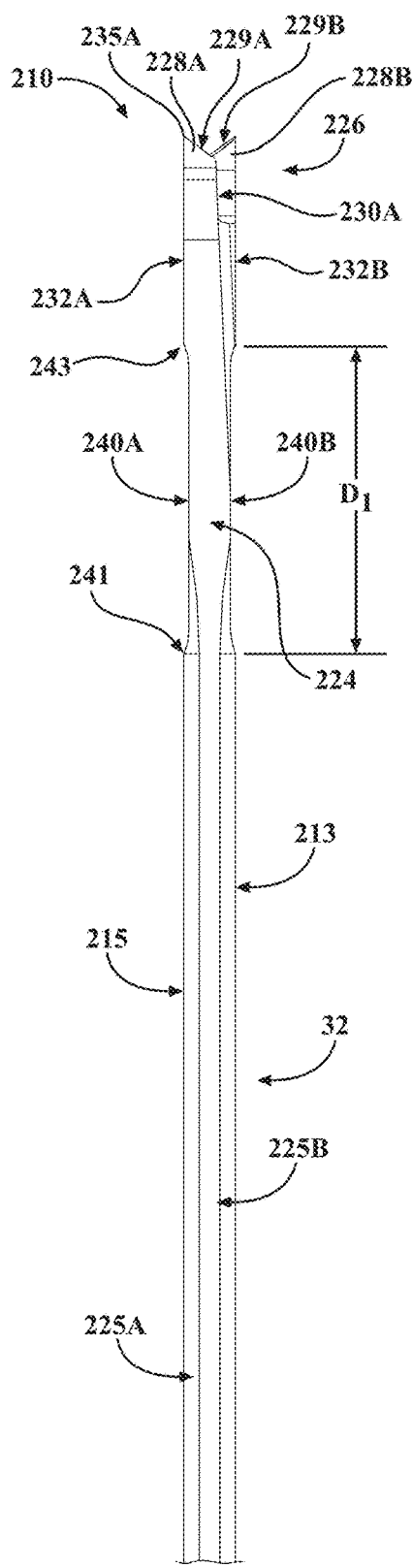
FIG. 23 is an enhanced side view of a distal portion and blade head of the saw blade of FIG. 18A.
Figure 24:
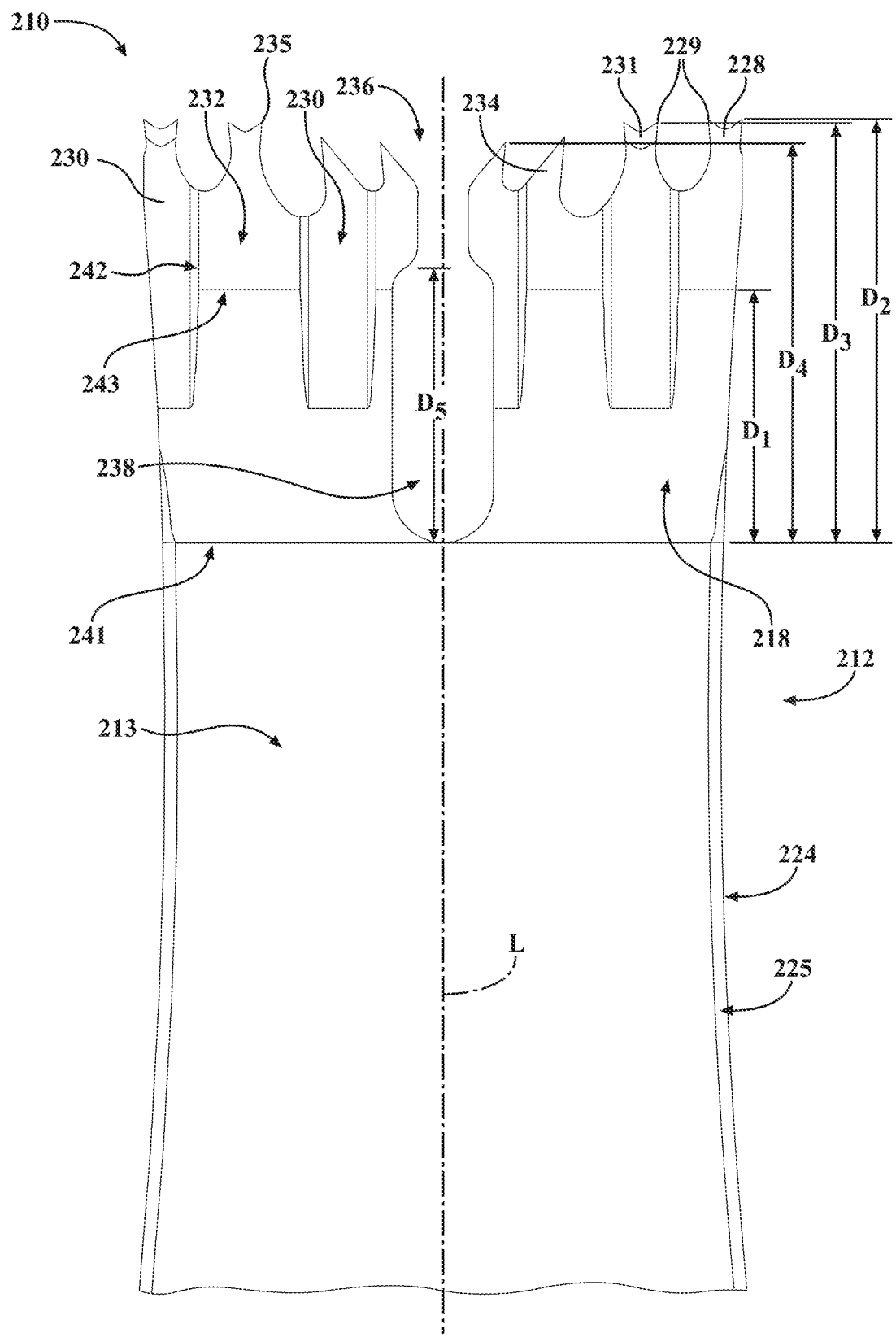
FIG. 24 is an enhanced top view of a distal portion and blade head of the saw blade of FIG. 18A.

Referring to FIGS. 23 and 24, it is further contemplated that one or more of the teeth 228, 234 may comprise varying levels or angels of beveling 230, 231. For example, a first bevel 230 may comprise a first slope or angle as you move distally along the tooth 228, 234. A second bevel 231 may be applied to the tooth 228 at a point distal to the first bevel 230, and the second bevel 231 may comprise a second slope or angle as you move distally along the tooth 228. The second slope of the second bevel 231 applied to the distal end of the tooth 228 may be steeper or greater than the first slope of the first bevel 230 applied to the blade head 226. The second bevel 231 may be applied to the distal end of the teeth 228 such that it defines a V-shaped recess in the distal end of the plurality of teeth 228 in between a pair of cutting edges 229 edges defined by each of the plurality of teeth 28. The second bevel 231 may terminate at a distal tip 235 of the cutting edges 129 and/or the plurality of teeth 228. As can be seen in FIG. 23, the second bevel 231 is applied to alternating surfaces of the teeth 228 of the blade head 226 and generally creates a V-shaped lateral profile of the plurality of teeth 228 across the distal end of the blade head 226. It can also be seen that the second bevel 231 is applied such that the distal tip 235 may comprise a flat. For example, the second bevel 231 is applied to produce an angled cutting surface 229 that includes a pointed tip 235 at the distal end of the tooth 228.

Referring to FIG. 24, the outer teeth 228 may generally comprise a V-shape, with a recess defined by the second bevel 231 or groove positioned proximate the center of the tooth between two cutting edges 229 that terminate at a point 235 at the distal most edge of the tooth 228. The cutting edge(s) 229 extends across the entire length/thickness of the tooth 228. The cutting edge(s) 229 defined by the second bevel 231 is angled relative to the top and bottom surfaces 213, 215 of the blade body 212. In manufacturing, this angle is achieved by laser cutting a generic blank of the blade body 212 and teeth 228, 234, and then using a grinding device, such as a V-shaped griding wheel and applying it to the outer teeth 228 at an angle relative to the top and bottom surfaces 213, 215 of the blade body in order to create an angled surface of the cutting edge(s) 229 of the outer teeth 228. As illustrated in the figures, the angle may be alternatingly applied to adjacent outer teeth 228 to create an alternating pattern of the angle of the second bevel 231 from top to bottom of the cutting edge(s) 229 of adjacent outer teeth 228. As can be seen in FIG. 23, this can create a V-shaped profile of at the distal most end of the blade head 226. This V-shaped profile can improve the cut performance of the blade 210 by reducing skiving and/or diving, as well as increasing the cut speed of the blade 210.

The teeth 228, 234 of the blade head 226 may also vary in length across the width of the blade head 226. For example, the inner teeth 234 may be generally shorter than the outer teeth 228, as measured from the distal portion 218 of the blade body 212. Furthermore, the outer teeth may also vary in length. For example, an outermost outer tooth 228 may extend a distance (D2) from the distal portion 218 of the blade body 212. A first outer tooth 228 that is one inside of the outermost outer tooth 228 (i.e. the second tooth in from the edge of the blade head 226) may extend a different distance (D3) from the distal portion 218 of the blade body 212, and an inner tooth 234 may extend yet another different distance (D5) from the distal portion 218 of the blade body 212. The teeth 228, 234, may be arranged such that the distance D2 is greater than the distance D3 so that the outermost outer tooth 228 and the second outer tooth 228 in from the edge of the blade head 226 may move along slightly different arcs as the blade is oscillated. In this configuration the outermost tooth 228 is distal to the second outer tooth 228 from the edge, such that the outermost outer tooth sits on a wider arc than the second outer tooth 228 in from the edge of the blade head 226. This outer tooth 228 configuration can improve the cut performance of the blade head 226, such as allowing the blade head 226 to efficiently cut bone and other biological tissue without being so aggressive that it cause the blade head 226 to dive, skive, or otherwise be pulled offline. The distance D4 of the inner teeth 234 may be less than each of the distances D2 and D3 such that the cut pattern of the blade head 226 as it is oscillated defines a recess proximate the center of the blade head 226. While not shown in the figures, it is also contemplated that the blade head 226 may include teeth 228, 234, that are arranged such that the distance D3 is greater than the distance D2 so that the outermost outer tooth 228 and the second outer tooth 228 in from the edge of the blade head 226 may move along the same arc as the blade is oscillated. In this configuration, the distance D4 may be less than each of the distances D2 and D3 such that the cut pattern of the blade head 226 as it is oscillated again defines a recess proximate the center of the blade head 226.

The blade head 226 may further define an opening 236. This opening 236 may be open to a void 238 defined by the blade head 226 and/or the distal portion 218 of the blade body 212. The opening 236 may be defined on or along the longitudinal axis (L) of the blade body 212. The void defined by the blade head 226 and/or the distal portion 218 of the blade body 212 may be generally disposed proximal to or behind the plurality of teeth 228. The void 238 may be defined as a generally ellipse, oblong, semi-circular, or oval-shaped void or opening 238, the void 238 defining a pair of tines in the blade head 226 with one tine on each side of the void 238. A center of the void 238 may be disposed on or along the longitudinal axis (L), and a major axis of the ellipse or oval may further be oriented to be parallel to the longitudinal axis (L) of the blade body 212. Alternatively, it is also contemplated that the void 238 may also be positioned such that the center of the void 238 is not on the longitudinal axis (L) of the blade body 212, but so that the major axis of the void 238 is oriented to be parallel with the longitudinal axis (L) of the blade body 212. The major axis of the void 238 may have a dimension D5. The dimension D5 of the major axis of the void 238 may correspond to the height D1 of the recess 240. For example, the major axis of the void 238 may have a dimension D5 configured to match the height D1 of the recess 240. Alternatively, in another configuration, the major axis of the void 238 may have a dimension D5 configured to be greater than the height D1 of the recess 240. In yet another configuration, the major axis of the void 238 may have a dimension D5 configured to be less than the height D1 of the recess 240. The opening 236 and/or the void 238 may function to assist with evacuation or removal of debris, such as biological material cut by the plurality of teeth 228, 234, as the blade body 212 is oscillated by the surgical saw. For example, bone chips removed/severed by the plurality of teeth 228, 234 may flow into the opening 236 and/or the void 238 to prevent the bone chips from collecting on or in front of the teeth and potentially inhibiting the cutting functionality of the plurality of teeth 228, 234. The collection of or buildup of bone chips or other biological material on or in front of the plurality of teeth 228, 234 may also increase the likelihood of the blade body 212 moving off plane or track as it continues to cut. This is commonly referred to as skiving, a condition that should be avoided when attempting to make precision or accurate cuts. The ellipse or oval shape of the void 238 may assist in spreading the debris captured within the void out laterally toward the outside of the blade as it moves proximally through the opening 236 and/or void 238.

The long slender profile of the ellipse/oval shape void 238 increase the width of the material of the blade head 226 on each side of the void 238, as compared to a wide void. This improves the heat transfer and/or heat dissipation from the teeth 228, 234 and/or blade head 226 to the distal portion 218 of the blade body 212. Specifically, the narrow and long (extending along the length of the blade body 212) void 238 increases the width of the tines of the blade head 226 improving the heat flow through the blade head 226. The long and slender shape of the void 238 still maintains a sufficient volume for receiving the debris of the tissue removed by the teeth 228, 234.

The blade head 226 and/or the distal portion 218 of the blade body 212 may also define a recess 240 configured to assist in the evacuation or removal of debris, such as biological material cut by the plurality of teeth 228, as the blade body 212 is oscillated by the surgical saw. The recess 240 may be defined by a reduced thickness in the blade head 226 and/or the distal portion 218 of the blade body 212. The recess may be formed on one or both of a top and bottom surface 213, 215 of the blade head 226 and/or the distal portion 218 of the blade body 212. The recess 240 may be generally defined by and/or disposed on the blade head 226 and/or the distal portion 218 of the blade body 212 proximal to or behind the plurality of teeth 228. The recess 240 may also serve to direct biological material from the blade head 226 and/or void 238 to the void 246 defined along the sides 224 of the distal portion 218 of the blade body 212 as biological tissue is removed by the saw blade 210. The recess 240 may have a proximal edge 241 and a distal edge 243, with a recess height D1 defined between the proximal edge 241 and the distal edge 243.

Figure 25:
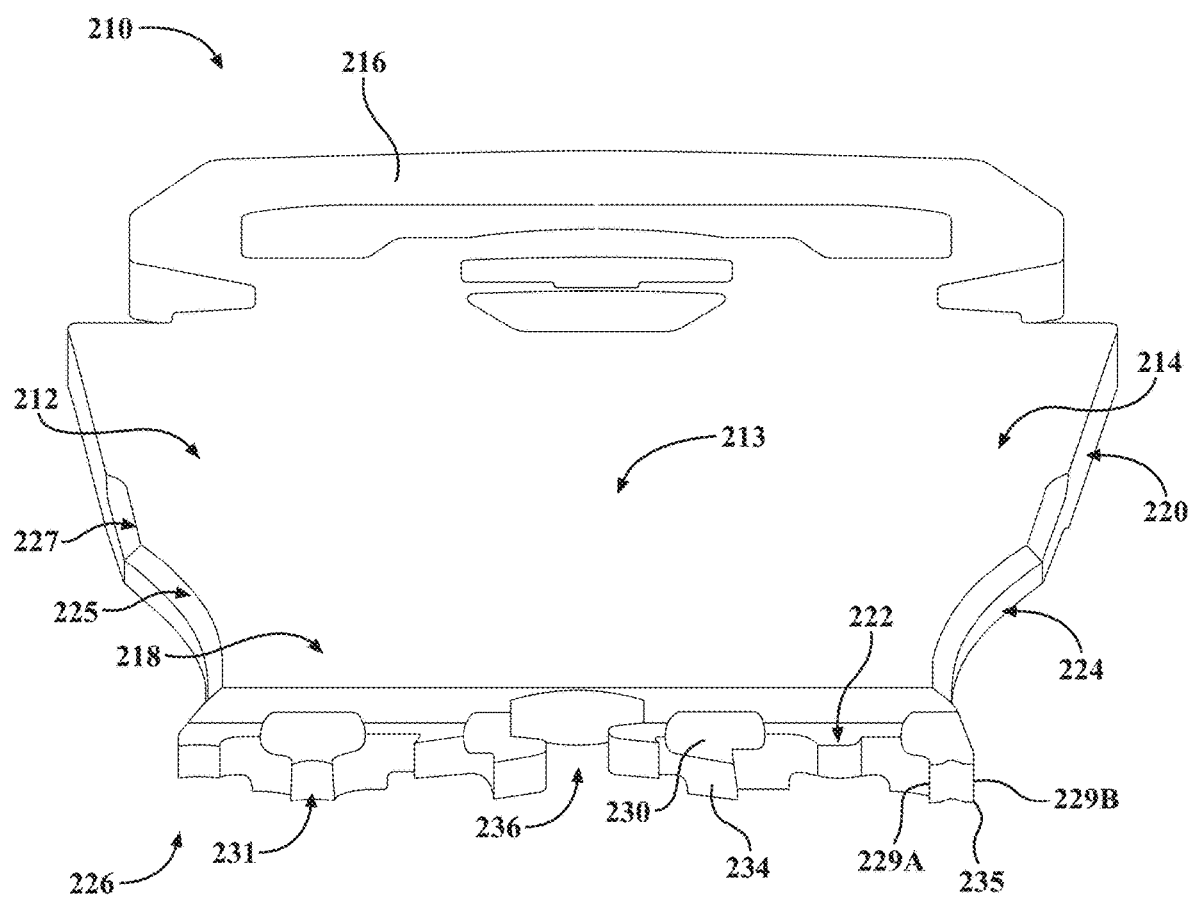
FIG. 25 is an enhanced perspective view from the blade head end of the saw blade of FIG. 18A.

Referring to FIGS. 24 and 25, the plurality of teeth 228, 234 of the blade head 226 may comprise a beveled surface 230 and a flat or unbeveled surface 232. The beveled surface 230 may be sloped and configured to direct or funnel biological tissues that has been removed by the plurality of teeth distally toward the void 238 and/or the recess 240 in order to keep the plurality free from debris that may impact the effectiveness of the plurality of the in performing the cut.

The beveling 230 applied to alternating surfaces of adjacent teeth 228 of the blade head 226 provides the formation of a cutting edge 242 at the opposed edges of the unbeveled surface 232 of the teeth 228. The cutting edge 242 may be defined along the length of the unbeveled surface 232 of the teeth 228. The cutting edge may be configured to allow for grinding, sanding, cutting, etc. of biological material in a direction perpendicular to the cutting direction of the teeth 228. For example, as is illustrated in FIG. 24, the typical cutting direction of the teeth 228 and/or blade head is in the distal to proximal direction along the x or y axis of a coordinate system. The cutting edge 242 defined along the length of the unbeveled surface 232 of the teeth 228 may be configured to cut or grind in the positive or negative z-axis, i.e. upward or downward. This cutting or grinding action created by the cutting edge 242 as the blade head 226 is oscillated may be considered similar to a rasp-like cutting action or shaving operation. The cutting edge 242 generally comprises a 90-degree formed between the beveled surface 232 of the tooth 228 and beveling 230 of the adjacent tooth 228. However, other rake angles are completed for the cutting edge. An advantage of the added direction cutting provided by the cutting edge 242 is that the cutting edge 242 may serve to help adjust or move the blade head 226 back to preferred plane/line to address skiving/drifting of the blade head 226 during the cutting procedure.

Figure 26:
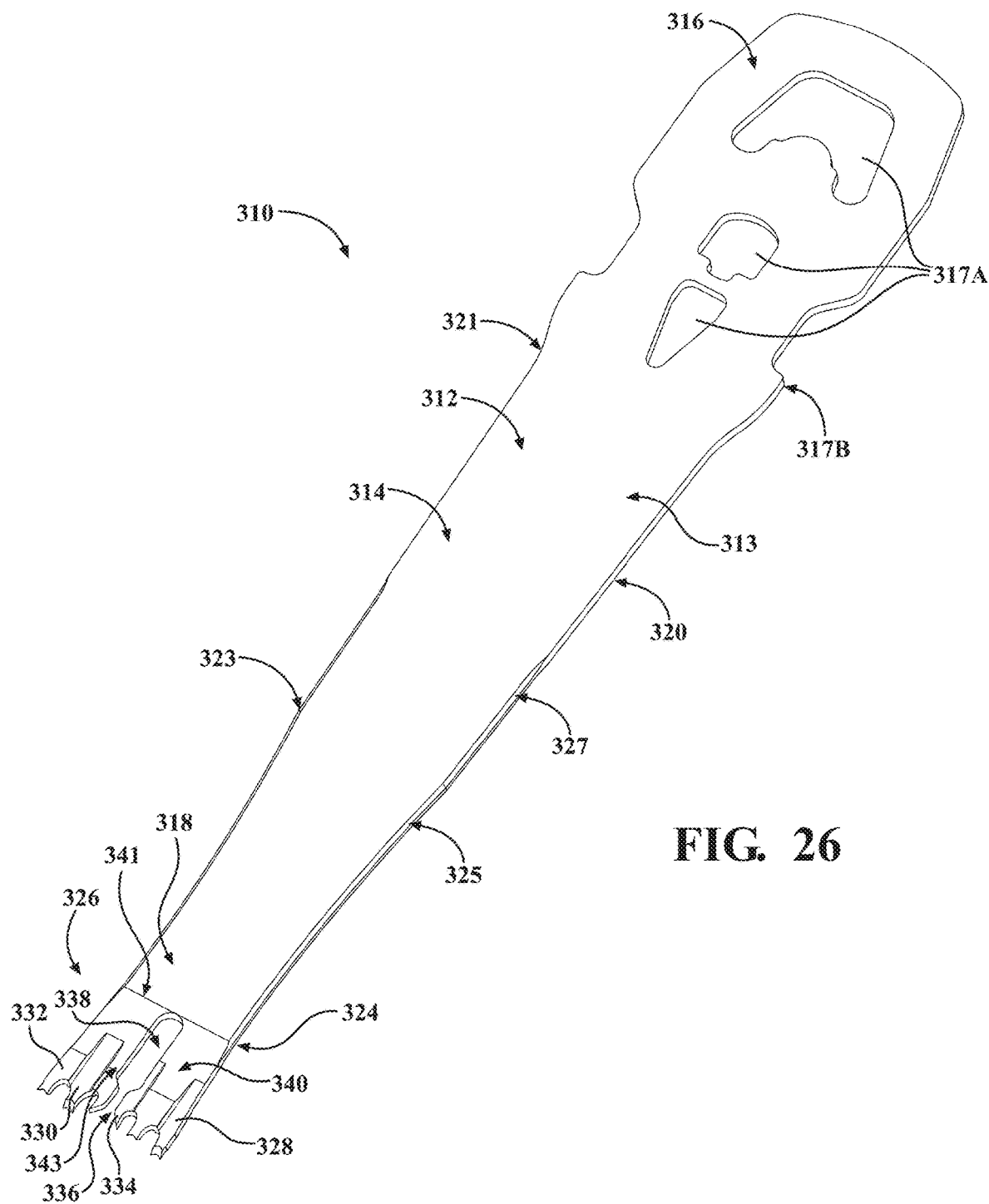
FIG. 26 is a perspective view of a fourth configuration of a saw blade for use with a surgical saw.
Figure 27:
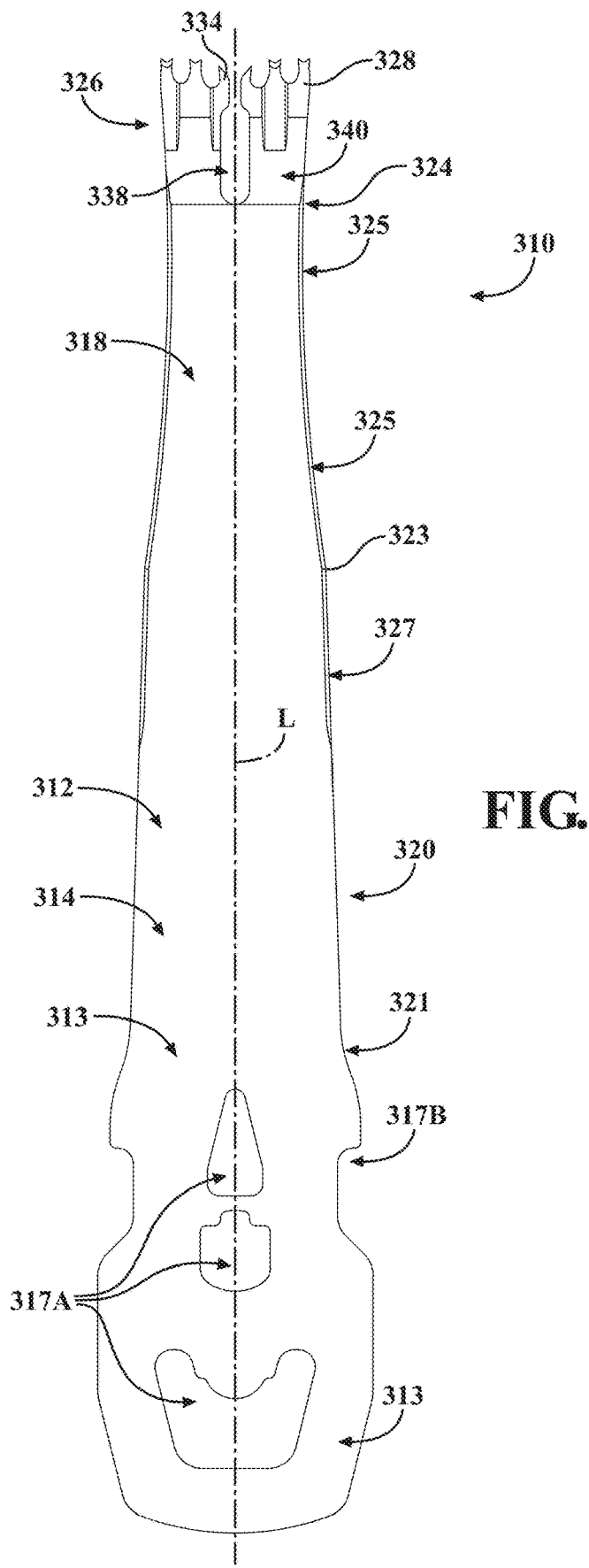
FIG. 27 is a top view of the saw blade of FIG. 26.

Referring to FIGS. 26 to 29, a fourth configuration of a saw blade 310 for use with a surgical saw, such as a sagittal surgical saw configure to oscillate a saw blade, is illustrated. It should be understood that any features of the saw blade 310 illustrated in FIGS. 26 to 29 that share a common base reference number may be configured, arranged, and/or designed to function in the same or similar matter as the configuration of the saw blades 10, 110, 210 described above. For example, FIG. 26 illustrates a saw blade 310 including a blade body 312. It should be understood that the blade body 312 of the saw blade 310 in FIG. 26 may have the same characteristics and/or functionality as any of the blade body's 12, 112, 212 of the saw blades 10, 110, 210 of FIGS. 1-25 described above.

Figure 28:
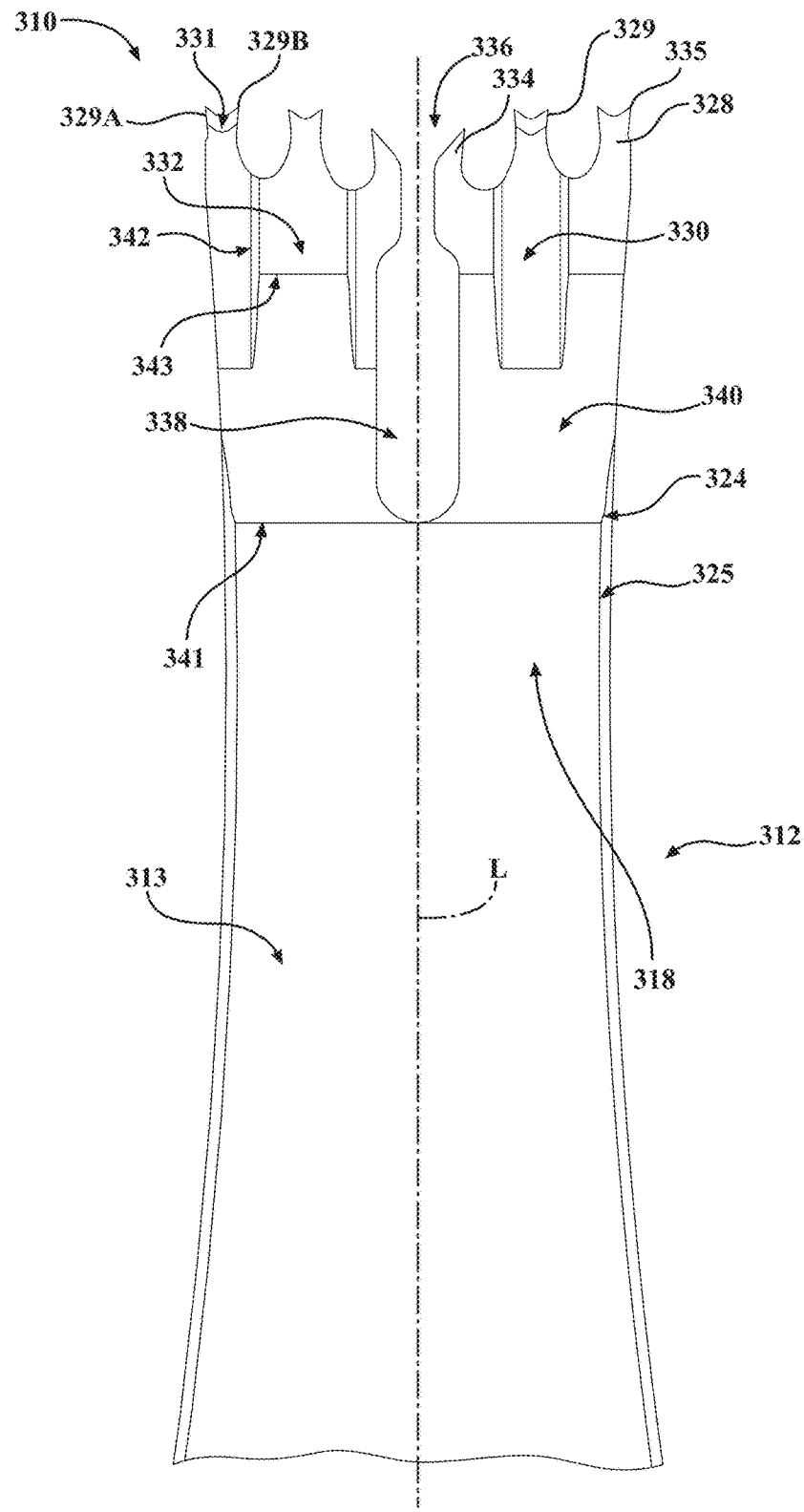
FIG. 28 is an enhanced top view of a distal portion and blade head of the saw blade of FIG. 26.
Figure 29:
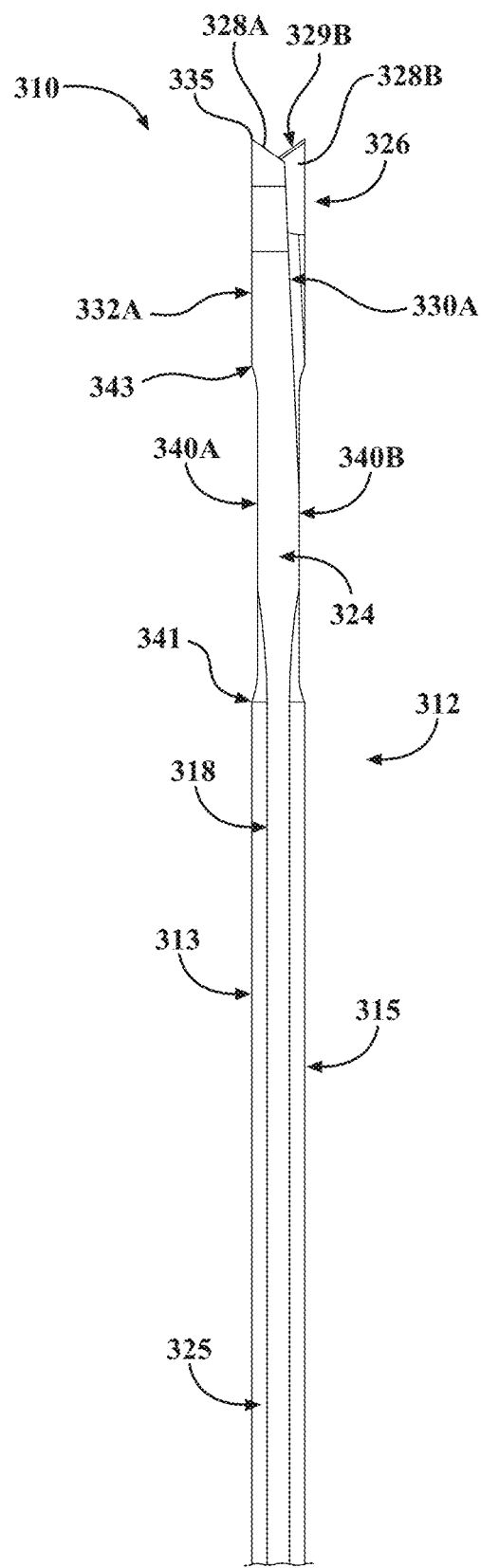
FIG. 29 is an enhanced side view of the distal portion and blade head of the saw blade of FIG. 26.

The saw blade 310 illustrated in FIGS. 26 to 29 largely follows the features and functions of the blade 210 illustrated and described in FIGS. 18A-25, but it is a smaller/narrower configuration of the saw blade 310. As this is a narrower configuration of a saw blade 310, this configuration has a blade head 326 that is also narrower. The narrower blade head 326 has an alternate tooth 328, 334 arrangement, specifically fewer teeth 328, 334 on the blade head 326. Referring to FIG. 28, the blade 310 has fewer outer teeth 328 to accommodate the narrower width of the blade head 326. While the exemplary blade 310 illustrated in FIGS. 26 to 29 has fewer outer teeth 328 and the same number of inner teeth 334 of the blade 210 of FIGS. 18A-25, it is also contemplated that the blade head 326 could be configured with more outer teeth 328 and fewer inner teeth 334 to accommodate the narrower blade head 326.

Figure 30:
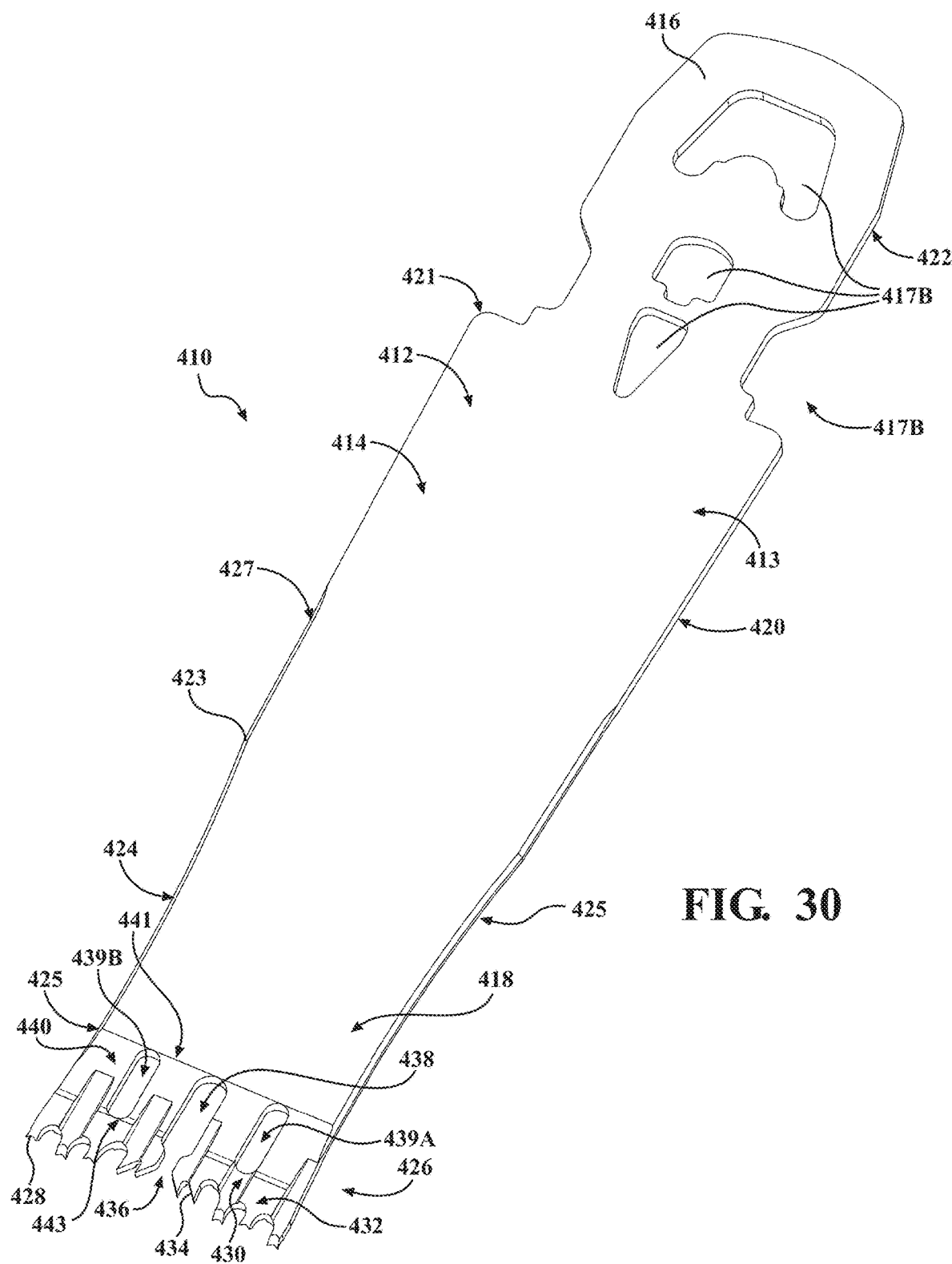
FIG. 30 is a perspective view of a fifth configuration of a saw blade for use with a surgical saw.
Figure 31:
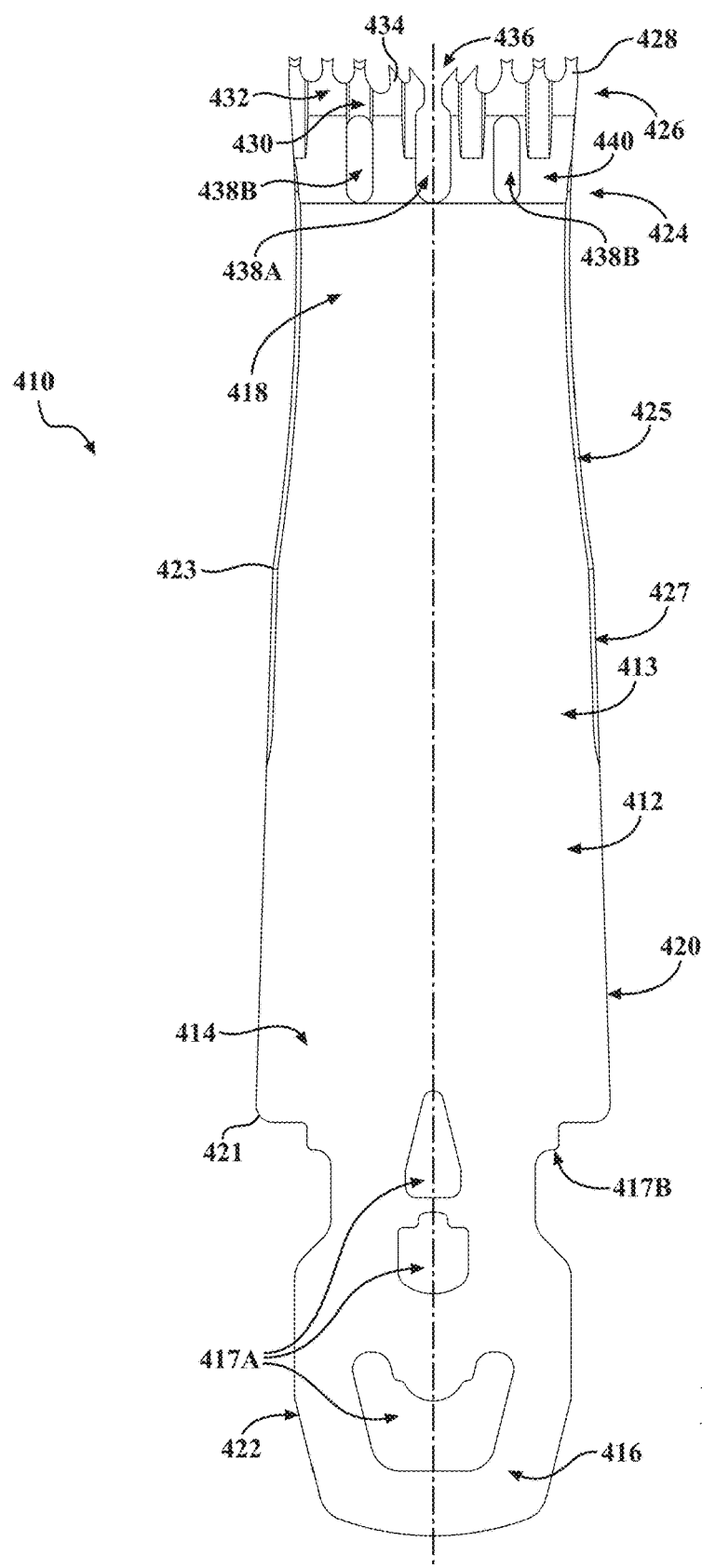
FIG. 31 is a top view of the saw blade of FIG. 30.

Referring to FIGS. 30 to 34, a fifth configuration of a saw blade 410 for use with a surgical saw, such as a sagittal surgical saw configure to oscillate a saw blade, is illustrated. It should be understood that any features of the saw blade 410 illustrated in FIGS. 30 to 34 that share a common base reference number may be configured, arranged, and/or designed to function in the same or similar matter as the configuration of the saw blades 10, 110, 210, 310 described above. For example, FIG. 30 illustrates a saw blade 410 including a blade body 412. It should be understood that the blade body 412 of the saw blade 410 in FIG. 30 may have the same characteristics and/or functionality as any of the blade body's 12, 112, 212, 312 of the saw blades 10, 110, 210, 310 of FIGS. 1-29 described above.

Figure 32:
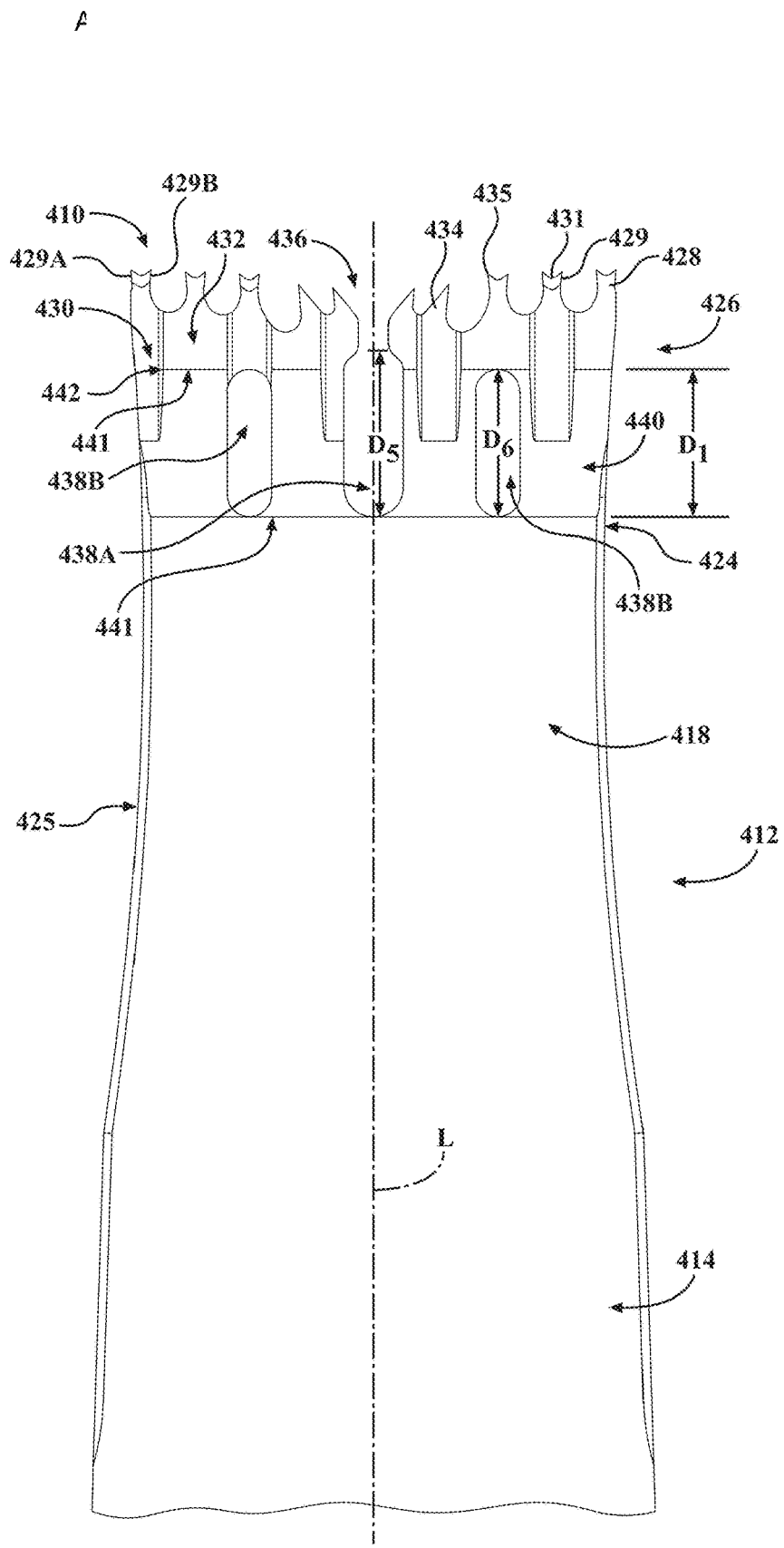
FIG. 32 is an enhanced top view of a distal portion and blade head of the saw blade of FIG. 30.
Figure 33:
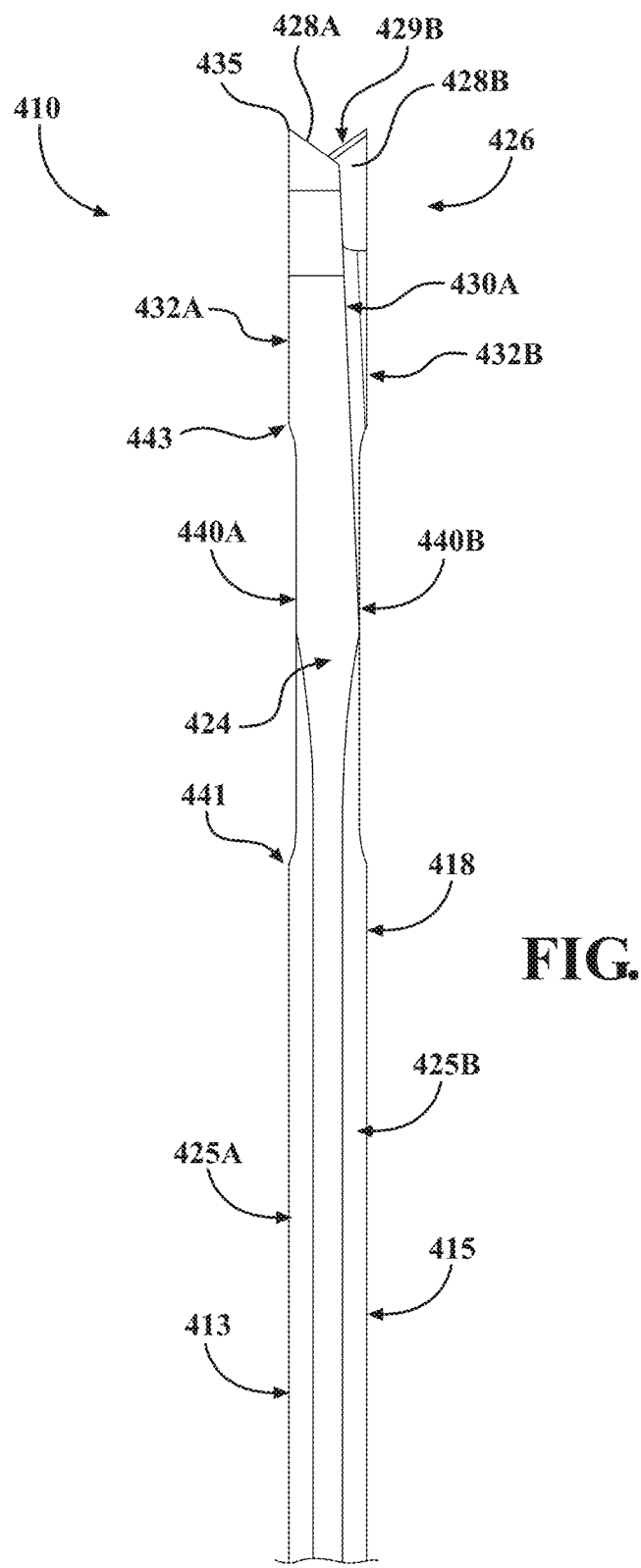
FIG. 33 is an enhanced side view of the distal portion and blade head of the saw blade of FIG. 30.
Figure 34:
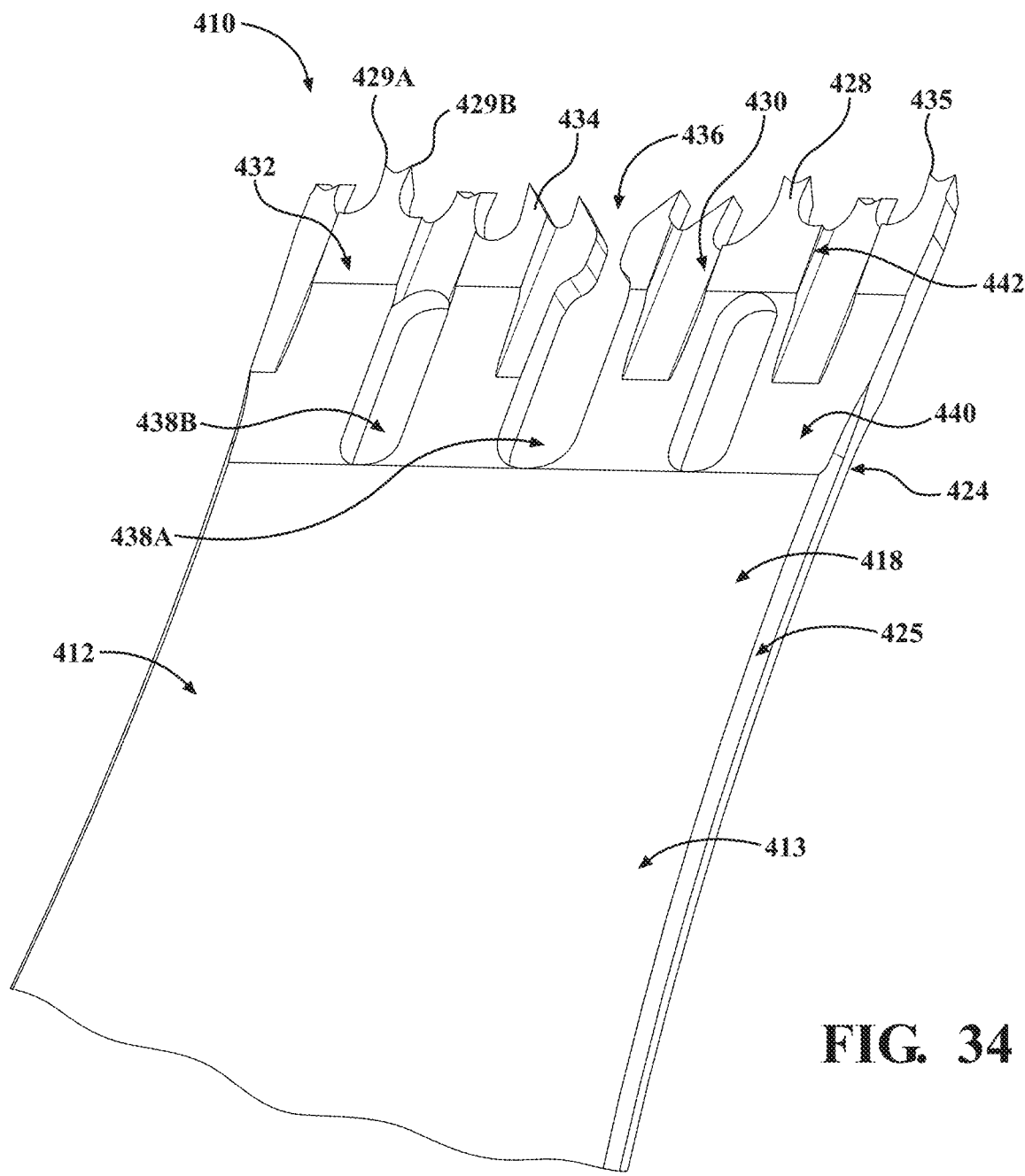
FIG. 34 is an enhanced perspective view of the distal portion and blade head of the saw blade of FIG. 30.

The saw blade 410 illustrated in FIGS. 30 to 34 largely follows the features and functions of the blades 210, 310 illustrated and described in FIGS. 18A to 29, but it is a wider configuration of the saw blade 410. As this is a wider configuration of a saw blade 410, this configuration has a blade head 426 that is also wider than the other designs. The wider blade head 426 has an alternate tooth 428, 434 arrangement, specifically fewer teeth 428, 434 on the blade head 426. Referring to FIG. 32, the blade 410 has additional outer teeth 428 to accommodate the wider width of the blade head 426. While the exemplary blade 410 illustrated in FIGS. 30 to 34 has more outer teeth 428 and the same number of inner teeth 434 of the blade 210, 310 of FIGS. 18A to 29, it is also contemplated that the blade head 426 could be configured with the same or fewer outer teeth 428 and additional inner teeth 434 to accommodate the wider blade head 426.

The wider blade head 426 may also define additional openings or apertures 438B in the blade head 426 similar to the void 438A of the blades 10, 110, 210, 310 described above. As described above, the void 438A may be sized relative to the height dimension of the recess 4409. For example, the major axis of the void 438A may have a dimension D5. The dimension D5 of the major axis of the void 438A may correspond to the height D1 of the recess 440. For example, the major axis of the void 438A may have a dimension D5 configured to match the height D1 of the recess 440. Alternatively, in another configuration, the major axis of the void 438A may have a dimension D5 configured to be greater than the height D1 of the recess 440. In yet another configuration, the major axis of the void 438A may have a dimension D5 configured to be less than the height D1 of the recess 440.

The additional apertures 438B may be positioned on the blade head 426 on either side of the void 438A. The additional apertures 438B provide additional space, i.e. receptacles, to accommodate additional debris and tissue that is cut by the blade head 426. The recess 440 of the blade head 426 may be defined by a reduced thickness in the blade head 426 and/or the distal portion 418 of the blade body 412. The recess 440 may be formed on one or both of a top and bottom surface 413, 415 of the blade head 426 and/or the distal portion 418 of the blade body 412. The recess 440 may be generally defined by and/or disposed on the blade head 426 and/or the distal portion 418 of the blade body 412 proximal to or behind the plurality of teeth 428. The recess 440 may also serve to direct biological material from the blade head 426 and/or void(s) 438A, 438B defined in the blade head toward the void 446 defined along the sides 424 of the distal portion 418 of the blade body 412 as biological tissue is removed by the saw blade 410.

The apertures 438B may be sized relative to a dimension of the recess 440. For example, as is illustrated in FIG. 32, the recess 440 may comprise a height dimension D1 measured from a proximal edge 441 of the recess 440 to a distal edge 443 of the recess 440. The major axis of the void 438B may have a dimension D6. The dimension D6 of the major axis of the void 438B may correspond to the height D1 of the recess 440. For example, the major axis of the void 438B may have a dimension D6 configured to match the height D1 of the recess 440. Alternatively, in another configuration, the major axis of the void 438B may have a dimension D6 configured to be greater than the height D1 of the recess 440. In yet another configuration, the major axis of the void 438B may have a dimension D6 configured to be less than the height D1 of the recess 440. Similar to the void 38, 138, 238, 338, described above, the aperture 438B may comprise a generally ellipse, oblong, semi-circular, or oval shape. The aperture 438B may be configured such that the major axis of the ellipse, oblong, semi-circular, or oval shaped aperture 438B comprises a dimension Dx that is equal to or less than the width dimension Dx dimension of the recess 440.

Figure 35:
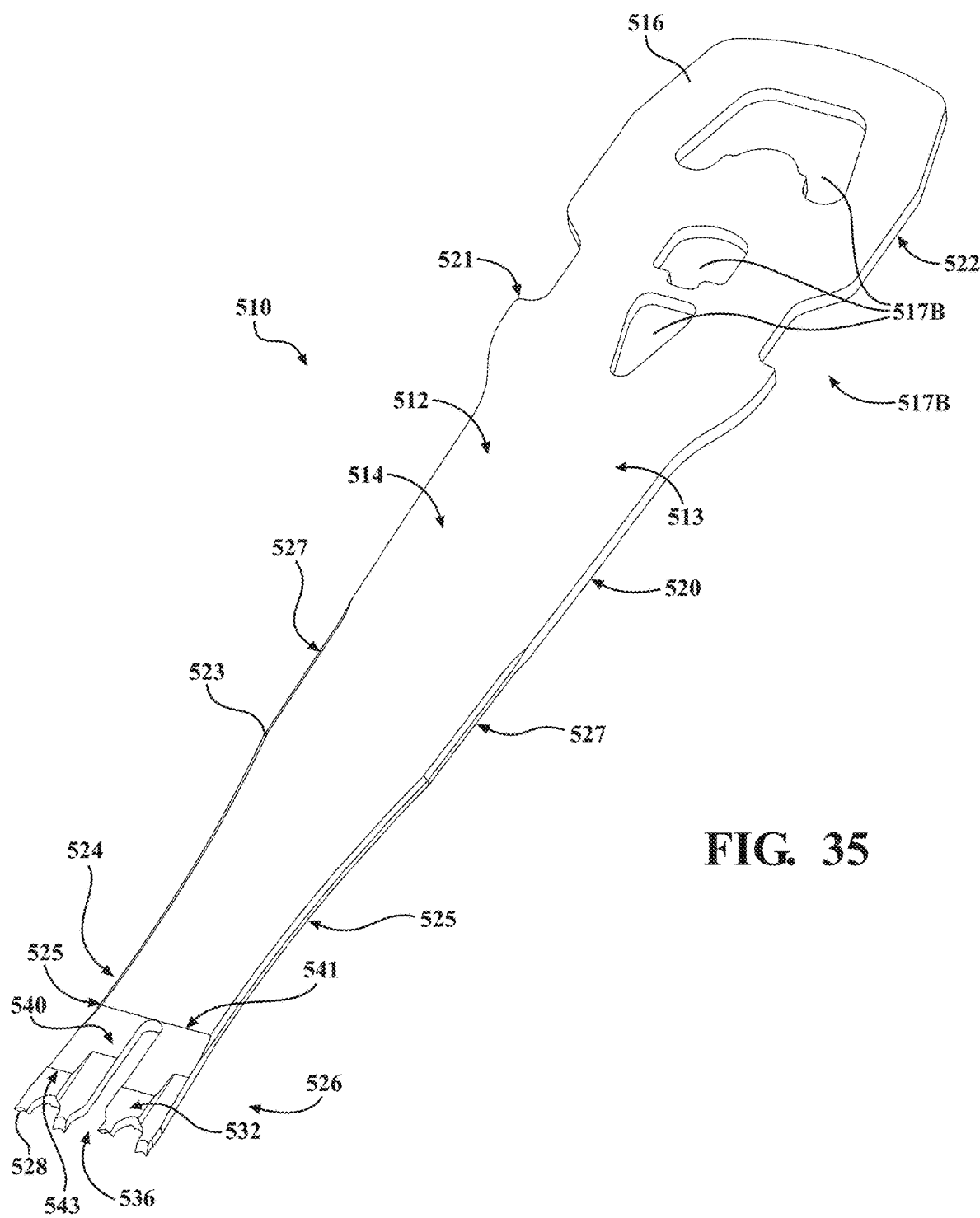
FIG. 35 is a perspective view of a sixth configuration of a saw blade for use with a surgical saw.
Figure 36:
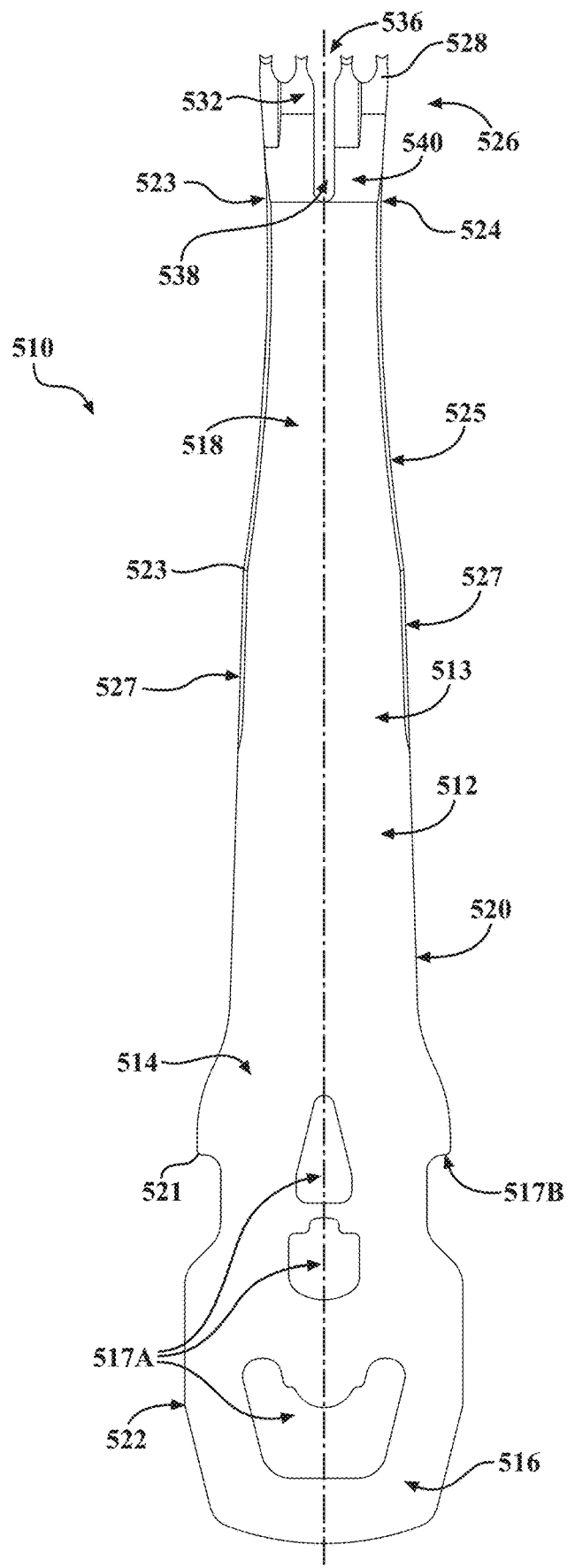
FIG. 36 is a top view of the saw blade of FIG. 35.
Figure 37:
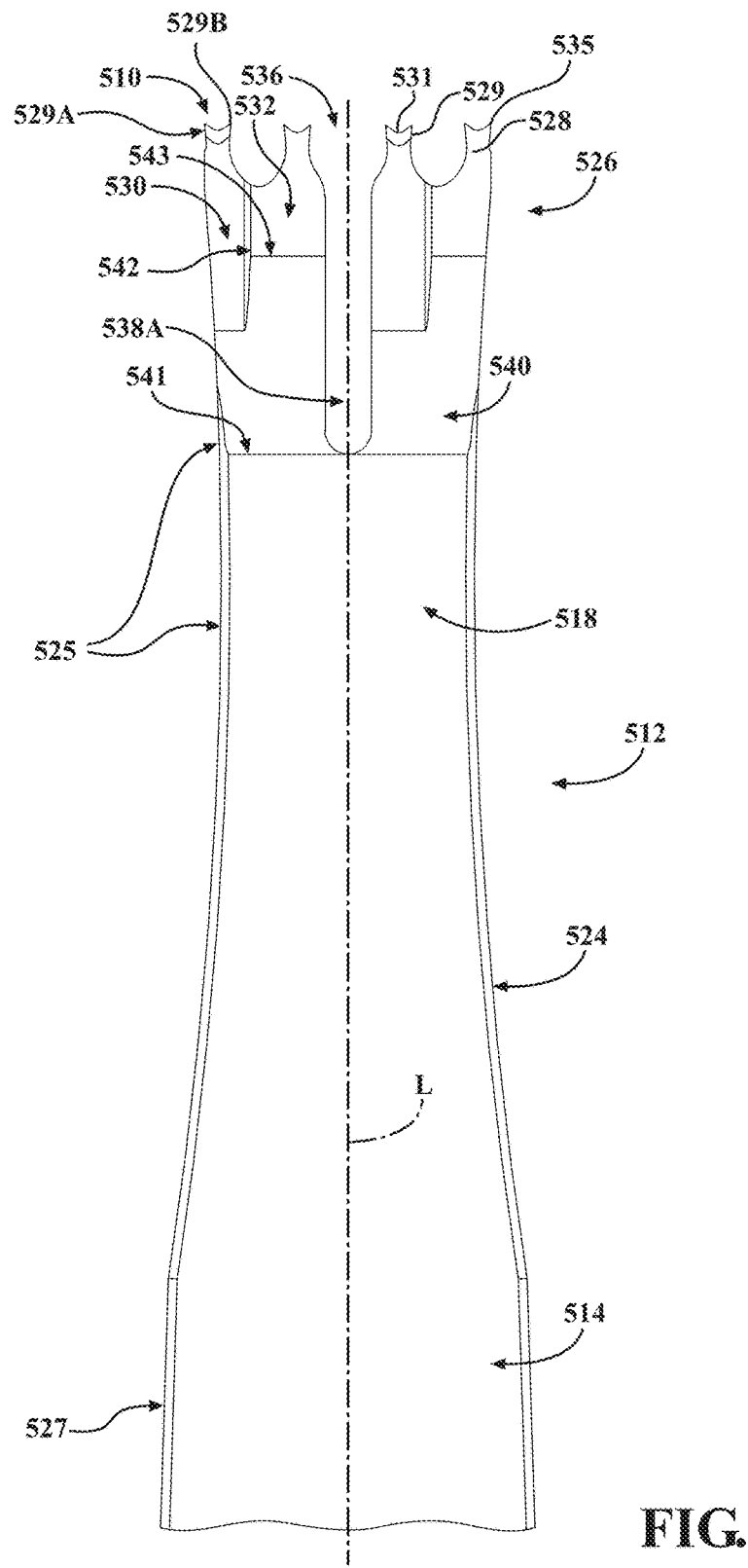
FIG. 37 is an enhanced top view of a distal portion and blade head of the saw blade of FIG. 35.
Figure 38:
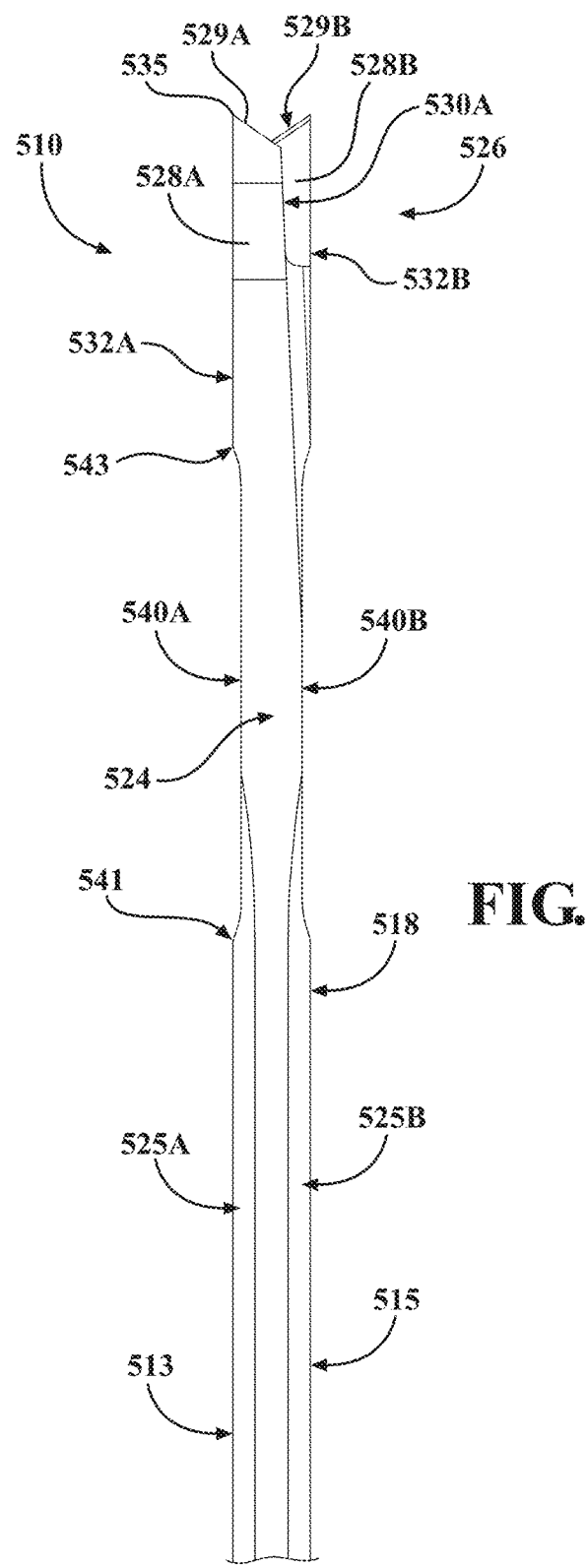
FIG. 38 is an enhanced side view of the distal portion and blade head of the saw blade of FIG. 35.
Figure 39:
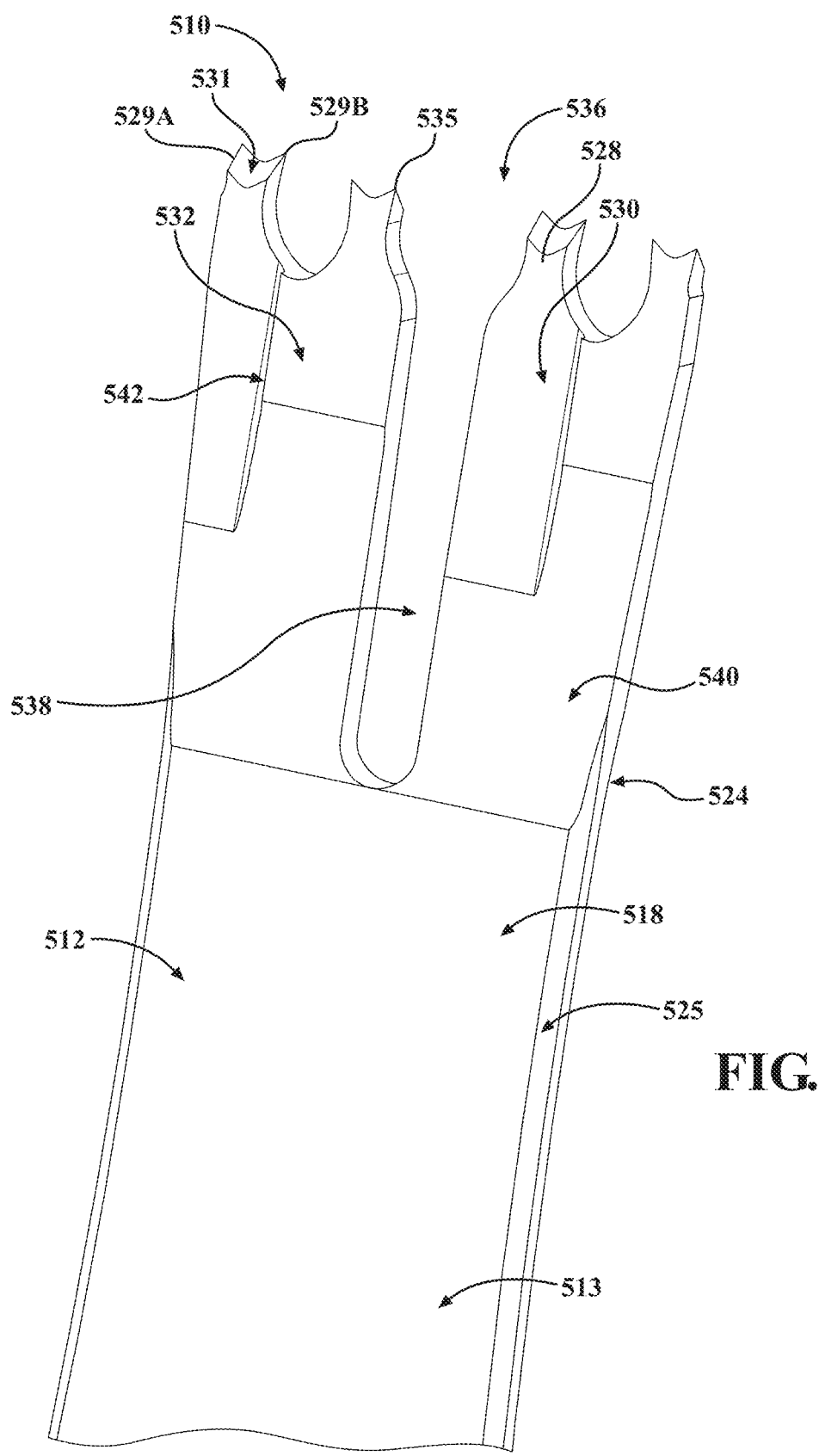
FIG. 39 is an enhanced perspective view of the distal portion and blade head of the saw blade of FIG. 35.

Referring to FIGS. 35 to 39, a sixth configuration of a saw blade 510 for use with a surgical saw, such as a sagittal surgical saw configure to oscillate a saw blade, is illustrated. It should be understood that any features of the saw blade 510 illustrated in FIGS. 35 to 39 that share a common base reference number may be configured, arranged, and/or designed to function in the same or similar matter as the configuration of the saw blades 10, 110, 210, 310, 410 described above. For example, FIG. 35 illustrates a saw blade 510 including a blade body 512. It should be understood that the blade body 512 of the saw blade 510 in FIG. 35 may have the same characteristics and/or functionality as any of the blade body's 12, 112, 212, 312, 412 of the saw blades 10, 110, 210, 310, 410 of FIGS. 1-34 described above.

The saw blade 510 illustrated in FIGS. 35 to 39 largely follows the features and functions of the blades 210, 310, 410 illustrated and described in FIGS. 18A to 34, but it is a narrower configuration of the saw blade 510. The blade 510 being narrower, omits or removes the inner teeth 34, 134, 234, 334, 434 of the blades 10, 110, 210, 310, 410 described above. The narrowness of the blade 510 does not have a width to accommodate the inner teeth while still having at least two outer teeth 528 extending from the blade head 526 on each side of the opening 536 defined in the blade head 526. To provide the V-shaped profile at the distal end of the blade head 526 created by the beveling 531 applied to the alternating surfaces of the teeth 528 of the blade head 526 the blade head 526 need to have at least two outer teeth 528 with alternating beveling 531 on each side of the void 538 and/or opening 536 defined in the blade head. To provide a narrower blade head 526, as provided in the configuration of the blade 510 illustrated in FIGS. 35 to 39, while still have the same cutting advantages provided by the V-shaped provide of the teeth 528 at the distal end of the blade head 526

Figure 40:
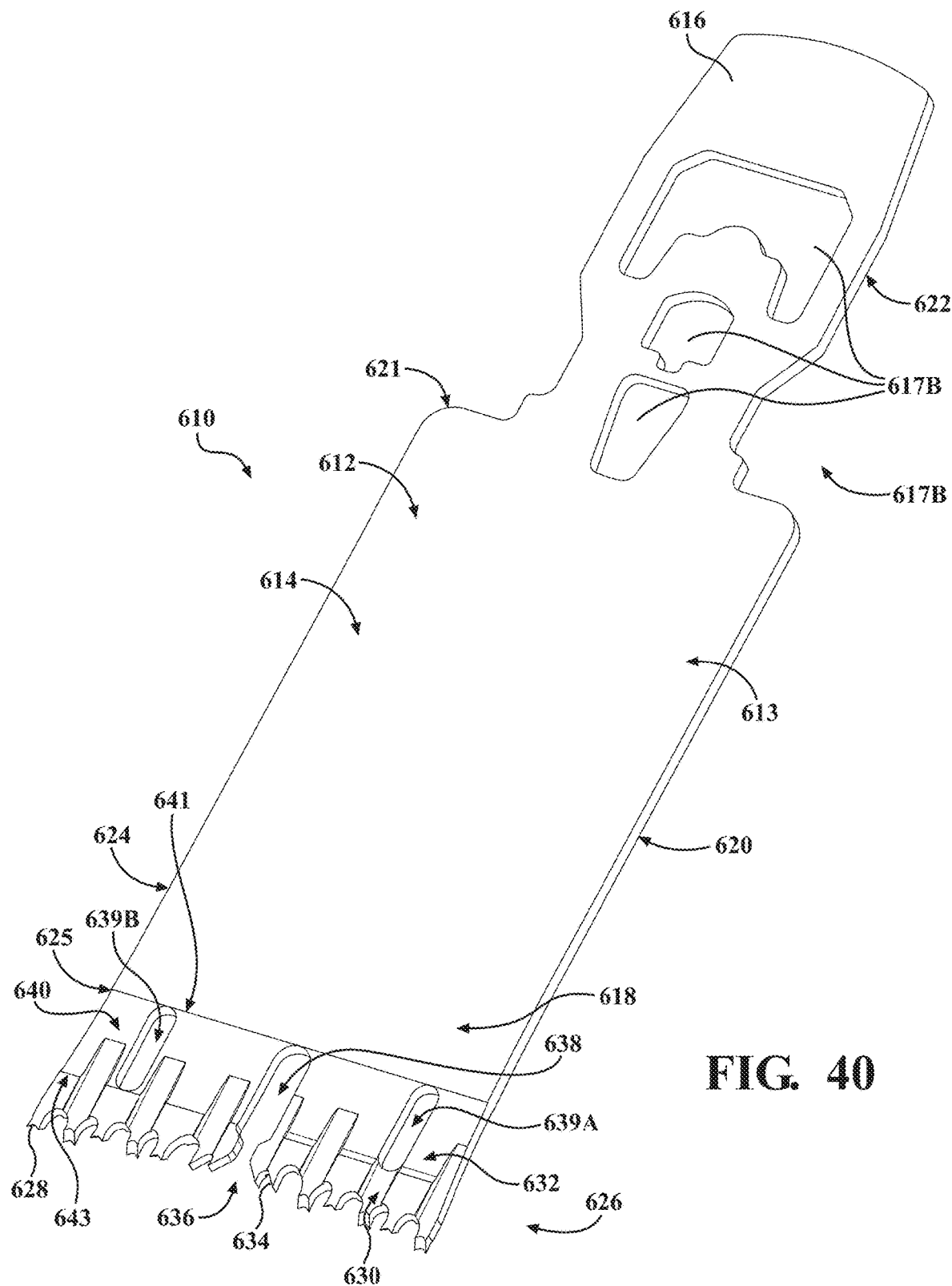
FIG. 40 is a perspective view of a seventh configuration of a saw blade for use with a surgical saw.
Figure 41:
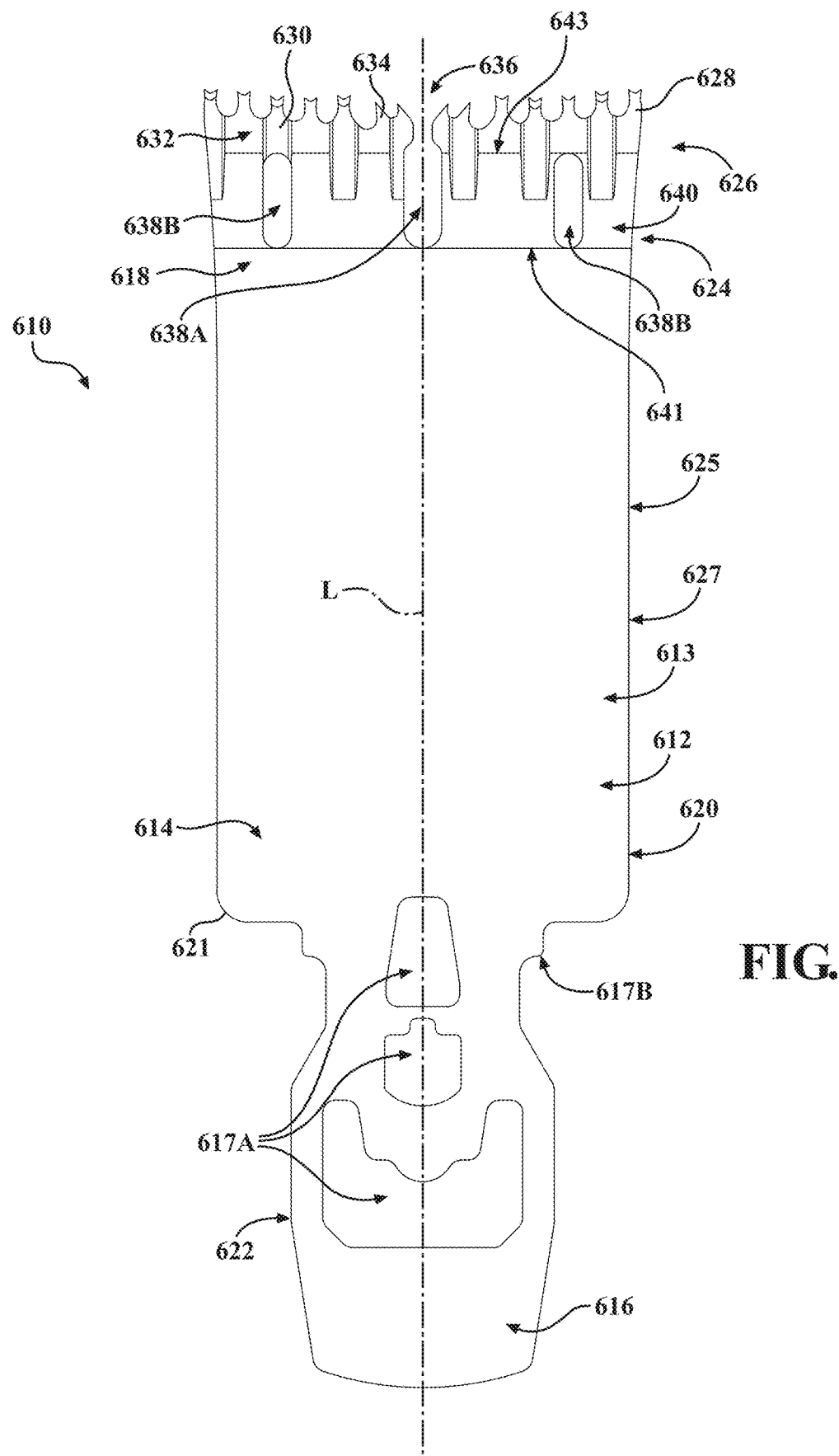
FIG. 41 is a top view of the saw blade of FIG. 40.

Referring to FIGS. 40 to 44, a seventh configuration of a saw blade 610 for use with a surgical saw, such as a sagittal surgical saw configure to oscillate a saw blade, is illustrated. It should be understood that any features of the saw blade 610 illustrated in FIGS. 40 to 44 that share a common base reference number may be configured, arranged, and/or designed to function in the same or similar matter as the configuration of the saw blades 10, 110, 210, 310, 410, 510 described above. For example, FIG. 40 illustrates a saw blade 610 including a blade body 612. It should be understood that the blade body 612 of the saw blade 610 in FIG. 40 may have the same characteristics and/or functionality as any of the blade body's 12, 112, 212, 312, 412, 512 of the saw blades 10, 110, 210, 310, 410, 510 of FIGS. 1-39 described above.

The saw blade 610 illustrated in FIGS. 40 to 44 largely follows the features and functions of the blades 210, 310, 410, 510 illustrated and described in FIGS. 18A to 39, but it is a wider saw blade 610 configuration, similar to the saw blade 410 of FIGS. 30 to 34 and described above. One distinction in the saw blade 610 from those described above, including the saw blade 410 of FIGS. 30 to 34, is that the intermediate portion 614 of the blade body 612 includes opposed intermediate side surfaces that are generally parallel to one another. Furthermore, the distal portion 618 of the blade body 612 may be flared outward away from the longitudinal axis (L) of the blade 610 as you move distally. This results in a blade head 626 that is wider than the intermediate portion 614 of the blade body 612.

Similar to the saw blade 410 above, the saw blade 610 in FIGS. 40 to 44 includes a wider blade head 626 that may define additional openings or apertures 638B in the blade head 526. The apertures 638B are in addition to the void 638A defined in the blade head proximate the longitudinal axis (L) of the saw blade 610. The additional apertures 638B may be positioned on the blade head 626 on either side of the void 638A. The additional apertures 638B provide additional space, i.e. receptacles, to accommodate additional debris and tissue that is cut by the blade head 626.

The recess 640 of the blade head 626 may be defined by a reduced thickness in the blade head 626 and/or the distal portion 618 of the blade body 612. The recess 640 may be formed on one or both of a top and bottom surface 613, 615 of the blade head 626 and/or the distal portion 618 of the blade body 612. The recess 640 may be generally defined by and/or disposed on the blade head 626 and/or the distal portion 618 of the blade body 612 proximal to or behind the plurality of teeth 628. The recess 640 may also serve to direct biological material from the blade head 626 and/or void(s) 638A, 638B defined in the blade head 626 toward the sides 624 of the distal portion 618 of the blade body 612 as biological tissue is removed by the saw blade 610.

Figure 42A:
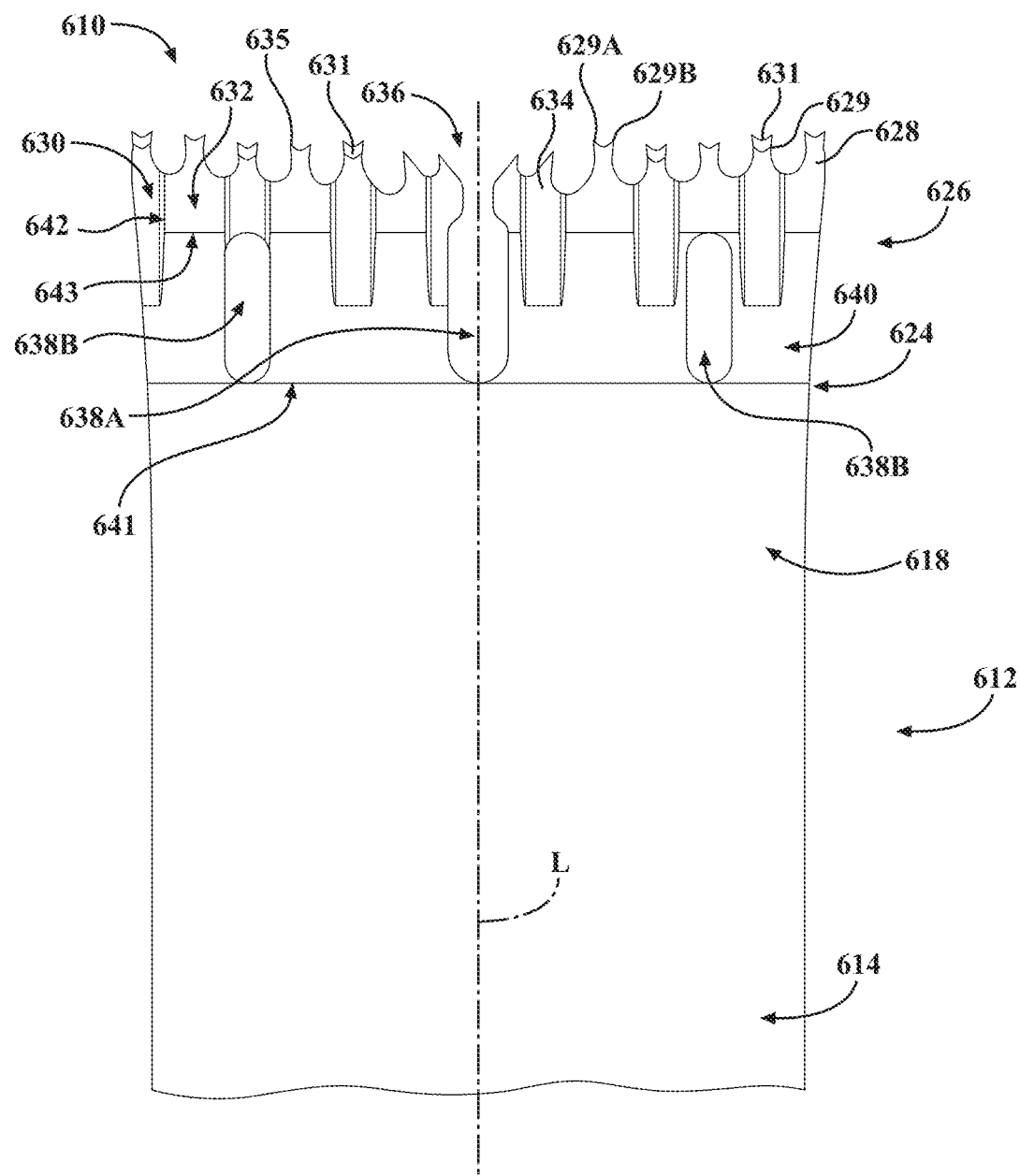
FIG. 42A is an enhanced top view of a distal portion and blade head of the saw blade of FIG. 40.
Figure 42B:
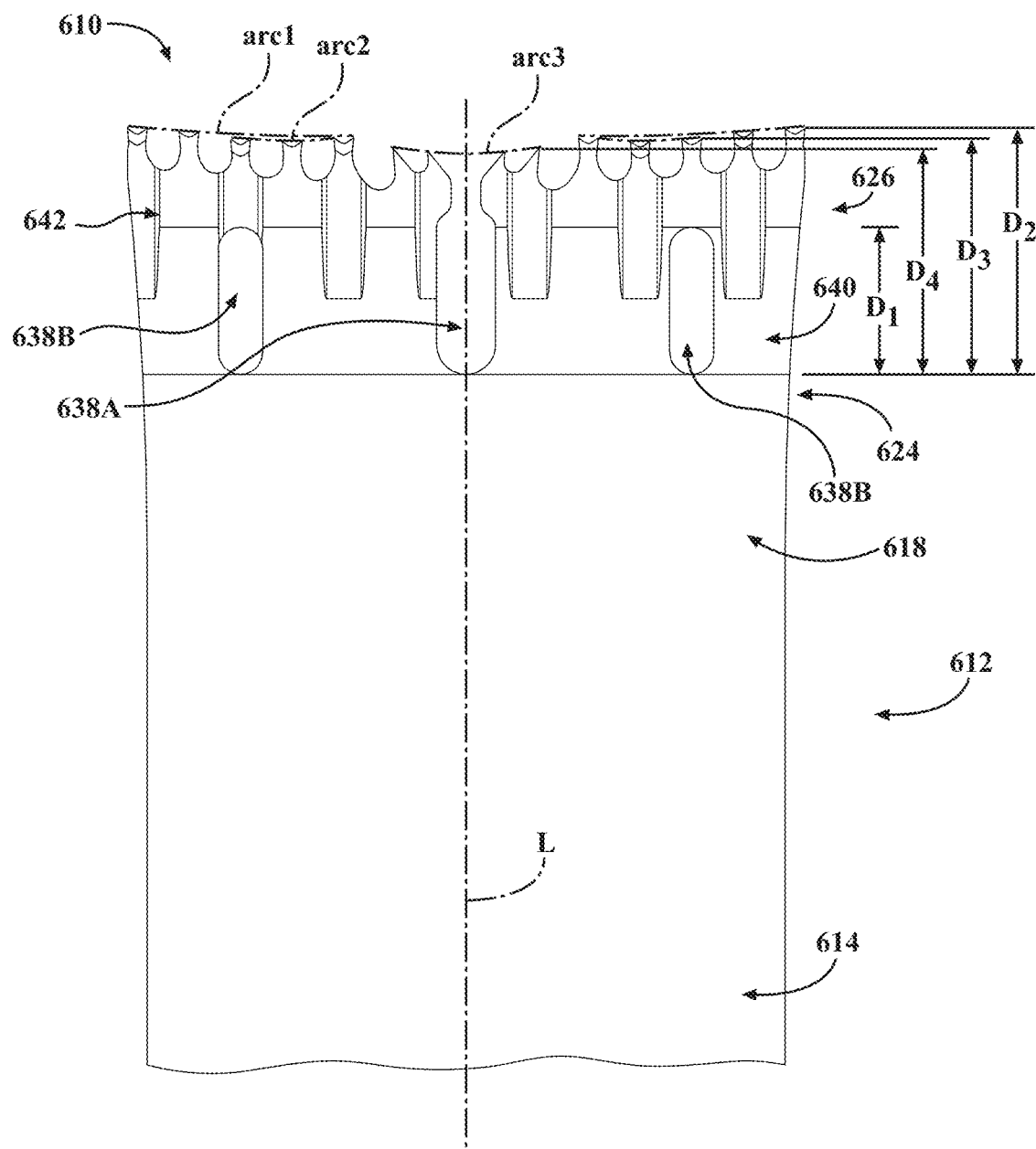
FIG. 42B is an enhanced top view of a distal portion and blade head of FIG. 42A illustrating the varied cut arcs across the face of the blade head created by the varied length of the teeth.

The apertures 638B may be sized relative to a dimension of the recess 640. For example, as is illustrated in FIG. 42B, the recess 640 may comprise a width dimension Dx dimension measured from a proximal edge of the recess 640 to a distal edge of the recess 640. Similar to the void 38, 138, 238, 338, 438, 538 described above, the aperture 638B may comprise a generally ellipse, oblong, semi-circular, or oval shape. The aperture 638B may also be configured such that the major axis of the ellipse, oblong, semi-circular, or oval shaped aperture 638B comprises a dimension Dx that is equal to or less than the width dimension Dx dimension of the recess 640.

Figure 42C:
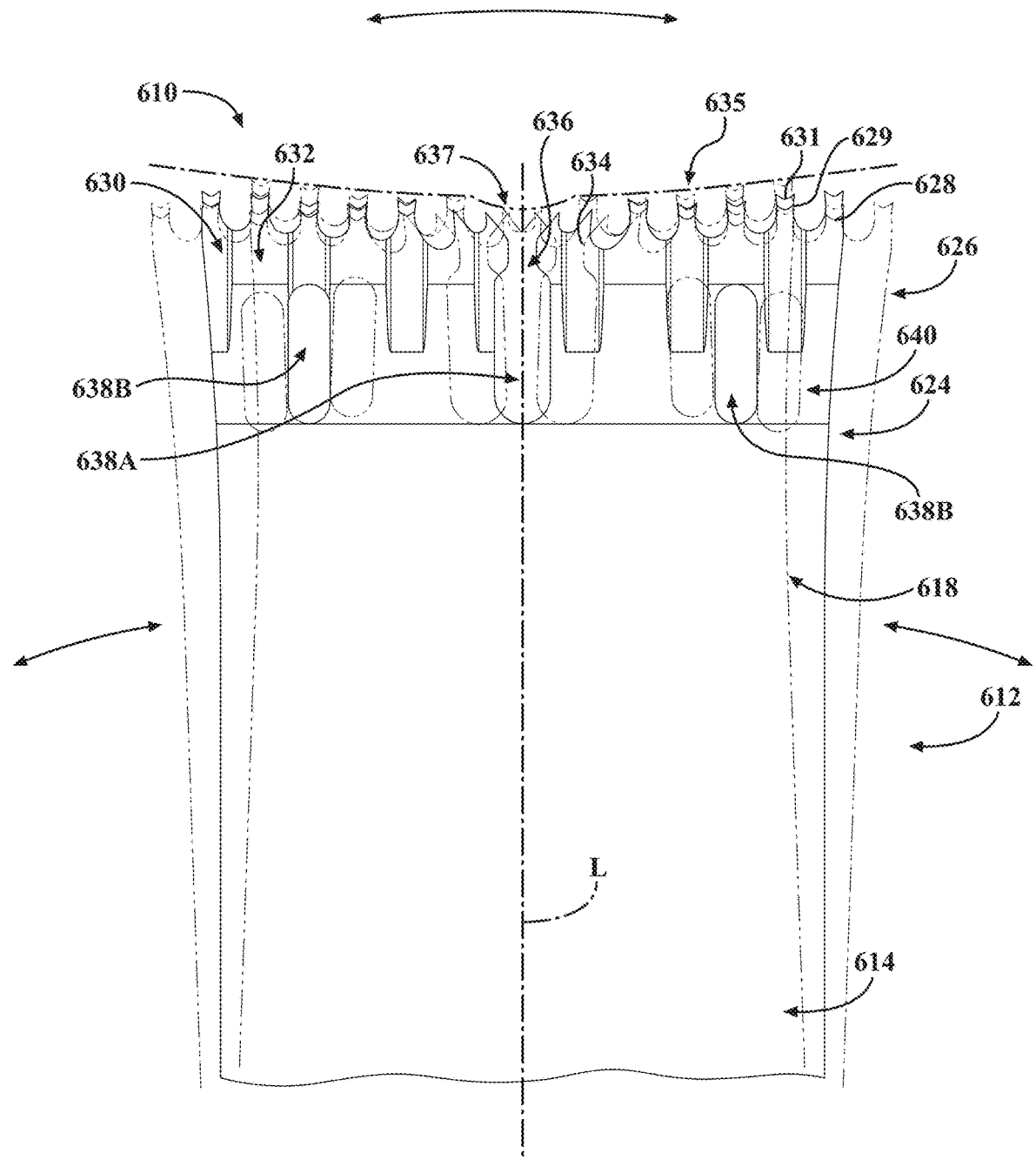
FIG. 42C is an enhanced top view of the distal portion and blade head of the of FIG. 42A showing the cut profile of the distal end of the blade when oscillated.
Figure 43:
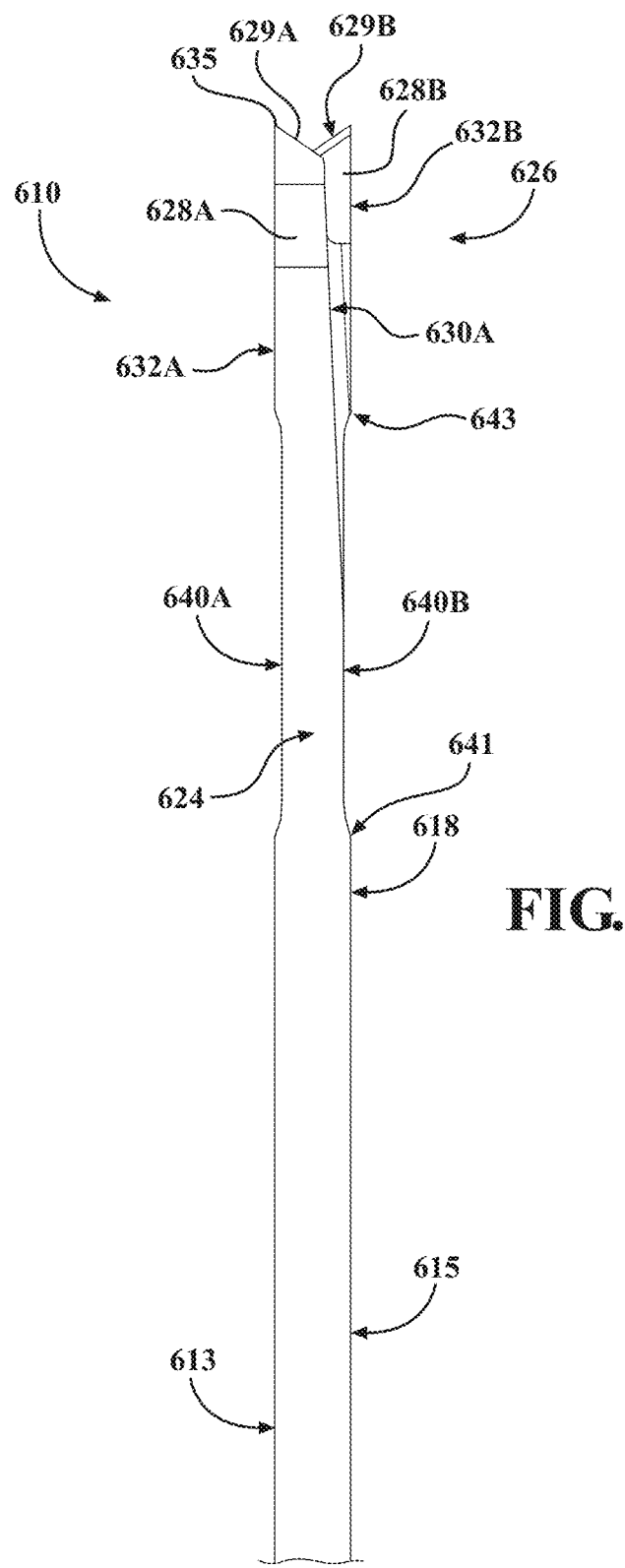
FIG. 43 is an enhanced side view of the distal portion and blade head of the saw blade of FIG. 40.
Figure 44:
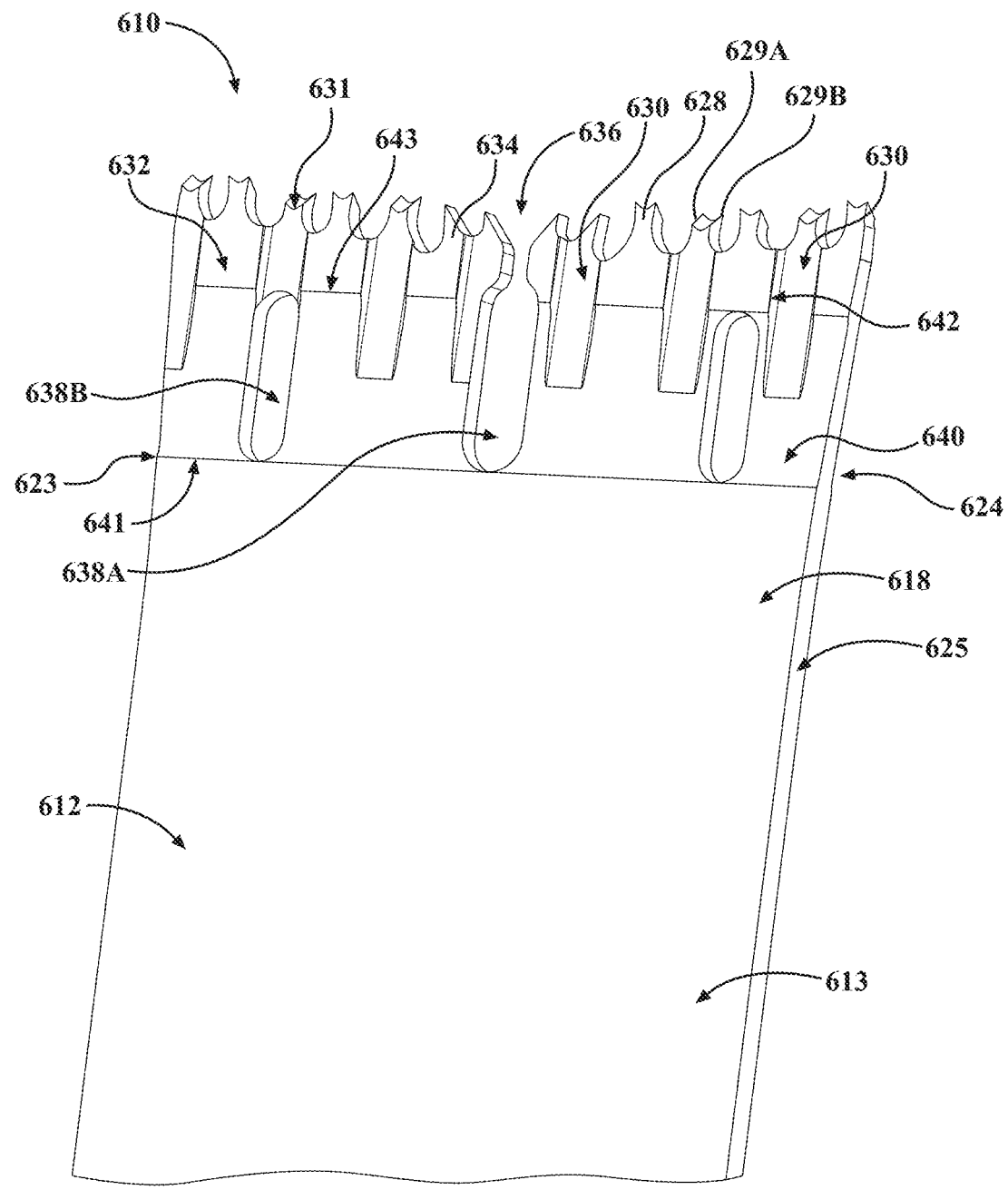
FIG. 44 is an enhanced perspective view of the distal portion and blade head of the saw blade of FIG. 40.

Referring to FIGS. 42B and 42C, a detailed of the blade head 626 and the teeth 628, 634 are illustrated. Specifically, the varying length of the teeth 628, 634 across the face of the blade head 626 and the general shape of the profile of the cut created by said varied length of the teeth 628, 634 when the saw blade 610 is oscillated. The length of the outermost outer tooth 628X and the outer tooth closest to the longitudinal axis (L) are varied in length based on a first arc (Arc1). The outer teeth 628X positioned between the outermost and innermost outer teeth 628X are arranged on a second arc (Arc2). The inner teeth 634 are arranged on a third arc (Arc3). The length of the teeth are such that the first arc (Arc1) is the distal most arc, the third arc (Arc3) is the most proximal arc, and the second arc (Arc2) falls in between the first and third arcs. Referring to FIG. 42C, the combination of varied tooth 628, 634 lengths along separate arcs (Arc1, Arc2, Arc3) creates a lateral cut profile across the width of the blade head 626 that has a concave shave, i.e. cut edge is recessed proximal to the longitudinal axis (L). The general concave shaped cut profile across the width of the blade head 626 includes an exaggerated recess 637 in the cut profile as the saw blade 610 is oscillated that is created by the third arc (Arc3) that the inner teeth 634 or arranged on relative to the arcs (Arc1, Arc2) of the outer teeth 628. This cut profile assists the blade 610 in staying centered when cutting a rounded surface, such as cutting or resecting a layer of bone on the patella. For example, in performance, given the rounded anatomy of the patella, the initial saw blade 610 contact of the blade head 626 with the patella occurs at the two outer teeth 628 positioned closest to the longitudinal axis (L). These innermost outer teeth 628 are strategically placed to deliver high cutting pressure upon entry, minimizing the risk of blade walk. The innermost outer teeth 628 (proximate the longitudinal axis (L)) contribute to the formation of recess 637 in the cut profile proximate the longitudinal axis (L). as shown in FIG. 42C. This recess 637 allows the formation of a central protrusion of bone that helps prevent blade kick during initial entry. As the saw blade 610 advances deeper into the bone, the remaining teeth engage to create the recess 637 in the center of the cut profile proximate the longitudinal axis (L) (FIG. 42C). The recess 637 in the cut profile may further enhance stability and mitigates the risk of kickback of the saw blade 610 when oscillated while cutting bone or other tissue.

Figure 45:
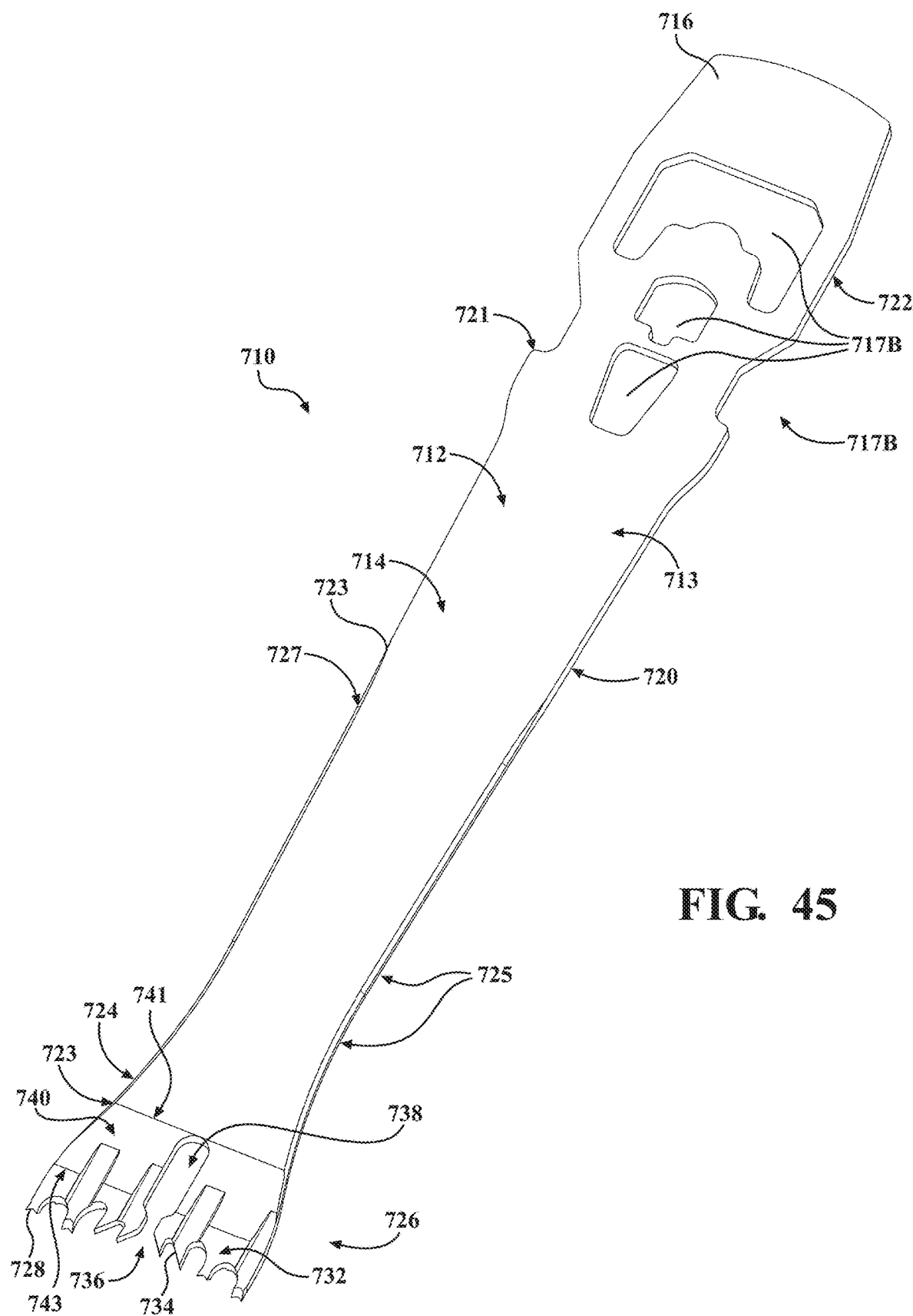
FIG. 45 is a perspective view of a eighth configuration of a saw blade for use with a surgical saw.
Figure 46:
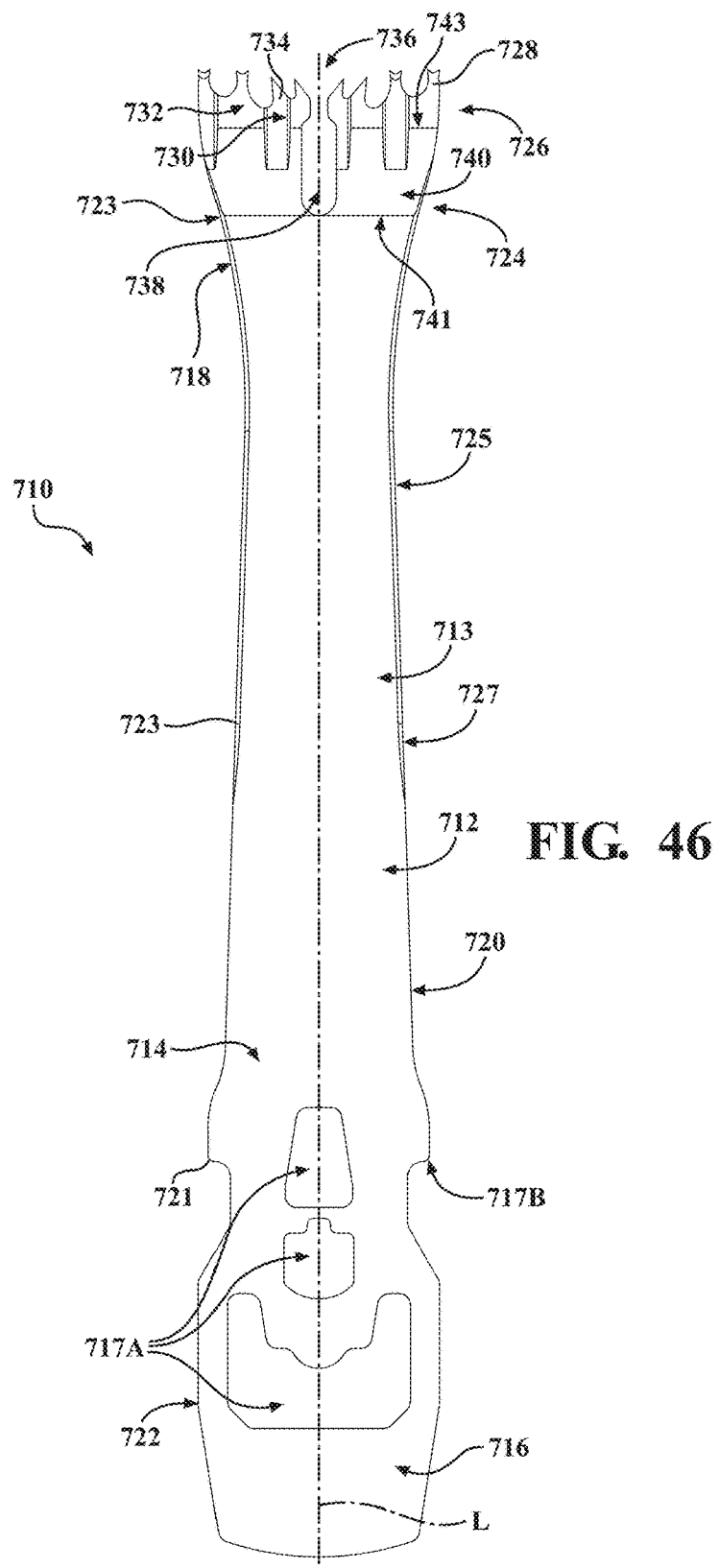
FIG. 46 is a top view of the saw blade of FIG. 45.
Figure 47:
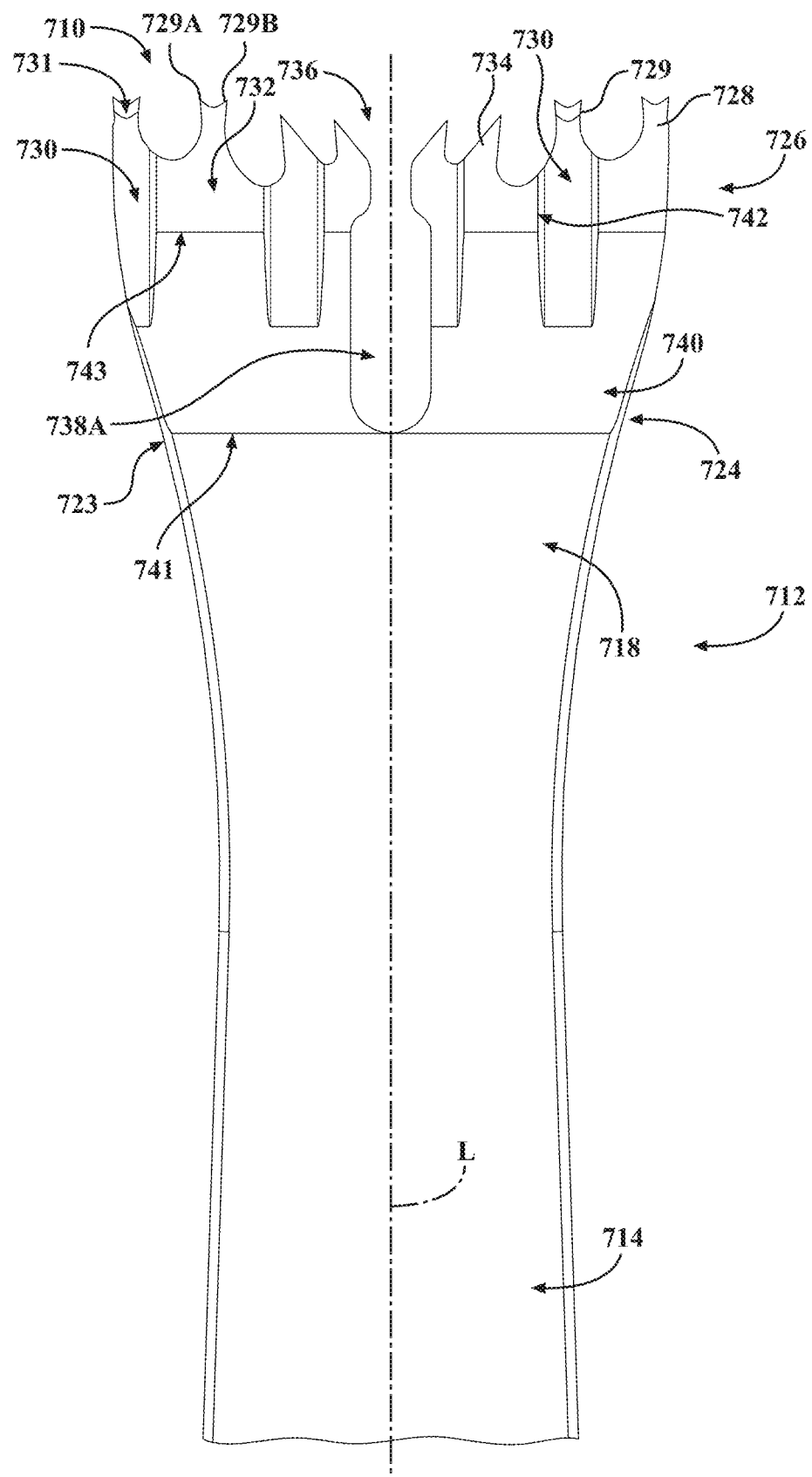
FIG. 47 is an enhanced top view of a distal portion and blade head of the saw blade of FIG. 45.
Figure 48:
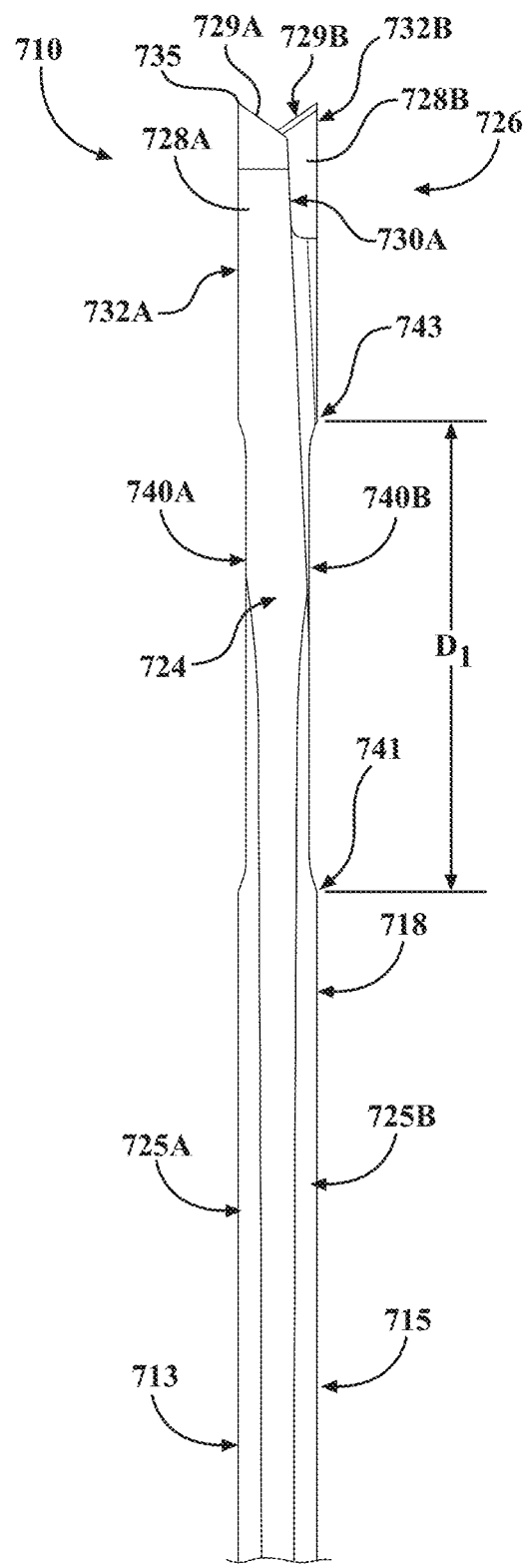
FIG. 48 is an enhanced side view of the distal portion and blade head of the saw blade of FIG. 45.
Figure 49:
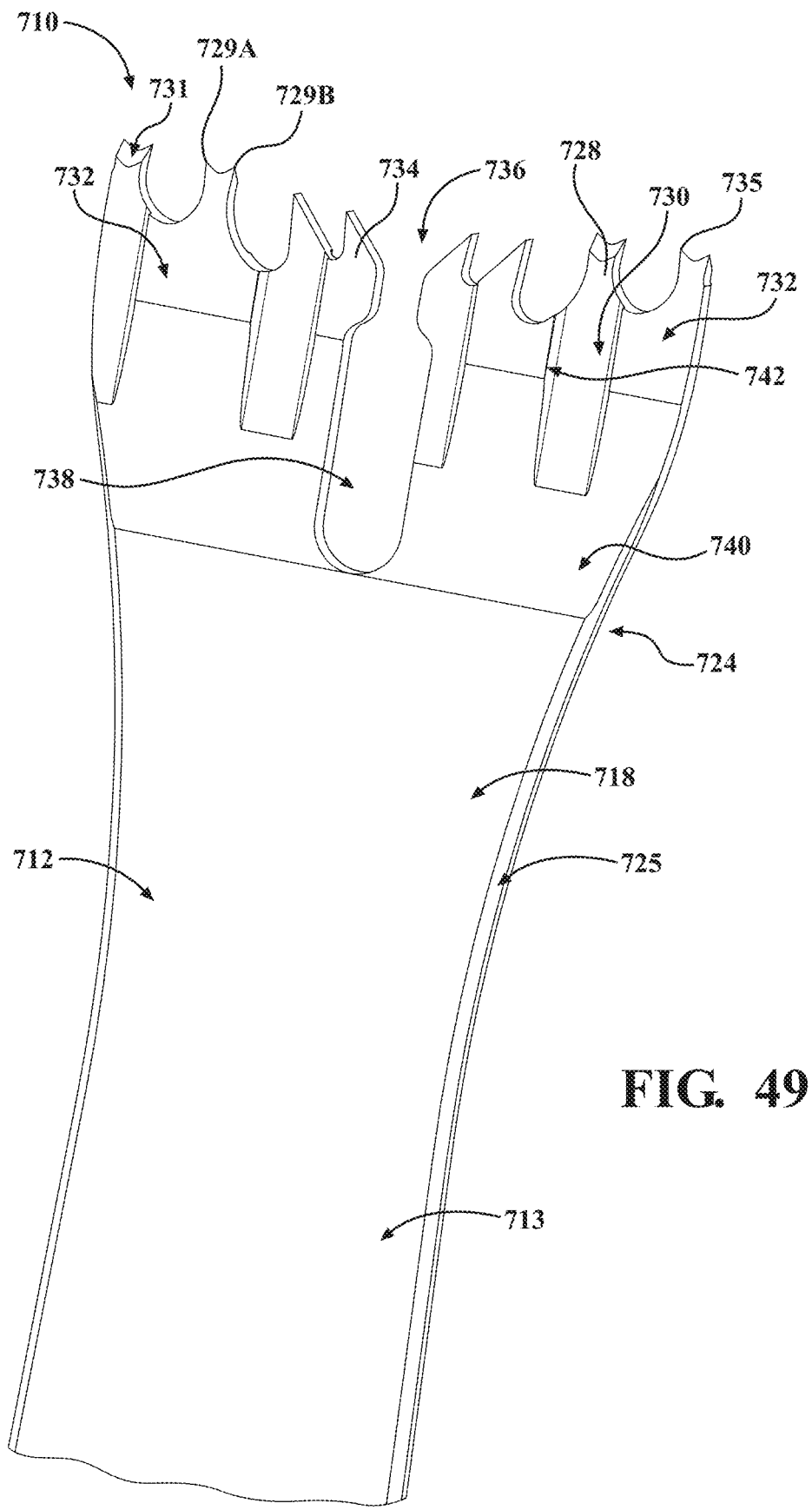
FIG. 49 is an enhanced perspective view of the distal portion and blade head of the saw blade of FIG. 45.

Referring to FIGS. 45 to 49, an eighth configuration of a saw blade 710 for use with a surgical saw, such as a sagittal surgical saw configure to oscillate a saw blade, is illustrated. It should be understood that any features of the saw blade 710 illustrated in FIGS. 45 to 49 that share a common base reference number may be configured, arranged, and/or designed to function in the same or similar matter as the configuration of the saw blades 10, 110, 210, 310, 410, 510, 610 described above. For example, FIG. 45 illustrates a saw blade 710 including a blade body 712. It should be understood that the blade body 712 of the saw blade 710 in FIG. 45 may have the same characteristics and/or functionality as any of the blade body's 12, 112, 212, 312, 412, 512, 612 of the saw blades 10, 110, 210, 310, 410, 510, 610 of FIGS. 1-44 described above.

The saw blade 710 illustrated in FIGS. 45 to 49 largely follows the features and functions of the blades 210, 310, 410, 510, 610 illustrated and described in FIGS. 18A to 49, specifically the features of the blade heads 226, 326, 426, 526, 626. One of the distinctions in the saw blade 710 from those described above, is that the blade head 726 is wider than distal and intermediate portions 718, 714 of the blade body 712. The intermediate portion 714 of the blade body 712 tapers inward toward the longitudinal axis (L) and then tapers back outward away from the longitudinal axis (L) as you move from the proximal end 721 to the distal end 723 of the intermediate portion 714. Furthermore, the distal portion 718 of the blade body 712 may be flared outward away from the longitudinal axis (L) of the saw blade 710 as you move distally. This results in a blade head 726 that is wider than the intermediate portion 714 of the blade body 712.

Figure 50:
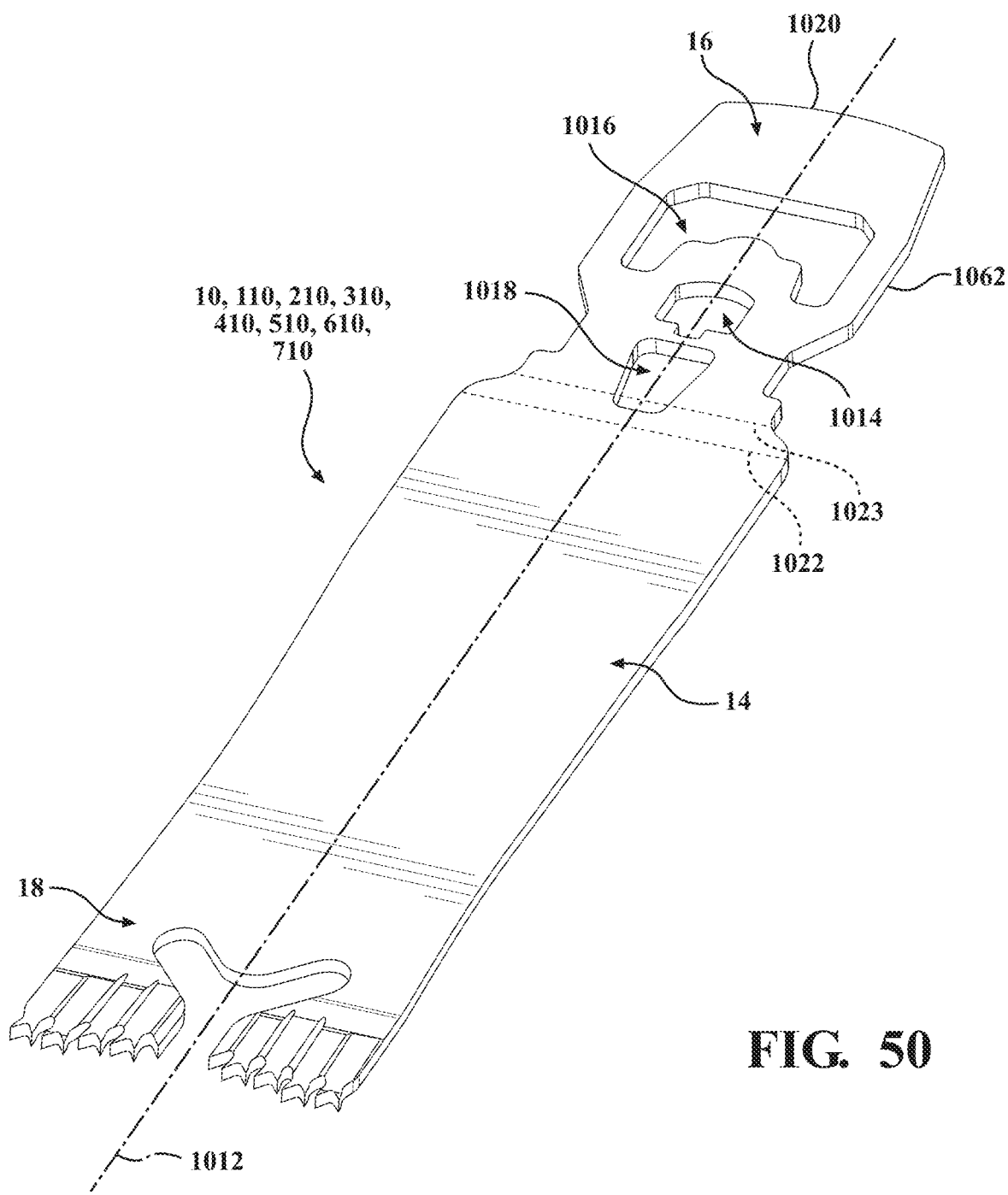
FIG. 50 is a perspective view of an exemplary configuration surgical saw blade including a proximal portion for mounting the blade to the blade mount of a surgical saw, according to the teachings of the present disclosure.
Figure 51A:
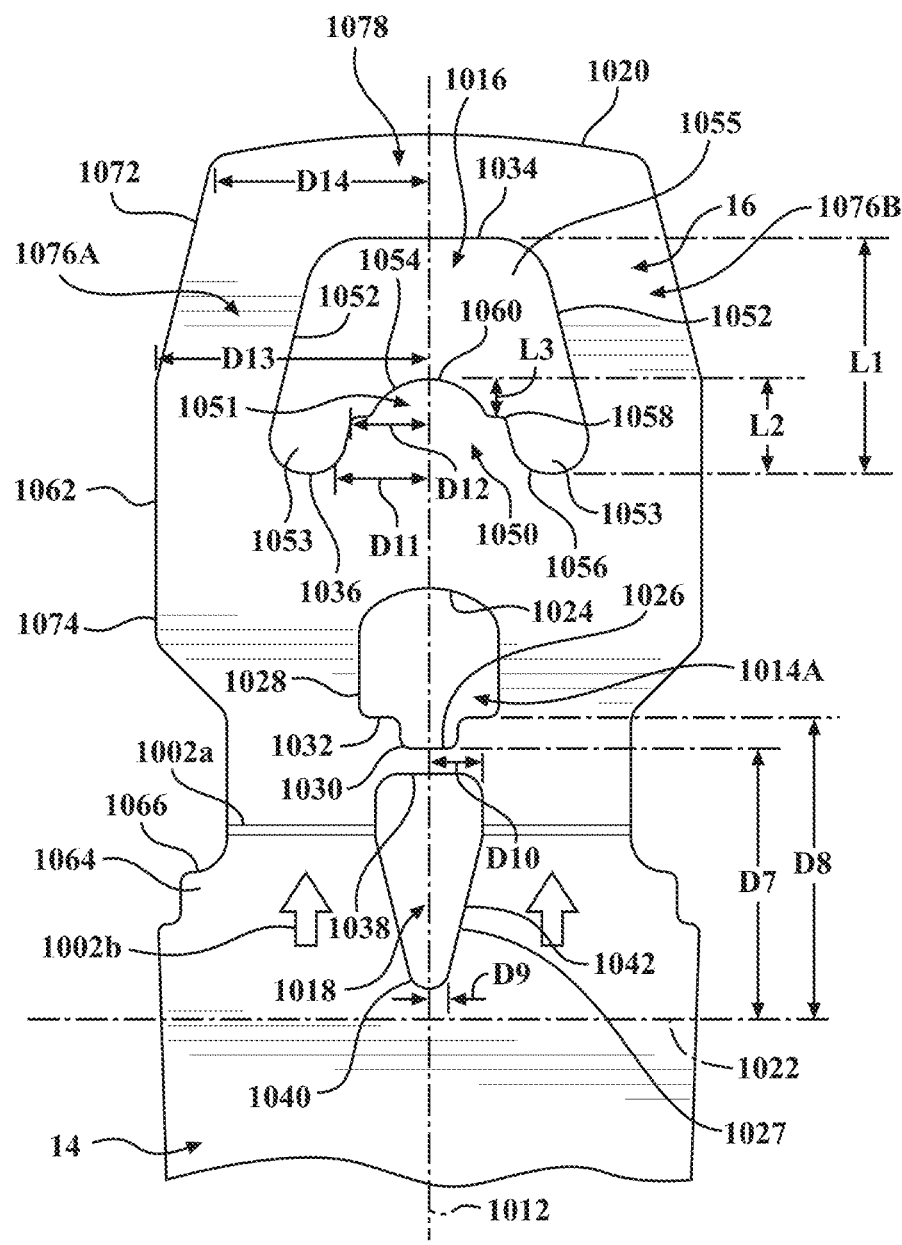
FIG. 51A is a top plan view of a proximal portion of the surgical saw blade illustrating various features of the surgical saw blade for securing the surgical saw blade to the blade mount of the surgical saw assembly, according to the teachings of the present disclosure.
Figure 51B:
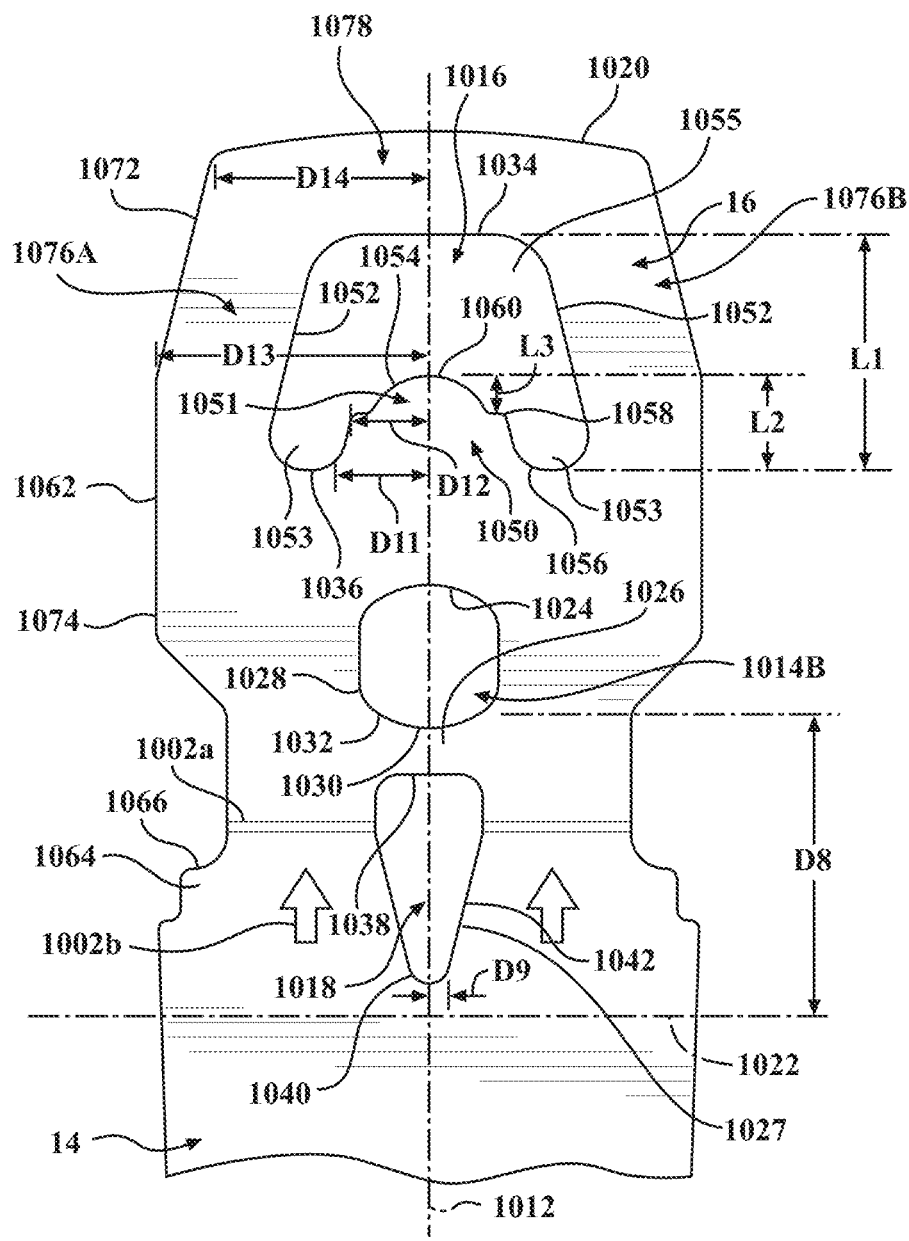
FIG. 51B is a top plan view of an alternate proximal portion of the surgical saw blade illustrating various features of the surgical saw blade for securing the surgical saw blade to blade mount of the surgical saw assembly, according to the teachings of the present disclosure.

Referring now to FIGS. 50 to 51B, an exemplary configuration of a saw blade 10, 110, 210, 310, 410, 510, 610, 710 described above for use with a surgical saw assembly 1. As described above, the saw blade 10, 110, 210, 310, 410, 510, 610, 710 includes geometric feature 17 defined by the proximal portion 16 or mounting portion of the surgical saw blade 10, 110, 210, 310, 410, 510, 610, 710 for attaching the saw blade 10, 110, 210, 310, 410, 510, 610, 710 to the blade mount 808 of the surgical saw assembly 1. The proximal portion 16 defines the geometric features that corresponds to a blade mount 808 of the surgical saw assembly 1, that will be described in more detail below. As is illustrated in FIGS. 50 to 51B, the proximal portion 16 of the saw blade 10, 110, 210, 310, 410, 510, 610, 710 includes a proximal edge 1020 and defines a distal axis 1022 opposite the proximal edge 1020. The distal axis 1022 may be parallel to the longitudinal axis 1012 and positioned less than half a length of the saw blade 10 from the proximal edge 1020. The distal portion 18 may have teeth formed on the blade head as described above. However, it is contemplated that the distal portion may be toothless, a smooth edge, or other tool configured for oscillation upon oscillation of the proximal portion 16.

The proximal portion 16 further defines a series of apertures including a central aperture 1014, a rear aperture 1016, and/or a fore aperture 1018. While three apertures are shown, it should be understood that any number and/or combination of the apertures may be defined. For example, the proximal portion 16 may include only a single aperture, two apertures, or three or more apertures. Further, the aperture may be defined as voids, slots, or other forms of openings or cutaways in the saw blade 10, 110, 210, 310, 410, 510, 610, 710. While not shown in the Figures, it is further contemplated that the apertures 1014, 1016, 1018 may include openings or slots extending in between the apertures 1014, 1016, 1018 and/or defining an opening to the aperture(s) 1014, 1016, 1018. For example, the apertures 1014, 1016, 1018 may be interconnected with an opening or slot. It is further contemplated that one or more of the apertures 1014, 1016, 1018 may be fully enclosed by the proximal portion 16 of the saw blade 10, 110, 210, 310, 410, 510, 610, 710. As shown in the figures, one or more of the central aperture 1014, the rear aperture 1016, and the fore aperture 1018 may be disposed on and/or defined on the longitudinal axis (L) of the saw blade 10, 110, 210, 310, 410, 510, 610, 710. For example, as illustrated in the Figures, each of the central aperture 1014, the rear aperture 1016, and the fore aperture 1018 are positioned along the longitudinal axis (L) that bisects the saw blade 10, 110, 210, 310, 410, 510, 610, 710. Alternatively, it is also contemplated that one or more of the central aperture 1014, the rear aperture 1016, and the fore aperture 1018 may be arranged such that the top and/or bottom surfaces of the saw blade 10, 110, 210, 310, 410, 510, 610, 710 may be asymmetrical. The mounting portion may be monoplanar.

Figure 54:
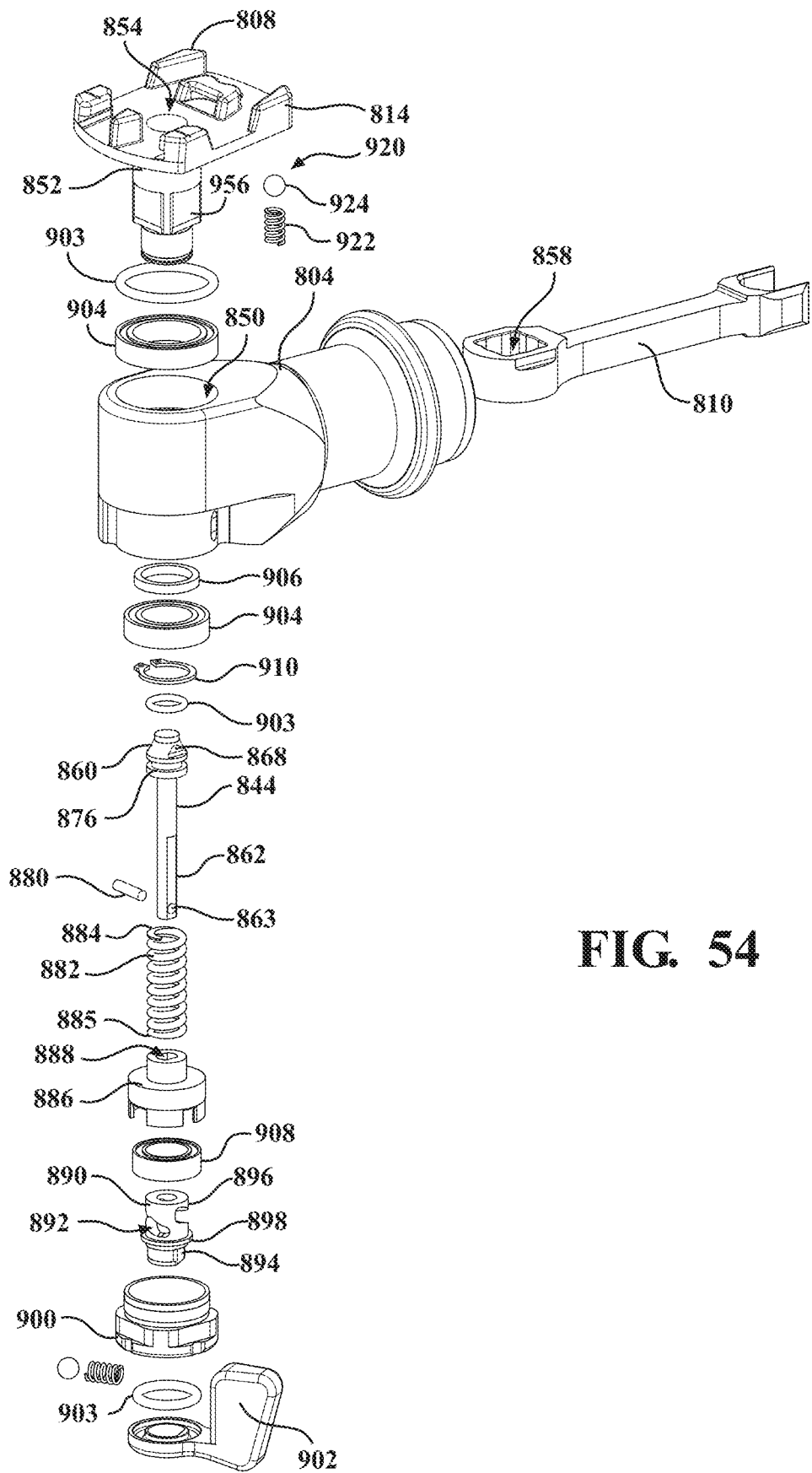
FIG. 54 is an exploded view of the blade mount of FIG. 53, according to the teachings of the present disclosure.
Figure 55:
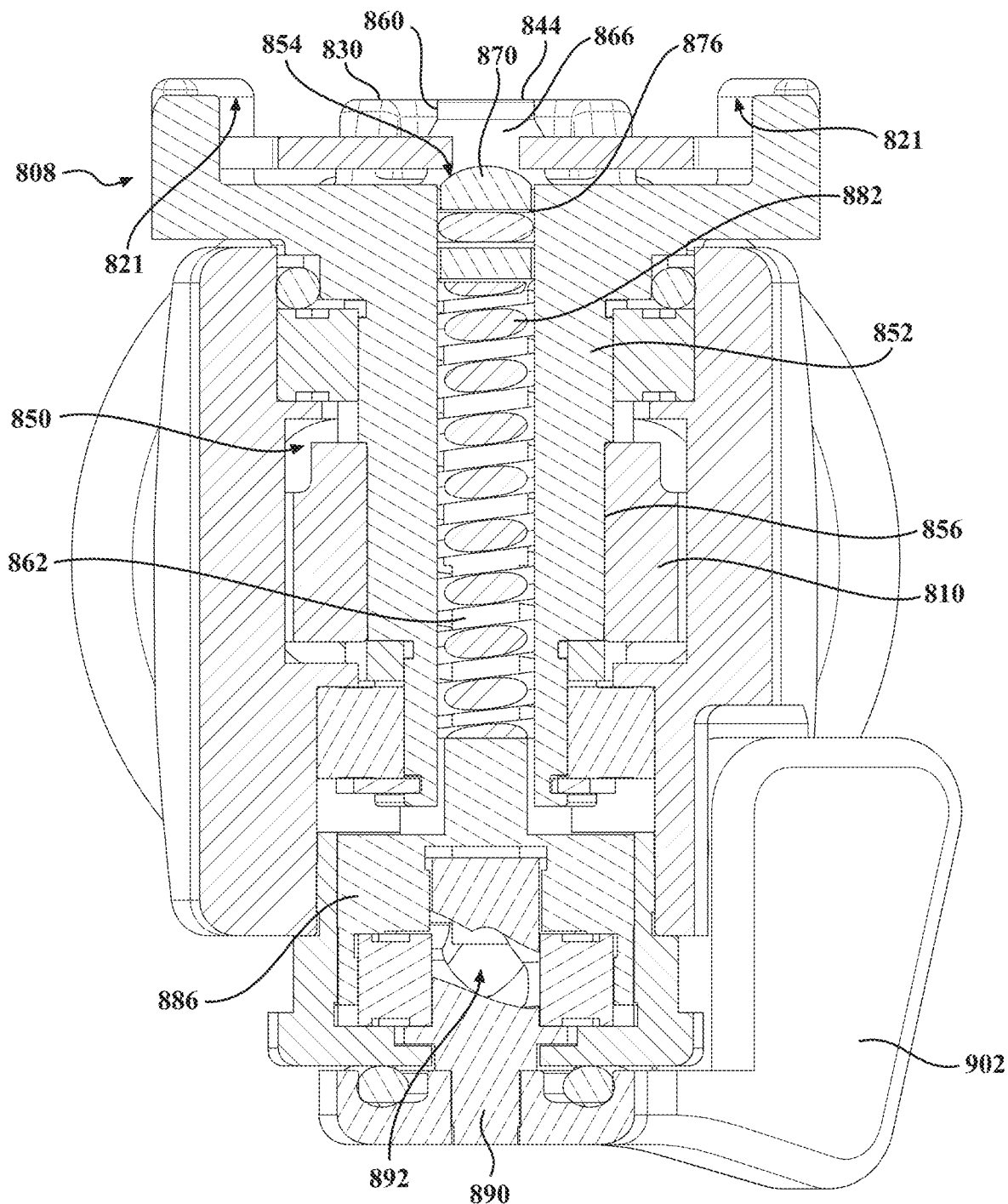
FIG. 55 a cross-sectional view of the blade mount, according to the teachings of the present disclosure.
Figure 56:
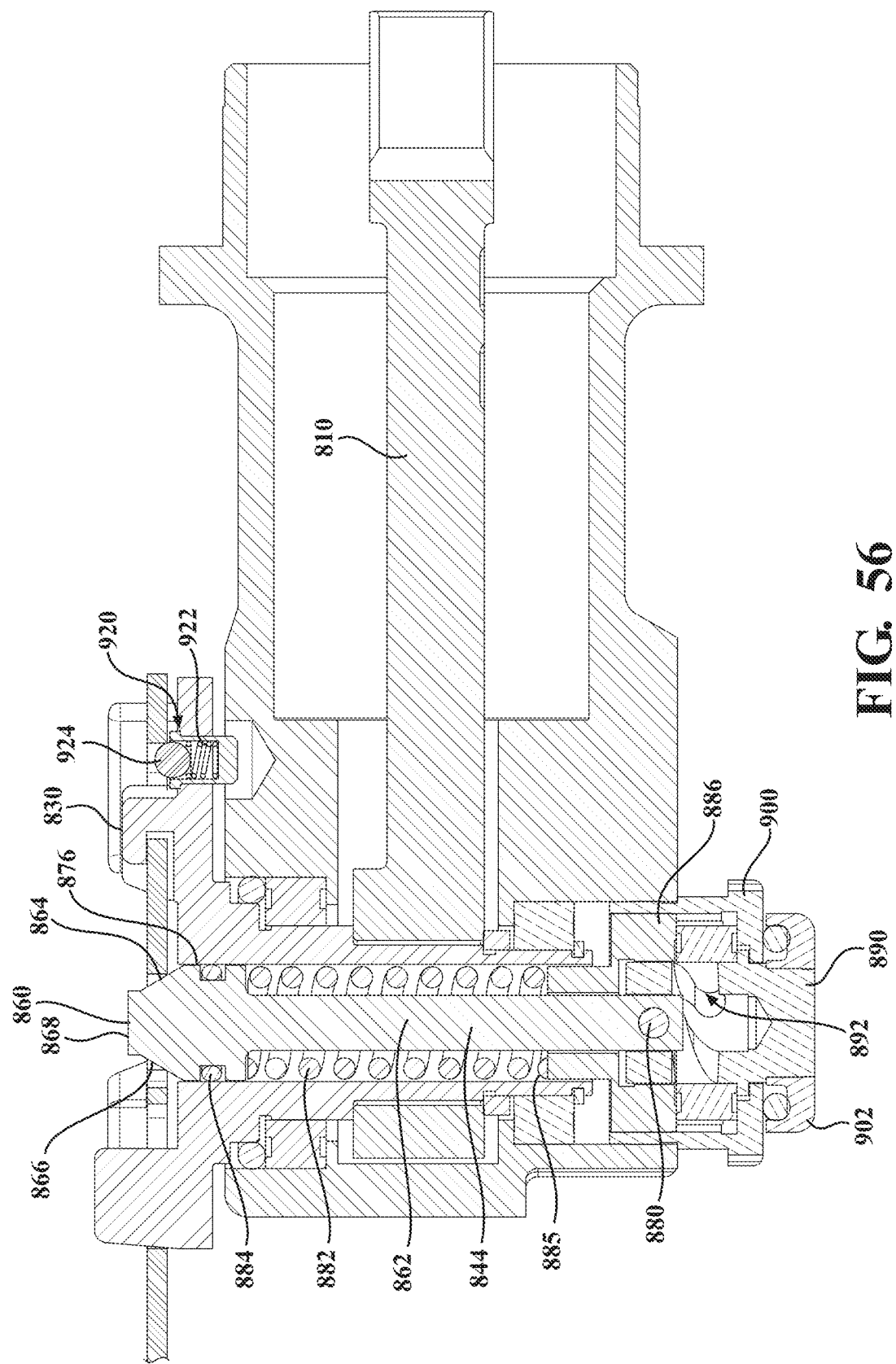
FIG. 56 is a cross-sectional view of the blade, according to the teachings of the present disclosure.
Figure 57:
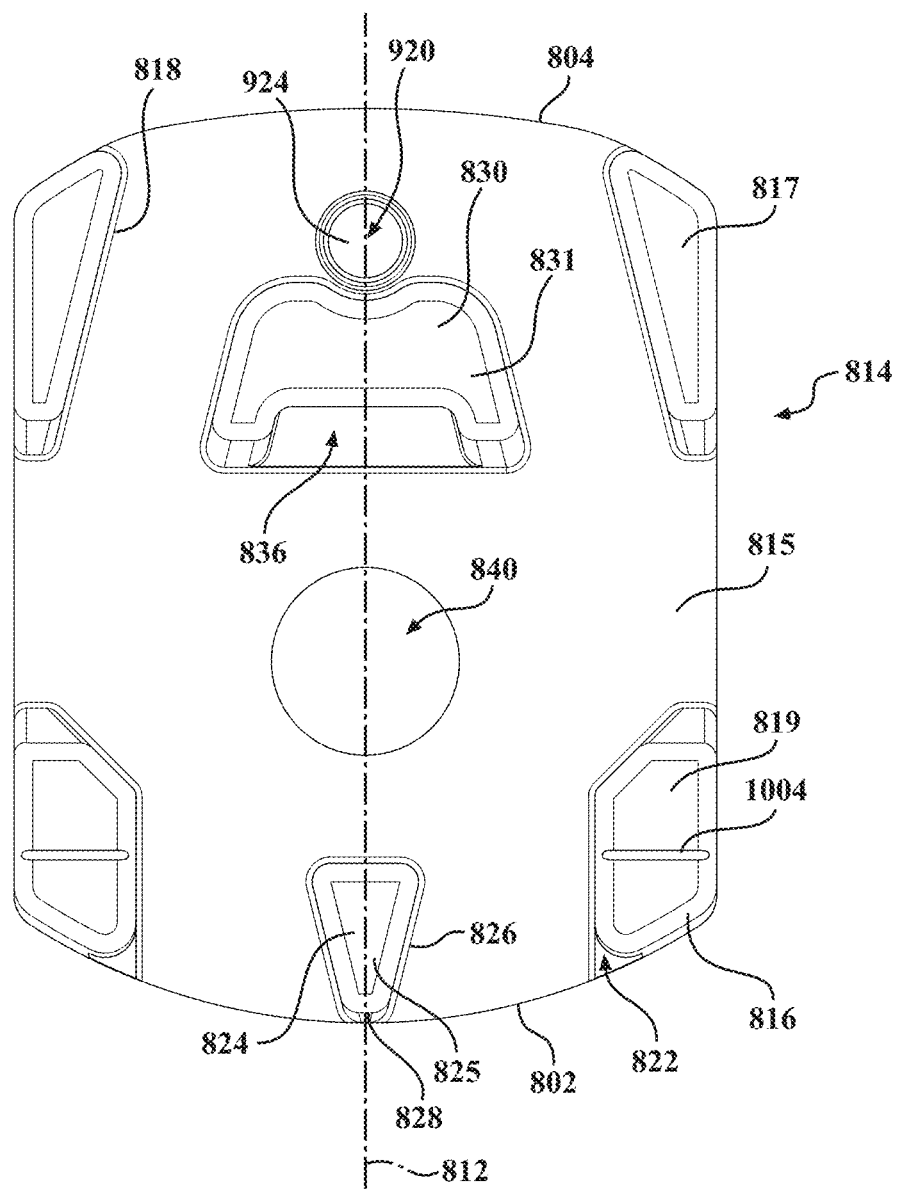
FIG. 57 is a top plan view of a portion of the blade mount of the surgical saw for receiving the surgical saw blade, according to the teachings of the present disclosure.

In the example shown, the central aperture 1014 may be shaped to receive an actuator 844 of the blade mount 808. The central aperture 1014 may be defined by a central proximal end wall 1024, a central distal end wall 1026, and a pair of central side walls 1028 extending between the central proximal end wall 1024 and the central distal end wall 1026. The central proximal end wall 1024 may be of an arcuate shape configured to engage with the biasing surface 866 (see FIG. 54) of the actuator 844 for biasing the surgical saw blade 10, 110, 210, 310, 410, 510, 610, 710 in a proximal direction, i.e. towards the proximal edge 1020. For example, the arcuate shape may be a semi-circular shape, curved, bent, or other similar rounded shape for biasing the saw blade toward the proximal edge 1020. It is contemplated that the central proximal end wall 1024 may further comprise of any number of cut outs or recesses that may aid in a grip of the actuator. For example, the central proximal end wall 1024 may be composed of a plurality of teeth creating an arcuate shape. While the central proximal end wall 1024 is illustrated as an arcuate shape, it is to be understood that the central proximal end wall may be of any shape for biasing the blade in a proximal direction, including a straight edge of a rectangular central aperture 1014.

The first distal end wall 1026 may also be of an arcuate shape. In configurations, the central aperture 1014 may be an enclosed circular opening within the proximal portion 16. In other examples, the central aperture 1014 may be a substantially rectangular shape, triangular shape or other shape configures to receive the actuator 844. In some examples, the central aperture 1014 may be fully encased by the proximal portion 16. In other examples, the central aperture 1014 or first aperture may be in communication with or otherwise open to the fore aperture 1018. In such examples, the central aperture 1014 and the fore aperture 1018 may be configured as a single unitary aperture 1014/1018 defining a biasing portion of the first aperture and a driving portion.

In some configurations, the central distal end wall 1026 has a first portion 1030 and a second portion 1032, the first portion 330 having a first distance D7 to the distal axis 1022 and the second portion 1032 having a second distance D8 to the distal axis 1022. The first distance D7 may be less than the second distance D8. In implementations where the ejection functionality is included, the second portion 1032 is configured to be engaged by an ejection surface of the actuator 844.

The fore aperture 1018 or third aperture, is positioned distal to the central aperture 1014 and/or the rear aperture 1016. The fore aperture 1018 includes a fore proximal wall 1038, a fore distal wall 1040 and two side walls 1042 extending between the fore proximal wall 1038 and the fore distal wall 1040. In embodiments, the two side walls 1042 taper towards the longitudinal axis 1012 from the fore proximal wall 1038 to the fore distal wall 1040. The fore distal wall 1040 may include a fore distal wall end having a distance D9 to the longitudinal axis 1012 and the fore proximal wall 1038 having a fore proximal wall end distance D10 to the longitudinal axis 1012, the fore distal wall end distance D9 less than the fore proximal wall end distance D10. The two side walls 1042 may be of any shape, for example, curved, recessed, and/or protruding. In configurations, one or both of the two side walls 1042 may be a drive wall as they engage with the side walls 826 of the distal protrusion 824 acting as a driver to drive the blade 10.

Where included, the rear aperture 1016 or a second aperture is positioned proximal to the central aperture 1014 and includes a proximal end 1034 and a distal end 1036 opposite the proximal end 1034. A rear aperture length L1 extends between the proximal end 1034 and the distal end 1036 of the rear aperture 1016. The rear aperture 1016 may be of a general 'U' shape comprised of two leg regions 1053 and a central region 1055 between the two leg regions 1053. However, while the rear aperture 1016 is depicted encircled by the mounting portion 16, it should be understood that the proximal end 1034 of the rear aperture 1016 may be open.

Still referring to FIGS. 50 to 51B, the mounting portion 16 may include a peninsula portion 1050 or retaining portion defining an area. The peninsula portion 1050 may be partially surrounded by the rear aperture 1016. The area defined by the peninsula portion 1050 may be less than the area defined by the rear aperture 1016. The peninsula portion 1050 includes two side walls 1058 and an end wall 1054. The leg regions 1053 of the rear aperture 1016 are positioned on both sides of the two side walls 1058 and the central region is positioned proximal to the end wall 1054. The end wall 1054 may be a semicylindrical shape. The two side walls 1058 may taper towards the longitudinal axis 1012 from the distal end 1036 to the proximal end 1034. In embodiments, the two side walls 1058 include a distal side wall end having a distal side wall end distance D11 to the longitudinal axis 1012 and a proximal side wall end having a proximal side wall end distance D12 to the longitudinal axis 1012. The distal side wall distance D11 may be greater than the proximal side wall distance D12. In configurations, one or both of the two side walls 1058 may act as a drive wall as they engage with the inner wall 834 of the proximal protrusion 830 acting as a driver to drive oscillation of the blade 10.

The peninsula portion 1050 extends away from the central aperture 1014 in the proximal direction and has a peninsula length L2. The peninsula portion further includes a tab portion 1060, the tab portion 1060 having a length L3. In some examples, the tab length L3 is less than 50% the peninsula portion length L2. In other examples, the tab length L3 is less than 30% the peninsula portion length L2. In even more examples, the tab length L3 is less than 10% the peninsula portion length L2. Further, the peninsula portion length L2 may be less than 75% the second aperture length L1. In some examples, the peninsula portion length L2 is less than 60% the second aperture length L1. The tab portion 1060 of the peninsula portion 1050 may be configured to fit within the central recessed portion 836 of the blade mount 808. In such configurations, a top surface 1051 of the tab portion engages with a retaining wall 837 to prevent the blade 10 from being displaced in an upward or downward direction.

The peninsula portion 1050, as described above may act as a retention portion configured to fit within the central recess portion 836 of the proximal protrusion 830, as shown in more detail in FIGS. 58A and 58B. The retention portion may be the narrowest region of the mounting portion 16 and has a width at its narrowest dimension less than the width of the fore aperture 1018 at the widest width of the fore aperture 1018. The widest width of the fore aperture 1018 is the width of the fore aperture 1018 at a line perpendicular to the longitudinal axis 1012. In some embodiments, the width W1 of the retention portion is less than 15% the width of the mounting portion defined by the outermost surface of the two stop protrusions 1064.

The mounting portion 16 further includes two sides 1062 extending between the distal axis 1022 and the proximal edge 1020. Two stop protrusions 1064 extend outwardly from the two sides 1062. As shown in the exemplary illustrations, the two stop protrusions 1064 extend outwardly from the two sides 1062 and have a top surface 1066. While the stop protrusions 1064 depicted as slightly obtuse angles, other shapes are contemplated. For example, the stop protrusions may be wings, circular, include recesses or cut outs, or any other shape that extends at least partially outward from the two sides 1062. It is additionally contemplated that only one stop protrusion 1064 may be defined by the proximal portion 16. In the example configuration shown, the stop protrusions 1064 extends a distance that is still within the width of the saw blade 10 define that the side surface 20 of the intermediate portion 14 of the saw blade 10. However, it should be understood that the stop protrusions may extend away from the longitudinal axis (1012) a distance such that the stop protrusions 1064 extend beyond the width of the intermediate portion 14.

As demonstrated in FIGS. 58A and 58B, the stop protrusions 1064 may be configured to engage with an upper wall 821 of a recess 822 of the retaining portion 820 to prevent movement of the blade 10 in the vertical direction. In examples, the stop protrusions 1064 are positioned distal to the central aperture 1014. Further, in some examples, the stop protrusions 1064 may be in line with the drive side walls 1042 of the fore aperture 1018. However, it should be understood that the stop protrusions may be positioned at any location on the two sides 1062 of the proximal portion 16.

The two sides 1062 further comprise a first side region 1074 and a second side region 1072 proximal to the first side region 1074. The second side region 1072 including a first end having a first end distance D13 to the longitudinal axis and a second end having a second end distance D14 to the longitudinal axis, and the first end distance D13 is greater than the second end distance D14. The second side region 1072 is configured to engage with an inner wall 818 of side portions 816 of the blade mount 808 as described below to drive oscillation of the blade 10 and act as a drive wall.

Referring now to FIGS. 52-59D, the blade mount 808 for retaining the saw blade 10 within a surgical saw 6 is illustrated. The blade mount 808 may include the blade mount 808, a housing 804 for containing an actuator 844, a coil spring 882, a bottom cap 886, a barrel 890, and a finishing cap 900, and a lever 902 extending out from the housing 804 to rotate the barrel 890 causing the actuator to move in an upwards or downwards direction. Various seals 903, bearings 904, washers 906, bushings 908, or circlips 910 are additionally provided within the housing to limit movement. The series of apertures 1014, 1016, 1018 are sized to fit into a corresponding series of protrusions 824, 830 and actuator 844 on the blade mount 808.

The blade mount 808 has a mount geometry configured to receive a corresponding blade geometry of the blade 802. The blade mount 808 defines a blade mount body 814 and a trunk 852 extending from the blade mount body 814 and into the housing 804. A drive assembly, represented by the drive link 810, oscillates the blade mount 808 back and forth around the longitudinal axis L2. The drive link 810 is driven by a motor within the surgical saw. The drive assembly may be removeable from the surgical saw handpiece.

The blade mount body 814 is defined, in part, by an upper surface 815 and a plurality of protrusions extending upward from the upper surface 815. The plurality of protrusions may include two fore side portions 816, two rear side portions 817, a distal protrusion 824, and a proximal protrusion 830 that extend from the upper surface 815. While only two fore side portions 816 two rear side portions 817 and two protrusions 824, 830 are shown, it should be understood that additional protrusions may be included. The protrusions 816, 824, 830 include an upper surface 819, 825, 831. It is contemplated that the height of the one or more of the protrusions 816, 824, 830 may be different, such that the height and/or position for one or more of the upper surface 819, 825, 831 relative to the blade mount surface 815 may be different. It is also contemplated that the height of one or more of the protrusions 816, 824, 830 may be the same or similar, such that the height and/or position for one or more of the upper surface 819, 825, 831 relative to the blade mount surface 815 may be the same or similar.

As described above in reference to the stop protrusions 1064, the fore side portions 816 may include a retaining portion 820 comprising a recessed portion 822 with an upper wall 821 configured to retain the stop protrusions 1064 of the saw blade 10 in a vertical direction. The upper wall 821 is configured to engage with a portion of the blade 10 set within the recess 822 to retain the blade 10 vertically, i.e., keep the blade from exiting the blade slot in a direction away from the upper surface. In some configurations, a stop may extend within the recess 822 to prevent movement of the blade 802 towards the proximal end.

In configurations, the rear side portions 817 include an inner wall 818. The inner wall 818 tapers towards the longitudinal axis L2 in a proximal direction. In other words, a plane extending from the inner wall 818 creates an angle with the longitudinal axis L2. In embodiments, the angle may be greater than 10 degrees. The inner wall 818 of the rear side portions 817 may engage with the first region 1072 of the side walls 1062 of the saw blade 10. As such, as the blade mount 808 is oscillated by the drive link 810, the inner walls 818 act as a driver to the blade 10.

The distal protrusion 824 includes a front wall 828, a back wall 829 and two side walls 826. The distal protrusion 824 is shaped as to correspond to the fore aperture 1018 and retain the blade 10 within the blade mount 808. The front wall 828 may feature a length less than the back wall 829. The side walls 826 may taper outwardly from the front wall 828 to the back wall 829 such that the distal protrusion 824 is narrower at its distal end. The side walls 826 may feature a curvature, indents, cut-outs and/or other protrusions. The two side walls 826 may abut with the fore aperture side walls 1042 of blade 10. In operation, as the blade mount 808 is oscillated by the drive link 810, the two side walls 826 act as a driver to drive the blade 802.

The proximal protrusion 830 may assume a general 'U' shape comprising a central portion 833 and two leg portions 832 extending from the central portion 833 in a direction toward the distal protrusion 824. The proximal protrusion 830 has an inner wall 834 facing the center aperture 840 and an outer wall 835 opposite the inner wall 834. The central portion 833 includes a central recessed portion 836 recessed within the central portion 833 of the proximal protrusion 830. The central recessed portion 836 includes a retaining wall 837 configured to engage with the blade 10 to maintain the blade 10 in a vertical position. The central recessed portion 836 may exhibit a generally semicylindrical shape. The inner wall 834 of the leg portions 832 may taper inward towards the central recessed portion 836. The inner wall 834 of the leg portions 832 may abut with two side walls 1058 of a peninsula portion 1050 of the blade 10. As such, as the blade mount 808 is oscillated by the drive link 810, the inner wall 834 acts as a driving surface to drive the blade 10.

A biasing member 920 is positioned within the blade mount 808 at a position proximal to the proximal protrusion 830. The biasing member 920 may comprise a biasing spring 922 and a ball 924 coupled to the biasing spring 922. In some examples, the biasing member 920 may be configured to move in a vertical direction perpendicular to the upper surface 815 of the blade slot 814. In a resting state, the biasing spring 922 causes the ball 924 to extend upward from the upper surface 815 of the blade mount body 814. A downward force may cause the ball to move in a downward direction relative to the upper surface 815. The ball 924 may be configured to engage with the proximal end 1034 of the rear aperture 1016 of the saw blade 10. In some embodiments, the biasing member 920 may be positioned adjacent to the proximal protrusion 830 and aligned with the longitudinal axis L2.

Still referring to FIGS. 52-59D, the blade mount 808 defines an aperture 840 positioned between the proximal protrusion 830 and the distal protrusion 824. The aperture 840, referred to as an actuator aperture, is shaped to receive the actuator 844. The housing 804 of the blade mount 808 defines a central bore 850 configured to retain the trunk 852 of the blade mount 808, the actuator 844, the coil spring 882, the bottom cap 886, the barrel 890, and the finishing cap 900, in addition to various bearings 904, washers 906, bushings 908, or circlips 910 via various shelves and recesses. The blade mount 808, having the blade mount body 814 and a trunk 852 extending from the blade mount body 814 opposite the protrusions 824, 830, sits such that the trunk 852 is positioned within the central bore 850 of the housing 804 and the blade slot 814 is located atop the housing 804. A vertically extending bore 854 extends within the blade mount 808 from the end of the trunk 852 to the center aperture 840. The trunk 852 is formed to have two diametrically opposed flats 856 that corresponds to a bore 858 of the drive link 810. This arrangement causes the blade mount 808 to engage in a rotating oscillation in response to the pivotal oscillation of the drive link 810.

The actuator 844 extends through the vertically extending bore 854. The actuator comprises a head portion 860 and a rod portion 862 extending in a downward direction from the head portion 860. The head portion 860 comprises a recessed groove 876 at the junction of the rod portion 862 and the head portion 860. The head portion 860 further comprises a top surface 866 that tapers toward a vertical boss portion 860. The top surface defines an indented portion 868 configured to engage with the central proximal end wall 1024 of the central aperture 1014 of the saw blade 10. A pin 880 extends through a hole 863 of the rod portion 862. The exposed ends of pin 880 project beyond the perimeter of the rod portion 862 and sits in a slot 892 of a barrel 890 as described in further detail below.

The coil spring 882 is disposed within the central bore 850 of the housing 804 and surrounding the rod portion 862 of the actuator 844. A top portion 884 of the coil spring 882 rests within the recessed groove 876 of the head portion 860. A bottom portion 885 of the spring 882 rests against the bottom cap 886. The coil spring 882 thus imposes a force on both the head portion 860 of the actuator 844 and the bottom cap 886. The bottom cap 886 is positioned below the spring 882 and includes a center aperture 888. The rod portion 862 extends through the center aperture 888 to fit within the barrel 890. As such, the bottom cap centers the rod portion 862 of the actuator 844.

The barrel 890 is rotatably fitted within the bottom cap 886 and the finishing cap 900. The barrel 890 has a head 894, a stem 896 and a collar 898 radially extending outward between the head 894 and the stem 896. The stem 896 is formed to have a slot 892 extending in a helical pattern around the stem 896. As noted above, the pin 880 sits within the slot 892. As the barrel 890 rotates, the pin 880 moves along the helical slot 892, causing the actuator 844 to move in an upwards or downwards direction. Application of force to the lever 902 rotates the barrel 890. The lever 902 may feature a planar body and is positioned such that the lever 902 projects outwardly from the housing 804. The lever 902 is configured to move between a locked state and an unlocked state, rotating into a position so that the pin 880 moves within the slot 892 of the barrel 890 as the blade mount 808 moved between a locked and unlocked state.

Referring now to FIGS. 51A, 51B,58A and 60A-60D, the surgical saw assembly 1, which includes the blade mount 808 and blade 10 featuring indicia 1002 and 1004, is illustrated. The indicia 1002 and 1004 may consist of printed graphics, engravings, laser markings, or any other method for applying a graphic or marking on the top surface 213 of the blade or on the surfaces 819, 825, 831 of the protrusions 816, 824, 830 of the blade mount 808. The indicia 1002 and 1004 may be aligned with the longitudinal axis L of the blade. In some instances, the indicia 1002 and 1004 may extend in a direction perpendicular to this axis. As an example, the indicia 1002, 1004 may be a line extending perpendicular to the longitudinal axis L. However, it should be understood that the indicia 1002 and 1004 can extend in any direction along or from the longitudinal axis L.

The blade indicia 1002 may be positioned adjacent to, or otherwise aligned with, an edge 1027 of one or more of the apertures 1014, 1016, and 1018. For example, the blade indicia 1002 may extend away from the apertures or may be slightly offset from them. In some cases, the blade indicia 1002 is positioned near one of the apertures, while in other cases, it may be positioned near multiple apertures. In some examples, the blade indicia 1002 may be aligned with one or more of the apertures 1014, 1016, 1018. There may be several blade indicia 1002 adjacent to an edge 1026 of one of the apertures, including instances where the indicia are located on opposing sides of the aperture.

In examples, the indicia 1002 may further include a mirror indicium, where the mirror indicia is positioned on the opposing edge of the edge 1026 of the one of the apertures 1014, 1016, 1018. Additionally, the blade indicia 1002 may be positioned on the peninsula portion 1050 of the blade 10, adjacent to the rear aperture 1018 and aligned with the longitudinal axis 1012. In some examples, the blade indicia 1002 may be partially obstructed by the blade mount 808 and may be positioned distal to or proximal to the stop protrusions 1064. While the figures show the blade indicia 1002 adjacent to the apertures 1014, 1016, 1018, it should be noted that this positioning is not restrictive. In some configurations, the blade indicia 1002 may be further defined as multiple indicia 1002a, 1002b, where the multiple indicia 1002a, 10022 is comprised of different images. As illustrated in FIG. 51A, the indicia 1002 may include both a line indicia 1002a and an arrow indicia 1002b. In some examples, the arrow indicia 1002 may depict a direction of insertion of the saw blade 10 into the blade mount 808.

The mount indicia 1004 may be located on the upper surfaces 819, 825, 831 of one or more of the protrusions 816, 824, 830. This mount indicia 1004 may be positioned adjacent to or aligned with an edge 1032 of the protrusions 824, 830, corresponding to the position of the blade indicia 1002. In some examples, the blade indicia 1002 may become aligned with the mount indicia 1004 in a mounted position, as shown in FIG. 58B. In one example, the blade indicia 1002 and the mount indicia 1004 make a continuous line as a complete image when adjoined. However, the complete image may be any other image displaying alignment of the mount indicia 1004 and the blade indicia 1002. There may be multiple mount indicia 1004 on one or more protrusions 824, 830. In some examples, the mount indicia 1004 may be located on the actuator 844 and may align with the blade indicia 1002 when the blade 10 is coupled to the mount 808.

The blade indicia 1002 and mount indicia 1004 can represent various symbols or numbers. For instance, they may include shapes such as half circles, triangles, locks, arrows, lines, or any other symbols designed to indicate the alignment of the blade 10 with the mount 6. For example, when half circle indicia 1002 and 1004 are aligned, they may form a full circle. When triangle indicia 1002 and 1004 are aligned, their corresponding points may face each other. When line indicia 1002 and 1004 are aligned, the line may extend across both the blade mount 808 and the blade 10. Another example includes the blade indicia 1002 being an open lock and the mount indicia 1004 being an open half circle; when aligned, the blade indicia 402 may be partially obstructed, resulting in a closed lock appearance.

In FIGS. 58A and 58B, the surgical saw assembly 1 is shown in both an unmounted position 1008 and a mounted position 1010. In the unmounted position 1008, the blade 10 may be separate from the mount 808 or misaligned, preventing the surgical saw assembly 1 from entering a locked state with the blade retention assembly 6. As depicted in FIG. 58A, the blade indicia 1002 is offset or misaligned with the mount indicia 1004. In some cases, the blade indicia 1002 may appear as an open lock in such an unmounted position. As described in more detail below, in the unmounted position, the blade 10 is placed on the blade mount 808 such that the protrusion 824, 830 are positioned within corresponding apertures 1016, 1018, the biasing member 920 is in a first position. In the first position, a force presses the ball 924 of the biasing member 920 in a downward direction relative to the upper surface of the blade mount.

In the mounted position as depicted in FIG. 58B, the blade indicia 1002 aligns with the mount indicia 1004, and the blade 10 couples with the blade mount 808. In the illustrated example, the blade indicia 1002 and the mount indicia 1004 adjoin to create a complete image of a line. The geometry of the blade mount 808 accommodates the corresponding geometry of the mounting portion 16 of the blade 10. In this position, the apertures 1014, 1016, and 1018 fit onto the protrusions 824 and 830, as well as the actuator 844. For instance, in the mounted position 1010, a blade indicia 1002 may be adjacent to an edge 1026 of an aperture, while a mount indicia 1004 is positioned adjacent to an edge 1032 of the upper surface X of a protrusion. The blade indicia 1002 is aligned with, next to, or joined with the mount indicia 1004.

Figure 59A:
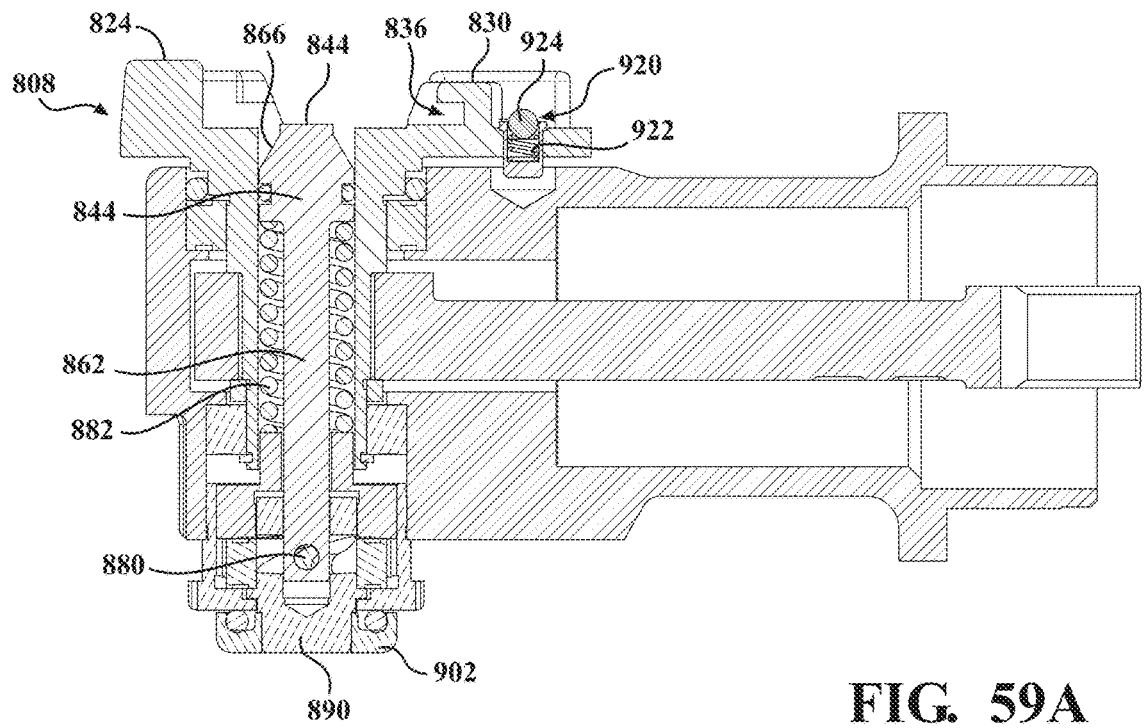
FIG. 59A a cross-sectional view of the surgical saw blade assembly in a first position before the surgical saw blade is inserted into the blade mount, according to the teachings of the present disclosure.

Referring now to FIGS. 59A-59D, a method for mounting and locking the surgical saw blade 10 within the blade mount 808 is illustrated. FIG. 59A depicts a cross-sectional view of the surgical saw blade assembly in a first position before the surgical saw blade is inserted into the retention assembly. In the first position, the actuator 844 is in a down position. In the down position the head 866 of the actuator 844 is positioned within the bore to allow the saw blade 10 to be inserted. The biasing member 920 is in an upward position where the ball 924 is biased by the biasing spring 922 to be positioned at least partially upward from the upper surface 815 of the blade mount body 814.

Figure 59B:
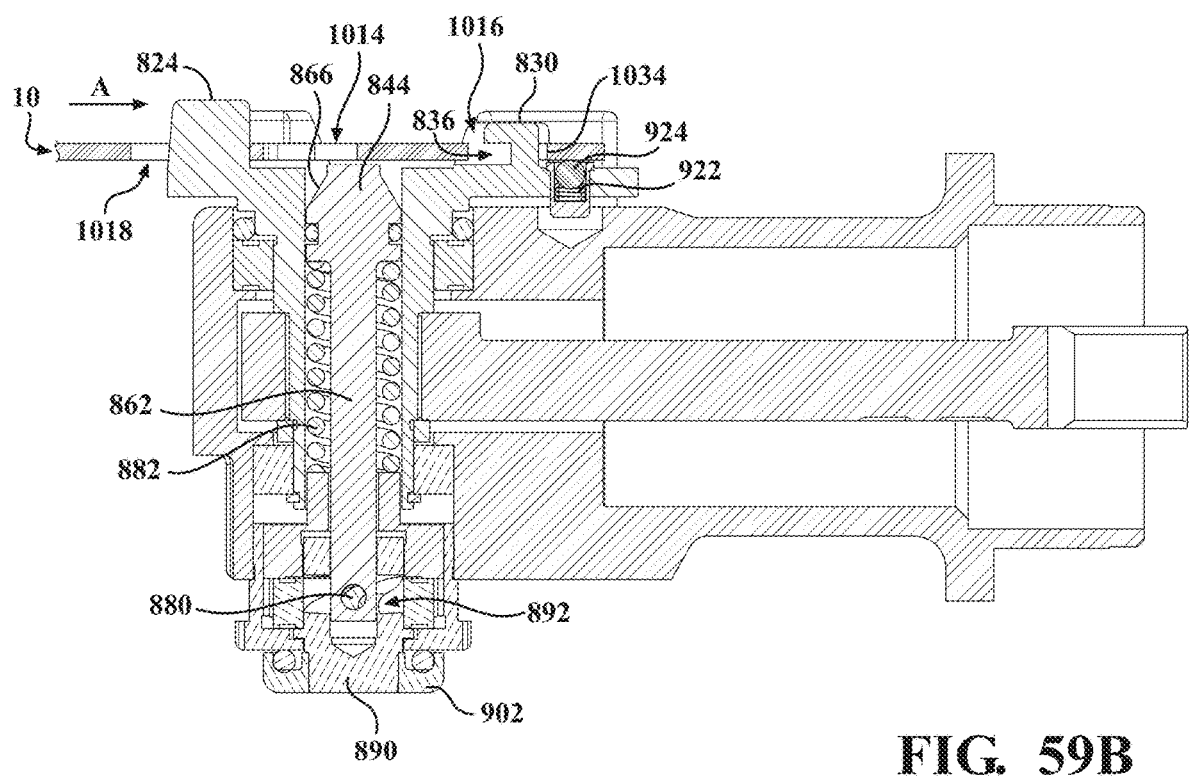
FIG. 59B is a cross-sectional view of the surgical saw blade assembly in a first intermediate position with the surgical saw blade partially inserted into the blade mount prior to sliding the surgical saw blade proximally within the blade mount, according to the teachings of the present disclosure.

FIG. 59B illustrates the surgical saw assembly 1 in a first intermediate position wherein the surgical saw blade 10 is partially inserted into the blade mount 808 prior to sliding the surgical saw blade 10 proximally within the blade mount 808. The actuator 844 is in a down position as in the first position. The biasing member 920 is in a downward position where the ball 924 is engaged with a surface of the saw blade 10 such that the ball 922 presses downward on the spring 922. The downward position of the biasing member 920 allows for the blade to move in the proximal direction of arrow A.

Figure 59C:
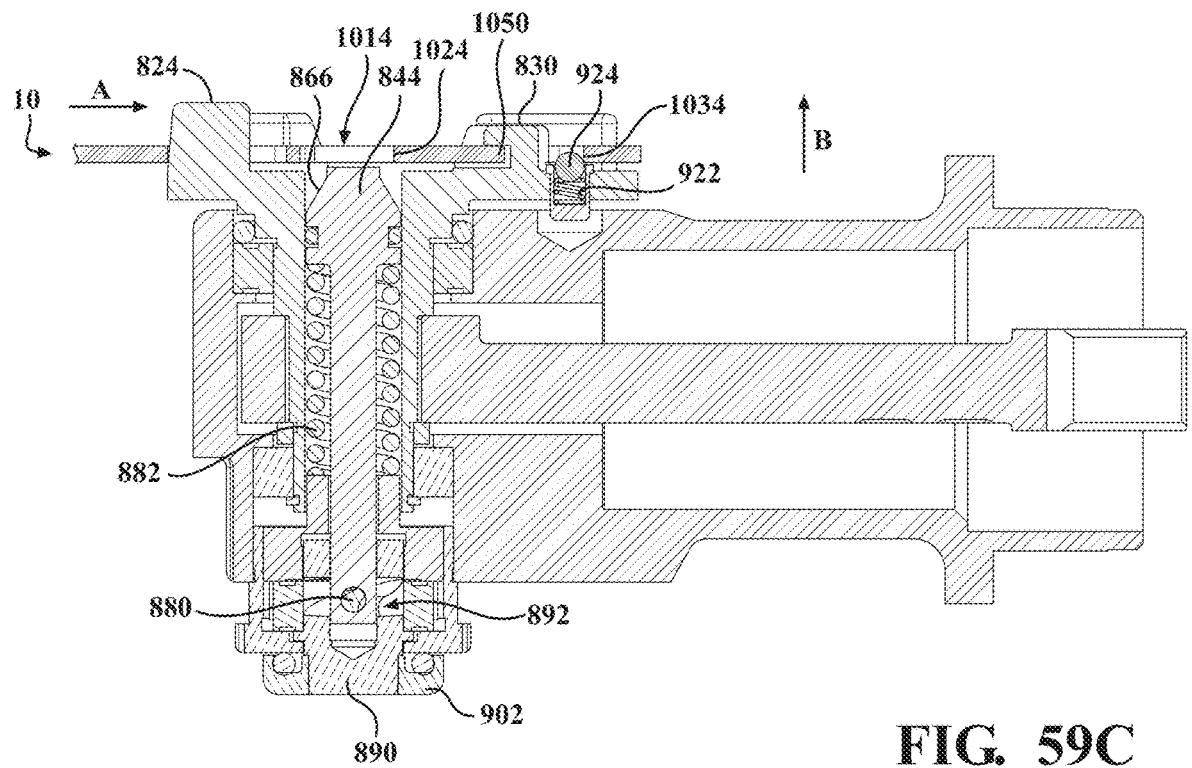
FIG. 59C is a cross-sectional view of the surgical saw blade assembly in a second intermediate position with the surgical saw blade partially inserted into the blade mount once the surgical saw blade has been slid proximally within the blade mount, according to the teachings of the present disclosure.

FIG. 59C illustrates the surgical saw assembly 1 in a second intermediate position wherein the surgical saw blade 10 is inserted into the blade mount 808 once the surgical saw blade 10 has been slid proximally within the blade mount 808. In the second intermediate position, the actuator 844 remains in the down position as described above. The biasing member 920 returns to an upward position as the biasing spring 922 applies a force on the ball 924 in the direction of arrow B. The ball 924 of the biasing member 920 engages with the proximal end 1034 of the rear aperture to bias the saw blade 10 in the proximal direction. In such examples, the curvature of the ball 922 in addition to the force in the direction of arrow b applied by the biasing spring applies a force in the direction of arrow A on the proximal end 1034 of the rear aperture 1016. In the second intermediate position, the peninsula portion 1050, or retention portion is inserted into the central recessed portion 836 of the rear protrusion 830. In such a position, the saw blade 10 is secured into the blade mount 808, however the saw blade 10 may be removed with effort from a user.

Figure 59D:
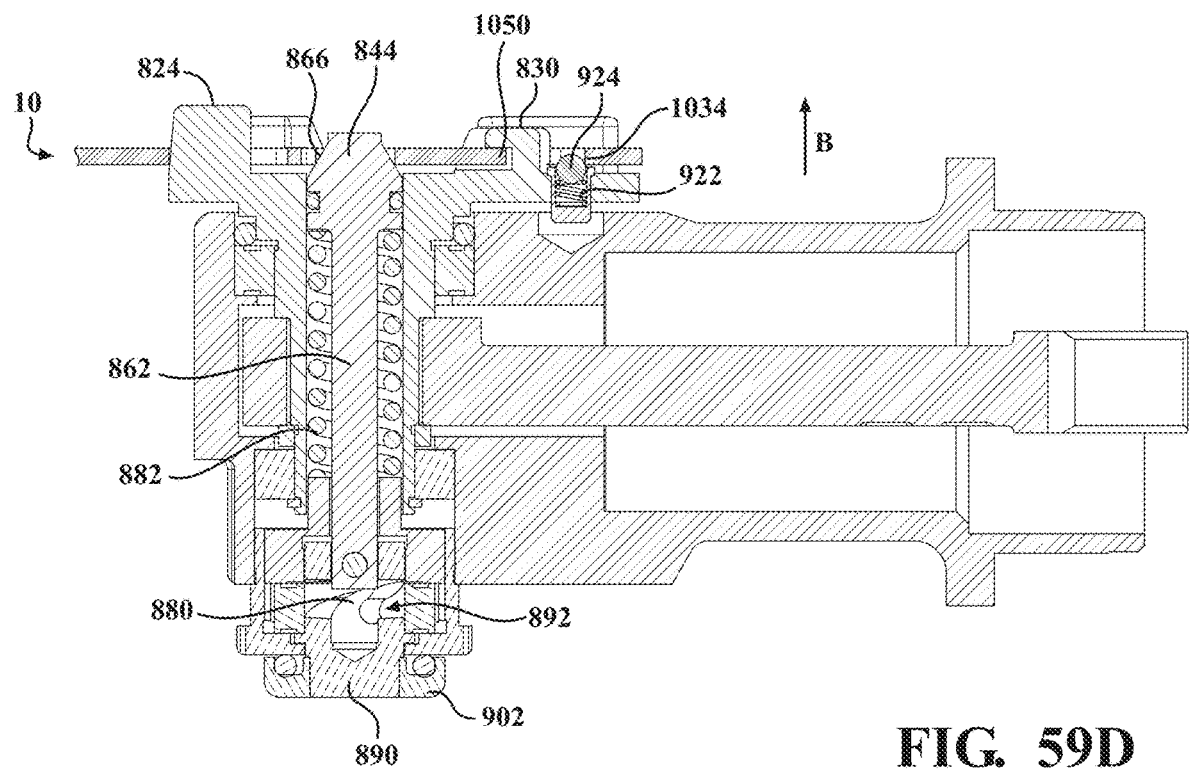
FIG. 59D is a cross-sectional view of the surgical saw blade assembly in a second position where the surgical saw blade is mounted/secured to the blade mount, according to the teachings of the present disclosure.

FIG. 59D depicts the surgical saw assembly in a second position wherein the surgical saw blade is mounted/secured to the blade mount 808. In the second position, the saw assembly 1 is in the locked state. The actuator is moved into the up position where the head portion 860 extends upward from the upper surface 815 of the blade mount body 814 and through the central aperture 1014 of the saw blade 10. The biasing surface 866 of the actuator 844 engages with the central proximal end wall 1024 of the central aperture 1014. A S the biasing surface 866 engages with the saw blade 10, the saw blade 10 is pushed in the direction of arrow A. The force in the direction of arrow A causes the peninsula portion 1050, or retention portion to remain within the central recessed portion 836 of the proximal protrusion 830. In such a locked state, the saw blade may not be removed from the blade mount 808. In the second position, the biasing member 920 remains engages with the proximal end 1034 of the rear aperture 1016 as in the second intermediate position.

As illustrated in FIGS. 59A-59D, a user may direct the saw blade 10 from the first position where the blade is completely unmounted to the first intermediate position wherein the saw blade is in a mounted, but in an unsecured and unlocked position. As the user inserts the blade, the fore and rear protrusions 824, 830 are placed in the corresponding apertures 1016, 1018 of the saw blade 10. As the user places the saw blade 10 in the first intermediate position, the ball 924 of the biasing member presses downward into the biasing spring 922.

The user then may move the saw blade 10 from the first intermediate position to the second intermediate position by applying a force in the direction of arrow A to move the saw blade 10 in the proximal direction. As the blade 10 is moved into the proximal direction, the biasing member 920 may automatically move in an upward direction to engage with the proximal end 1034 of the rear aperture 1016. Additionally, the blade indicia 1002, as described above, will align with the mount indicia 1004. At least a portion of the peninsula portion 1050 will enter the central recessed portion 836 of the rear protrusion 830.

Once the blade is in the second intermediate position, the user may place the surgical saw assembly 1 in the second position. In the second position, the saw blade 10 moves from a secured but unlocked state to a locked state where the blade is not removable by the user. The user may adjust lever 902 to move the actuator 844 in the direction of arrow B. The slot 892 of the barrel 890 is turned to the locked position. The pin 180 is pushed up through the slot 192 in a direction of arrow B as the barrel 190 is rotated. This movement causes engagement of the biasing surface 866 with the first proximal end wall 1024 of the central aperture 1014 of the blade 10. As the biasing surface 866 is engaged with the blade 10, to press the blade 10 in the direction of arrow A. The force in the direction of arrow A causes the peninsula portion 1050 or the tab portion 1060 of the blade 10 to be pressed into the central recessed portion 836 of the proximal protrusion 830. As such, the blade 10 is tightly retained within the blade mount 808.

Clauses covering additional configurations of the system(s) described above:

I. A surgical sagittal saw blade for use with a surgical saw, the surgical sagittal saw blade comprising:
   a planar blade body including a proximal portion, an intermediate portion, and a distal portion, the proximal and distal portions extending from opposed ends of the intermediate portion;
   wherein the proximal portion defines a geometric feature configured for mounting the planar blade body to the surgical saw;
   a blade head extending from a distal end of the distal portion of the planar blade body, the blade head comprising:
   a plurality of teeth arranged adjacent to one another across at least a portion of a width of the blade head, each of the plurality of teeth having a top surface and an opposed bottom surface;
   wherein one of the top surface or the bottom surface of each of the plurality of teeth is beveled portion;
   wherein the beveling is alternatingly applied to the opposite of the top or the bottom surface of the adjacent teeth of each of the plurality of teeth.

II. The surgical sagittal saw blade of clause I, wherein the bevel that alternates between the top and the bottom surfaces of the adjacent teeth of each of the plurality of teeth defines a V-shaped side profile across a width of a distal end of the blade head.

III. The surgical sagittal saw blade of clause I, wherein the alternatingly beveled top and the bottom surfaces of the adjacent teeth of each of the plurality of teeth defines a V-shaped side profile at a distal end of the plurality of teeth of the blade head.

IV. The surgical sagittal saw blade of clause II or III, where in the V-shaped side profile of the plurality of teeth defines a thickness of the blade head that is equal to or greater than a thickness of the planar blade body to allow the insertion of the planar blade body into a kerf cut by the blade head.

V. The surgical sagittal saw blade of any one of clauses I to III, wherein the beveling to the top and the bottom surfaces of the adjacent teeth of each of the plurality of teeth increase in depth moving distally along each of the top or the bottom surfaces of each of the plurality of teeth.

VI. The surgical sagittal saw blade of any one of clauses I to V, wherein the beveling to the top surface results in the top surface tapering downward toward the bottom surface moving distally along the blade head, and the beveling to the bottom surface results in the bottom surface tapering upward toward the top surface moving distally along the blade head.

VII. The surgical sagittal saw blade of clause I, wherein the distal portion of the planar blade body defines a V-shaped void, the V-shaped void oriented such that the V opens toward the intermediate portion and/or proximal portion of the planar blade body.

VIII. The surgical sagittal saw blade of clause I, wherein the distal portion of the planar blade body defines an elongated circular-shaped void, the elongated circular-shaped void oriented such that a major axis of the elongated circular-shaped void is generally parallel to a longitudinal axis of the planar blade body.

IX. The surgical sagittal saw blade of clause I, wherein the distal portion of the planar blade body defines an oblong-shaped void, the oblong-shaped void oriented such that a major axis of the oblong-shaped void is generally parallel to a longitudinal axis of the planar blade body.

X. The surgical sagittal saw blade of clause I wherein the distal portion of the planar blade body defines an oval-shaped void, the oval-shaped void oriented such that a major axis of the oval-shaped void is generally parallel to a longitudinal axis of the planar blade body.

XI. The surgical sagittal saw blade of any one of clauses VII to X, wherein the blade head defines at least two tines, at least two of the plurality of teeth extending each of the at least two tines; and
wherein each of the at least two tines are separated by an opening, the opening configured to open into the void.

XII. The surgical sagittal saw blade of any one of clauses I to XI, wherein the blade head comprises a top surface and a bottom surface;
wherein at least one of the top surface or the bottom surface defines a recess, the recess located proximal to the plurality of teeth of the blade head and configured to assist with evacuation of biological material removed by the plurality of teeth when the planar blade body is oscillated from side-to-side by the surgical saw.

XIII. The surgical sagittal saw blade of clause XII, wherein the planar blade body comprises a longitudinal axis extending from the proximal portion to the distal portion of the planar blade body; and
wherein the recess comprises a lateral axis extending along a width of the recess, the recess is oriented such that the lateral axis of the recess is generally perpendicular to the longitudinal axis of the planar blade body.

XIV. The surgical sagittal saw blade of clause XII or XIII, wherein a proximal end of the beveled portion of the top surface or bottom surface of each of the plurality of teeth is configured to open into the recess on the respective top surface or bottom surface of the blade head such that biological material removed by the plurality of teeth may move proximally along the beveled portion of the top surface or bottom surface and into the recess.

XV. The surgical sagittal saw blade of any one of clauses I to XIV, wherein the beveled portion of the top or the bottom surface of the each of the plurality of teeth comprise a first beveled portion to a proximal portion of the top or the bottom surface of each of the plurality of teeth and a second beveled portion to a distal portion of the top or the bottom surface each of the plurality of teeth.

XVI. The surgical sagittal saw blade of clause XV, wherein the first beveled portion to the proximal portion of the top or the bottom surface of each of the plurality of teeth is at a first angle relative to the unbeveled portion of top or the bottom surface of the adjacent tooth and the second beveled portion to a distal portion of the top or the bottom surface each of the plurality of teeth is at a second angle relative to the unbeveled portion of top or the bottom surface of the adjacent tooth; and
wherein the second angle is greater than the first angle, and the second angle is configured to define a V-shaped side profile at a distal end of the plurality of teeth of the blade head.

XVII. The surgical sagittal saw blade of any one of clauses I to XVI, further comprising an indicia disposed on the distal portion and/or the intermediate portion of the planar blade body relative to the blade head such that the indicia is configured to indicate a distance between the distal end of the blade head and the location of the indicia on the planar blade body; and
wherein the indicia is shaped to allow for visibility of the indicia by the user while the planar blade body is oscillated.

XVIII. The surgical saw blade of clause XVII, wherein the indicia comprises one of a solid line or a dashed line arranged in an arched shape such the arch of the solid or dashed line is concentric to the axis of rotation when the planar blade body is oscillated.

XIX. A surgical sagittal saw blade for use with a surgical saw, the surgical sagittal saw blade comprising:
a planar blade body including a proximal portion, an intermediate portion, and a distal portion, the proximal and distal portions extending from opposed ends of the intermediate portion;
a geometric feature defined by the proximal portion of the planar blade body, the geometric feature configured for mounting the planar blade body to the surgical saw;
a blade head extending from a distal end of the distal portion of the planar blade body;
a plurality of teeth arranged adjacent to one another across a width of the distal end of the blade head; and
wherein the distal portion of the planar blade body comprises opposed side surfaces, each of the opposed side surfaces comprises a concave profile between the intermediate portion of the planar blade body and the blade head, the concave profile configured to define a void along the side surfaces of the distal portion of the planar blade body as the planar blade body is oscillated from side-to-side by the surgical saw; and
wherein at least a portion of each of the opposed side surfaces of the distal portion are beveled.

XX. The surgical sagittal saw blade of clause XIX, wherein the distal portion of the planar blade body defines an elongated circular-shaped void proximal to the plurality of teeth, the elongated circular-shaped void oriented such that a major axis of the elongated circular-shaped void is generally parallel to a longitudinal axis of the planar blade body.

XXI. The surgical sagittal saw blade of clause XIX, wherein the distal portion of the planar blade body defines an oblong-shaped void proximal to the plurality of teeth, the oblong-shaped void oriented such that a major axis of the oblong-shaped void is generally parallel to a longitudinal axis of the planar blade body.

XXII. The surgical sagittal saw blade of clause XIX, wherein the distal portion of the planar blade body defines an oval-shaped void proximal to the plurality of teeth, the oval-shaped void oriented such that a major axis of the oval-shaped void is generally parallel to a longitudinal axis of the planar blade body.

XXIII. The surgical sagittal saw blade of any one of clauses XIX to XXII, wherein the blade head defines at least two tines, at least two of the plurality of teeth extending each of the at least two tines; and wherein each of the at least two tines are separated by an opening, the opening configured to open into the void.

XXIV. The surgical sagittal saw blade of any one of clauses XX to XXIII, further comprising a recess defined in at least one of a top surface or a bottom surface of the blade head, the recess proximal to the plurality of teeth;

wherein a first dimension of the major axis of the void is equal to or less than a width dimension of the recess measured from a proximal edge to a distal edge of the recess.

XXV. The surgical sagittal saw blade of any one of clauses XIX to XXIV, further comprising an indicia disposed on the distal portion and/or the intermediate portion of the planar blade body relative to the blade head such that the indicia is configured to indicate a distance between the distal end of the blade head and the location of the indicia on the planar blade body; and wherein the indicia is shaped to allow for visibility of the indicia by the user while the planar blade body is oscillated.

XXVI. The surgical saw blade of clause XXV, wherein the indicia comprises one of a solid line or a dashed line arranged in an arched shape such the arch of the solid or dashed line is concentric to the axis of rotation when the planar blade body is oscillated.

XXVII. A surgical sagittal saw blade for use with a surgical saw, the surgical sagittal saw blade comprising:

a planar blade body including a proximal portion, an intermediate portion, and a distal portion, the proximal and distal portions extending from opposed ends of the intermediate portion;

a geometric feature defined by the proximal portion of the planar blade body, the geometric feature configured for mounting the planar blade body to the surgical saw;

a blade head extending from a distal end of the distal portion of the planar blade body;

a plurality of teeth arranged adjacent to one another across a width of the distal end of the blade head; and wherein the distal portion of the planar blade body comprises opposed side surfaces, each of the opposed side surfaces comprises a concave profile between the intermediate portion of the planar blade body and the blade head, the concave profile configured to define a void along the side surfaces of the distal portion of the planar blade body as the planar blade body is oscillated from side-to-side by the surgical saw; and wherein at least a portion of each of the opposed side surfaces of the distal portion comprises a chamfer.

XXVIII. A surgical sagittal saw blade for use with a surgical saw, the surgical sagittal saw blade comprising:

a planar blade body including a proximal portion, an intermediate portion, and a distal portion, the proximal and distal portions extending from opposed ends of the intermediate portion;

a geometric feature defined by the proximal portion of the planar blade body, the geometric feature configured for mounting the planar blade body to the surgical saw;

a blade head extending from a distal end of the distal portion of the planar blade body;

a plurality of teeth arranged adjacent to one another across a width of the distal end of the blade head; and a recess defined in at least one of a top surface or a bottom surface of the blade head, the recess proximal to the plurality of teeth;

wherein the distal portion of the planar blade body comprises opposed side surfaces, each of the opposed side surfaces comprises a taper between the intermediate portion of the planar blade body and the blade head, the taper configured to reduce a width of the distal portion of the planar blade body moving distally from the intermediate portion toward the blade head to define a void along the side surfaces of the distal portion of the planar blade body as the planar blade body is oscillated from side-to-side by the surgical saw; and wherein the recess is configured to direct debris removed by the plurality of teeth to the void along the side surfaces of the distal portion of the planar blade body as the planar blade body is oscillated from side-to-side by the surgical saw.

XXIX. The surgical sagittal saw blade of clause XXVIII, wherein the distal portion of the planar blade body defines an elongated circular-shaped void, the elongated circular-shaped void oriented such that a major axis of the elongated circular-shaped void is generally parallel to a longitudinal axis of the planar blade body.

XXX. The surgical sagittal saw blade of clause XXVIII, wherein the distal portion of the planar blade body defines an oblong-shaped void, the oblong-shaped void oriented such that a major axis of the oblong-shaped void is generally parallel to a longitudinal axis of the planar blade body.

XXXI. The surgical sagittal saw blade of clause XXVIII, wherein the distal portion of the planar blade body defines an oval-shaped void, the oval-shaped void oriented such that a major axis of the oval-shaped void is generally parallel to a longitudinal axis of the planar blade body.

XXXII. The surgical sagittal saw blade of any one of clauses XXVIII to XXXI, wherein the blade head defines at least two tines, at least two of the plurality of teeth extending each of the at least two tines; and wherein each of the at least two tines are separated by an opening, the opening configured to open into the void.

XXXIII. The surgical sagittal saw blade of any one of clauses XXIX to XXXII, wherein a first dimension of the major axis of the void is equal to or less than a width dimension of the recess measured from a proximal edge to a distal edge of the of the recess.

XXXIV. The surgical sagittal saw blade of any one of clauses XXVIII to XXXII, wherein the recess comprises a proximal edge and a distal edge, the distal edge of the recess being spaced at least five millimeters (5 mm) from a distal most tip of the plurality of teeth.

XXXV. The surgical sagittal saw blade of clause XXXIV, wherein the recess comprises a proximal edge and a distal edge, the distal edge of the recess being spaced at least 12 millimeters (12 mm) from a distal most tip of the plurality of teeth.

XXXVI. The surgical sagittal saw blade of clause XXXV, wherein the recess comprises a proximal edge and a distal edge, the distal edge of the recess being spaced at least 15 millimeters (15 mm) from a distal most tip of the plurality of teeth.

XXXVII. The surgical sagittal saw blade of any one of clauses XXVIII to XXXVI, wherein the taper between the intermediate portion of the planar blade body and the blade head extends to a distal edge of the recess.

XXXVIII. The surgical sagittal saw blade of any one of clauses XXVIII to XXXVI, wherein the taper between the intermediate portion of the planar blade body and the blade head extends to a proximal end of the plurality of teeth.

XXXIX. The surgical sagittal saw blade of any one of clauses XXVIII to XXXVI, wherein the taper between the intermediate portion of the planar blade body and the blade head extends to the distal end of the blade head from which the plurality of teeth extend from.

XL. The surgical sagittal saw blade of any one of clauses XXVIII to XXXVI, wherein the taper between the intermediate portion of the planar blade body and the blade head extends to at least a distal edge of the recess.

XLI. The surgical sagittal saw blade of any one of clauses XXVIII to XXXVI, wherein the taper between the intermediate portion of the planar blade body and the blade head extends to at least a proximal edge of the recess.

XLII. The surgical sagittal saw blade of any one of clauses XXVIII to XLI, further comprising an indicia disposed on the distal portion and/or the intermediate portion of the planar blade body relative to the blade head such that the indicia is configured to indicate a distance between the distal end of the blade head and the location of the indicia on the planar blade body; and wherein the indicia is shaped to allow for visibility of the indicia by the user while the planar blade body is oscillated.

XLIII. The surgical saw blade of clause XLII, wherein the indicia comprises one of a solid line or a dashed line arranged in an arched shape such the arch of the solid or dashed line is concentric to the axis of rotation when the planar blade body is oscillated.

XLIV. A surgical sagittal saw blade for use with a surgical saw, the surgical sagittal saw blade comprising:

a planar blade body including a proximal portion, an intermediate portion, and a distal portion, the proximal and distal portions extending from opposed ends of the intermediate portion;

a longitudinal axis extending between the proximal and distal portions of the planar blade body;

a geometric feature defined by the proximal portion of the planar blade body, the geometric feature configured for mounting the planar blade body to the surgical saw;

a blade head extending from a distal end of the distal portion of the planar blade body;

a plurality of teeth arranged adjacent to one another across a width of the distal end of the blade head;

a recess defined in at least one of a top surface or a bottom surface of the blade head; and wherein the distal portion of the planar blade body comprises opposed side surfaces, each of the opposed side surfaces is tapered inward toward the longitudinal axis of the planar blade body moving from the intermediate portion of the planar blade body to a distal edge of the recess of the blade head, the taper configured to define a void along the side surfaces of the distal portion of the planar blade body as the planar blade body is oscillated from side-to-side by the surgical saw.

XLV. The surgical sagittal saw blade of clause XLIV, wherein the distal portion of the planar blade body defines an elongated circular-shaped void, the elongated circular-shaped void oriented such that a major axis of the elongated circular-shaped void is generally parallel to a longitudinal axis of the planar blade body.

XLVI. The surgical sagittal saw blade of clause XLIV, wherein the distal portion of the planar blade body defines an oblong-shaped void, the oblong-shaped void oriented such that a major axis of the oblong-shaped void is generally parallel to a longitudinal axis of the planar blade body.

XLVII. The surgical sagittal saw blade of clause XLIV, wherein the distal portion of the planar blade body defines an oval-shaped void, the oval-shaped void oriented such that a major axis of the oval-shaped void is generally parallel to a longitudinal axis of the planar blade body.

XLVIII. The surgical sagittal saw blade of any one of clauses XLIV to XLVII, wherein the blade head defines at least two tines, at least two of the plurality of teeth extending each of the at least two tines; and wherein each of the at least two tines are separated by an opening, the opening configured to open into the void.

XLIX. A surgical sagittal saw blade for use with a surgical saw, the surgical sagittal saw blade comprising:

a planar blade body including a proximal portion, an intermediate portion, and a distal portion, the proximal and distal portions extending from opposed ends of the intermediate portion;

a longitudinal axis extending between the proximal and distal portions of the planar blade body;

a geometric feature defined by the proximal portion of the planar blade body, the geometric feature configured for mounting the planar blade body to the surgical saw;

a blade head extending from a distal end of the distal portion of the planar blade body;

a plurality of teeth arranged adjacent to one another across a width of the distal end of the blade head; and wherein the intermediate portion of the planar blade body comprises opposed side surfaces, each of the opposed side surfaces of the intermediate portion is tapered inward toward the longitudinal axis of the planar blade body moving from the proximal portion of the planar blade body to the distal portion of the planar blade body, wherein the distal portion of the planar blade body comprises opposed side surfaces, each of the opposed side surfaces of the distal portion comprises a concave profile; and wherein the combination of the concave shape of the opposed side surfaces of the distal portion and the taper of the opposed side surfaces of the intermediate portion are configured to reduce the lateral profile of the planar blade body when it is oscillated from side-to-side by the surgical saw.

L. The surgical sagittal saw blade of clause XLIX, wherein at least one of the opposed side surfaces of the intermediate portion or the opposed side surfaces of the distal portion further comprises a chamfer at least a portion of the length of the respective side surfaces.

LI. The surgical sagittal saw blade of clause XLIX, wherein the taper along the opposed side surfaces of the intermediate portion of the planar blade body is such that the distal end of the intermediate portion of the planar blade body will not cross beyond a lateral boundary defined on either side of the planar blade body;

wherein the lateral boundary on the either side of the planar blade body are generally parallel to the longitudinal axis of the planar blade body and the distance of the lateral boundary from the longitudinal axis is defined by an outermost point of the side surface of a proximal end of the intermediate portion of the planar blade body when the planar blade body is oscillated from side-to-side by the surgical saw.

LII. The surgical sagittal saw blade of any one of clauses XLIX to LI, further comprising an indicia disposed on the distal portion and/or the intermediate portion of the planar blade body relative to the blade head such that the indicia is configured to indicate a distance between the distal end of the blade head and the location of the indicia on the planar blade body; and
wherein the indicia is shaped to allow for visibility of the indicia by the user while the planar blade body is oscillated.

LIII. The surgical saw blade of clause LII, wherein the indicia comprises one of a solid line or a dashed line arranged in an arched shape such the arch of the solid or dashed line is concentric to the axis of rotation when the planar blade body is oscillated.

LIV. A surgical sagittal saw blade for use with a surgical saw, the surgical sagittal saw blade comprising:
a planar blade body including a proximal portion, an intermediate portion, and a distal portion, the proximal and distal portions extending from opposed ends of the intermediate portion;
a longitudinal axis extending between the proximal and distal portions of the planar blade body;
a geometric feature defined by the proximal portion of the planar blade body, the geometric feature configured for mounting the planar blade body to the surgical saw;
a blade head extending from a distal end of the distal portion of the planar blade body;
a plurality of teeth arranged adjacent to one another across at least a portion of a width of the distal end of the blade head; and
wherein the intermediate portion of the planar blade body comprises opposed side surfaces, each of the opposed side surfaces is tapered inward toward the longitudinal axis of the planar blade body moving from the proximal portion of the planar blade body to the distal portion of the planar blade body, the taper configured such that the side surfaces of the intermediate portion of the planar blade body never extend beyond a kerf width defined by the blade head when the planar blade body is oscillated from side-to-side by the surgical saw; and
wherein at least a portion of each of the opposed side surfaces of the intermediate portion comprises a chamfer.

LV. A surgical sagittal saw blade for use with a surgical saw, the surgical sagittal saw blade comprising:
a planar blade body including a proximal portion, an intermediate portion, and a distal portion, the proximal and distal portions extending from opposed ends of the intermediate portion;
a longitudinal axis extending between the proximal and distal portions of the planar blade body;
a geometric feature defined by the proximal portion of the planar blade body, the geometric feature configured for mounting the planar blade body to the surgical saw;
a blade head extending from a distal end of the distal portion of the planar blade body;
a plurality of teeth arranged adjacent to one another across a width of the distal end of the blade head; and
wherein the intermediate portion of the planar blade body comprises opposed side surfaces, each of the opposed side surfaces is tapered inward toward the longitudinal axis of the planar blade body moving from the proximal portion of the planar blade body to the distal portion of the planar blade body, the taper configured such that the side surfaces of the intermediate portion of the planar blade body never extend beyond a kerf width defined by the blade head when the planar blade body is oscillated from side-to-side by the surgical saw; and
wherein at least a portion of each of the opposed side surfaces of the intermediate portion comprises a radius extending between a top surface and a bottom surface of the planar blade body.

LVI. A surgical sagittal saw blade for use with a surgical saw, the surgical sagittal saw blade comprising:
a planar blade body including a proximal portion, an intermediate portion, and a distal portion, the proximal and distal portions extending from opposed ends of the intermediate portion;
a geometric feature defined by the proximal portion is configured for mounting the planar blade body to the surgical saw;
a blade head extending from a distal end of the distal portion of the planar blade body, the blade head comprising:
a plurality of teeth arranged adjacent to one another, each of the plurality of teeth having a top surface and an opposed bottom surface;
a recess defined in at least one of a top surface or a bottom surface of the blade head;
wherein one of the top surface or the bottom surface of each of the plurality of teeth is beveled portion; and
wherein a proximal end of the beveling on the top surface or bottom surface of each of the plurality of teeth is configured to extend proximally into the recess on the respective top surface or bottom surface of the blade head such that biological material removed by the plurality of teeth may move proximally along the beveled portion of the top surface or the bottom surface of each of the plurality of teeth and into the recess defined in the respective top surface or the bottom surface of the blade head.

LVII. The surgical sagittal saw blade of clause LVI, wherein the planar blade body comprises a longitudinal axis extending from the proximal portion to the distal portion of the planar blade body; and
wherein the recess comprises a lateral axis extending along a width of the recess, the recess is oriented such that the lateral axis of the recess is generally perpendicular to the longitudinal axis of the planar blade body.

LVIII. The surgical sagittal saw blade of clause LVI or LVII, wherein the blade head further defines a void proximal to the plurality of teeth, the recess configured to open to the void such biological tissue removed by the plurality of teeth may move from the recess to the void or from the void across a surface of the recess to be expelled at an outer edge of the planar blade body.

LIX. The surgical sagittal saw blade of clause LVIII, wherein the void comprises an elongated circular-shape, the void being oriented such that a major axis of the void is generally parallel to a longitudinal axis of the planar blade body.

LX. The surgical sagittal saw blade of clause LVIII, wherein the void comprises an oblong-shape, the void being oriented such that a major axis of the void is generally parallel to a longitudinal axis of the planar blade body.

LXI. The surgical sagittal saw blade of clause LVIII, wherein the distal portion of the planar blade body defines an oval-shaped void, the oval-shaped void oriented such that a major axis of the oval-shaped void is generally parallel to a longitudinal axis of the planar blade body.

LXII. The surgical sagittal saw blade of any one of clauses LVIII to LXI, wherein the blade head defines at least two tines separated by the void, at least two of the plurality of teeth extending from each of the at least two tines.

LXIII. The surgical sagittal saw blade of any one of clauses LVIII to LXII, further comprising an indicia disposed on the distal portion and/or the intermediate portion of the planar blade body relative to the blade head such that the indicia is configured to indicate a distance between the distal end of the blade head and the location of the indicia on the planar blade body; and wherein the indicia is shaped to allow for visibility of the indicia by the user while the planar blade body is oscillated.

LXIV. The surgical saw blade of clause LXIII, wherein the indicia comprises one of a solid line or a dashed line arranged in an arched shape such that the arch of the solid or dashed line is concentric to the axis of rotation when the planar blade body is oscillated.

LXV. The surgical sagittal saw blade of any one of clauses LVI to LXIV, wherein the beveling to the top surface results in the top surface tapering downward toward the bottom surface moving distally along the blade head, and the beveling to the bottom surface results in the bottom surface tapering upward toward the top surface moving distally along the blade head.

LXVI. A surgical sagittal saw blade for use with a surgical saw, the surgical sagittal saw blade comprising:

a planar blade body including a proximal portion, an intermediate portion, and a distal portion, the proximal and distal portions extending from opposed ends of the intermediate portion;

a geometric feature defined by the proximal portion is configured for mounting the planar blade body to the surgical saw;

a blade head extending from a distal end of the distal portion of the planar blade body, the blade head comprising:

a plurality of teeth arranged adjacent to one another, each of the plurality of teeth having a top surface and an opposed bottom surface;

wherein two adjacent teeth each comprise a beveled portion, the beveling be alternatingly applied to the top surface and the bottom surface of the two adjacent teeth; and wherein the beveled portion of one of the top or bottom surface of one of the two adjacent teeth defines a cutting edge where the beveled portion meets an unbeveled portion of the top or bottom surface of the adjacent tooth, the cutting edge extending distally from a distal end of the adjacent tooth with the unbeveled portion of the top or bottom surface.

LXVII. The surgical sagittal saw blade of clause LXVI, wherein the cutting edge of the adjacent tooth with the unbeveled portion of the top or bottom surface comprises a first cutting edge and a second cutting edge, the first and second cutting edges on opposed sides of the unbeveled portion of the top or bottom surface.

LXVIII. The surgical sagittal saw blade of clause LXVI or LXVII, wherein the cutting edge is configured to act as a rasp when the planar blade body is oscillated from side-to-side by the surgical saw.

LXIX. The surgical sagittal saw blade of any one of clauses LXVI to LXVIII, wherein the cutting edge is configured to remove biological material in the direction perpendicular to a top surface or a bottom surface of the planar blade body when the planar blade body is oscillated from side-to-side by the surgical saw.

LXX. The surgical sagittal saw blade of any one of clauses LXVI to LXIX, wherein the beveling to the top surface results in the top surface tapering downward toward the bottom surface moving distally along the blade head, and the beveling to the bottom surface results in the bottom surface tapering upward toward the top surface moving distally along the blade head.

LXXI. A method of manufacturing a saw blade for use with a sagittal surgical saw, the saw blade comprising a planar blade body having opposed proximal and distal ends, the distal end defining a blade head with a plurality of teeth arranged adjacent to one another across a width of the blade head, the method comprising:

beveling one of a top surface or a bottom surface of each of the plurality of teeth such that the beveling is alternatingly applied to the top and the bottom surfaces of the adjacent teeth of each of the plurality of teeth to define a V-shaped side profile across a width of a distal end of the blade head.

LXXII. The method of clause LXXI, wherein the beveling is applied to one of the top surface or the bottom surface of each of the plurality of teeth on the respective surface in a single grinding pass.

LXXIII. The method of clause LXXI or LXXII, further comprising the step of defining a recess in at least one of a top surface or a bottom surface the blade head proximal to the plurality of teeth, the recess extending laterally across the top surface or the bottom surface the blade head perpendicular to a longitudinal axis of the planar blade body; and wherein the beveling is alternatingly applied to the top and the bottom surfaces of the adjacent teeth of each of the plurality of teeth extends into the recess.

LXXIV. The method of any one of clauses LXXI to LXXIII, wherein the beveling to the top surface of the plurality of teeth is accomplished by passing a grinder in a first pass over the top surface; and wherein the beveling to the bottom surface of the plurality of teeth is accomplished by passing the grinder in a second pass over the bottom surface.

LXXV. The method of clause LXXI, wherein the applying the beveling to the top surface or the bottom surface of each of the plurality of teeth comprises grinding the top surface or the bottom surface of each of the respective plurality of teeth.

LXXVI. The method of any one of clauses LXXI or LXXV, wherein the depth of the beveling to the top surface or the bottom surface of each of the plurality of teeth increases in depth moving distally along each of the top or the bottom surfaces of each of the plurality of teeth.

LXXVII. The method of any one of clauses LXXI to LXXVI, further comprising the step of marking a point on a top surface or a bottom surface of the planar blade body with an indicia, the indicia configured to indicate a distance between the distal end of the blade head and the location of the indicia on the planar blade body; and wherein the indicia is shaped to allow for visibility of the indicia by the user while the planar blade body is oscillated.

LXXVIII. The surgical sagittal saw blade of any one of clauses LXXI to LXXVII, wherein the beveling to the top surface results in the top surface tapering downward toward the bottom surface moving distally along the blade head, and the beveling to the bottom surface results in the bottom surface tapering upward toward the top surface moving distally along the blade head.

LXXIX. A surgical sagittal saw blade for use with a surgical saw, the surgical sagittal saw blade comprising:
a planar blade body including a proximal portion, an intermediate portion, and a distal portion, the proximal and distal portions extending from opposed ends of the intermediate portion;
a longitudinal axis extending between the proximal and distal portions of the planar blade body, the longitudinal axis bisecting the planar blade body;
a geometric feature defined by the proximal portion of the planar blade body, the geometric feature configured for mounting the planar blade body to the surgical saw;
a blade head extending from a distal end of the distal portion of the planar blade body;
a plurality of inner teeth that extend distally a first distance from the blade head and are positioned proximate the longitudinal axis; and
one or more outer teeth that extend distally a second distance from the blade head on either side of the inner teeth;
wherein the second distance is greater than the first distance such that the outer teeth move along a first arc and the inner teeth move along a second arc when the planar blade body is oscillated from side-to-side by the surgical saw; and
wherein the combination of the first and second arc define a recess in the cut profile of the blade head when the planar blade body is oscillated from side-to-side by the surgical saw.

LXXX. A surgical sagittal saw blade for use with a surgical saw, the surgical sagittal saw blade comprising:
a planar blade body including a proximal portion, an intermediate portion, and a distal portion, the proximal and distal portions extending from opposed ends of the intermediate portion;
a longitudinal axis extending between the proximal and distal portions of the planar blade body, the longitudinal axis bisecting the planar blade body;
a geometric feature defined by the proximal portion of the planar blade body, the geometric feature configured for mounting the planar blade body to the surgical saw;
a blade head extending from a distal end of the distal portion of the planar blade body;
a plurality of teeth arranged adjacent one other across a width of the blade head; and
wherein a distance that each of the plurality of teeth extend distally from the blade head increase respective to the distance a tooth of the plurality of teeth is located from the longitudinal axis.

LXXXI. The surgical sagittal saw blade of clause LXXX, wherein a distal tip of each of the teeth of the plurality of teeth define a concave profile of a distal end of the blade head.

LXXXII. A surgical sagittal saw blade for use with a surgical saw, the surgical sagittal saw blade comprising:
a planar blade body including a proximal portion, an intermediate portion, and a distal portion, the proximal and distal portions extending from opposed ends of the intermediate portion;
wherein the proximal portion defines a geometric feature configured for mounting the planar blade body to the surgical saw, the geometric feature including at least one aperture;
a blade head extending from a distal end of the distal portion of the planar blade body, the blade head comprising a plurality of teeth arranged adjacent to one another; and
wherein the distal portion of the planar blade body comprises a top surface, a bottom surface, and a pair of opposed side surfaces extending between the top and bottom surfaces; and
wherein the pair of opposed side surfaces taper inward toward a longitudinal axis that bisects the planar blade body;
wherein at least a portion of each of the side surfaces of the distal portion comprises a chamfer where the side surfaces intersects with either the top or bottom surfaces.

LXXXIII. The surgical sagittal saw blade of the clause LXXXII, wherein at least a portion of each of the side surfaces of the distal portion comprises a chamfer where the side surfaces intersects with both the top and bottom surfaces.

LXXXIV. The surgical sagittal saw blade of clauses LXXXII, wherein the taper of the side surfaces of the distal portion defines biconcave shape of the top surface and the bottom surface of the distal portion of the planar blade body.

LXXXV. The surgical sagittal saw blade of clauses LXXXII or LXXXIV, wherein at least one of the pair of opposed side surfaces of the distal portion of the planar blade body defines a chamfer where the at least one of the pair of opposed side surfaces meets one of the top surface or the bottom surface.

LXXXVI. A surgical sagittal saw blade for use with a surgical saw, the surgical sagittal saw blade comprising:
a planar blade body including a proximal portion, an intermediate portion, and a distal portion, the proximal and distal portions extending from opposed ends of the intermediate portion;
a blade head extending from a distal end of the distal portion of the planar blade body, the blade head comprising a plurality of teeth arranged adjacent to one another;
wherein the proximal portion defines a geometric feature configured for mounting the planar blade body to the surgical saw;
wherein the planar blade body comprises a top surface, bottom surface, and a pair of opposed side surfaces extending between the top surface and the bottom surface; and
wherein at least one of the pair of opposed side surfaces of the distal portion of the planar blade body defines a chamfer where the at least one of the pair of opposed side surfaces meets one of the top surface or the bottom surface.

LXXXVII. The surgical sagittal saw blade of clause LXXXVI, wherein each of the pair of opposed side surfaces of the distal portion of the planar blade body defines a chamfer where each of the pair of opposed side surfaces meets the top surface and meets the bottom surface.

LXXXVIII. The surgical sagittal saw blade of clause LXXXVI or LXXXVII, wherein at least one of the pair of opposed side surfaces of the distal portion of the planar blade body define a concave taper between the proximal portion and the distal portion of the planar blade body, LXXXIX. The surgical sagittal saw blade of clauses LXXXVIII, wherein the concave taper configured to define a void along the side surfaces of the distal portion of the planar blade body as the planar blade body is oscillated from side-to-side by the surgical saw.

XC. The surgical sagittal saw blade of clause LXXXVIII, wherein each of the pair of opposed side surfaces of the distal portion of the planar blade body comprises a concave taper.

XCI. The surgical sagittal saw blade of any one of clauses LXXXVIII to XC, wherein the blade head extending from a distal end of the distal portion of the planar blade body is narrower than the widest part of the proximal portion of the planar blade body.

XCII. The surgical sagittal saw blade of any one of clauses LXXXVI to XCI, wherein the blade head defines at least two tines separated by an opening and at least two of the plurality of teeth extend from each of the at least two tines; and
wherein one of the plurality of teeth that is distal to the opening extends a first distance from the distal end of the distal portion of the planar blade body and one of the plurality of teeth that is proximal to the opening extends a second distance from the distal end of the distal portion of the planar blade body such that the first distance is greater than the second distance.

XCIII. A surgical sagittal saw blade for use with a surgical saw, the surgical sagittal saw blade comprising:
a planar blade body including a proximal portion, an intermediate portion, and a distal portion, the proximal and distal portions extending from opposed ends of the intermediate portion;
a blade head extending from a distal end of the distal portion of the planar blade body, the blade head comprising a plurality of teeth arranged adjacent to one another;
wherein the proximal portion defines a geometric feature configured for mounting the planar blade body to the surgical saw;
wherein the planar blade body comprises a top surface, bottom surface, and a pair of opposed side surfaces extending between the top surface and the bottom surface; and
wherein at least one of the pair of opposed side surfaces of the distal portion of the planar blade body defines a radius between the top and bottom surfaces.

XCIV. A surgical sagittal saw blade for use with a surgical saw, the surgical sagittal saw blade comprising:
a planar blade body including a proximal portion, an intermediate portion, and a distal portion, the proximal and distal portions extending from opposed ends of the intermediate portion;
a blade head extending from a distal end of the distal portion of the planar blade body, the blade head comprising a plurality of teeth arranged adjacent to one another;
wherein the proximal portion defines a geometric feature configured for mounting the planar blade body to the surgical saw;
wherein the planar blade body comprises a top surface, bottom surface, and a pair of opposed side surfaces extending between the top and bottom surfaces; and
wherein each of the pair of opposed side surfaces of the intermediate portion and the distal portion of the planar blade body defines a chamfer where each of the pair of opposed side surfaces meets one of the top or bottom surfaces.

XCV. The surgical sagittal saw blade of clauses XCIV, wherein each of the pair of opposed side surfaces of the distal portion of the planar blade body defines a chamfer along an edge where each of the pair of opposed side surfaces meets the top surface and meets the bottom surface.

XCVI. The surgical sagittal saw blade of clauses XCIV or XCV, wherein the chamfer along the edge where each of the pair of opposed side surfaces meets one of the top or bottom surfaces is configured to reduce the sharpness of the edge and prevent damage to the surrounding tissue by the edge.

XCVII. A surgical sagittal saw blade for use with a surgical saw, the surgical sagittal saw blade comprising:
a planar blade body including a proximal portion, an intermediate portion, and a distal portion, the proximal and distal portions extending from opposed ends of the intermediate portion;
wherein the proximal portion defines a geometric feature configured for mounting the planar blade body to the surgical saw, the geometric feature including at least one aperture;
a blade head extending from a distal end of the distal portion of the planar blade body, the blade head comprising at least three teeth extending distally from the blade head on each side of a longitudinal axis of the planar blade body, the at least three teeth arranged adjacent to one another; and
wherein the distal portion of the planar blade body comprises a top surface, a bottom surface, and a pair of opposed side surfaces extending between the top and bottom surfaces; and
wherein the pair of opposed side surfaces taper inward toward a longitudinal axis that bisects the planar blade body such that that the top and the bottom surfaces of the distal portion of the planar blade body comprises a biconcave profile; and
wherein one of the at least three teeth that is most distal to the longitudinal axis of the planar blade body extends a first distance from the distal end of the distal portion of the planar blade body, one of the at least three teeth that is most proximal to the longitudinal axis of the planar blade body extends a second distance from the distal end of the distal portion of the planar blade body, and one of the at least three teeth that is between the most proximal to the longitudinal axis and the most distal to the longitudinal axis extends a third distance from the distal end of the distal portion of the planar blade body; and
wherein the third distance is greater than the second distance but less than the first distance.

XCVIII. A surgical sagittal saw blade for use with a surgical saw, the surgical sagittal saw blade comprising:

a planar blade body including a proximal portion, an intermediate portion, and a distal portion, the proximal and distal portions extending from opposed ends of the intermediate portion;
wherein the proximal portion defines a geometric feature configured for mounting the planar blade body to the surgical saw, the geometric feature including at least one aperture;
a blade head extending from a distal end of the distal portion of the planar blade body, the blade head comprising opposed outer edges with at a first outer tooth positioned proximate each of the opposed outer edges of the blade head and a second outer tooth positioned adjacent to the first outer tooth and more proximate to a longitudinal axis of the planar blade body;
wherein each of the first and second outer teeth comprise a pair of distal tips separated by a V-shaped groove, the distal tip terminating at a point; and
wherein the first outer tooth extends a first distance from the distal end of the distal portion of the planar blade body and the second outer tooth extends a second distance from the distal end of the distal portion of the planar blade body;
wherein the first distance is greater than the second distance such that the first outer tooth and the second outer tooth travel along the same arc as the planar blade body is oscillated.

XCIX. The surgical sagittal saw blade of clause XCVIII, wherein the first outer tooth and the second outer tooth have a concave arc profile when the surgical sagittal saw blade is stationary.

C. The surgical sagittal saw blade of clause XCVIII or 99XCIX wherein the first outer tooth is on distal arc relative to second outer tooth when the surgical sagittal saw blade is oscillated.

CI. A surgical sagittal saw blade for use with a surgical saw, the surgical sagittal saw blade comprising:
a planar blade body including a proximal portion, an intermediate portion, and a distal portion, the proximal and distal portions extending from opposed ends of the intermediate portion;
wherein the proximal portion defines a geometric feature configured for mounting the planar blade body to the surgical saw, the geometric feature including at least one aperture;
a blade head extending from a distal end of the distal portion of the planar blade body, the blade head defining at least two tines separated by an opening;
the at least two tines comprising at least two teeth extending from each of the at least two tines;
wherein the blade head further defines an elongated aperture having a major axis that is generally parallel to a longitudinal axis of the planar blade body, the opening disposed at a distal end of the elongate aperture; and
wherein one of the at least two teeth that is distal to the opening extends a first distance from the distal end of the distal portion of the planar blade body and one of the at least two teeth that is proximal to the opening extends a second distance from the distal end of the distal portion of the planar blade body such that the first distance is greater than the second distance.

CII. The surgical sagittal saw blade of clause CI, wherein one of a top surface or a bottom surface of the planar blade body of each of the at least two teeth extending from each of the at least two tines is beveled;
wherein the beveling is alternatingly applied to the opposite of the top or the bottom surface of the adjacent teeth of each of the at least two teeth extending from each of the at least two tines.

CIII. A surgical sagittal saw blade for use with a surgical saw, the surgical sagittal saw blade comprising:
a planar blade body including a proximal portion, an intermediate portion, and a distal portion, the proximal and distal portions extending from opposed ends of the intermediate portion;
a blade head extending from a distal end of the distal portion of the planar blade body, the blade head defining at least two tines separated by and opening;
at least three teeth extending distally from each of the at least two tines;
wherein one of the at least three teeth that is most distal to the opening extends a first distance from the distal end of the distal portion of the planar blade body, one of the at least three teeth that is most proximal to the opening extends a second distance from the distal end of the distal portion of the planar blade body, and one of the at least three teeth that is between the most proximal to the opening and the most distal to the opening extends a third distance from the distal end of the distal portion of the planar blade body; and
wherein the third distance is greater than the second distance and less than the first distance.

CIV. The surgical sagittal saw blade of clause CIII, wherein each of the at least three teeth having a top surface and an opposed bottom surface;
wherein one of the top surfaces or the bottom surface of each of the at least three teeth is beveled; and
wherein the beveling is alternatingly applied to the opposite of the top or the bottom surface of the adjacent teeth of each of the at least three teeth.

CV. A method of manufacturing a saw blade for use with a sagittal surgical saw, the method comprising:
laser cutting a planar blade body having opposed proximal and distal ends, the distal end defining a blade head with a plurality of teeth arranged adjacent to one another across a width the blade head; and
grinding a distal end of at least one of the plurality of the teeth with a grinding device that is oriented at an angle relative to a top surface or a bottom surface of the planar blade body, the angle corresponding to a rake angle of the at least one of the plurality of the teeth.

CVI. The method of clause CV, further comprising the step of alternating the angle of the grinding device for each adjacent tooth of the plurality of teeth.

CVII. The method of clause CV or CVI, wherein the grinding device is shaped to define a V-shaped notch in the distal end of the at least one of the plurality of the teeth; and
wherein grinding the distal end of at least one of the plurality of the teeth defines a V-shaped tooth having two cutting edges, each of the cutting edges extending the entire width of the tooth.

CVIII. The method of any one of clauses CV to CVII, further comprising the step of beveling one of the top surface or the bottom surface of each of the plurality of teeth such that the beveling is alternatingly applied to the top and the bottom surfaces of the adjacent teeth of each of the plurality of teeth to define a V-shaped side profile across a width of a distal end of the blade head.

CIX. A surgical sagittal saw blade for use with a surgical saw, the surgical sagittal saw blade comprising:

a planar blade body including a proximal portion, an intermediate portion, and a distal portion, the proximal and distal portions extending from opposed ends of the intermediate portion;

wherein the proximal portion defines a geometric feature configured for mounting the planar blade body to the surgical saw, the geometric feature including at least one aperture;

a blade head extending from a distal end of the distal portion of the planar blade body, the blade head defining at least two tines separated by and opening that opens to an elongated aperture, the elongate aperture having a major axis generally parallel to a longitudinal axis of the planar blade body;

the at least two tines comprising at least two teeth extending from each of the at least two tines, wherein one of a top surface or a bottom surface of each of the at least two teeth extending from each of the at least two tines is beveled;

wherein the beveling is alternatingly applied to the opposite of the top or the bottom surface of the adjacent teeth of each of the at least two teeth extending from each of the at least two tines; and wherein one of the at least two teeth that is distal to the opening extends a first distance from the distal end of the distal portion of the planar blade body and one of the at least two teeth that is proximal to the opening extends a second distance from the distal end of the distal portion of the planar blade body such that the first distance is greater than the second distance.

CX. A surgical sagittal saw blade for use with a surgical saw including a blade mount, the surgical sagittal saw blade comprising:

a planar blade body including a proximal portion, an intermediate portion, and a distal portion, the proximal and distal portions extending from opposed ends of the intermediate portion;

a blade head extending from a distal end of the distal portion of the planar blade body, the blade head comprising a plurality of teeth arranged adjacent to one another;

an indicia disposed on a point on the distal portion and/or the intermediate portion of the planar blade body relative to the blade head such that the indicia is configured to indicate a distance to the point on the planar blade body relative to the blade head; and wherein the indicia is shaped to allow for visibility of the indicia by the user while the planar blade body is oscillated.

CXI. The surgical saw blade of clause CX, wherein the indicia comprises a line arranged in an arched shape such the arc of the line is concentric to the axis of rotation when the planar blade body is oscillated.

CXII. The surgical saw blade of clause CX, wherein the indicia comprises a plurality of dashes arranged in an arched shape such the arc of the dashes is concentric to the axis of rotation and the dashes appear to the user as a solid line when the planar blade body is oscillated.

CXIII. A surgical sagittal saw blade for use with a surgical saw, the surgical sagittal saw blade comprising:

a planar blade body including a proximal portion, an intermediate portion, and a distal portion, the proximal and distal portions extending from opposed ends of the intermediate portion;

wherein the proximal portion defines a geometric feature configured for mounting the planar blade body to the surgical saw, the geometric feature including at least one aperture;

a blade head extending from a distal end of the distal portion of the planar blade body, the blade head comprising at least three outer teeth, the three outer teeth including a first outer tooth positioned proximate an outer edge of the blade head, a second outer tooth positioned adjacent to the first outer tooth, and a third outer tooth position adjacent to the second outer tooth and more proximate to a longitudinal axis of the planar blade body;

wherein each of the first, second, and third outer teeth comprise a pair of distal tips separated by a V-shaped groove, the distal tip terminating at a point; and wherein the first outer tooth extends a first distance from the distal end of the distal portion of the planar blade body, the second outer tooth extends a second distance from the distal end of the distal portion of the planar blade body, and the third outer tooth extends a third distance from the distal end of the distal portion of the planar blade body;

wherein the second distance is greater than the third distance, and the first distance is greater than both of the second and the third distances.

CXIV. A surgical sagittal saw blade for use with a surgical saw, the surgical sagittal saw blade comprising:

a planar blade body including a proximal portion, an intermediate portion, and a distal portion, the proximal and distal portions extending from opposed ends of the intermediate portion;

a blade head extending from a distal end of the distal portion of the planar blade body, the blade head defining at least two tines separated by and opening;

a plurality of teeth extending distally from the blade head, with at least three of the plurality of teeth extending distally from each of the at least two tines;

a recess defined in at least one of a top surface or a bottom surface of the blade head, the recess proximal to the plurality of teeth;

an aperture defined in at least one of the two tines of the blade head, the aperture proximal to the plurality of teeth; and wherein the recess is configured to direct debris removed by the plurality of teeth toward a side surface of the distal portion of the planar blade body or toward the aperture as the planar blade body is oscillated from side-to-side by the surgical saw.

CXV. The surgical sagittal saw blade of clause CXIV, wherein the aperture is at least partially defined within the recess.

CXVI. The surgical sagittal saw blade of clause CXIV or CXV, wherein the blade head includes an aperture defined in each of the two tines.

CXVII. The surgical sagittal saw blade of clause CXIV or CXV, wherein the blade head includes a first aperture defined in a first of the two tines and a second aperture defined in a second of the two tines.

CXVIII. The surgical sagittal saw blade of any one of clauses CXIV to CXVII, wherein the aperture comprises one of an oblong, an elongated-circular, an ellipse, or an oval shape, the aperture being oriented such that a major axis is generally parallel to a longitudinal axis of the planar blade body.

CXIX. The surgical sagittal saw blade of clause CXVIII, wherein a dimension of the major axis of the aperture is equal to or less than a width dimension of the recess measured from a proximal edge to a distal edge of the recess.

CXX. A surgical saw blade (10) configured for oscillatory resection of bone, the saw blade (10) comprising:
a body (12) defining a longitudinal axis (1112), the body (12) having a mounting portion (16) and a distal portion (18) opposite the mounting portion (16), the distal portion (18) and the mounting portion (16) integral with one another such that oscillation of the mounting portion (16) results in oscillation of the distal portion (18), the distal portion (18) having a blade head (26), the mounting portion (16) defines a series of apertures including:
a first aperture (1014) shaped for receiving a biasing actuator (844); and
a second aperture (1016) including:
a second proximal end (1034) and a second distal end (1036) opposite the second proximal end (1034), wherein
the mounting portion (16) includes a peninsula portion (1060) extending away from the central aperture (1014) and configured for retaining the saw blade (10) in a saw blade (10) mount,
the peninsula portion (1060) is partially surrounded by the second aperture (1016), and
the peninsula portion (1060) defines an area less than an area defined by the second aperture (1016).

CXXI. The surgical saw blade (10) of clause CXX, the first aperture defines an arcuate central proximal end wall (1024) configured for biasing the surgical saw blade (10) in a direction towards the peninsula portion (1060).

CXXII. The surgical saw blade of clause CXXI, wherein the central proximal end wall further comprises a plurality of cut outs.

CXXIII. The saw blade (10) of clause CXX, wherein the mounting portion (16) further comprises
a proximal edge (1020);
a distal axis (1022) opposite the proximal edge (1020), the distal axis perpendicular to the longitudinal axis and positioned less than half a length of the saw blade from the proximal edge; and
two side edges (1062) extending between the distal axis (1022) and the proximal edge (1020), wherein the mounting portion (16) further comprises two stop protrusions (1064) extending outwardly from the two side edges (1062).

CXXIV. The saw blade (10) of clause CXXIII, wherein each of the two stop protrusions (1064) are positioned distal to the central aperture (1014).

CXXV. The surgical saw blade (10) of clause CXXIII, wherein each of the two side edges (1062) further comprise:
a first side region (1074); and
a second side region (1072) positioned proximal to the first side region (1074), the second side region (1072) including a first end and a second end, wherein the first end has a first end distance to the longitudinal axis (1112), the second end that is proximal to the first end has a second end distance to the longitudinal axis (1112), and the first end distance is greater than the second end distance.

CXXVI. The surgical saw blade (10) of clause CXX, wherein the mounting portion (16) is monoplanar.

CXXVII. The surgical saw blade (10) of clause CXX, wherein the rear aperture (1016) is positioned proximal to the central aperture (1014).

CXXVIII. The surgical saw blade (10) of clause CXX, wherein the peninsula portion (1050) comprises two side walls (1058) and an end wall (1054), the two side walls (1058) taper towards the longitudinal axis (1112) from the distal end (1036) to the end wall.

CXXIX. The surgical saw blade (10) of clause CXX, wherein the peninsula portion (1050) comprises two side walls (1058), the two side walls (1058) including a distal side wall end (1056) having a distal side wall end distance to the longitudinal axis (1112) and a proximal side wall end having a proximal side wall end distance to the longitudinal axis (1112), wherein the distal side wall distance is greater than the proximal side wall distance.

CXXX. The surgical saw blade (10) of clause CXX, wherein the peninsula portion (1050) comprises:
two side walls (1058), and
an accurate end wall extending between the two side walls (1054).

CXXXI. The surgical saw blade (10) of clause CXX, wherein the peninsula portion (1050) further includes a tab portion (1060) having a tab length extending in a proximal direction from the peninsula portion (1050), wherein
the tab length is less than a peninsula portion (1050) length.

CXXXII. The surgical saw blade (10) of clause CXXXI, wherein the tab portion (1060) is a semicylindrical shape.

CXXXIII. The surgical saw blade (10) of clause CXXVIII, wherein the series of apertures further includes a third aperture (1018) defined by:
a fore proximal wall (1038),
a fore distal wall (1040), and
two fore side walls (1042) extending between the fore proximal wall (1038) and the fore distal wall (1040), wherein the two fore side walls (1042) taper toward the longitudinal axis (1112) from the fore proximal wall (1038) to the fore distal wall (1040).

CXXXIV. The surgical saw blade (10) of clause CXX, wherein the series of apertures includes a third aperture including a fore distal wall (1040) having a fore distal wall (1040) end and a fore proximal wall (1038) having a fore proximal wall (1038) end, the fore distal wall (1040) end having a fore distal wall (1040) end distance to the longitudinal axis (1112), the fore proximal wall (1038) end having a fore proximal wall (1038) end distance to the longitudinal axis (1112), the fore distal wall (1040) end distance less than the fore proximal wall (1038) end distance.

CXXXV. The surgical saw blade (10) of clause CXXXIV, wherein the third aperture is positioned distal to the first aperture (1014).

CXXXVI. The surgical saw blade (10) of clause CXX, wherein the second aperture (1016) includes a second aperture length between the proximal end (1034) and the distal end (1036), wherein the peninsula portion (1050) has a peninsula length, the peninsula length less than 80 percent of the second aperture (1016) length.

CXXXVII. The surgical blade (10) of clause CXXXVI, wherein the peninsula length is less than 70 percent of the second aperture (1016) length.

CXXXVIII. The surgical blade (10) of clause CXX, wherein the second aperture (1016) is encircled by the mounting portion (16).

CXXXIX. A surgical saw blade (10) configured for oscillatory resection of bone, the saw blade (10) comprising:

a body (12) defining a longitudinal axis (1112), the body (12) having a mounting portion (16) and a distal portion (18) opposite the mounting portion (16), the distal portion (18) and the mounting portion (16) integral with one another such that oscillation of the mounting portion (16) results in oscillation of the distal portion (18), the mounting portion (16) defines a series of apertures including:

a rear aperture (1016); and a fore aperture distal to the rear aperture (1016), the fore aperture shaped to retain the saw blade (10) during actuation, wherein the rear and fore aperture each intersects the longitudinal axis (1112) of the body (12) of the saw blade (10), wherein the mounting portion (16) includes a peninsula portion (1050) extending away from the fore aperture, the peninsula portion (1050) configured for retaining the saw blade (10) in a saw blade (10) mount, the peninsula portion (1050) being partially surrounded by the rear aperture (1016).

CXL. The surgical saw blade (10) of clause CXXXIX, wherein the mounting portion (16) further includes a proximal edge (1020) and a distal axis (1022) opposite the proximal edge (1020); and a central aperture (1014) positioned between the rear aperture (1016) and the fore aperture (1018) comprising:

a central proximal end wall (1024);

a pair of central side walls (1028); and a central distal end wall.

CXLI. The surgical saw blade (10) of clause CXL, wherein the central proximal end wall (1024) is further defined as an arcuate central proximal end wall configured for biasing the surgical saw blade (10) in a direction towards the peninsula portion (1050).

CXLII. The surgical saw blade (10) of clause CXXXIX, wherein the mounting portion (16) is monoplanar.

CXLIII. The surgical saw blade (10) of clause CXXXIX, wherein the rear aperture (1016) is positioned proximal to the fore aperture.

CXLIV. The surgical saw blade (10) of clause CXL, wherein the peninsula portion (1050) comprises two side walls (1058) and an end wall (1054), the two side walls (1058) taper towards the longitudinal axis (1112) from the distal end (1056) to the end wall (1054).

CXLV. The surgical saw blade (10) of clause CXXXIX, wherein the peninsula portion (1050) comprises two side walls (1058), the two side walls (1058) including a distal side wall end having a distal side wall end distance to the longitudinal axis (1112) and a proximal side wall end having a proximal side wall end distance to the longitudinal axis (1112), wherein the distal side wall distance is greater than the proximal side wall distance.

CXLVI. The surgical saw blade (10) of clause CXXXIX, wherein the peninsula portion (1050) comprises:

two side walls (1058); and an arcuate end wall (1054) extending between the two side walls (1058).

CXLVII. The surgical saw blade (10) of clause CXXXIX, wherein the rear aperture (1016) includes a proximal end (1034), a distal end (1036) opposite the proximal end (1034), and a rear aperture length between the proximal end (1034) and the distal end (1036), and the peninsula portion (1050) includes a tab portion (1060), the peninsula portion (1050) having a peninsula length and the tab portion having a tab length extending in a proximal direction from the peninsula portion (1050), the peninsula length is less than 75 percent of the second aperture length and the tab length is less than 50 percent (50%) of the peninsula portion (1050) length.

CXLVIII. The surgical saw blade (10) of clause CXLVII, wherein the tab portion is defined as a semicylindrical protrusion.

CXLIX. The surgical saw blade (10) of clause CXXXIX, wherein the fore aperture includes two fore side walls (1042) extending between a fore proximal wall (1038) and a fore distal wall (1040), wherein the two fore side walls (1042) taper toward the longitudinal axis (1112) from the fore proximal wall (1038) to the fore distal wall (1040).

CL. The saw blade (10) of clause CXXXIX, wherein the mounting portion (16) further comprises a proximal edge (1020);

a distal axis (1022) opposite the proximal edge (1020), the distal axis perpendicular to the longitudinal axis and positioned less than half a length of the saw blade from the proximal edge; and two side edges (1062) extending between the distal axis (1022) and the proximal edge (1020), wherein the mounting portion (16) further comprises two stop protrusions (1064) extending outwardly from the two side edges (1062).

CLI. The saw blade (10) of clause CL, wherein the two stop protrusions (1064) are positioned distal to the rear aperture.

CLII. The saw blade (10) of clause CL, wherein each of the two side edges (1062) further comprise:

a first side portion (1074); and a second side portion (1072) positioned proximal to the first side portion, the second side portion including a first end and a second end, wherein the first end has a first end distance relative to the longitudinal axis (1112), the second end that is proximal to the first end has a second end distance relative to the longitudinal axis (1112), and the first end distance is greater than the second end distance.

CLIII. The surgical blade (10) of clause CXXXIX, wherein the rear aperture (1016) is encircled by the mounting portion (16).

CLIV. A surgical saw blade (10) configured for oscillatory resection of bone, the saw blade (10) comprising:

a body (12) defining a longitudinal axis (1112), the body (12) having:

a mounting portion (16) having a proximal edge (1020), a distal end (1022) opposite the proximal edge (1020), the distal axis perpendicular to the longitudinal axis and positioned less than half a length of the saw blade from the proximal edge, two side edges (1062) extending between the distal end (1022) and the proximal edge (1020), and two stop protrusions (1064) extending outwardly from the two side edges (1062); and a distal portion (18) opposite the mounting portion (16), the distal portion (18) and the mounting portion (16)

integral with one another such that oscillation of the mounting portion (16) results in oscillation of the distal portion (18), wherein the mounting portion (16) defines a series of apertures including:

a first aperture (1014) shaped to receiving a biasing actuator (844); and a second aperture (1016) proximal to the central aperture (1014), wherein the mounting portion (16) includes a peninsula portion (1050) extending away from the first aperture (1014), the peninsula portion (1050) partially surrounded by the second aperture (1016) and configured for retaining the saw blade (10) in a saw blade mount, and the stop protrusions (1064) are distal to the first aperture (1014).

CLV. The surgical saw blade (10) of clause CLIV, wherein each of the two side edges (1062) comprise:

a first side portion (1074); and a second side portion (1072) positioned proximal to the first side portion, the second side portion including a first end and a second end, wherein the first end has a first end distance to the longitudinal axis (1012), the second end that is proximal to the first end has a second end distance to the longitudinal axis (1012), and the first end distance is greater than the second end distance.

CLVI. The surgical saw blade (10) of clause CLIV, wherein the first aperture (1014) comprises:

a central proximal end wall (1024);

a pair of central side walls (1028); and a central distal end wall (1026).

CLVII. The surgical saw blade (10) of clause CLVI, wherein the central proximal end wall (1024) further defines an arcuate central proximal end wall configured for biasing the surgical saw blade (10) in a direction towards the peninsula portion (1050).

CLVIII. The surgical saw blade (10) of clause CLIV, wherein the mounting portion (16) is monoplanar.

CLIX. The surgical saw blade (10) of clause CLIV, wherein the second aperture (1016) is positioned proximal to the first aperture (1014).

CLX. The surgical saw blade (10) of clause CLIV, wherein the peninsula portion (1050) comprises two side walls (10458) and an end wall (1054), the two side walls (1058) taper towards the longitudinal axis (1112) from the distal end (1036) to the end wall (1054).

CLXI. The surgical saw blade (10) of clause CLIV, wherein the peninsula portion (1050) comprises two side walls (1058), the two side walls (1058) including a distal side wall end having a distal side wall end distance to the longitudinal axis (1112) and a proximal side wall end having a proximal side wall end distance to the longitudinal axis (1112), wherein the distal side wall distance is greater than the proximal side wall distance.

CLXII. The surgical saw blade (10) of clause CLIV, wherein the peninsula portion (1050) comprises:

two side walls (1058); and an arcuate end wall extending between the two side walls (1054).

CLXIII. The surgical saw blade (10) of clause CLIV, wherein the second aperture (1016) includes a second proximal end (1034), a second distal end (1036) opposite the second proximal end (1034), and a second aperture (1016) length between the second proximal end (1034) and the second distal end (1036), and the peninsula portion (1050) includes a tab portion, the peninsula portion (1050) having a peninsula length and the tab portion having a tab length extending in a proximal direction from the peninsula portion (1050), the peninsula length is less than 80 percent of the second aperture (1016) length and the tab length is less than the peninsula portion (1050) length.

CLXIV. The surgical saw blade (10) of clause CLXIII, wherein the tab portion is further defined as a semicylindrical protrusion.

CLXV. The surgical saw blade (10) of clause CLIV, wherein the series of apertures further comprises a third aperture including:

a fore proximal wall (1038), a fore distal wall (1040), and two side walls (1042) extending between the fore proximal wall (1038) and the fore distal wall (1040), wherein the two side walls (1042) taper toward the longitudinal axis (1112) from the fore proximal wall (1038) to the fore distal wall (1040).

CLXVI. The surgical saw blade (10) of clause CLIV, wherein the series of apertures further comprises a third aperture including a fore distal wall (1040) having a fore distal wall (1040) end and a fore proximal wall (1038) having a fore proximal wall (1038) end, the fore distal wall (1040) end having a rear distal wall (1040) end distance to the longitudinal axis (1112), the fore proximal wall (1038) end having a fore proximal wall (1038) end distance to the longitudinal axis (1112), the fore distal wall (1040) end distance less than the fore proximal wall (1038) end distance.

CLXVII. The surgical saw blade (10) of clause CLXVI, wherein the third aperture is positioned distal to the second aperture (1016).

CLXVIII. The surgical blade (10) of clause CLIV, wherein the second aperture (1016) is encircled by the mounting portion (16).

CLXIX. A surgical saw blade (10) configured for oscillatory resection of bone, the saw blade (10) comprising:

a body (12) having a mounting portion (16) and a distal portion (18) opposite the mounting portion (16); the distal portion (18) having teeth (28) formed on a distal region, the body (12) defining a longitudinal axis (1112), the distal portion (18) and the mounting portion (16) are integral with one another such that oscillation of the mounting portion (16) results in oscillation of the distal portion (18); wherein the mounting portion (16) defines:

a central aperture (1014) shaped to receiving a biasing actuator (844);

a rear aperture (1016) proximal to the central aperture (1014);

a first driving portion, having at least one first drive wall proximal to the central aperture (1014), the first drive wall including a first end and a second end, wherein the first end has a first end distance to the longitudinal axis (1112) and the second end that is proximal to the first end has a second end distance to the longitudinal axis (1112), the first end distance is greater than the second end distance; and a second driving portion defined by a fore aperture, the fore aperture being located distal to the central aperture (1014), wherein the central, rear, and fore aperture each overlap the longitudinal axis (1112) of the body (12) of the saw blade (10).

CLXX. The surgical saw blade (10) of clause CLXIX, wherein the mounting portion (16) further includes a peninsula portion (1050) extending away from the central aperture (1014) and configured for retaining the saw blade (10) in a saw blade (10) mount, the peninsula portion (1050) is partially surrounded by the rear aperture (1016), and wherein the peninsula portion (1050) defines an area less than an area defined by the rear aperture (1016).

CLXXI. The surgical saw blade (10) of clause CLXX, wherein the peninsula portion (1050) comprises two side walls (1058) and an end wall, the two side walls (1058) taper towards the longitudinal axis (1112) from a distal end (1036) to the end wall.

CLXXII. The surgical saw blade (10) of clause CLXX, wherein the peninsula portion (1050) comprises two side walls (1058) the two side walls (1058) including a distal side wall end having a distal side wall end distance to the longitudinal axis (1112) and a proximal side wall end having a proximal side wall end distance to the longitudinal axis (1112), wherein the distal side wall distance is greater than the proximal side wall distance.

CLXXIII. The surgical saw blade (10) of clause CLXX, wherein the peninsula portion (1050) comprises:
two side walls (1058); and
an arcuate end wall (1054) extending between the two side walls (1058).

CLXXIV. The surgical saw blade (10) of clause CLXX, wherein the peninsula portion (1050) further includes a tab portion (1060) extending in a proximal direction from the peninsula portion (1050).

CLXXV. The surgical saw blade (10) of clause CLXX IV, wherein the tab portion is further defined as a semicylindrical protrusion.

CLXXVI. The surgical saw blade (10) of clause CLXIX, wherein
the mounting portion (16) further includes a proximal edge (1020) and a distal axis (1022) opposite the proximal edge (1020, the distal axis perpendicular to the longitudinal axis and positioned less than half a length of the saw blade from the proximal edge; and
the central aperture (1014) comprises:
 a central proximal end wall (1024);
 a pair of central side walls (1028); and
 a central distal end wall (1026).

CLXXVII. The surgical saw blade (10) of clause CLXXVI, wherein the central proximal end wall (1024) is further defined by an arcuate central proximal end wall configured for biasing the surgical saw blade (10) in a proximal direction.

CLXXVIII. The surgical saw blade (10) of clause CLXIX, wherein the mounting portion (16) is monoplanar.

CLXXIX. The surgical saw blade (10) of clause CLXIX, wherein the rear aperture (1016) is positioned proximal to the central aperture (1014).

CLXXX. The saw blade (10) of clause CLXIX, wherein the mounting portion (16) further comprises
a proximal edge (1020);
a distal axis (1022) opposite the proximal edge (1020), the distal axis perpendicular to the longitudinal axis and positioned less than half a length of the saw blade from the proximal edge; and two side edges (1062) extending between the distal axis (1022) and the proximal edge (1020), wherein the mounting portion (16) further comprises two stop protrusions (1064) extending outwardly from the two side edges (1062).

CLXXXI. The saw blade (10) of clause CLXXX, wherein the two stop protrusions (1064) are positioned distal to the rear aperture.

CLXXXII. A surgical saw blade (10) configured for oscillatory resection of bone, the saw blade (10) comprising:
a body (12) having a mounting portion (16) and a distal portion (18) opposite the mounting portion (16); the distal portion (18) having teeth (28) formed on a distal region, the body (12) defining a longitudinal axis (1112), the distal portion (18) and the mounting portion (16) are integral with one another such that oscillation of the mounting portion (16) results in oscillation of the distal portion (18); wherein
the mounting portion (16) defines:
a first aperture (1014) shaped to receiving a biasing actuator (844);
a second aperture having a proximal end (1034) and a distal end (1036), with the proximal end (1034) being wider than the distal end (1036);
two sides (1062) extending between the distal end (1036) and the proximal end (1034), and two stop protrusions (1064) extending outwardly from the two sides (1062); and
three driving protrusions (1076, 1050) extending from a proximal end of the mounting portion (16), the three driving protrusions (1076, 1050) being proximal the two stop protrusions (1064).

CLXXXIII. The surgical saw blade (10) of clause CLXXXII, wherein the three driving protrusions (1064) include a first pair of arms and a nub extending between the pair of arms, with the arms having a length longer than the nub.

CLXXXIV. The surgical saw blade of clause CXX, wherein the central aperture is further defined as an enclosed hole.

CLXXXV. A surgical saw assembly having a blade mount (808) and a surgical saw blade (10) configured for oscillatory resection of bone, the blade mount having:
a body portion (814) defining a longitudinal axis (1112), the body portion having a top surface (815) extending between a proximal end (804) and a distal end (802);
an actuator (844) configured to be movable in a direction perpendicular to the top surface (815); and
a biasing member (920) configured to be movable in a direction perpendicular to the top surface (815), and engage the saw blade (10) in a mounted position to bias the surgical saw blade (10) towards the proximal end (804).

CLXXXVI. The surgical saw assembly of clause CLXXXV, wherein the blade mount (808) further comprises a proximal protrusion (830) extending upwards from the top surface (815).

CLXXXVII. The surgical saw assembly of clause CLXXXVI, wherein the biasing member (920) is positioned proximal to the proximal protrusion (830).

CLXXXVIII. The surgical saw assembly of clause CLXXXVI, wherein the actuator (844) is positioned distal to the proximal protrusion (830).

CLXXXIX. The surgical saw assembly of clause CLXXXVI, wherein the proximal protrusion (830) includes a recessed portion (836) configured to receive the saw blade (10).

CXC. The surgical saw assembly of clause CLXXXIX, wherein the surgical saw blade (10) further defines a retention portion (1050) configured to engage with the recessed portion (836) of the proximal protrusion in the mounted position.

CXCI. The surgical saw assembly of clause CLXXXVI, wherein the surgical saw blade (10) defines a rear aperture (1016) shaped to receive the proximal protrusion, the rear aperture (1016) comprising:
a rear aperture proximal end (1034) and a rear aperture distal end (1036) opposite the rear aperture proximal end (1034).

CXCII. The surgical saw assembly of clause CXCI, wherein in the mounted position, the biasing member engages with the rear aperture proximal end (1034) of the rear aperture (1016) to bias the blade (10) in the proximal direction.

CXCIII. The surgical saw assembly of clause CLXXXV, wherein the biasing member (920) is defined by a biasing spring (922) and a ball (924).

CXCIV. The surgical saw assembly of clause CXCIII, wherein the spring (922) is configured to push the ball (924) in an upward direction perpendicular to the top surface (815).

CXCV. The surgical saw assembly of clause CLXXXV, wherein the actuator comprises:
a head portion (860);
a rod portion (862);
a housing (804) having a bore (850), wherein the rod portion of the actuator is positioned within the bore;
an actuator spring (882) having a top end and a bottom end positioned circumferentially around the actuator (844) within the bore (850), the top end abutting the head portion of the actuator;
a bottom cap (886) abutting the bottom end of the actuator spring; and
a lever (902) attached to a cam (890) configured to rotate between an unlocked position and a locked position, wherein
upon movement from the unlocked position to the locked position, the actuator spring causes the head portion of the actuator to move in an upward direction.

CXCVI. The surgical saw assembly of clause CLXXXV, wherein the blade (10) mount further defines a pair of side portions (817), the two side portions (817) taper towards the longitudinal axis (1112) from a distal end to the proximal end.

CXCVII. The surgical saw assembly of clause CXCVI, wherein a plane of one of the pair of side portions (817) and the longitudinal axis (1112) define a taper angle greater than five (5) degrees.

CXCVIII. The surgical saw assembly of clause CXCVI, wherein the pair of side portions (817) includes a front wall (819) that tapers in a proximal direction upwards from the top surface (815).

CXCIX. The surgical saw assembly of clause CLXXXV, wherein the blade (10) mount further defines a plurality of protrusions (824, 830) having an upper surface (825, 831).

CC. The surgical saw assembly of clause CXCIX, wherein one or more of the plurality of protrusions (824, 830) comprises a dimension defined between top surface (815) and the upper surface (825, 831) of each of the plurality of protrusions (824, 830); and
wherein the dimension defined between top surface (815) and the upper surface (825, 831) of each of the plurality of protrusions (824, 830) is different.

CCI. The surgical saw assembly of clause CXCIX, wherein the upper surface (819, 825, 831) of at least one of the plurality of protrusions (816, 824, 830) includes a mount indicia (1004).

CCII. The surgical saw assembly of clause CCI, wherein the surgical saw blade (10) comprises a body (12) including a mounting portion (16) and a distal portion (18) opposite the mounting portion (16), and wherein the mounting portion (16) includes a blade indicia (1002).

CCIII. The surgical saw assembly of clause CCII, wherein the mount indicia (1004) adjoins the blade indicia (1002) in the mounted position.

CCIV. A surgical saw assembly having a blade mount (808) and a surgical saw blade (10) configured for oscillatory resection of bone, the blade mount having:
a body portion (814) defining a longitudinal axis (1112), the body portion having a top surface (815) extending between a proximal end (804) and a distal end (802);
a biasing member (920) configured to be movable in a direction perpendicular to the top surface (815); and
an actuator (844) movable between a first position and a second position, the first position corresponding to a locked blade state, and the second position corresponding to an unlocked blade state, wherein
the saw blade (10) is movable between an unmounted state, a mounted state and the locked state,
the biasing member (920) engages with the saw blade (10) in the mounted state and the locked state but not the unmounted state,
the actuator (844) engages with the saw blade (10) in the locked state, but not the unmounted state or the mounted state, and
the blade (10) is removable from the mount (808) when the actuator is in the second position but not in the first position.

CCV. The surgical saw assembly of clause CCIV, wherein the blade mount (808) further comprises a proximal protrusion (830) extending upwards form the top surface (815), and
the protrusion (830) engages with the saw blade (10) in the mounted state and the locked state but not the unmounted state.

CCVI. The surgical saw assembly of clause CCV, wherein the biasing member (920) is positioned proximal to the proximal protrusion (830).

CCVII. The surgical saw assembly of clause CCV, wherein the actuator (844) is positioned distal to the proximal protrusion (830).

CCVIII. The surgical saw assembly of clause CCV, wherein the proximal protrusion (830) includes a recessed portion (836) configured to receive the saw blade (10).

CCIX. The surgical saw assembly of clause CCVIII, wherein the surgical saw blade (10) further defines a retention portion (1050) configured to engage with the recessed portion (836) of the proximal protrusion in the mounted state.

CCX. The surgical saw assembly of clause CCV, wherein the surgical saw blade (10) defines a rear aperture (1016) shaped to receive the proximal protrusion, the rear aperture comprising:

a rear aperture proximal end (1034) and a rear aperture distal end (1036) opposite the rear aperture proximal end (1034).

CCXI. The surgical saw assembly of clause CCX, wherein in the mounted state, the biasing member (920) engages with the rear aperture proximal end (1034) of the rear aperture (1016) to bias the blade (10) in the proximal direction.

CCXII. The surgical saw assembly of clause CCIV, wherein the biasing member (920) is defined by a biasing spring (922) and a ball (924).

CCXIII. The surgical saw assembly of clause CCXII, wherein the spring (922) is configured to push the ball (924) in an upward direction perpendicular to the top surface (815).

CCXIV. The surgical saw assembly of clause CCIV, wherein the actuator comprises:
a head portion (860);
a rod portion (862);
a housing (804) having a bore (850), wherein the rod portion of the actuator is positioned within the bore;
an actuator spring (882) having a top end and a bottom end positioned circumferentially around the actuator (844) within the bore (850), the top end abutting the head portion of the actuator;
a bottom cap (886) abutting the bottom end of the actuator spring; and
 a lever (902) attached to a cam (890) configured to rotate between an unlocked position corresponding to the unlocked blade state and a locked position corresponding to the locked blade state, wherein
upon movement from the unlocked position to the locked position, the actuator spring causes the head portion of the actuator to move in an upward direction.

CCXV. The surgical saw assembly of clause CCIV, wherein the blade mount further defines a pair of side portions (817), the two side portions (817) taper towards the longitudinal axis (1112) from a distal end to the proximal end.

CCXVI. The surgical saw assembly of clause CCXV, wherein a plane of one of the pair of side portions (817) and the longitudinal axis (1112) define a taper angle greater than five (5) degrees.

CCXVII. The surgical saw assembly of clause CCXV, wherein the pair of side portions (817 include a front wall (819) that tapers towards the proximal end in a direction upwards from the top surface.

CCXVIII. The surgical saw assembly of clause CCIV, wherein the blade mount (808) further defines a plurality of protrusions (824, 830) having an upper surface (825, 831).

CCXIX. The surgical saw assembly of clause CCXVIII, wherein the upper surface of at least one of the plurality of protrusions includes a mount indicium (1004).

CCXX. The surgical saw assembly of clause CCXIX, wherein the surgical saw blade (10) comprises a body (12) including a mounting portion (16) and a distal portion (18) opposite the mounting portion (16), and wherein the mounting portion (16) includes a blade indicium (1002).

CCXXI. The surgical saw assembly of clause CCXX, wherein the mount indicia adjoins the blade indicia in the mounted state.

CCXXII. A method for mounting a surgical saw blade (10) to a blade mount (808) of a surgical saw assembly, the blade mount comprising a body portion (814) having a top surface (815); a biasing member (920) movable in a direction perpendicular to the top surface (815); and an actuator (844) movable between a first position and a second position, the first position corresponding to an unlocked blade (10) state, and the second position corresponding to an locked blade (10) state, wherein the method comprises:

directing the surgical saw blade (10) from an unmounted position to a mounted position with respect to a blade mount, wherein the biasing member is configured to automatically engage with the surgical saw blade (10) in the mounted position; and moving the actuator (844) from the first position to the second position, wherein the saw blade (10) is removable from the mount when the actuator is in the first position but not in the second position.

CCXXIII. The method of clause CCXXII, wherein
the blade mount further comprises a proximal protrusion (830) extending upwards form the top surface (815), and
the proximal protrusion engages with the saw blade (10) in the mounted position.

CCXXIV. The method of clause CCXXIII, wherein the biasing member (920) is positioned proximal to the proximal protrusion (830).

CCXXV. The method of clause CCXXIII, wherein the actuator (844) is positioned distal to the proximal protrusion (830).

CCXXVI. The method of clause CCXXIII, wherein the proximal protrusion (830) includes a recessed portion (836) configured to receive the saw blade (10).

CCXXVII. The method of clause CCXXVI, wherein the surgical saw blade (10) further defines a retention portion (1050) configured to engage with the recessed portion (836) of the proximal protrusion (830) in the mounted position.

CCXXVIII. The method of clause CCXXIII, wherein the surgical saw blade (10) defines a rear aperture (1016) shaped to receive the proximal protrusion (830) upon direction of the saw blade (10) from the unmounted position to the mounted position, the rear aperture (1016) comprising:
a rear aperture proximal end (1034) and a rear aperture distal end (1036) opposite the rear aperture proximal end (1034).

CCXXIX. The method of clause CCXXVIII, wherein in the mounted position, the biasing member (920) engages with the rear aperture proximal end (1034) of the rear aperture (1016) to bias the blade (10) in the proximal direction.

CCXXX. The method of clause CCXXII, wherein the biasing member (920) is defined by a biasing spring (922) and a ball (924).

CCXXXI. The method of clause CCXXX, wherein at least a portion of the ball (924) is positioned above the top surface (815) in a perpendicular direction.

CCXXXII. The method of clause CCXXX, wherein the spring (922) is configured to push the ball (924) in an upward direction perpendicular to the top surface (815).

CCXXXIII. The method of clause CCXXII, wherein the actuator comprises:
a head portion;
a head portion (860);
a rod portion (862);
a housing (804) having a bore (850), wherein the rod portion of the actuator is positioned within the bore;

an actuator spring (882) having a top end and a bottom end positioned circumferentially around the actuator (844) within the bore (850), the top end abutting the head portion of the actuator;

a bottom cap (886) abutting the bottom end of the actuator spring; and a lever (902) attached to a cam (890), the method further comprising:

rotating the lever between an unlocked position corresponding to the second position and a locked position corresponding to the first position, wherein upon movement from the unlocked position to the locked position, actuator spring causes the head portion of the actuator to move in an upward direction.

CCXXXIV. A blade assembly for attachment to a surgical saw, the blade assembly having:

a blade mount (808) having a plurality of protrusions (830, 824), the plurality of protrusions having an upper surface (831, 825), wherein the upper surface of at least one of the plurality of protrusions includes a mount indicia (1004); and a surgical saw blade (10) movable between an unmounted position and a mounted position with respect to the blade mount, the saw blade (10) having:

a body (12) including a mounting portion (16) and a distal portion (18) opposite the mounting portion (16), the body (12) defining a longitudinal axis (1112), the distal portion (18) having teeth (28) formed on a distal region, the mounting portion (16) defining a plurality of apertures (1014, 1016, 1018) configured to correspond to the plurality of protrusions (830, 824), and the mounting portion (16) having a blade indicia (1002), wherein in the unmounted position the mount indicia (1004) and blade indicia (1002) are separate, and in the mounted position the mount indicia adjoins the blade indicia.

CCXXXV. The blade assembly of clause CCXXXIV, wherein the blade indicia is configured to be partially obstructed in the mounted position.

CCXXXVI. The blade assembly of clause CCXXXIV, wherein the plurality of protrusions (824, 830) defines a distal protrusion (824) and a proximal protrusion (830), the proximal protrusion having a recessed portion (836), wherein the upper surface of the proximal protrusion extends at least partially over the recessed portion.

CCXXXVII. The blade assembly of clause CCXXXVI, wherein the surgical saw blade (10) further defines a retention portion (1050) configured to engage with the recessed portion (836) of the proximal protrusion (830) in the mounted position.

CCXXXVIII. The blade (10) assembly of clause CCXXXVII, wherein the at least a portion of the blade indicia (1002) is configured to be positioned within the recessed portion (836) in the mounted position.

CCXXXIX. The blade assembly of clause CCXXXVII, wherein at least a portion of the blade indicia (1002) is positioned on the retention portion (1050) of the surgical saw blade (10).

CCXL. The blade assembly of clause CCXXXIV, wherein the plurality of protrusions defines a pair of side protrusions (816), each of the pair of side protrusions (816) having a recessed wall (818) parallel to the longitudinal axis (1112).

CCXLI. The blade assembly of clause CCXL, wherein the mount indicia (1004) is positioned on the upper surface (819) of the pair of side protrusions (816).

CCXLII. The blade assembly of clause CCXLI, wherein the mount indicia is a line extending perpendicular to the longitudinal axis (1112).

CCXLIII. The blade assembly of clause CCXLII, wherein the plurality of protrusions further defines a proximal protrusion (830) proximal to the pair of side protrusions (816).

CCXLIV. The blade assembly of clause CCXXXIV, wherein the blade indicia is an open lock in the unmounted position.

CCXLV. The blade assembly of clause CCXXXIV, wherein the indicia is one of a laser marking, a printed graphic, or an engraving.

CCXLVI. The blade assembly of clause CCXXXIV, wherein the mount indicia and the blade indicia is one of a half circle, a triangle, a line, or an arrow.

CCXLVII. The blade assembly of clause CCXXXIV, wherein the blade indicia is aligned with the longitudinal axis (1112).

CCXLVIII. The blade assembly of clause CCXXXIV, wherein the blade (10) indicia extends in a perpendicular direction to the longitudinal axis (1112).

CCXLIX. A method for mounting a surgical saw blade (10) to a mount apparatus, wherein the method comprises:

directing the surgical saw blade (10) from an unmounted position to a mounted position with respect to a blade mount (808), wherein the surgical saw blade (10) comprises a body (12) defining a longitudinal axis (1112), the body (12) including a mounting portion (16) and a distal portion (18) opposite the mounting portion (16); the mounting portion (16) defining a plurality of apertures, wherein the mounting portion (16) includes a blade indicia (1002), and the blade mount having a plurality of protrusions (824, 830) corresponding to the plurality of apertures (1016, 1018), the plurality of protrusions having an upper surface (825, 831), wherein the upper surface of at least one of the plurality of protrusions includes a mount indicia (1004);

aligning the blade indicia to the mount indicia; and locking the blade (10) in the mounted position.

CCL. The method of clause CCXLIX, wherein upon alignment of the blade indicia to the mount indicia, the blade indicia and the mount indicia define a complete image.

CCLI. The method of clause CCXLIX, wherein the blade mount (808) further comprises an actuator (844) movable between a first position and a second position, the first position corresponding to an unlocked blade state, and the second position corresponding to an locked blade state, wherein locking the blade (10) in the mounted position comprises moving the actuator (844) from the first position to the second position.

CCLII. The method of clause CCL, wherein the plurality of protrusions (824, 830) defines a distal protrusion (824) and a proximal protrusion (830), the proximal protrusion having a recessed portion (836), wherein the upper surface of the proximal protrusion extends at least partially over the recessed portion.

CCLIII. The method of clause CCLII, wherein the surgical saw blade (10) further defines a retention portion (1050) configured to engage with the recessed portion (836) of the proximal protrusion in the mounted position.

CCLIV. The method of clause CCLIII, wherein the at least a portion of the blade indicia is configured to be positioned within the recessed portion in the mounted position.

CCLV. The method of clause CCLIII, wherein at least a portion of the blade indicia is positioned on the retention portion of the surgical saw blade (10).

CCLVI. The method of clause CCXLIX, wherein the plurality of protrusions defines a pair of side protrusions (816), each of the pair of side protrusions (816) having a recessed wall (818) parallel to the longitudinal axis (1112).

CCLVII. The method of clause CCLVI, wherein the mount indicia is positioned on the upper surface (819) of the pair of side protrusions (816).

CCLVIII. The method of clause CCLVII, wherein the mount indicia is perpendicular to the longitudinal axis (1112).

CCLIX. The method of clause CCLVIII, wherein the plurality of protrusions further defines a proximal protrusion (830) proximal to the pair of side protrusions (816).

CCLX. The method of clause CCLIX, wherein the mount indicia and/or the blade indicia is one of a laser marking, a printed graphic, or an engraving.

CCLXI. The method of clause CCXLIX, wherein the mount indicia and/or the blade indicia is one of a half circle, a triangle, a line, or an arrow.

CCLXII. The method of clause CCXLIX, wherein the blade indicia and/or the mount indicia are aligned with the longitudinal axis (1112).

CCLXIII. The method of clause CCXLIX, wherein the blade indicia and/or the mount indicia extend perpendicular to the longitudinal axis (1112).

CCLXIV. A blade assembly for attachment to a surgical saw, the blade assembly having:
a blade mount (808) having a mount geometry for receiving a surgical saw blade (10), the blade mount having a mount indicia (1004); and
a surgical saw blade (10) movable between an unmounted position and a mounted position with respect to the blade mount, the saw blade (10) having:
a body (12) including a mounting portion (16) and a distal portion (18) opposite the mounting portion (16), the mounting portion (16) defining a blade (10) geometry corresponding to the mount geometry, the mounting portion (16) including a blade indicia (1002), wherein
in the unmounted position the mount indicia and blade indicia are separate, and in the mounted position the mount indicia adjoins the blade indicia.

CCLXV. The blade assembly of clause CCLXIV, wherein the mount indicia extends in a direction perpendicular to a longitudinal axis (1112).

CCLXVI. The blade assembly of clause CCLXIV, wherein the indicia is one of a laser marking, a printed graphic, or an engraving.

CCLXVII. The blade assembly of clause CCLXIV, wherein the mount indicia and the blade indicia is one of a half circle, a triangle, a line, or an arrow.

CCLXVIII. The blade assembly of clause CCLXIV, wherein the blade indicia is aligned with a longitudinal axis (1112).

CCLXIX. The blade assembly of clause CCLXIV, wherein the blade indicia extends in a direction perpendicular to a longitudinal axis (1112).

CCLXX. The blade assembly of clause CCLXIV, wherein the blade indicia comprises a first partial image and the mount indicia comprises a second partial image such that combination of the blade indicia and the mount indicia define a complete image when the surgical saw blade (10) is in the mounted position.

CCLXXI. A method for mounting a surgical saw blade (10) to a blade mount (808), wherein the method comprises:
directing the surgical saw blade from an unmounted position to a mounted position with respect to the blade mount,
the surgical saw blade (10) having a body (12) including a mounting portion (16) and a distal portion (18) opposite the mounting portion (16); the mounting portion (16) defining a blade (10) geometry, wherein the mounting portion (16) includes a blade indicia (1002), and
the blade mount having a mount geometry configured for receiving the surgical saw blade, the blade mount including a mount indicia (1004);
aligning the blade indicia to the mount indicia; and
locking the blade in the mounted position.

CCLXXII. A surgical tool assembly comprising:
a mount (808) having a mount geometry for receiving a saw blade (10), the mount having a mount indicia (1004); and
a saw blade (10) movable between an unmounted position and a mounted position with respect to the mount, the saw blade (10) having:
a body (12) including a mounting portion (16) and a distal portion (18) opposite the mounting portion (16), the mounting portion (16) defining a blade (10) geometry corresponding to the mount geometry, the mounting portion (16) including a blade indicia (1002), wherein
in the unmounted position the blade indicia and mount indicia are separate, and in the mounted position the blade indicia adjoins the mount indicia.

CCLXXIII.

CCLXXIV. A surgical saw blade (10) configured for oscillatory resection of bone, the saw blade (10) comprising:
a body (12) having a mounting portion (16) and a distal portion (18) opposite the mounting portion (16), the distal portion (18) and the mounting portion (16) are integral with one another such that oscillation of the mounting portion (16) results in oscillation of the distal portion (18); the body (12) defining a longitudinal axis (1112);
the mounting portion (16) defining a series of apertures including:
a rear aperture (1016), and
a fore aperture (1018) distal to the rear aperture (1016), the fore aperture and rear aperture each overlap the longitudinal axis (1012); and
an indicia (1002) positioned on the mounting portion, and adjacent an edge of at least one of the rear aperture or the fore aperture.

CCLXXV. The surgical saw blade (10) of clause CCLXXIV, wherein the indicia is one of a laser marking, a printed graphic, or an engraving.

CCLXXVI. The surgical saw blade (10) of clause CCLXXIV, wherein the indicia is one of a half circle, a full circle, a triangle, a line, or an arrow.

CCLXXVII. The surgical saw blade (10) of clause CCLXXIV, wherein the mounting portion (16) further defines a central aperture (1014) positioned between the rear aperture and the fore aperture.

CCLXXVIII. The surgical saw blade (10) of clause CCLXXVII, wherein the indicia is further defined as a fore indicia, a rear indicia, and a central indicia.

CCLXXIX. The surgical saw blade (10) of clause CCLXXVIII, wherein the indicia is aligned with the longitudinal axis (1112).

CCLXXX. The surgical saw blade (10) of clause CCLXXVIII, wherein the indicia extend in a perpendicular direction to the longitudinal axis (1112).

CCLXXXI. The surgical saw blade (10) of clause CCLXXVIII, wherein the fore indicia is adjacent to an edge of the fore aperture.

CCLXXXII. The surgical saw blade (10) of clause CCLXXXI, wherein the fore indicia further comprise a mirror indicia, wherein the mirror indicia is positioned on the opposing edge of the edge of the fore aperture.

CCLXXXIII. The surgical saw blade (10) of clause CCLXXIV, wherein the indicia extends in a perpendicular direction to the longitudinal axis (1112).

CCLXXXIV. The surgical saw blade (10) of clause CCLXXIV, wherein the indicia is aligned with the longitudinal axis (1112).

CCLXXXV. A surgical saw blade (10) configured for oscillatory resection of bone, the saw blade (10) comprising:
a body (12) defining a longitudinal axis (1112), the body having:
a mounting portion (16) having a proximal end and a distal end opposite the proximal end, two sides (1062) extending between the distal end and the proximal end, wherein the mounting portion further comprises two stop protrusions (1064) extending outwardly from the two sides; and
a distal portion (18) opposite the mounting portion (16), the distal portion (18) and the mounting portion (16) are integral with one another such that oscillation of the mounting portion (16) results in oscillation of the distal portion (18), wherein
the mounting portion (16) defines an aperture (1014, 1016, 1018), and
an indicia (1002) is positioned on the mounting portion (16), the indicia adjacent to an edge of the aperture.

CCLXXXVI. The surgical saw blade (10) of clause CCLXXXV, wherein the indicia is one of a laser marking, a printed graphic, or an engraving.

CCLXXXVII. The surgical saw blade (10) of clause CCLXXXV, wherein the indicia is one of a half circle, a full circle, a triangle, a line, or an arrow.

CCLXXXVIII. The surgical saw blade (10) of clause CCLXXXV, wherein the indicia is aligned with the longitudinal axis (1112).

CCLXXXIX. The surgical saw blade (10) of clause CCLXXXV, wherein the indicia extends in a perpendicular direction to the longitudinal axis (1112).

CCXC. The surgical saw blade (10) of clause CCLXXXV, wherein the indicia is distal to the two stop protrusions (1064).

CCXCI. A surgical sagittal saw blade (10) for use with a surgical saw, the surgical sagittal saw blade (10) comprising:
a planar blade body (12) including a proximal portion (16), an intermediate portion (14), and a distal portion (18), the proximal and distal portion extending from opposed ends of the intermediate portion;
a blade head extending from a distal end of the distal portion (18) of the planar blade body;
wherein the proximal portion defines a geometric feature configured for mounting the planar blade body to the surgical saw, the geometric feature including at least one aperture (1014, 1016, 1018);
a blade indicia (1002) disposed on the proximal portion, the blade indicia comprising a first partial image corresponding to a mount indicia (1004) comprising a second partial indicia such that the combination of the blade indicia and the mount indicia define a complete image when the surgical sagittal saw blade is properly mounted to the blade mount.

CCXCII. The surgical saw blade (10) of clause CCXCI, wherein the indicia is one of a laser marking, a printed graphic, or an engraving.

CCXCIII. The surgical saw blade (10) of clause CCXCI, wherein the indicia is one of a half circle, a full circle, a triangle, a line, or an arrow.

CCXCIV. The surgical saw blade (10) of clause CCXCI, wherein the mounting portion (16) further defines a central aperture (1014) positioned between the fore aperture and the rear aperture (1016).

CCXCV. The surgical saw blade (10) of clause CCXCI, wherein the indicia is aligned with the longitudinal axis.

CCXCVI. The surgical saw blade (10) of clause CCXCI, wherein the indicia extends in a direction perpendicular to the longitudinal axis.

CCXCVII. A surgical saw blade configured for oscillatory resection of bone, the saw blade comprising:
a body defining a longitudinal axis, the body having a mounting portion and a distal portion opposite the mounting portion, the distal portion and the mounting portion integral with one another such that oscillation of the mounting portion results in oscillation of the distal portion, the mounting portion defines a series of openings including:
a first aperture shaped for receiving a biasing actuator; and
a second aperture including a proximal end and a distal end opposite the proximal end, wherein
the mounting portion includes a peninsula portion extending away from the first aperture and configured for retaining the saw blade in a saw blade mount,
the peninsula portion is partially surrounded by the second aperture, and
the peninsula portion defines an area less than an area defined by the second aperture.

CCXCVIII. The surgical saw blade of clause CCXCVII, wherein the first aperture is in communication with the second aperture.

CCXCIX. A surgical saw blade configured for oscillatory resection of bone, the saw blade comprising:
a body defining a longitudinal axis, the body having a mounting portion and a distal portion opposite the mounting portion, the distal portion and the mounting portion integral with one another such that oscillation of the mounting portion results in oscillation of the distal portion, the mounting portion including:
a first aperture defining a drive portion and a biasing portion, the biasing portion defines an arcuate wall configured for biasing the surgical saw blade in a proximal direction, the drive portion positioned distal to the biasing portion, the drive portion comprising two side walls, the two side walls taper towards the longitudinal axis in a direction towards a proximal end of the mounting portion, wherein the proximal end defines a retention portion, the retention portion being the narrowest region of the mounting portion and having a width at its narrowest dimension being less than the width of the first opening at a lateral axis.

CCC. A surgical saw blade configured for oscillatory resection of bone, the saw blade comprising:
a body defining a longitudinal axis, the body having a mounting portion and a distal portion opposite the mounting portion, the distal portion and the mounting portion integral with one another such that oscillation of the mounting portion results in oscillation of the distal portion, the mounting portion including:
a first aperture defining a drive portion and a biasing portion, the biasing portion defining an arcuate wall configured for biasing the surgical saw blade in a proximal direction, the drive portion positioned distal to the biasing portion, the drive portion comprising two side walls, the two side walls taper towards the longitudinal axis in a direction towards a proximal end of the mounting portion; and
three driving protrusions extending from a proximal end of the mounting portion, the three driving protrusions being proximal the two stop protrusions.

CCCI. A surgical saw blade configured for oscillatory resection of bone, the saw blade comprising:
a body defining a longitudinal axis, the body having a mounting portion and a distal portion opposite the mounting portion, the distal portion and the mounting portion integral with one another such that oscillation of the mounting portion results in oscillation of the distal portion, the mounting portion including:
a proximal edge;
a distal axis opposite the proximal edge, the distal axis perpendicular to the longitudinal axis and positioned less than half a length of the saw blade from the proximal edge;
two side edges extending between the distal axis and the proximal edge; and
a first aperture defining a drive portion and a biasing portion, the biasing portion defines a arcuate wall configured for biasing the surgical saw blade in a proximal direction, the drive portion positioned distal to the biasing portion, the drive portion comprising two side walls, the two side walls taper towards the longitudinal axis in a direction towards a proximal end of the mounting portion; wherein
the two side edges define at least two drive surfaces positioned proximal to the first aperture, the two drive surfaces tapering towards the longitudinal axis in the proximal direction.

CCCII. A surgical saw blade configured for oscillatory resection of bone, the surgical saw blade comprising:
a body having a mounting portion and a distal portion opposite the mounting portion; two sides extending between the distal portion and a proximal end of the mounting portion, the body defining a longitudinal axis, the distal portion and the mounting portion are integral with one another such that oscillation of the mounting portion results in oscillation of the distal portion, the mounting portion defining a first aperture,
wherein the mounting portion further comprises:
two stop protrusions extending outwardly from the two sides, positioned on a lateral axis, the lateral axis perpendicular to the longitudinal axis; and
the first aperture defining a first driving portion having at least one first drive wall aligned with the two stop protrusions,
the proximal end defining a retention portion, the retention portion being the narrowest region of the mounting portion and having a width at its narrowest dimension being less than the width of the first aperture at the lateral axis, and
the first aperture and the retention portion each intersect the longitudinal axis.

CCCIII. A surgical saw blade configured for oscillatory resection of bone, the surgical saw blade comprising:
a body having a mounting portion and a distal portion opposite the mounting portion, two sides extending between the distal portion and a proximal end of the mounting portion, the distal portion having teeth formed on a distal region, the body defining a longitudinal axis, the distal portion and the mounting portion are integral with one another such that oscillation of the mounting portion results in oscillation of the distal portion, the mounting portion defining a first aperture,
wherein the mounting portion further comprises:
two stop protrusions extending outwardly from the two sides; and
the first aperture defining a first driving portion having at least one first drive wall aligned with the two stop protrusions, wherein
each of the two sides further comprise a first side portion and a second side portion positioned proximal to the first side portion, wherein the second side portion tapers towards the longitudinal axis from the first side portion to the proximal end.

CCCIV. A surgical saw blade configured for oscillatory resection of bone, the saw blade comprising:
a body defining a longitudinal axis, the body having a mounting portion and a distal portion opposite the mounting portion, the distal portion and the mounting portion integral with one another such that oscillation of the mounting portion results in oscillation of the distal portion, the distal portion having teeth formed on a distal region, the mounting portion defines a series of apertures including:
a first aperture shaped for receiving a biasing actuator, the first aperture defining a keyway corresponding to the biasing actuator; and
a second aperture defining a driving portion, the second aperture positioned distal to the first aperture, wherein the first and second aperture each overlap the longitudinal axis of the body of the saw blade.

Example configurations of the saw blade 10, 110, 210, 310, 410, 510, 610, 710 have been described in an illustrative manner above. These saw blades 10, 110, 210, 310, 410, 510, 610, 710 may be utilized as part of a surgical saw system 6 including surgical saw having a blade mount 808 for removably securing the saw blade(s) 10, 110, 210, 310, 410, 510, 610, 710 to the surgical It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:
1. A surgical saw blade configured for oscillatory resection of bone, the saw blade comprising:
a body defining a longitudinal axis, the body having a mounting portion and a distal portion opposite the mounting portion, the distal portion and the mounting portion formed integrally with one another such that oscillation of the mounting portion results in oscillation of the distal portion, the distal portion having teeth formed on a blade head, the mounting portion defining a series of apertures including:
a first aperture shaped for receiving a biasing actuator; and
a second aperture including a second proximal end and a second distal end opposite the second proximal end, wherein
the mounting portion includes a peninsula portion extending away from the first aperture and configured for retaining the saw blade in a saw blade mount, the peninsula portion comprising two side walls and an arcuate end wall extending between the two side walls,
the peninsula portion is partially surrounded by the second aperture, and
the peninsula portion defines an area less than an area defined by the second aperture.

2. The surgical saw blade of claim 1, wherein the first aperture includes an arcuate first proximal end wall configured for biasing the surgical saw blade in a direction towards the peninsula portion.

3. The surgical saw blade of claim 1, wherein the mounting portion further comprises
a proximal edge;
a distal axis opposite the proximal edge, the distal axis perpendicular to the longitudinal axis and positioned less than half a length of the saw blade from the proximal edge; and
two side edges extending between the distal axis and the proximal edge, wherein the mounting portion further comprises two stop protrusions extending outwardly from the two side edges.

4. The surgical saw blade of claim 3, wherein the two stop protrusions are positioned distal to the first aperture.

5. The surgical saw blade of claim 3, wherein each of the two side edges further comprise:
a first side region; and
a second side region positioned proximal to the first side region, the second side region including a first end and a second end, wherein the first end has a first end distance to the longitudinal axis, the second end that is proximal to the first end has a second end distance to the longitudinal axis, and the first end distance is greater than the second end distance.

6. The surgical saw blade of claim 1, wherein the two side walls including a distal side wall end having a distal side wall end distance to the longitudinal axis and a proximal side wall end having a proximal side wall end distance to the longitudinal axis, wherein the distal side wall distance is greater than the proximal side wall distance.

7. The surgical saw blade of claim 1, wherein the series of apertures further includes a third aperture defined by:
a fore proximal wall,
a fore distal wall, and
two fore side walls extending between the fore proximal wall and the fore distal wall, wherein the two fore side walls taper toward the longitudinal axis from the fore proximal wall to the fore distal wall.

8. The surgical saw blade of claim 1, wherein the series of apertures includes a third aperture including a fore distal wall having a fore distal wall end and a fore proximal wall having a fore proximal wall end, the fore distal wall end having a fore distal wall end distance to the longitudinal axis, the fore proximal wall end having a fore proximal wall end distance to the longitudinal axis, the fore distal wall end distance less than the fore proximal wall end distance.

9. A surgical saw blade configured for oscillatory resection of bone, the saw blade comprising:
a body defining a longitudinal axis, the body having a mounting portion and a distal portion opposite the mounting portion, the distal portion and the mounting portion formed integrally with one another such that oscillation of the mounting portion results in oscillation of the distal portion, the distal portion having teeth formed on a distal region,
the mounting portion having a proximal edge and a distal axis opposite the proximal edge, the mounting portion defining a series of apertures including:
a rear aperture; and
a fore aperture distal to the rear aperture, the fore aperture shaped to retain the saw blade during actuation, wherein the rear and fore aperture each intersects the longitudinal axis of the body of the saw blade; and
a central aperture positioned between the rear aperture and the fore aperture comprising a central proximal end wall, a pair of central side walls, and a central distal end wall, wherein
the mounting portion includes a peninsula portion extending away from the fore aperture, the peninsula portion configured for retaining the saw blade in a saw blade mount, the peninsula portion being partially surrounded by the rear aperture.

10. The surgical saw blade of claim 9, wherein the central proximal end wall is further defined as an arcuate central proximal end wall configured for biasing the surgical saw blade in a direction towards the peninsula portion.

11. The surgical saw blade of claim 9, wherein the peninsula portion comprises two side walls and an end wall, the two side walls taper towards the longitudinal axis from the distal end to the end wall.

12. The surgical saw blade of claim 9, wherein the fore aperture includes two fore side walls extending between a fore proximal wall and a fore distal wall, wherein the two fore side walls taper toward the longitudinal axis from the fore proximal wall to the fore distal wall.

13. The saw blade of claim 9, wherein the mounting portion further comprises
a proximal edge;
a distal axis opposite the proximal edge, the distal axis perpendicular to the longitudinal axis and positioned less than half a length of the saw blade from the proximal edge; and
two side edges extending between the distal axis and the proximal edge, wherein the mounting portion further comprises two stop protrusions extending outwardly from the two side edges.

14. The saw blade of claim 13, wherein the two stop protrusions are positioned distal to the rear aperture.

15. The surgical saw blade of claim 13, wherein each of the two side edges further comprise:
a first side portion; and
a second side portion positioned proximal to the first side portion, the second side portion including a first end and a second end, wherein the first end has a first end distance relative to the longitudinal axis, the second end that is proximal to the first end has a second end distance relative to the longitudinal axis, and the first end distance is greater than the second end distance.

16. A surgical saw blade configured for oscillatory resection of bone, the saw blade comprising:

a body defining a longitudinal axis, the body having:
  a mounting portion having a proximal edge, a distal axis opposite the proximal edge, the distal axis perpendicular to the longitudinal axis and positioned less than half a length of the saw blade from the proximal edge, two side edges extending between the distal axis and the proximal edge, and two stop protrusions extending outwardly from the two side edges; and
  a distal portion opposite the mounting portion, the distal portion having teeth formed on a distal region, the distal portion and the mounting portion integral with one another such that oscillation of the mounting portion results in oscillation of the distal portion,
  the mounting portion defining a series of apertures including:
    a first aperture shaped to receiving a biasing actuator; and
    a second aperture proximal to the first aperture, wherein the mounting portion includes a peninsula portion extending away from the first aperture, the peninsula portion partially surrounded by the second aperture and configured for retaining the saw blade in a saw blade mount, and
    the stop protrusions are distal to the first aperture.

17. The surgical saw blade of claim 16, wherein each of the two side edges comprise:
  a first side portion; and
  a second side portion positioned proximal to the first side portion, the second side portion including a first end and a second end, wherein the first end has a first end distance to the longitudinal axis, the second end that is proximal to the first end has a second end distance to the longitudinal axis, and the first end distance is greater than the second end distance.

18. The surgical saw blade of claim 16, wherein the first aperture comprises:
  a central proximal end wall;
  a pair of central side walls;
  a central distal end wall; and
  wherein the central proximal end wall further defines an arcuate central proximal end wall configured for biasing the surgical saw blade in a direction towards the peninsula portion.

19. The surgical saw blade of claim 16, wherein the peninsula portion comprises two side walls and an end wall, the two side walls taper towards the longitudinal axis from the distal end to the end wall.

20. The surgical saw blade of claim 16, wherein the peninsula portion comprises two side walls, the two side walls including a distal side wall end having a distal side wall end distance to the longitudinal axis and a proximal side wall end having a proximal side wall end distance to the longitudinal axis, wherein the distal side wall distance is greater than the proximal side wall distance.

21. The surgical saw blade of claim 16, wherein the peninsula portion comprises:
  two side walls; and
  an arcuate end wall extending between the two side walls.

22. The surgical saw blade of claim 16, wherein the series of apertures further comprises a third aperture including:
  a fore proximal wall,
  a fore distal wall, and
  two side walls extending between the fore proximal wall and the fore distal wall, wherein the two side walls taper toward the longitudinal axis from the fore proximal wall to the fore distal wall.

23. The surgical saw blade of claim 16, wherein the series of apertures further comprises a third aperture including a fore distal wall having a fore distal wall end and a fore proximal wall having a fore proximal wall end, the fore distal wall end having a rear distal wall end distance to the longitudinal axis, the fore proximal wall end having a fore proximal wall end distance to the longitudinal axis, the fore distal wall end distance less than the fore proximal wall end distance.

24. A surgical saw blade configured for oscillatory resection of bone, the saw blade comprising:
  a body having a mounting portion and a distal portion opposite the mounting portion; the distal portion having teeth formed on a distal region, the body defining a longitudinal axis, the distal portion and the mounting portion are formed integrally with one another such that oscillation of the mounting portion results in oscillation of the distal portion; wherein
  the mounting portion defines:
    a central aperture shaped to receive a biasing actuator;
    a rear aperture proximal to the central aperture;
    a first driving portion, having at least one first drive wall proximal to the central aperture, the first drive wall including a first end and a second end, wherein the first end has a first end distance to the longitudinal axis and the second end that is proximal to the first end has a second end distance to the longitudinal axis, the first end distance is greater than the second end distance;
    a second driving portion defined by a fore aperture, the fore aperture being located distal to the central aperture;
    a proximal edge;
    a distal axis opposite the proximal edge, the distal axis perpendicular to the longitudinal axis and positioned less than half a length of the saw blade from the proximal edge; and
    two side edges extending between the distal axis and the proximal edge,
    wherein the mounting portion further comprises two stop protrusions extending outwardly from the two side edges, and
    the central, rear, and fore aperture each overlap the longitudinal axis of the body of the saw blade.

25. The surgical saw blade of claim 24, wherein the central aperture comprises:
  a central proximal end wall;
  a pair of central side walls;
  a central distal end wall; and
  wherein the central proximal end wall is further defined by an arcuate central proximal end wall configured for biasing the surgical saw blade in a proximal direction.

26. The surgical saw blade of claim 24, wherein the two stop protrusions are positioned distal to the rear aperture.

27. A surgical saw blade configured for oscillatory resection of bone, the saw blade comprising:
  a body defining a longitudinal axis, the body having a mounting portion and a distal portion opposite the mounting portion, the distal portion and the mounting portion formed integrally with one another such that oscillation of the mounting portion results in oscillation of the distal portion, the distal portion having teeth formed on a blade head, the mounting portion defining a series of apertures including:

a first aperture shaped for receiving a biasing actuator; and a second aperture including a second proximal end and a second distal end opposite the second proximal end, wherein the mounting portion includes a peninsula portion extending away from the first aperture and configured for retaining the saw blade in a saw blade mount, the peninsula portion including a tab portion having a tab length extending in a proximal direction from the peninsula portion, the tab length is less than a peninsula portion length, the peninsula portion is partially surrounded by the second aperture, and the peninsula portion defines an area less than an area defined by the second aperture.

28. A surgical saw blade configured for oscillatory resection of bone, the saw blade comprising:

a body defining a longitudinal axis, the body having a mounting portion and a distal portion opposite the mounting portion, the distal portion and the mounting portion formed integrally with one another such that oscillation of the mounting portion results in oscillation of the distal portion, the distal portion having teeth formed on a distal region, the mounting portion defining a series of apertures including:

a rear aperture; and a fore aperture distal to the rear aperture, the fore aperture shaped to retain the saw blade during actuation, wherein the rear and fore aperture each intersects the longitudinal axis of the body of the saw blade, wherein the fore aperture includes two fore side walls extending between a fore proximal wall and a fore distal wall, wherein the two fore side walls taper toward the longitudinal axis from the fore proximal wall to the fore distal wall, and the mounting portion includes a peninsula portion extending away from the fore aperture, the peninsula portion configured for retaining the saw blade in a saw blade mount, the peninsula portion being partially surrounded by the rear aperture.

\* \* \* \* \*